United States Patent
Horton et al.

(10) Patent No.: US 10,440,545 B2
(45) Date of Patent: *Oct. 8, 2019

(54) METHODS AND APPARATUS FOR USING SMART ENVIRONMENT DEVICES VIA APPLICATION PROGRAM INTERFACES

(71) Applicant: Google LLC, Mountain View, CA (US)

(72) Inventors: David Horton, San Jose, CA (US); Leon Tan, San Jose, CA (US); Andrew Urman, San Jose, CA (US); Melissa Daniels, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/051,375

(22) Filed: Jul. 31, 2018

(65) Prior Publication Data
US 2018/0376313 A1 Dec. 27, 2018

Related U.S. Application Data

(63) Continuation of application No. 15/158,268, filed on May 18, 2016, now Pat. No. 10,075,828, which is a
(Continued)

(51) Int. Cl.
*G06F 3/00* (2006.01)
*G06F 9/44* (2018.01)
(Continued)

(52) U.S. Cl.
CPC .............. *H04W 4/80* (2018.02); *F24F 11/30* (2018.01); *F24F 11/62* (2018.01); *G05B 13/04* (2013.01); *G05B 15/02* (2013.01); *G05B 17/02* (2013.01); *G05D 23/1904* (2013.01); *G05D 23/1917* (2013.01); *G06F 9/54* (2013.01); *G06F 9/541* (2013.01); *G06F 9/546* (2013.01); *G08B 17/10* (2013.01); *H04L 12/282* (2013.01); *H04L 12/2803* (2013.01); *H04L 12/2816* (2013.01); *H04L 12/2818* (2013.01); *H04L 12/2823* (2013.01); *H04L 12/2829* (2013.01); *H04L 63/08* (2013.01); *H04L 67/1097* (2013.01);
(Continued)

(58) Field of Classification Search
CPC ....................................................... H04W 4/80
USPC ................................................................ 719/328
See application file for complete search history.

(56) References Cited

U.S. PATENT DOCUMENTS

| 5,903,455 A | 5/1999 | Sharpe, Jr. et al. |
| 6,349,883 B1 | 2/2002 | Simmons et al. |

(Continued)

OTHER PUBLICATIONS

"Non-Final Office Action", U.S. Appl. No. 15/380,767, dated Dec. 18, 2018, 7 pages.
(Continued)

*Primary Examiner* — Timothy A Mudrick
(74) *Attorney, Agent, or Firm* — Colby Nipper PLLC

(57) ABSTRACT

Systems and Methods disclosed herein relate to providing control of smart devices via data provided from or to a doorbell, via an application programming interface (API). The data provided by the doorbell may be submission data related to the doorbell, while received data may be reception data related to one or more smart devices, a smart-device environment structure hosting the smart devices, or both. Based upon the reception data and/or the submission data, a status of the doorbell and/or of the smart devices may be modified.

20 Claims, 40 Drawing Sheets

Related U.S. Application Data continuation-in-part of application No. PCT/US2015/037215, filed on Jun. 23, 2015, which is a continuation of application No. 14/722,034, filed on May 26, 2015, now abandoned, and a continuation of application No. 14/722,032, filed on May 26, 2015, now Pat. No. 9,668,085, and a continuation of application No. 14/722,026, filed on May 26, 2015, now Pat. No. 9,456,297, and a continuation of application No. 14/722,023, filed on May 26, 2015, now Pat. No. 9,838,830, and a continuation of application No. 14/722,012, filed on May 26, 2015, now Pat. No. 9,854,386, and a continuation of application No. 14/722,003, filed on May 26, 2015, now Pat. No. 9,491,571, and a continuation-in-part of application No. 14/531,805, filed on Nov. 3, 2014, now abandoned.

(60) Provisional application No. 62/099,959, filed on Jan. 5, 2015, provisional application No. 62/016,052, filed on Jun. 23, 2014.

(51) Int. Cl.

| | | |
|---|---|---|
| *G06F 9/46* | (2006.01) | |
| *G06F 13/00* | (2006.01) | |
| *H04W 4/80* | (2018.01) | |
| *G05B 15/02* | (2006.01) | |
| *H04W 4/60* | (2018.01) | |
| *G05D 23/19* | (2006.01) | |
| *G06F 9/54* | (2006.01) | |
| *H04L 12/28* | (2006.01) | |
| *G05B 13/04* | (2006.01) | |
| *G08B 17/10* | (2006.01) | |
| *H04L 29/06* | (2006.01) | |
| *H04L 29/08* | (2006.01) | |
| *H04M 1/725* | (2006.01) | |
| *F24F 11/62* | (2018.01) | |
| *F24F 11/30* | (2018.01) | |
| *G05B 17/02* | (2006.01) | |
| *H04W 4/021* | (2018.01) | |
| *H05B 37/02* | (2006.01) | |

(52) U.S. Cl.
CPC .............. *H04L 67/12* (2013.01); *H04L 67/22* (2013.01); *H04M 1/72533* (2013.01); *H04W 4/021* (2013.01); *H04W 4/60* (2018.02); *H05B 37/0227* (2013.01); *H05B 37/0272* (2013.01); *G05B 2219/2642* (2013.01); *H04L 29/06047* (2013.01); *H04L 67/30* (2013.01); *H04L 67/42* (2013.01); *H04L 2012/285* (2013.01); *H04L 2012/2841* (2013.01)

(56) References Cited

U.S. PATENT DOCUMENTS

| | | |
|---|---|---|
| 6,993,658 B1 | 1/2006 | Engberg et al. |
| 7,904,209 B2 | 3/2011 | Podgorny et al. |
| 8,594,850 B1 | 11/2013 | Gourlay et al. |
| 8,718,826 B2 | 5/2014 | Ramachandran et al. |
| 8,843,935 B2 | 9/2014 | Hegdal et al. |
| 8,862,096 B1 | 10/2014 | Viswanathan et al. |
| 9,130,910 B1 | 9/2015 | Logue |
| 9,154,303 B1 | 10/2015 | Saylor |
| 9,191,771 B2 | 11/2015 | Viswanathan et al. |
| 9,491,571 B2 | 11/2016 | Karp et al. |
| 9,532,094 B2 | 12/2016 | Karp et al. |
| 9,541,912 B1 | 1/2017 | Grossman, IV et al. |
| 9,668,085 B2 | 5/2017 | Pi-Sunyer |
| 9,788,039 B2 | 10/2017 | Karp |
| 9,854,386 B2 | 12/2017 | Karp |
| 9,973,802 B2 | 5/2018 | Karp et al. |
| 10,075,828 B2 | 9/2018 | Horton et al. |
| 2001/0034754 A1 | 10/2001 | Elwahab et al. |
| 2002/0023258 A1 | 2/2002 | Elwahab et al. |
| 2002/0047646 A1 | 4/2002 | Lys et al. |
| 2003/0041107 A1 | 2/2003 | Blattner et al. |
| 2003/0044017 A1 | 3/2003 | Briscoe |
| 2003/0177012 A1 | 9/2003 | Drennan |
| 2003/0208527 A1 | 11/2003 | Lglesais et al. |
| 2004/0019900 A1 | 1/2004 | Knightbridge et al. |
| 2004/0111499 A1 | 6/2004 | Dobrowski et al. |
| 2004/0137891 A1 | 7/2004 | Clark et al. |
| 2004/0138961 A1 | 7/2004 | Clark et al. |
| 2004/0139119 A1 | 7/2004 | Clark et al. |
| 2004/0139120 A1 | 7/2004 | Roundtree et al. |
| 2004/0142683 A1 | 7/2004 | Clark et al. |
| 2005/0119794 A1 | 6/2005 | Amundson et al. |
| 2005/0125083 A1 | 6/2005 | Kiko |
| 2005/0140574 A1 | 6/2005 | Tamura |
| 2005/0188402 A1 | 8/2005 | de Andrade et al. |
| 2005/0280704 A1 | 12/2005 | Clare et al. |
| 2006/0053164 A1 | 3/2006 | Ewing et al. |
| 2006/0080408 A1 | 4/2006 | Istvan et al. |
| 2006/0271911 A1 | 11/2006 | Palapudi et al. |
| 2007/0043478 A1 | 2/2007 | Ehlers et al. |
| 2007/0293264 A1 | 12/2007 | Marsh et al. |
| 2008/0077867 A1 | 3/2008 | Hake et al. |
| 2008/0090617 A1 | 4/2008 | Sutardja |
| 2008/0209491 A1 | 8/2008 | Hasek |
| 2008/0262822 A1 | 10/2008 | Hardwick et al. |
| 2009/0249428 A1 | 10/2009 | White et al. |
| 2010/0127854 A1 | 5/2010 | Helvick et al. |
| 2010/0131618 A1 | 5/2010 | Brewis et al. |
| 2010/0131619 A1 | 5/2010 | Brewis et al. |
| 2010/0131622 A1 | 5/2010 | Brewis et al. |
| 2010/0131652 A1 | 5/2010 | Brewis et al. |
| 2010/0217837 A1 | 8/2010 | Ansari et al. |
| 2010/0289643 A1 | 11/2010 | Trundle et al. |
| 2011/0015802 A1 | 1/2011 | Imes |
| 2011/0046805 A1 | 2/2011 | Bedros et al. |
| 2011/0082574 A1 | 4/2011 | Pachet et al. |
| 2011/0119317 A1 | 5/2011 | Kazoun et al. |
| 2011/0131304 A1 | 6/2011 | Henson |
| 2011/0131384 A1 | 6/2011 | Henson |
| 2011/0202185 A1 | 8/2011 | Imes et al. |
| 2011/0238978 A1 | 9/2011 | Majumdar et al. |
| 2011/0269465 A1 | 11/2011 | Xu et al. |
| 2011/0276396 A1 | 11/2011 | Rathod |
| 2011/0289113 A1 | 11/2011 | Arling et al. |
| 2011/0290893 A1 | 12/2011 | Steinberg |
| 2011/0306304 A1 | 12/2011 | Forutanpour et al. |
| 2011/0314163 A1 | 12/2011 | Borins et al. |
| 2012/0016524 A1 | 1/2012 | Spicer et al. |
| 2012/0172027 A1 | 7/2012 | Partheesh et al. |
| 2012/0179547 A1 | 7/2012 | Besore et al. |
| 2012/0305661 A1 | 12/2012 | Malchiondo et al. |
| 2013/0073094 A1 | 3/2013 | Knapton et al. |
| 2013/0098596 A1 | 4/2013 | Fisher et al. |
| 2013/0297078 A1 | 11/2013 | Kolavennu |
| 2013/0328663 A1 | 12/2013 | Ordaz |
| 2014/0047368 A1 | 2/2014 | Yang et al. |
| 2014/0058567 A1 | 2/2014 | Matsuoka et al. |
| 2014/0058806 A1 | 2/2014 | Guenette et al. |
| 2014/0082702 A1 | 3/2014 | Supalla |
| 2014/0201256 A1 | 7/2014 | Pinheiro et al. |
| 2014/0206326 A1 | 7/2014 | Hodges et al. |
| 2014/0222862 A1 | 8/2014 | Arling et al. |
| 2014/0309788 A1 | 10/2014 | Blum |
| 2014/0309874 A1 | 10/2014 | Ricci |
| 2014/0337879 A1 | 11/2014 | Arling et al. |
| 2014/0351870 A1 | 11/2014 | Amine et al. |
| 2014/0359602 A1 | 12/2014 | Sawaya et al. |
| 2015/0098455 A1 | 4/2015 | Fritsch |
| 2015/0227118 A1 | 8/2015 | Wong |
| 2015/0236913 A1 | 8/2015 | Nakano et al. |
| 2015/0279183 A1 | 10/2015 | Kobayashi |
| 2015/0334165 A1 | 11/2015 | Arling et al. |

(56) References Cited

U.S. PATENT DOCUMENTS

| | | |
|---|---|---|
| 2015/0370615 A1 | 12/2015 | Pi-Sunyer |
| 2015/0370621 A1 | 12/2015 | Karp et al. |
| 2015/0372832 A1 | 12/2015 | Kortz et al. |
| 2015/0372833 A1 | 12/2015 | Karp |
| 2015/0372834 A1 | 12/2015 | Karp |
| 2015/0373149 A1 | 12/2015 | Lyons |
| 2016/0134932 A1 | 5/2016 | Karp et al. |
| 2016/0142758 A1 | 5/2016 | Karp et al. |
| 2016/0261425 A1 | 9/2016 | Horton et al. |
| 2016/0297479 A1 | 10/2016 | Ritschel et al. |
| 2017/0118499 A1 | 4/2017 | Karp et al. |
| 2017/0192402 A1 | 7/2017 | Karp et al. |
| 2019/0058985 A1 | 2/2019 | Karp et al. |
| 2019/0208390 A1 | 7/2019 | Kortz et al. |

OTHER PUBLICATIONS

"Final Office Action", U.S. Appl. No. 14/577,635, dated Dec. 6, 2018, 54 pages.
"Advisory Action", U.S. Appl. No. 14/722,034, dated Sep. 1, 2017, 3 pages.
"Advisory Action", U.S. Appl. No. 14/531,805, dated Oct. 14, 2015, 3 pages.
"Final Office Action", U.S. Appl. No. 14/531,805, dated Oct. 20, 2017, 13 pages.
"Final Office Action", U.S. Appl. No. 14/531,805, dated Jul. 31, 2015, 13 pages.
"Final Office Action", U.S. Appl. No. 14/531,805, dated Jul. 26, 2018, 13 pages.
"Final Office Action", U.S. Appl. No. 14/722,034, dated Oct. 30, 2017, 15 pages.
"Final Office Action", U.S. Appl. No. 14/722,023, dated Sep. 19, 2016, 15 pages.
"Final Office Action", U.S. Appl. No. 14/722,034, dated Apr. 18, 2017, 16 pages.
"Final Office Action", U.S. Appl. No. 14/531,805, dated Dec. 29, 2016, 17 pages.
"Final Office Action", U.S. Appl. No. 14/722,012, dated Aug. 30, 2016, 25 pages.
"Final Office Action", U.S. Appl. No. 14/987,679, dated Feb. 13, 2017, 25 pages.
"Final Office Action", U.S. Appl. No. 14/577,635, dated Jan. 23, 2017, 44 pages.
"Final Office Action", U.S. Appl. No. 14/577,635, dated Jan. 30, 2018, 52 pages.
"First Action Interview Office Action", U.S. Appl. No. 14/988,278, dated Jun. 7, 2016, 3 pages.
"First Action Interview Office Action", U.S. Appl. No. 14/722,034, dated Jul. 21, 2016, 3 pages.
"First Action Interview Office Action", U.S. Appl. No. 14/531,805, dated Apr. 6, 2015, 4 pages.
"First Action Interview Office Action", U.S. Appl. No. 14/722,003, dated Feb. 24, 2016, 5 pages.
"First Action Interview Office Action", U.S. Appl. No. 14/722,023, dated Apr. 21, 2016, 5 pages.
"International Preliminary Report on Patentability", Application No. PCT/US2015/037215, dated Jan. 5, 2017, 8 pages.
"International Search Report and Written Opinion", Application No. PCT/US2015/037215, dated Oct. 9, 2015, 10 pages.
"Non-Final Office Action", U.S. Appl. No. 14/531,805, dated Jun. 30, 2017, 12 pages.
"Non-Final Office Action", U.S. Appl. No. 14/531,805, dated Mar. 28, 2018, 13 pages.
"Non-Final Office Action", U.S. Appl. No. 14/722,034, dated Jan. 11, 2018, 15 pages.
"Non-Final Office Action", U.S. Appl. No. 14/531,805, dated Jun. 23, 2016, 16 pages.
"Non-Final Office Action", U.S. Appl. No. 14/722,034, dated Jan. 12, 2017, 17 pages.
"Non-Final Office Action", U.S. Appl. No. 14/722,012, dated Apr. 4, 2017, 19 pages.
"Non-Final Office Action", U.S. Appl. No. 14/987,679, dated Jun. 2, 2016, 22 pages.
"Non-Final Office Action", U.S. Appl. No. 14/577,635, dated Jul. 5, 2016, 32 pages.
"Non-Final Office Action", U.S. Appl. No. 14/577,635, dated Jul. 26, 2017, 47 pages.
"Non-Final Office Action", U.S. Appl. No. 14/577,635, dated Jun. 1, 2018, 53 pages.
"Notice of Allowance", U.S. Appl. No. 14/722,023, dated Jul. 25, 2017, 10 pages.
"Notice of Allowance", U.S. Appl. No. 14/722,023, dated Feb. 23, 2017, 10 pages.
"Notice of Allowance", U.S. Appl. No. 15/158,268, dated May 1, 2018, 11 pages.
"Notice of Allowance", U.S. Appl. No. 14/722,034, dated Jul. 20, 2018, 14 pages.
"Notice of Allowance", U.S. Appl. No. 14/722,012, dated Aug. 2, 2017, 5 pages.
"Notice of Allowance", U.S. Appl. No. 14/722,003, dated Jun. 23, 2016, 7 pages.
"Notice of Allowance", U.S. Appl. No. 14/988,278, dated Oct. 3, 2016, 7 pages.
"Notice of Allowance", U.S. Appl. No. 14/722,032, dated Nov. 21, 2016, 7 pages.
"Notice of Allowance", U.S. Appl. No. 14/987,679, dated Jun. 1, 2017, 7 pages.
"Notice of Allowance", U.S. Appl. No. 14/722,032, dated Mar. 28, 2017, 8 pages.
"Notice of Allowance", U.S. Appl. No. 15/387,423, dated Jan. 9, 2018, 9 pages.
"Pre-Interview Communication", U.S. Appl. No. 14/988,278, dated Mar. 10, 2016, 3 pages.
"Pre-Interview First Office Action", U.S. Appl. No. 14/531,805, dated Feb. 10, 2015, 4 pages.
"Pre-Interview First Office Action", U.S. Appl. No. 14/722,003, dated Nov. 3, 2015, 4 pages.
"Pre-Interview First Office Action", U.S. Appl. No. 14/722,023, dated Dec. 14, 2015, 4 pages.
"Pre-Interview First Office Action", U.S. Appl. No. 14/722,012, dated Jan. 29, 2016, 4 pages.
"Pre-Interview First Office Action", U.S. Appl. No. 14/722,032, dated Mar. 11, 2016, 4 pages.
"Pre-Interview First Office Action", U.S. Appl. No. 14/722,034, dated Mar. 21, 2016, 4 pages.
"Supplemental Notice of Allowance", U.S. Appl. No. 15/158,268, dated May 22, 2018, 7 pages.
"Final Office Action", U.S. Appl. No. 15/380,767, dated May 15, 2019, 19 pages.
"Non-Final Office Action", U.S. Appl. No. 16/166,046, dated Aug. 7, 2019, 8 pages.

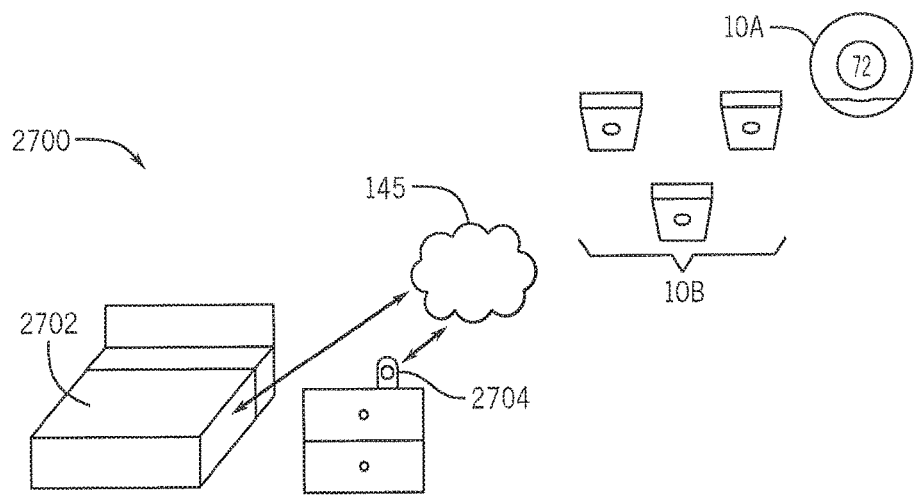
FIG. 56
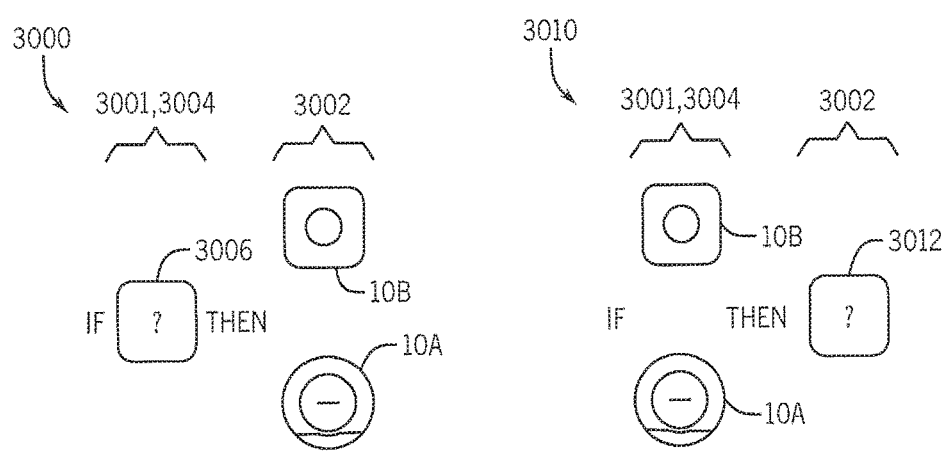
FIG. 57
FIG. 58

METHODS AND APPARATUS FOR USING SMART ENVIRONMENT DEVICES VIA APPLICATION PROGRAM INTERFACES

CROSS REFERENCE TO RELATED APPLICATIONS

This application is a continuation of and claims priority to U.S. patent application Ser. No. 15/158,268, entitled "Methods and Apparatus for Using Smart Environment Devices via Application Program Interfaces", filed May 18, 2016, which is herein incorporated by reference in its entirety for all purposes. Additionally, this application claims priority to Patent Cooperation Treaty Application No. PCT/US15/37215, entitled "Methods and Apparatus for Using Smart Environment Devices via Application Program Interfaces", filed Jun. 23, 2015, which is herein incorporated by reference in its entirety for all purposes. Additionally, this application claims priority to U.S. Provisional Patent Application No. 62/099,959, entitled "Methods and Apparatus for Exploiting Smart Environment Device Application Program Interfaces", filed Jan. 5, 2015, which is herein incorporated by reference in its entirety for all purposes. Additionally, this application claims priority to and incorporates by reference, in its entirety for all purposes, U.S. patent application Ser. No. 14/722,003 (NEST:0051A), Ser. No. 14/722,012 (NEST:0051B), Ser. No. 14/722,023 (NEST:0051C), Ser. No. 14/722,026 (NEST:0051D), Ser. No. 14/722,032 (NEST:0051E), and Ser. No. 14/722,034 (NEST:0051F), each entitled "METHODS AND APPARATUS FOR USING SMART ENVIRONMENT DEVICES VIA APPLICATION PROGRAM INTERFACES", filed May 26, 2015. Further, this application claims priority to and incorporates by reference, in its entirety for all purposes, U.S. patent application Ser. No. 14/531,805 (NEST:0035A), entitled "INTELLIGENT CONFIGURATION OF A SMART ENVIRONMENT BASED ON ARRIVAL TIME", filed Nov. 3, 2014, which claims priority to U.S. Provisional Application No. 62/016,052 (NEST:0035PRO), filed Jun. 23, 2014, which is incorporated by reference in its entirety for all purposes.

BACKGROUND

This disclosure relates to accessing data and/or controlling electronic devices (e.g., smart devices) via one or more application programming interfaces (APIs).

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

People interact with a number of different electronic devices on a daily basis. In a home setting, for example, a person may interact with smart thermostats, lighting systems, alarm systems, entertainment systems, and a variety of other electronic devices. To interact with some of these electronic devices, a person may communicate a command using an application program running on another electronic device. For instance, a person may control the temperature setting on a smart thermostat using an application program running on a smartphone. The application program may communicate with a secure online service that interacts with that thermostat.

To preserve the user experience associated with an electronic device, the manufacturer of the electronic device may develop the application programs to control the electronic device. Opening access to the electronic devices to third party developers, however, may potentially improve the experience of some people with the devices—but only if third party application programs do not cause the electronic devices to behave in an undesirable manner. Accordingly, while it may be desirable to open access to the electronic devices to third party developers, it may also be desirable to place restrictions on that access so as to reduce the risk that the third party access may negatively impact the operation of the electronic devices and thus the user experience associated with those devices.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

According to embodiments of this disclosure, applications may access different installations of smart home devices (e.g., via an application programming interface (API)). Namely, the third party applications may communicate not directly with a smart home device, but rather through a device service. The device service may provide a corresponding update signal to the target smart home device based on one or more factors such as operation status parameters of the device.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which:

FIG. 56 is a block diagram illustrating a system that integrates a smart bed cover and/or a smart bedside sleep detector with smart devices, in accordance with one or more embodiments;

FIG. 57 is a schematic illustration of a conditional rule where a thermostat, a smoke/carbon monoxide detector, or both are outputs, in accordance with an embodiment;

FIG. 58 is a schematic illustration of a conditional rule where data from a thermostat, a smoke/carbon monoxide detector, or both are conditions, in accordance with an embodiment;

DETAILED DESCRIPTION OF SPECIFIC EMBODIMENTS

Figure 1:
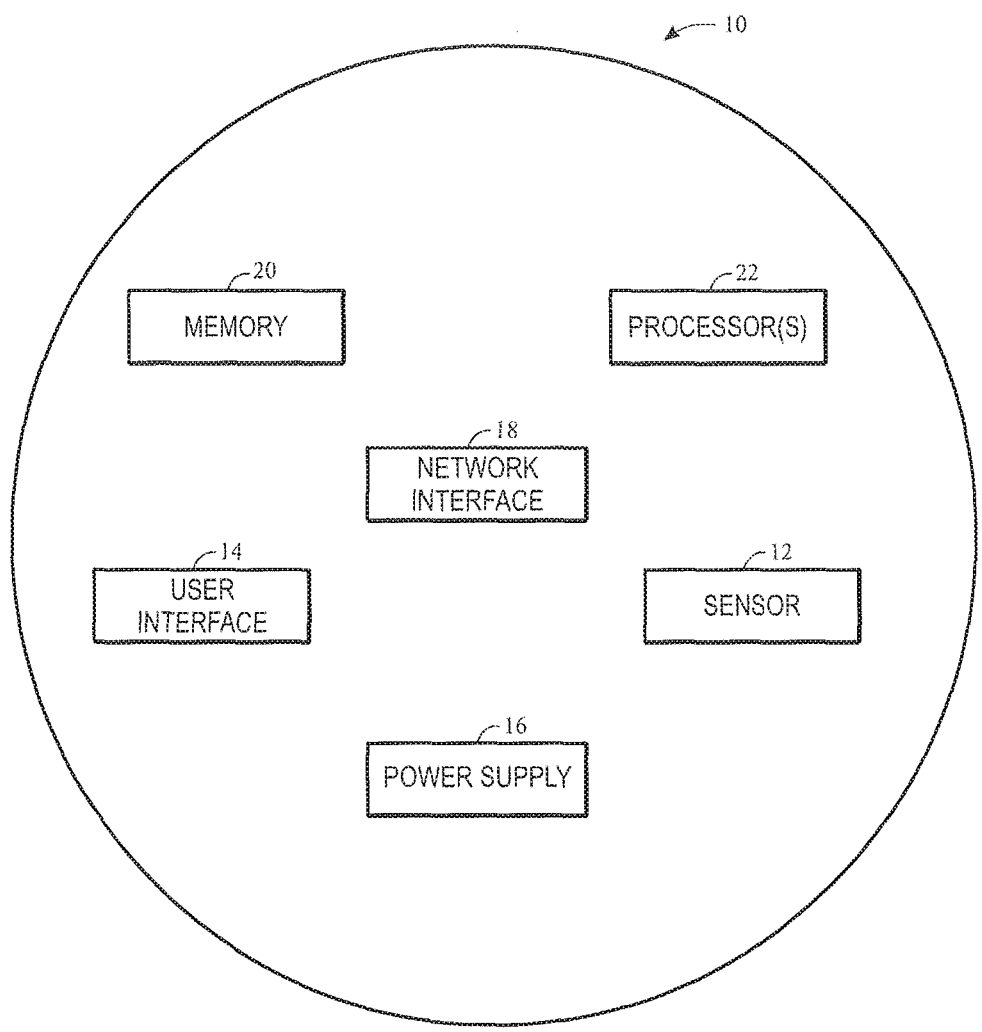
FIG. 1 is a block diagram of a smart home device, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Embodiments of the present disclosure relate to an electronic device, such as a thermostat or a hazard detector (e.g., smoke detector, carbon monoxide detector, etc.), that may be disposed in a building (e.g., home or office) such that the electronic device may detect the presence of a human being in the building and distinguish between the presence of the human being and a pet. Generally, the electronic device may employ a sensor, such as a passive infrared (PIR) sensor, to detect the presence of a human being. However, each PIR sensor may be inherently sensitive to different levels of noise. By accounting for the different sensitivity levels of each PIR sensor, the electronic device may improve its detection of human beings and better distinguish between the presence of human beings and pets.

Keeping this in mind, the electronic device may include a low-power processor that may store the sensor measurements acquired by the PIR sensor during a time period when the electronic device does not expect a human in the building or portion of the building being monitored by electronic device is not expected to have a human being present. In one embodiment, after storing the sensor measurements over some period of time, the low-power processor may send the stored sensor measurements to a high-power processor of the electronic device. The high-power processor may then calculate a threshold or adjust the previous threshold for determining a presence of a human based on the stored sensor measurements that correspond to the time period when a human being is likely not present in the building. The high-power processor may then send the newly calculated or the adjusted threshold to the low-power processor. The low-power processor may then use the newly calculated or the adjusted threshold to detect the presence of a human. Since the new threshold is calculated based on the respective sensor measurements for the respective PIR sensor of a respective electronic device, the new threshold may compensate for the inherent sensitivity characteristics of the respective PIR sensor. As a result, the electronic device may detect the presence of a human being more effectively and efficiently.

Smart Device in Smart Home Environment

By way of introduction, FIG. 1 illustrates an example of a general device 10 that may that may be disposed within a building environment. In one embodiment, the device 10 may include one or more sensors 12, a user-interface component 14, a power supply 16 (e.g., including a power connection and/or battery), a network interface 18, a high-power processor 20, a low-power processor 22, a passive infrared (PIR) sensor 24, a light source 26, and the like.

The sensors 12, in certain embodiments, may detect various properties such as acceleration, temperature, humidity, water, supplied power, proximity, external motion, device motion, sound signals, ultrasound signals, light signals, fire, smoke, carbon monoxide, global-positioning-satellite (GPS) signals, radio-frequency (RF), other electromagnetic signals or fields, or the like. As such, the sensors 12 may include temperature sensor(s), humidity sensor(s), hazard-related sensor(s) or other environmental sensor(s), accelerometer(s), microphone(s), optical sensors up to and including camera(s) (e.g., charged coupled-device or video cameras), active or passive radiation sensors, GPS receiver(s) or radiofrequency identification detector(s). While FIG. 1 illustrates an embodiment with a single sensor, many embodiments may include multiple sensors. In some instances, the device 10 may include one or more primary sensors and one or more secondary sensors. Here, the primary sensor(s) may sense data central to the core operation of the device (e.g., sensing a temperature in a thermostat or sensing smoke in a smoke detector), while the secondary sensor(s) may sense other types of data (e.g., motion, light or sound), which can be used for energy-efficiency objectives or smart-operation objectives.

One or more user-interface components 14 in the device 10 may receive input from the user and/or present information to the user. The received input may be used to determine a setting. In certain embodiments, the user-interface components may include a mechanical or virtual component that responds to the user's motion. For example, the user can mechanically move a sliding component (e.g., along a vertical or horizontal track) or rotate a rotatable ring (e.g., along a circular track), or the user's motion along a touchpad may be detected. Such motions may correspond to a setting adjustment, which can be determined based on an absolute position of a user-interface component 14 or based on a displacement of a user-interface components 14 (e.g., adjusting a set point temperature by 1 degree F. for every 10° rotation of a rotatable-ring component). Physically and virtually movable user-interface components can allow a user to set a setting along a portion of an apparent continuum. Thus, the user may not be confined to choose between two discrete options (e.g., as would be the case if up and down buttons were used) but can quickly and intuitively define a setting along a range of possible setting values. For example, a magnitude of a movement of a user-interface component may be associated with a magnitude of a setting adjustment, such that a user may dramatically alter a setting with a large movement or finely tune a setting with a small movement.

The user-interface components 14 may also include one or more buttons (e.g., up and down buttons), a keypad, a number pad, a switch, a microphone, and/or a camera (e.g., to detect gestures). In one embodiment, the user-interface component 14 may include a click-and-rotate annular ring component that may enable the user to interact with the component by rotating the ring (e.g., to adjust a setting) and/or by clicking the ring inwards (e.g., to select an adjusted setting or to select an option). In another embodiment, the user-interface component 14 may include a camera that may detect gestures (e.g., to indicate that a power or alarm state of a device is to be changed). In some instances, the device 10 may have one primary input component, which may be used to set a plurality of types of settings. The user-interface components 14 may also be configured to present information to a user via, e.g., a visual display (e.g., a thin-film-transistor display or organic light-emitting-diode display) and/or an audio speaker.

The power-supply component 16 may include a power connection and/or a local battery. For example, the power connection may connect the device 10 to a power source such as a line voltage source. In some instances, an AC power source can be used to repeatedly charge a (e.g., rechargeable) local battery, such that the battery may be used later to supply power to the device 10 when the AC power source is not available.

The network interface 18 may include a component that enables the device 10 to communicate between devices. As such, the network interface 18 may enable the device 10 to communicate with other devices 10 via a wired or wireless network. The network interface 18 may include a wireless card or some other transceiver connection to facilitate this communication.

The high-power processor 20 and the low-power processor 22 may support one or more of a variety of different device functionalities. As such, the high-power processor 20 and the low-power processor 22 may each include one or more processors configured and programmed to carry out and/or cause to be carried out one or more of the functionalities described herein. In one embodiment, the high-power processor 20 and the low-power processor 22 may include general-purpose processors carrying out computer code stored in local memory (e.g., flash memory, hard drive, and/or random access memory), special-purpose processors or application-specific integrated circuits, combinations thereof, and/or using other types of hardware/firmware/software processing platforms. In certain embodiments, the high-power processor 20 may execute computationally intensive operations such as operating the user-interface component 14 and the like. The low-power processor 22, on the other hand, may manage less complex processes such as detecting a hazard or temperature from the sensor 12. In one embodiment, the low-power processor may wake or initialize the high-power processor for computationally intensive processes.

By way of example, the high-power processor 20 and the low-power processor 22 may detect when a location (e.g., a house or room) is occupied (i.e., includes a presence of a human), up to and including whether it is occupied by a specific person or is occupied by a specific number of people (e.g., relative to one or more thresholds). In one embodiment, this detection can occur, e.g., by analyzing microphone signals, detecting user movements (e.g., in front of a device), detecting openings and closings of doors or garage doors, detecting wireless signals, detecting an internet protocol (IP) address of a received signal, detecting operation of one or more devices within a time window, or the like. Moreover, the high-power processor 20 and the low-power processor 22 may include image recognition technology to identify particular occupants or objects.

In certain embodiments, the high-power processor 20 and the low-power processor 22 may detect the presence of a human using the PIR sensor 24. The PIR sensor 24 may be a passive infrared sensor that may measures infrared (IR) light radiating from objects in its field of view. As such, the PIR sensor 24 may detect the Infrared radiation emitted from an object.

In some instances, the high-power processor 20 may predict desirable settings and/or implement those settings. For example, based on the presence detection, the high-power processor 20 may adjust device settings to, e.g., conserve power when nobody is home or in a particular room or to accord with user preferences (e.g., general at-home preferences or user-specific preferences). As another example, based on the detection of a particular person, animal or object (e.g., a child, pet or lost object), the high-power processor 20 may initiate an audio or visual indicator of where the person, animal or object is or may initiate an alarm or security feature if an unrecognized person is detected under certain conditions (e.g., at night or when lights are off).

In some instances, devices may interact with each other such that events detected by a first device influence actions of a second device. For example, a first device can detect that a user has entered into a garage (e.g., by detecting motion in the garage, detecting a change in light in the garage or detecting opening of the garage door). The first device can transmit this information to a second device via the network interface 18, such that the second device can, e.g., adjust a home temperature setting, a light setting, a music setting, and/or a security-alarm setting. As another example, a first device can detect a user approaching a front door (e.g., by detecting motion or sudden light pattern changes). The first device may, e.g., cause a general audio or visual signal to be presented (e.g., such as sounding of a doorbell) or cause a location-specific audio or visual signal to be presented (e.g., to announce the visitor's presence within a room that a user is occupying).

In addition to detecting various types of events, the device 10 may include a light source 26 that may illuminate when a living being, such as a human, is detected as approaching.

The light source 26 may include any type of light source such as one or more light-emitting diodes or the like. The light source 26 may be communicatively coupled to the high-power processor 20 and the low-power processor 22, which may provide a signal to cause the light source 26 to illuminate.

Figure 2:
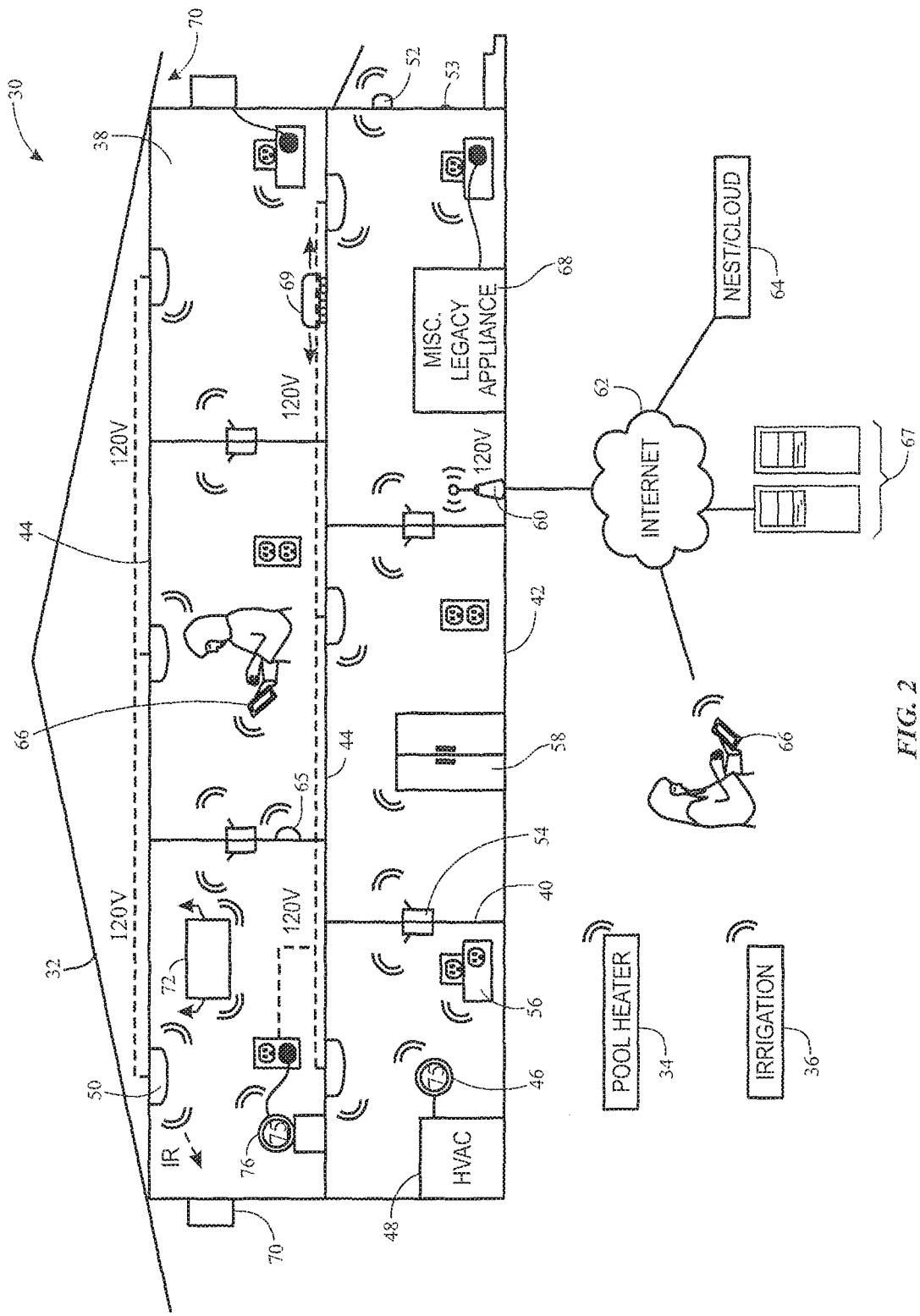
FIG. 2 is a block diagram of a connected smart home environment that includes a number of smart home devices, in accordance with an embodiment.

Keeping the foregoing in mind, FIG. 2 illustrates an example of a smart-home environment 30 within which one or more of the devices 10 of FIG. 1, methods, systems, services, and/or computer program products described further herein can be applicable. The depicted smart-home environment 30 includes a structure 32, which can include, e.g., a house, office building, garage, or mobile home. It will be appreciated that devices can also be integrated into a smart-home environment 30 that does not include an entire structure 32, such as an apartment, condominium, or office space. Further, the smart home environment can control and/or be coupled to devices outside of the actual structure 32. Indeed, several devices in the smart home environment need not physically be within the structure 32 at all. For example, a device controlling a pool heater or irrigation system can be located outside of the structure 32.

The depicted structure 32 includes a plurality of rooms 38, separated at least partly from each other via walls 40. The walls 40 can include interior walls or exterior walls. Each room can further include a floor 42 and a ceiling 44. Devices can be mounted on, integrated with and/or supported by a wall 40, floor 42 or ceiling 44.

In some embodiments, the smart-home environment 30 of FIG. 2 includes a plurality of devices 10, including intelligent, multi-sensing, network-connected devices, that can integrate seamlessly with each other and/or with a central server or a cloud-computing system to provide any of a variety of useful smart-home objectives. The smart-home environment 30 may include one or more intelligent, multi-sensing, network-connected thermostats 46 (hereinafter referred to as "smart thermostats 46"), one or more intelligent, network-connected, multi-sensing hazard detection units 50 (hereinafter referred to as "smart hazard detectors 50"), and one or more intelligent, multi-sensing, network-connected entryway interface devices 52 (hereinafter referred to as "smart doorbells 52"). According to embodiments, the smart thermostat 46 may include a Nest® Learning Thermostat—1st Generation T100577 or Nest® Learning Thermostat—2nd Generation T200577 by Nest Labs, Inc., among others. The smart thermostat 46 detects ambient climate characteristics (e.g., temperature and/or humidity) and controls a HVAC system 48 accordingly.

The smart hazard detector 50 may detect the presence of a hazardous substance or a substance indicative of a hazardous substance (e.g., smoke, fire, or carbon monoxide). The smart hazard detector 50 may include a Nest® Protect that may include sensors 12 such as smoke sensors, carbon monoxide sensors, and the like. As such, the hazard detector 50 may determine when smoke, fire, or carbon monoxide may be present within the building.

The smart doorbell 52 may detect a person's approach to or departure from a location (e.g., an outer door), control doorbell functionality, announce a person's approach or departure via audio or visual means, or control settings on a security system (e.g., to activate or deactivate the security system when occupants go and come). The smart doorbell 52 may interact with other devices 10 based on whether someone has approached or entered the smart-home environment 30.

In some embodiments, the smart-home environment 30 further includes one or more intelligent, multi-sensing, network-connected wall switches 54 (hereinafter referred to as "smart wall switches 54"), along with one or more intelligent, multi-sensing, network-connected wall plug interfaces 56 (hereinafter referred to as "smart wall plugs 56"). The smart wall switches 54 may detect ambient lighting conditions, detect room-occupancy states, and control a power and/or dim state of one or more lights. In some instances, smart wall switches 54 may also control a power state or speed of a fan, such as a ceiling fan. The smart wall plugs 56 may detect occupancy of a room or enclosure and control supply of power to one or more wall plugs (e.g., such that power is not supplied to the plug if nobody is at home).

Still further, in some embodiments, the device 10 within the smart-home environment 30 may further includes a plurality of intelligent, multi-sensing, network-connected appliances 58 (hereinafter referred to as "smart appliances 58"), such as refrigerators, stoves and/or ovens, televisions, washers, dryers, lights, stereos, intercom systems, garage-door openers, floor fans, ceiling fans, wall air conditioners, pool heaters, irrigation systems, security systems, and so forth. According to embodiments, the network-connected appliances 58 are made compatible with the smart-home environment by cooperating with the respective manufacturers of the appliances. For example, the appliances can be space heaters, window AC units, motorized duct vents, etc. When plugged in, an appliance can announce itself to the smart-home network, such as by indicating what type of appliance it is, and it can automatically integrate with the controls of the smart-home. Such communication by the appliance to the smart home can be facilitated by any wired or wireless communication protocols known by those having ordinary skill in the art. The smart home also can include a variety of non-communicating legacy appliances 68, such as old conventional washer/dryers, refrigerators, and the like which can be controlled, albeit coarsely (ON/OFF), by virtue of the smart wall plugs 56. The smart-home environment 30 can further include a variety of partially communicating legacy appliances, such as infrared ("IR") controlled wall air conditioners 70 or other IR-controlled devices, which can be controlled by IR signals provided by the smart hazard detectors 50 or the smart wall switches 54.

According to embodiments, the smart thermostats 46, the smart hazard detectors 50, the smart doorbells 52, the smart wall switches 54, the smart wall plugs 56, and other devices of the smart-home environment 30 are modular and can be incorporated into older and new houses. For example, the devices 10 are designed around a modular platform consisting of two basic components: a head unit and a back plate, which is also referred to as a docking station. Multiple configurations of the docking station are provided so as to be compatible with any home, such as older and newer homes. However, all of the docking stations include a standard head-connection arrangement, such that any head unit can be removably attached to any docking station. Thus, in some embodiments, the docking stations are interfaces that serve as physical connections to the structure and the voltage wiring of the homes, and the interchangeable head units contain all of the sensors 12, processors 28, user interfaces 14, the power supply 16, the network interface 18, and other functional components of the devices described above.

Many different commercial and functional possibilities for provisioning, maintenance, and upgrade are possible. For example, after years of using any particular head unit, a user will be able to buy a new version of the head unit and simply plug it into the old docking station. There are also many different versions for the head units, such as low-cost versions with few features, and then a progression of increasingly-capable versions, up to and including extremely fancy head units with a large number of features. Thus, it should be appreciated that the various versions of the head units can all be interchangeable, with any of them working when placed into any docking station. This can advantageously encourage sharing and re-deployment of old head units—for example, when an important high-capability head unit, such as a hazard detector, is replaced by a new version of the head unit, then the old head unit can be re-deployed to a back room or basement, etc. According to embodiments, when first plugged into a docking station, the head unit can ask the user (by 2D LCD display, 2D/3D holographic projection, voice interaction, etc.) a few simple questions such as, "Where am I" and the user can indicate "living room", "kitchen" and so forth.

The smart-home environment 30 may also include communication with devices outside of the physical home but within a proximate geographical range of the home. For example, the smart-home environment 30 may include a pool heater monitor 34 that communicates a current pool temperature to other devices within the smart-home environment 30 or receives commands for controlling the pool temperature. Similarly, the smart-home environment 30 may include an irrigation monitor 36 that communicates information regarding irrigation systems within the smart-home environment 30 and/or receives control information for controlling such irrigation systems. According to embodiments, an algorithm is provided for considering the geographic location of the smart-home environment 30, such as based on the zip code or geographic coordinates of the home. The geographic information is then used to obtain data helpful for determining optimal times for watering, such data may include sun location information, temperature, dewpoint, soil type of the land on which the home is located, etc.

By virtue of network connectivity, one or more of the smart-home devices of FIG. 2 can further allow a user to interact with the device even if the user is not proximate to the device. For example, a user can communicate with a device using a computer (e.g., a desktop computer, laptop computer, or tablet) or other portable electronic device (e.g., a smartphone) 66. A web page or app can be configured to receive communications from the user and control the device based on the communications and/or to present information about the device's operation to the user. For example, the user can view a current setpoint temperature for a device and adjust it using a computer. The user can be in the structure during this remote communication or outside the structure.

As discussed, users can control the smart thermostat and other smart devices in the smart-home environment 30 using a network-connected computer or portable electronic device 66. In some examples, some or all of the occupants (e.g., individuals who live in the home) can register their device 66 with the smart-home environment 30. Such registration can be made at a central server to authenticate the occupant and/or the device as being associated with the home and to give permission to the occupant to use the device to control the smart devices in the home. An occupant can use their registered device 66 to remotely control the smart devices of the home, such as when the occupant is at work or on vacation. The occupant may also use their registered device to control the smart devices when the occupant is actually located inside the home, such as when the occupant is sitting on a couch inside the home. It should be appreciated that instead of or in addition to registering devices 66, the smart-home environment 30 makes inferences about which individuals live in the home and are therefore occupants and which devices 66 are associated with those individuals. As such, the smart-home environment "learns" who is an occupant and permits the devices 66 associated with those individuals to control the smart devices of the home.

In some instances, guests desire to control the smart devices. For example, the smart-home environment may receive communication from an unregistered mobile device of an individual inside of the home, where said individual is not recognized as an occupant of the home. Further, for example, a smart-home environment may receive communication from a mobile device of an individual who is known to be or who is registered as a guest.

According to embodiments, a guest-layer of controls can be provided to guests of the smart-home environment 30. The guest-layer of controls gives guests access to basic controls (e.g., a judicially selected subset of features of the smart devices), such as temperature adjustments, but it locks out other functionalities. The guest layer of controls can be thought of as a "safe sandbox" in which guests have limited controls, but they do not have access to more advanced controls that could fundamentally alter, undermine, damage, or otherwise impair the occupant-desired operation of the smart devices. For example, the guest layer of controls will not permit the guest to adjust the heat-pump lockout temperature.

A use case example of this is when a guest is in a smart home, the guest could walk up to the thermostat and turn the dial manually, but the guest may not want to walk around the house "hunting" for the thermostat, especially at night while the home is dark and others are sleeping. Further, the guest may not want to go through the hassle of downloading the necessary application to their device for remotely controlling the thermostat. In fact, the guest may not have the home owner's login credentials, etc., and therefore cannot remotely control the thermostat via such an application. Accordingly, according to embodiments of the invention, the guest can open a mobile browser on their mobile device, type a keyword, such as "NEST" into the URL field and tap "Go" or "Search", etc. In response, the device presents the guest with a user interface which allows the guest to move the target temperature between a limited range, such as 65 and 80 degrees Fahrenheit. As discussed, the user interface provides a guest layer of controls that are limited to basic functions. The guest cannot change the target humidity, modes, or view energy history.

According to embodiments, to enable guests to access the user interface that provides the guest layer of controls, a local webserver is provided that is accessible in the local area network (LAN). It does not require a password, because physical presence inside the home is established reliably enough by the guest's presence on the LAN. In some embodiments, during installation of the smart device, such as the smart thermostat, the home owner is asked if they want to enable a Local Web App (LWA) on the smart device. Business owners will likely say no; home owners will likely say yes. When the LWA option is selected, the smart device broadcasts to the LAN that the above referenced keyword, such as "NEST", is now a host alias for its local web server. Thus, no matter whose home a guest goes to, that same keyword (e.g., "NEST") is always the URL you use to access the LWA, provided the smart device is purchased from the same manufacturer. Further, according to embodiments, if there is more than one smart device on the LAN, the second and subsequent smart devices do not offer to set up another LWA. Instead, they register themselves as target candidates with the master LWA. And in this case the LWA user would be asked which smart device they want to change the temperature on before getting the simplified user interface for the particular smart device they choose.

According to embodiments, a guest layer of controls may also be provided to users by means other than a device 66. For example, the smart device, such as the smart thermostat, may be equipped with walkup-identification technology (e.g., face recognition, RFID, ultrasonic sensors) that "fingerprints" or creates a "signature" for the occupants of the home. The walkup-identification technology can be the same as or similar to the fingerprinting and signature creating techniques described in other sections of this application. In operation, when a person who does not live in the home or is otherwise not registered with the smart home or whose fingerprint or signature is not recognized by the smart home "walks up" to a smart device, the smart device provides the guest with the guest layer of controls, rather than full controls.

As described below, the smart thermostat 46 and other smart devices "learn" by observing occupant behavior. For example, the smart thermostat learns occupants' preferred temperature set-points for mornings and evenings, and it learns when the occupants are asleep or awake, as well as when the occupants are typically away or at home, for example. According to embodiments, when a guest controls the smart devices, such as the smart thermostat, the smart devices do not "learn" from the guest. This prevents the guest's adjustments and controls from affecting the learned preferences of the occupants.

According to some embodiments, a smart television remote control is provided. The smart remote control recognizes occupants by thumbprint, visual identification, RFID, etc., and it recognizes a user as a guest or as someone belonging to a particular class having limited control and access (e.g., child). Upon recognizing the user as a guest or someone belonging to a limited class, the smart remote control only permits that user to view a subset of channels and to make limited adjustments to the settings of the television and other devices. For example, a guest cannot adjust the digital video recorder (DVR) settings, and a child is limited to viewing child-appropriate programming.

According to some embodiments, similar controls are provided for other instruments, utilities, and devices in the house. For example, sinks, bathtubs, and showers can be controlled by smart spigots that recognize users as guests or as children and therefore prevent water from exceeding a designated temperature that is considered safe.

In some embodiments, in addition to containing processing and sensing capabilities, each of the devices 34, 36, 46, 50, 52, 54, 56, and 58 (collectively referred to as "the smart devices") is capable of data communications and information sharing with any other of the smart devices, as well as to any central server or cloud-computing system or any other device that is network-connected anywhere in the world. The required data communications can be carried out using any of a variety of custom or standard wireless protocols (Wi-Fi, ZigBee, 6LoWPAN, etc.) and/or any of a variety of custom or standard wired protocols (CAT6 Ethernet, HomePlug, etc.).

According to embodiments, all or some of the smart devices can serve as wireless or wired repeaters. For example, a first one of the smart devices can communicate with a second one of the smart device via a wireless router 60. The smart devices can further communicate with each other via a connection to a network, such as the Internet 62. Through the Internet 62, the smart devices can communicate with a central server or a cloud-computing system 64. The central server or cloud-computing system 64 can be associated with a manufacturer, support entity, or service provider associated with the device. For one embodiment, a user may be able to contact customer support using a device itself rather than needing to use other communication means such as a telephone or Internet-connected computer. Further, software updates can be automatically sent from the central server or cloud-computing system 64 to devices (e.g., when available, when purchased, or at routine intervals).

According to embodiments, the smart devices combine to create a mesh network of spokesman and low-power nodes in the smart-home environment 30, where some of the smart devices are "spokesman" nodes and others are "low-powered" nodes. Some of the smart devices in the smart-home environment 30 are battery powered, while others have a regular and reliable power source, such as by connecting to wiring (e.g., to 120V line voltage wires) behind the walls 40 of the smart-home environment. The smart devices that have a regular and reliable power source are referred to as "spokesman" nodes. These nodes are equipped with the capability of using any wireless protocol or manner to facilitate bidirectional communication with any of a variety of other devices in the smart-home environment 30 as well as with the central server or cloud-computing system 64. On the other hand, the devices that are battery powered are referred to as "low-power" nodes. These nodes tend to be smaller than spokesman nodes and can only communicate using wireless protocols that requires very little power, such as Zigbee, 6LoWPAN, etc. Further, some, but not all, low-power nodes are incapable of bidirectional communication. These low-power nodes send messages, but they are unable to "listen". Thus, other devices in the smart-home environment 30, such as the spokesman nodes, cannot send information to these low-power nodes.

As described, the smart devices serve as low-power and spokesman nodes to create a mesh network in the smart-home environment 30. Individual low-power nodes in the smart-home environment regularly send out messages regarding what they are sensing, and the other low-powered nodes in the smart-home environment—in addition to sending out their own messages—repeat the messages, thereby causing the messages to travel from node to node (i.e., device to device) throughout the smart-home environment 30. The spokesman nodes in the smart-home environment 30 are able to "drop down" to low-powered communication protocols to receive these messages, translate the messages to other communication protocols, and send the translated messages to other spokesman nodes and/or the central server or cloud-computing system 64. Thus, the low-powered nodes using low-power communication protocols are able to send messages across the entire smart-home environment 30 as well as over the Internet 62 to the central server or cloud-computing system 64. According to embodiments, the mesh network enables the central server or cloud-computing system 64 to regularly receive data from all of the smart devices in the home, make inferences based on the data, and send commands back to one of the smart devices to accomplish some of the smart-home objectives described herein.

As described, the spokesman nodes and some of the low-powered nodes are capable of "listening". Accordingly, users, other devices, and the central server or cloud-computing system 64 can communicate controls to the low-powered nodes. For example, a user can use the portable electronic device (e.g., a smartphone) 66 to send commands over the Internet 62 to the central server or cloud-computing system 64, which then relays the commands to the spokesman nodes in the smart-home environment 30. The spokesman nodes drop down to a low-power protocol to communicate the commands to the low-power nodes throughout the smart-home environment, as well as to other spokesman nodes that did not receive the commands directly from the central server or cloud-computing system 64.

An example of a low-power node is a smart night light 65. In addition to housing a light source, the smart night light 65 houses an occupancy sensor, such as an ultrasonic or passive IR sensor, and an ambient light sensor, such as a photoresistor or a single-pixel sensor that measures light in the room. In some embodiments, the smart night light 65 is configured to activate the light source when its ambient light sensor detects that the room is dark and when its occupancy sensor detects that someone is in the room. In other embodiments, the smart night light 65 is simply configured to activate the light source when its ambient light sensor detects that the room is dark. Further, according to embodiments, the smart night light 65 includes a low-power wireless communication chip (e.g., ZigBee chip) that regularly sends out messages regarding the occupancy of the room and the amount of light in the room, including instantaneous messages coincident with the occupancy sensor detecting the presence of a person in the room. As mentioned above, these messages may be sent wirelessly, using the mesh network, from node to node (i.e., smart device to smart device) within the smart-home environment 30 as well as over the Internet 62 to the central server or cloud-computing system 64.

Other examples of low-powered nodes include battery-operated versions of the smart hazard detectors 50. These smart hazard detectors 50 are often located in an area without access to constant and reliable power and, as discussed in detail below, may include any number and type of sensors, such as smoke/fire/heat sensors, carbon monoxide/dioxide sensors, occupancy/motion sensors, ambient light sensors, temperature sensors, humidity sensors, and the like. Furthermore, smart hazard detectors 50 can send messages that correspond to each of the respective sensors to the other devices and the central server or cloud-computing system 64, such as by using the mesh network as described above.

Examples of spokesman nodes include smart thermostats 46, smart doorbells 52, smart wall switches 54, and smart wall plugs 56. These devices 46, 52, 54, and 56 are often located near and connected to a reliable power source, and therefore can include more power-consuming components, such as one or more communication chips capable of bidirectional communication in any variety of protocols.

In some embodiments, these low-powered and spokesman nodes (e.g., devices 46, 50, 52, 54, 56, 58, and 65) can function as "tripwires" for an alarm system in the smart-home environment. For example, in the event a perpetrator circumvents detection by alarm sensors located at windows, doors, and other entry points of the smart-home environment 30, the alarm could be triggered upon receiving an occupancy, motion, heat, sound, etc. message from one or more of the low-powered and spokesman nodes in the mesh network. For example, upon receiving a message from a smart night light 65 indicating the presence of a person, the central server or cloud-computing system 64 or some other device could trigger an alarm, provided the alarm is armed at the time of detection. Thus, the alarm system could be enhanced by various low-powered and spokesman nodes located throughout the smart-home environment 30. In this example, a user could enhance the security of the smart-home environment 30 by buying and installing extra smart nightlights 65. However, in a scenario where the perpetrator uses a radio transceiver to jam the wireless network, the devices 10 may be incapable of communicating with each other. Therefore, as discussed in detail below, the present techniques provide network communication jamming attack detection and notification solutions to such a problem.

In some embodiments, the mesh network can be used to automatically turn on and off lights as a person transitions from room to room. For example, the low-powered and spokesman nodes detect the person's movement through the smart-home environment and communicate corresponding messages through the mesh network. Using the messages that indicate which rooms are occupied, the central server or cloud-computing system 64 or some other device activates and deactivates the smart wall switches 54 to automatically provide light as the person moves from room to room in the smart-home environment 30. Further, users may provide pre-configuration information that indicates which smart wall plugs 56 provide power to lamps and other light sources, such as the smart night light 65. Alternatively, this mapping of light sources to wall plugs 56 can be done automatically (e.g., the smart wall plugs 56 detect when a light source is plugged into it, and it sends a corresponding message to the central server or cloud-computing system 64). Using this mapping information in combination with messages that indicate which rooms are occupied, the central server or cloud-computing system 64 or some other device activates and deactivates the smart wall plugs 56 that provide power to lamps and other light sources so as to track the person's movement and provide light as the person moves from room to room.

In some embodiments, the mesh network of low-powered and spokesman nodes can be used to provide exit lighting in the event of an emergency. In some instances, to facilitate this, users provide pre-configuration information that indicates exit routes in the smart-home environment 30. For example, for each room in the house, the user provides a map of the best exit route. It should be appreciated that instead of a user providing this information, the central server or cloud-computing system 64 or some other device could automatically determine the routes using uploaded maps, diagrams, architectural drawings of the smart-home house, as well as using a map generated based on positional information obtained from the nodes of the mesh network (e.g., positional information from the devices is used to construct a map of the house). In operation, when an alarm is activated (e.g., when one or more of the smart hazard detector 50 detects smoke and activates an alarm), the central server or cloud-computing system 64 or some other device uses occupancy information obtained from the low-powered and spokesman nodes to determine which rooms are occupied and then turns on lights (e.g., nightlights 65, wall switches 54, wall plugs 56 that power lamps, etc.) along the exit routes from the occupied rooms so as to provide emergency exit lighting.

Further included and illustrated in the smart-home environment 30 of FIG. 2 are service robots 69 each configured to carry out, in an autonomous manner, any of a variety of household tasks. For some embodiments, the service robots 69 can be respectively configured to perform floor sweeping, floor washing, etc. in a manner similar to that of known commercially available devices such as the ROOMBA™ and SCOOBA™ products sold by iRobot, Inc. of Bedford, Mass. Tasks such as floor sweeping and floor washing can be considered as "away" or "while-away" tasks for purposes of the instant description, as it is generally more desirable for these tasks to be performed when the occupants are not present. For other embodiments, one or more of the service robots 69 are configured to perform tasks such as playing music for an occupant, serving as a localized thermostat for an occupant, serving as a localized air monitor/purifier for an occupant, serving as a localized baby monitor, serving as a localized hazard detector for an occupant, and so forth, it being generally more desirable for such tasks to be carried out in the immediate presence of the human occupant. For purposes of the instant description, such tasks can be considered as "human-facing" or "human-centric" tasks.

When serving as a localized thermostat for an occupant, a particular one of the service robots 69 can be considered to be facilitating what can be called a "personal comfort-area network" for the occupant, with the objective being to keep the occupant's immediate space at a comfortable temperature wherever that occupant may be located in the home. This can be contrasted with conventional wall-mounted room thermostats, which have the more attenuated objective of keeping a statically-defined structural space at a comfortable temperature. According to one embodiment, the localized-thermostat service robot 69 is configured to move itself into the immediate presence (e.g., within five feet) of a particular occupant who has settled into a particular location in the home (e.g. in the dining room to eat their breakfast and read the news). The localized-thermostat service robot 69 includes a temperature sensor, a processor, and wireless communication components configured such that control communications with the HVAC system, either directly or through a wall-mounted wirelessly communicating thermostat coupled to the HVAC system, are maintained and such that the temperature in the immediate vicinity of the occupant is maintained at their desired level. If the occupant then moves and settles into another location (e.g. to the living room couch to watch television), the localized-thermostat service robot 69 proceeds to move and park itself next to the couch and keep that particular immediate space at a comfortable temperature.

Technologies by which the localized-thermostat service robot 69 (and/or the larger smart-home system of FIG. 2) can identify and locate the occupant whose personal-area space is to be kept at a comfortable temperature can include, but are not limited to, RFID sensing (e.g., person having an RFID bracelet, RFID necklace, or RFID key fob), synthetic vision techniques (e.g., video cameras and face recognition processors), audio techniques (e.g., voice, sound pattern, vibration pattern recognition), ultrasound sensing/imaging techniques, and infrared or near-field communication (NFC) techniques (e.g., person wearing an infrared or NFC-capable smartphone), along with rules-based inference engines or artificial intelligence techniques that draw useful conclusions from the sensed information (e.g., if there is only a single occupant present in the home, then that is the person whose immediate space should be kept at a comfortable temperature, and the selection of the desired comfortable temperature should correspond to that occupant's particular stored profile).

When serving as a localized air monitor/purifier for an occupant, a particular service robot 69 can be considered to be facilitating what can be called a "personal health-area network" for the occupant, with the objective being to keep the air quality in the occupant's immediate space at healthy levels. Alternatively or in conjunction therewith, other health-related functions can be provided, such as monitoring the temperature or heart rate of the occupant (e.g., using finely remote sensors, near-field communication with on-person monitors, etc.). When serving as a localized hazard detector for an occupant, a particular service robot 69 can be considered to be facilitating what can be called a "personal safety-area network" for the occupant, with the objective being to ensure there is no excessive carbon monoxide, smoke, fire, etc., in the immediate space of the occupant. Methods analogous to those described above for personal comfort-area networks in terms of occupant identifying and tracking are likewise applicable for personal health-area network and personal safety-area network embodiments.

According to some embodiments, the above-referenced facilitation of personal comfort-area networks, personal health-area networks, personal safety-area networks, and/or other such human-facing functionalities of the service robots 69, are further enhanced by logical integration with other smart sensors in the home according to rules-based inferencing techniques or artificial intelligence techniques for achieving better performance of those human-facing functionalities and/or for achieving those goals in energy-conserving or other resource-conserving ways. Thus, for one embodiment relating to personal health-area networks, the air monitor/purifier service robot 69 can be configured to detect whether a household pet is moving toward the currently settled location of the occupant (e.g., using on-board sensors and/or by data communications with other smart-home sensors along with rules-based inferencing/artificial intelligence techniques), and if so, the air purifying rate is immediately increased in preparation for the arrival of more airborne pet dander. For another embodiment relating to personal safety-area networks, the hazard detector service robot 69 can be advised by other smart-home sensors that the temperature and humidity levels are rising in the kitchen, which is nearby to the occupant's current dining room location, and responsive to this advisory the hazard detector service robot 69 will temporarily raise a hazard detection threshold, such as a smoke detection threshold, under an inference that any small increases in ambient smoke levels will most likely be due to cooking activity and not due to a genuinely hazardous condition.

The above-described "human-facing" and "away" functionalities can be provided, without limitation, by multiple distinct service robots 69 having respective dedicated ones of such functionalities, by a single service robot 69 having an integration of two or more different ones of such functionalities, and/or any combinations thereof (including the ability for a single service robot 69 to have both "away" and "human facing" functionalities) without departing from the scope of the present teachings. Electrical power can be provided by virtue of rechargeable batteries or other rechargeable methods, such as an out-of-the-way docking station to which the service robots 69 will automatically dock and recharge its batteries (if needed) during periods of inactivity. Preferably, each service robot 69 includes wireless communication components that facilitate data communications with one or more of the other wirelessly communicating smart-home sensors of FIG. 2 and/or with one or more other service robots 69 (e.g., using Wi-Fi, Zigbee, Z-Wave, 6LoWPAN, etc.), and one or more of the smart-home devices 10 can be in communication with a remote server over the Internet. Alternatively or in conjunction therewith, each service robot 69 can be configured to communicate directly with a remote server by virtue of cellular telephone communications, satellite communications, 3G/4G network data communications, or other direct communication method.

Provided according to some embodiments are systems and methods relating to the integration of the service robot(s) 69 with home security sensors and related functionalities of the smart home system. The embodiments are particularly applicable and advantageous when applied for those service robots 69 that perform "away" functionalities or that otherwise are desirable to be active when the home is unoccupied (hereinafter "away-service robots"). Included in the embodiments are methods and systems for ensuring that home security systems, intrusion detection systems, and/or occupancy-sensitive environmental control systems (for example, occupancy-sensitive automated setback thermostats that enter into a lower-energy-using condition when the home is unoccupied) are not erroneously triggered by the away-service robots.

Provided according to one embodiment is a home automation and security system (e.g., as shown in FIG. 2) that is remotely monitored by a monitoring service by virtue of automated systems (e.g., cloud-based servers or other central servers, hereinafter "central server") that are in data communications with one or more network-connected elements of the home automation and security system. The away-service robots are configured to be in operative data communication with the central server, and are configured such that they remain in a non-away-service state (e.g., a dormant state at their docking station) unless permission is granted from the central server (e.g., by virtue of an "away-service-OK" message from the central server) to commence their away-service activities. An away-state determination made by the system, which can be arrived at (i) exclusively by local on-premises smart device(s) based on occupancy sensor data, (ii) exclusively by the central server based on received occupancy sensor data and/or based on received proximity-related information such as GPS coordinates from user smartphones or automobiles, or (iii) any combination of (i) and (ii) can then trigger the granting of away-service permission to the away-service robots by the central server. During the course of the away-service robot activity, during which the away-service robots may continuously detect and send their in-home location coordinates to the central server, the central server can readily filter signals from the occupancy sensing devices to distinguish between the away-service robot activity versus any unexpected intrusion activity, thereby avoiding a false intrusion alarm condition while also ensuring that the home is secure. Alternatively or in conjunction therewith, the central server may provide filtering data (such as an expected occupancy-sensing profile triggered by the away-service robots) to the occupancy sensing nodes or associated processing nodes of the smart home, such that the filtering is performed at the local level. Although somewhat less secure, it would also be within the scope of the present teachings for the central server to temporarily disable the occupancy sensing equipment for the duration of the away-service robot activity.

According to another embodiment, functionality similar to that of the central server in the above example can be performed by an on-site computing device such as a dedicated server computer, a "master" home automation console or panel, or as an adjunct function of one or more of the smart-home devices of FIG. 2. In such an embodiment, there would be no dependency on a remote service provider to provide the "away-service-OK" permission to the away-service robots and the false-alarm-avoidance filtering service or filter information for the sensed intrusion detection signals.

According to other embodiments, there are provided methods and systems for implementing away-service robot functionality while avoiding false home security alarms and false occupancy-sensitive environmental controls without the requirement of a single overall event orchestrator. For purposes of the simplicity in the present disclosure, the home security systems and/or occupancy-sensitive environmental controls that would be triggered by the motion, noise, vibrations, or other disturbances of the away-service robot activity are referenced simply as "activity sensing systems," and when so triggered will yield a "disturbance-detected" outcome representative of the false trigger (for example, an alarm message to a security service, or an "arrival" determination for an automated setback thermostat that causes the home to be heated or cooled to a more comfortable "occupied" setpoint temperature). According to one embodiment, the away-service robots are configured to emit a standard ultrasonic sound throughout the course of their away-service activity, the activity sensing systems are configured to detect that standard ultrasonic sound, and the activity sensing systems are further configured such that no disturbance-detected outcome will occur for as long as that standard ultrasonic sound is detected. For other embodiments, the away-service robots are configured to emit a standard notification signal throughout the course of their away-service activity, the activity sensing systems are configured to detect that standard notification signal, and the activity sensing systems are further configured such that no disturbance-detected outcome will occur for as long as that standard notification signal is detected, wherein the standard notification signal comprises one or more of: an optical notifying signal; an audible notifying signal; an infrared notifying signal; an infrasonic notifying signal; a wirelessly transmitted data notification signal (e.g., an IP broadcast, multicast, or unicast notification signal, or a notification message sent in an TCP/IP two-way communication session).

According to some embodiments, the notification signals sent by the away-service robots to the activity sensing systems are authenticated and encrypted such that the notifications cannot be learned and replicated by a potential burglar. Any of a variety of known encryption/authentication schemes can be used to ensure such data security including, but not limited to, methods involving third party data security services or certificate authorities. For some embodiments, a permission request-response model can be used, wherein any particular away-service robot requests permission from each activity sensing system in the home when it is ready to perform its away-service tasks, and does not initiate such activity until receiving a "yes" or "permission granted" message from each activity sensing system (or from a single activity sensing system serving as a "spokesman" for all of the activity sensing systems). One advantage of the described embodiments that do not require a central event orchestrator is that there can (optionally) be more of an arms-length relationship between the supplier(s) of the home security/environmental control equipment, on the one hand, and the supplier(s) of the away-service robot(s), on the other hand, as it is only required that there is the described standard one-way notification protocol or the described standard two-way request/permission protocol to be agreed upon by the respective suppliers.

According to still other embodiments, the activity sensing systems are configured to detect sounds, vibrations, RF emissions, or other detectable environmental signals or "signatures" that are intrinsically associated with the away-service activity of each away-service robot, and are further configured such that no disturbance-detected outcome will occur for as long as that particular detectable signal or environmental "signature" is detected. By way of example, a particular kind of vacuum-cleaning away-service robot may emit a specific sound or RF signature. For one embodiment, the away-service environmental signatures for each of a plurality of known away-service robots are stored in the memory of the activity sensing systems based on empirically collected data, the environmental signatures being supplied with the activity sensing systems and periodically updated by a remote update server. For another embodiment, the activity sensing systems can be placed into a "training mode" for the particular home in which they are installed, wherein they "listen" and "learn" the particular environmental signatures of the away-service robots for that home during that training session, and thereafter will suppress disturbance-detected outcomes for intervals in which those environmental signatures are heard.

For still another embodiment, which is particularly useful when the activity sensing system is associated with occupancy-sensitive environmental control equipment rather than a home security system, the activity sensing system is configured to automatically learn the environmental signatures for the away-service robots by virtue of automatically performing correlations over time between detected environmental signatures and detected occupancy activity. By way of example, for one embodiment an intelligent automated nonoccupancy-triggered setback thermostat such as the Nest Learning Thermostat can be configured to constantly monitor for audible and RF activity as well as to perform infrared-based occupancy detection. In particular view of the fact that the environmental signature of the away-service robot will remain relatively constant from event to event, and in view of the fact that the away-service events will likely either (a) themselves be triggered by some sort of nonoccupancy condition as measured by the away-service robots themselves, or (b) occur at regular times of day, there will be patterns in the collected data by which the events themselves will become apparent and for which the environmental signatures can be readily learned. Generally speaking, for this automatic-learning embodiment in which the environmental signatures of the away-service robots are automatically learned without requiring user interaction, it is more preferable that a certain number of false triggers be tolerable over the course of the learning process. Accordingly, this automatic-learning embodiment is more preferable for application in occupancy-sensitive environmental control equipment (such as an automated setback thermostat) rather than home security systems for the reason that a few false occupancy determinations may cause a few instances of unnecessary heating or cooling, but will not otherwise have any serious consequences, whereas false home security alarms may have more serious consequences.

According to embodiments, technologies including the sensors of the smart devices located in the mesh network of the smart-home environment in combination with rules-based inference engines or artificial intelligence provided at the central server or cloud-computing system 64 are used to provide a personal "smart alarm clock" for individual occupants of the home. For example, user-occupants can communicate with the central server or cloud-computing system 64 via their mobile devices 66 to access an interface for the smart alarm clock. There, occupants can turn on their "smart alarm clock" and input a wake time for the next day and/or for additional days. In some embodiments, the occupant may have the option of setting a specific wake time for each day of the week, as well as the option of setting some or all of the inputted wake times to "repeat". Artificial intelligence will be used to consider the occupant's response to these alarms when they go off and make inferences about the user's preferred sleep patterns over time.

According to embodiments, the smart device in the smart-home environment 30 that happens to be closest to the occupant when the occupant falls asleep will be the device that transmits messages regarding when the occupant stopped moving, from which the central server or cloud-computing system 64 will make inferences about where and when the occupant prefers to sleep. This closest smart device will as be the device that sounds the alarm to wake the occupant. In this manner, the "smart alarm clock" will follow the occupant throughout the house, by tracking the individual occupants based on their "unique signature", which is determined based on data obtained from sensors located in the smart devices. For example, the sensors include ultrasonic sensors, passive IR sensors, and the like. The unique signature is based on a combination of walking gate, patterns of movement, voice, height, size, etc. It should be appreciated that facial recognition may also be used.

According to an embodiment, the wake times associated with the "smart alarm clock" are used by the smart thermostat 46 to control the HVAC in an efficient manner so as to pre-heat or cool the house to the occupant's desired "sleeping" and "awake" temperature settings. The preferred settings can be learned over time, such as by observing which temperature the occupant sets the thermostat to before going to sleep and which temperature the occupant sets the thermostat to upon waking up.

According to an embodiment, a device is positioned proximate to the occupant's bed, such as on an adjacent nightstand, and collects data as the occupant sleeps using noise sensors, motion sensors (e.g., ultrasonic, IR, and optical), etc. Data may be obtained by the other smart devices in the room as well. Such data may include the occupant's breathing patterns, heart rate, movement, etc. Inferences are made based on this data in combination with data that indicates when the occupant actually wakes up. For example, if—on a regular basis—the occupant's heart rate, breathing, and moving all increase by 5% to 10%, twenty to thirty minutes before the occupant wakes up each morning, then predictions can be made regarding when the occupant is going to wake. Other devices in the home can use these predictions to provide other smart-home objectives, such as adjusting the smart thermostat 46 so as to pre-heat or cool the home to the occupant's desired setting before the occupant wakes up. Further, these predictions can be used to set the "smart alarm clock" for the occupant, to turn on lights, etc.

According to embodiments, technologies including the sensors of the smart devices located throughout the smart-home environment in combination with rules-based inference engines or artificial intelligence provided at the central server or cloud-computing system 64 are used to detect or monitor the progress of Alzheimer's Disease. For example, the unique signatures of the occupants are used to track the individual occupants' movement throughout the smart-home environment 30. This data can be aggregated and analyzed to identify patterns indicative of Alzheimer's. Oftentimes, individuals with Alzheimer's have distinctive patterns of migration in their homes. For example, a person will walk to the kitchen and stand there for a while, then to the living room and stand there for a while, and then back to the kitchen. This pattern will take about thirty minutes, and then the person will repeat the pattern. According to embodiments, the remote servers or cloud computing architectures 64 analyze the person's migration data collected by the mesh network of the smart-home environment to identify such patterns.

Figure 3:
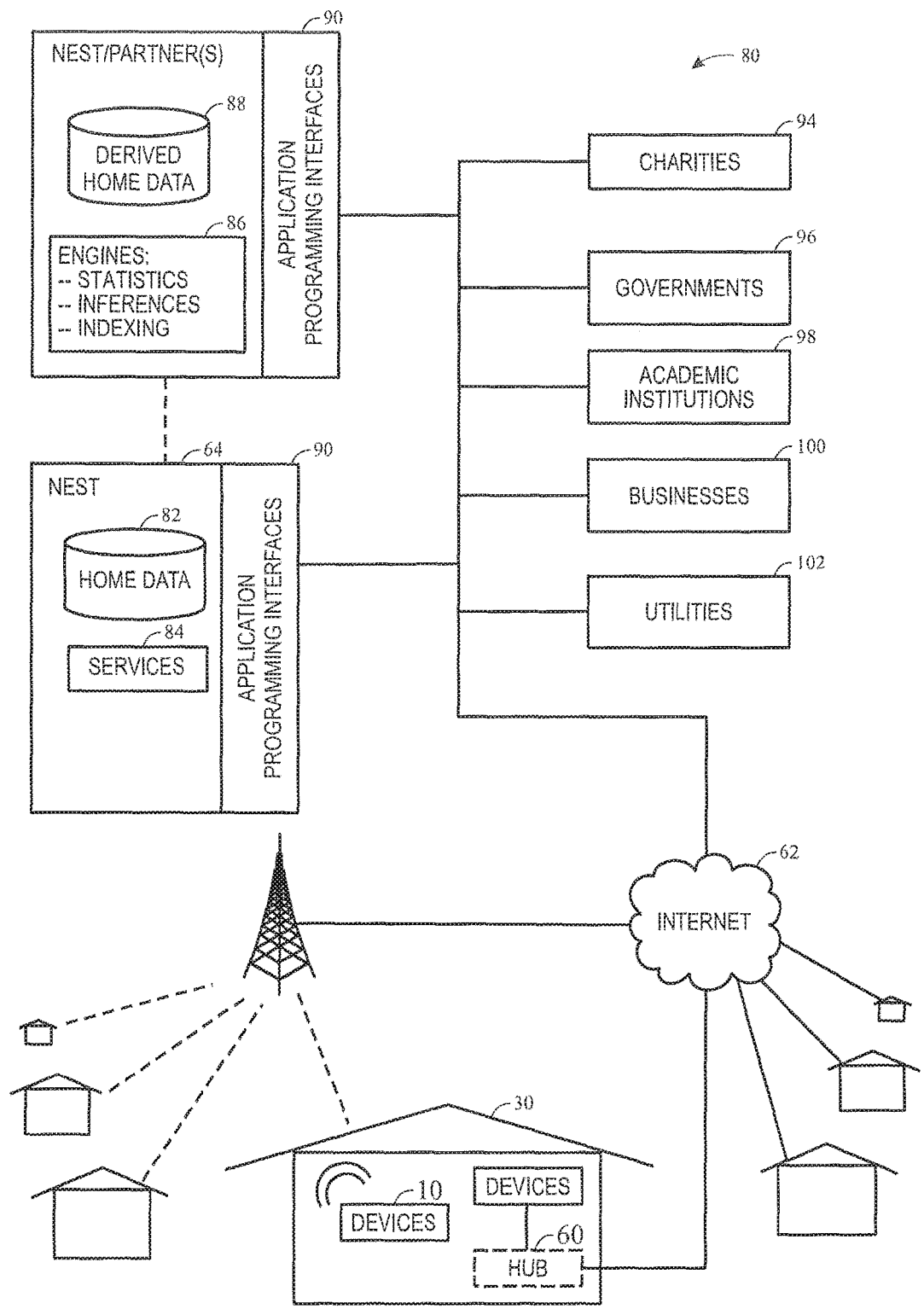
FIG. 3 is a block diagram illustrating a manner of controlling and/or accessing the smart home environment using services over the internet, in accordance with an embodiment.

In addition, FIG. 3 illustrates an embodiment of an extensible devices and services platform 80 that can be concentrated at a single server or distributed among several different computing entities without limitation with respect to the smart-home environment 30. The extensible devices and services platform 80 may include a processing engine 86, which may include engines that receive data from devices of smart-home environments (e.g., via the Internet or a hubbed network), to index the data, to analyze the data and/or to generate statistics based on the analysis or as part of the analysis. The analyzed data can be stored as derived home data 88.

Results of the analysis or statistics can thereafter be transmitted back to the device that provided home data used to derive the results, to other devices, to a server providing a web page to a user of the device, or to other non-device entities. For example, use statistics, use statistics relative to use of other devices, use patterns, and/or statistics summarizing sensor readings can be generated by the processing engine 86 and transmitted. The results or statistics can be provided via the Internet 62. In this manner, the processing engine 86 can be configured and programmed to derive a variety of useful information from the home data 82. A single server can include one or more engines.

The derived data can be highly beneficial at a variety of different granularities for a variety of useful purposes, ranging from explicit programmed control of the devices on a per-home, per-neighborhood, or per-region basis (for example, demand-response programs for electrical utilities), to the generation of inferential abstractions that can assist on a per-home basis (for example, an inference can be drawn that the homeowner has left for vacation and so security detection equipment can be put on heightened sensitivity), to the generation of statistics and associated inferential abstractions that can be used for government or charitable purposes. For example, processing engine 86 can generate statistics about device usage across a population of devices and send the statistics to device users, service providers or other entities (e.g., that have requested or may have provided monetary compensation for the statistics).

According to some embodiments, the home data 82, the derived home data 88, and/or another data can be used to create "automated neighborhood safety networks." For example, in the event the central server or cloud-computing architecture 64 receives data indicating that a particular home has been broken into, is experiencing a fire, or some other type of emergency event, an alarm is sent to other smart homes in the "neighborhood." In some instances, the central server or cloud-computing architecture 64 automatically identifies smart homes within a radius of the home experiencing the emergency and sends an alarm to the identified homes. In such instances, the other homes in the "neighborhood" do not have to sign up for or register to be a part of a safety network, but instead are notified of an emergency based on their proximity to the location of the emergency. This creates robust and evolving neighborhood security watch networks, such that if one person's home is getting broken into, an alarm can be sent to nearby homes, such as by audio announcements via the smart devices located in those homes. It should be appreciated that this can be an opt-in service and that, in addition to or instead of the central server or cloud-computing architecture 64 selecting which homes to send alerts to, individuals can subscribe to participate in such networks and individuals can specify which homes they want to receive alerts from. This can include, for example, the homes of family members who live in different cities, such that individuals can receive alerts when their loved ones in other locations are experiencing an emergency.

According to some embodiments, sound, vibration, and/or motion sensing components of the smart devices are used to detect sound, vibration, and/or motion created by running water. Based on the detected sound, vibration, and/or motion, the central server or cloud-computing architecture 64 makes inferences about water usage in the home and provides related services. For example, the central server or cloud-computing architecture 64 can run programs/algorithms that recognize what water sounds like and when it is running in the home. According to one embodiment, to map the various water sources of the home, upon detecting running water, the central server or cloud-computing architecture 64 sends a message an occupant's mobile device asking if water is currently running or if water has been recently run in the home and, if so, which room and which water-consumption appliance (e.g., sink, shower, toilet, etc.) was the source of the water. This enables the central server or cloud-computing architecture 64 to determine the "signature" or "fingerprint" of each water source in the home. This is sometimes referred to herein as "audio fingerprinting water usage."

In one illustrative example, the central server or cloud-computing architecture 64 creates a signature for the toilet in the master bathroom, and whenever that toilet is flushed, the central server or cloud-computing architecture 64 will know that the water usage at that time is associated with that toilet. Thus, the central server or cloud-computing architecture 64 can track the water usage of that toilet as well as each water-consumption application in the home. This information can be correlated to water bills or smart water meters so as to provide users with a breakdown of their water usage.

According to some embodiments, sound, vibration, and/or motion sensing components of the smart devices are used to detect sound, vibration, and/or motion created by mice and other rodents as well as by termites, cockroaches, and other insects (collectively referred to as "pests"). Based on the detected sound, vibration, and/or motion, the central server or cloud-computing architecture 64 makes inferences about pest-detection in the home and provides related services. For example, the central server or cloud-computing architecture 64 can run programs/algorithms that recognize what certain pests sound like, how they move, and/or the vibration they create, individually and/or collectively. According to one embodiment, the central server or cloud-computing architecture 64 can determine the "signatures" of particular types of pests.

For example, in the event the central server or cloud-computing architecture 64 detects sounds that may be associated with pests, it notifies the occupants of such sounds and suggests hiring a pest control company. If it is confirmed that pests are indeed present, the occupants input to the central server or cloud-computing architecture 64 confirms that its detection was correct, along with details regarding the identified pests, such as name, type, description, location, quantity, etc. This enables the central server or cloud-computing architecture 64 to "tune" itself for better detection and create "signatures" or "fingerprints" for specific types of pests. For example, the central server or cloud-computing architecture 64 can use the tuning as well as the signatures and fingerprints to detect pests in other homes, such as nearby homes that may be experiencing problems with the same pests. Further, for example, in the event that two or more homes in a "neighborhood" are experiencing problems with the same or similar types of pests, the central server or cloud-computing architecture 64 can make inferences that nearby homes may also have such problems or may be susceptible to having such problems, and it can send warning messages to those homes to help facilitate early detection and prevention.

In some embodiments, to encourage innovation and research and to increase products and services available to users, the devices and services platform 80 expose a range of application programming interfaces (APIs) 90 to third parties, such as charities 94, governmental entities 96 (e.g., the Food and Drug Administration or the Environmental Protection Agency), academic institutions 98 (e.g., university researchers), businesses 100 (e.g., providing device warranties or service to related equipment, targeting advertisements based on home data), utility companies 102, and other third parties. The APIs 90 are coupled to and permit third party systems to communicate with the central server or the cloud-computing system 64, including the services 84, the processing engine 86, the home data 82, and the derived home data 88. For example, the APIs 90 allow applications executed by the third parties to initiate specific data processing tasks that are executed by the central server or the cloud-computing system 64, as well as to receive dynamic updates to the home data 82 and the derived home data 88.

For example, third parties can develop programs and/or applications, such as web or mobile apps that integrate with the central server or the cloud-computing system 64 to provide services and information to users. Such programs and application may be, for example, designed to help users reduce energy consumption, to preemptively service faulty equipment, to prepare for high service demands, to track past service performance, etc., or to perform any of a variety of beneficial functions or tasks now known or hereinafter developed.

According to some embodiments, third party applications make inferences from the home data 82 and the derived home data 88, such inferences may include when are occupants home, when are they sleeping, when are they cooking, when are they in the den watching television, and when do they shower. The answers to these questions may help third-parties benefit consumers by providing them with interesting information, products and services as well as with providing them with targeted advertisements.

In one example, a shipping company creates an application that makes inferences regarding when people are at home. The application uses the inferences to schedule deliveries for times when people will most likely be at home. The application can also build delivery routes around these scheduled times. This reduces the number of instances where the shipping company has to make multiple attempts to deliver packages, and it reduces the number of times consumers have to pick up their packages from the shipping company.

Figure 4:
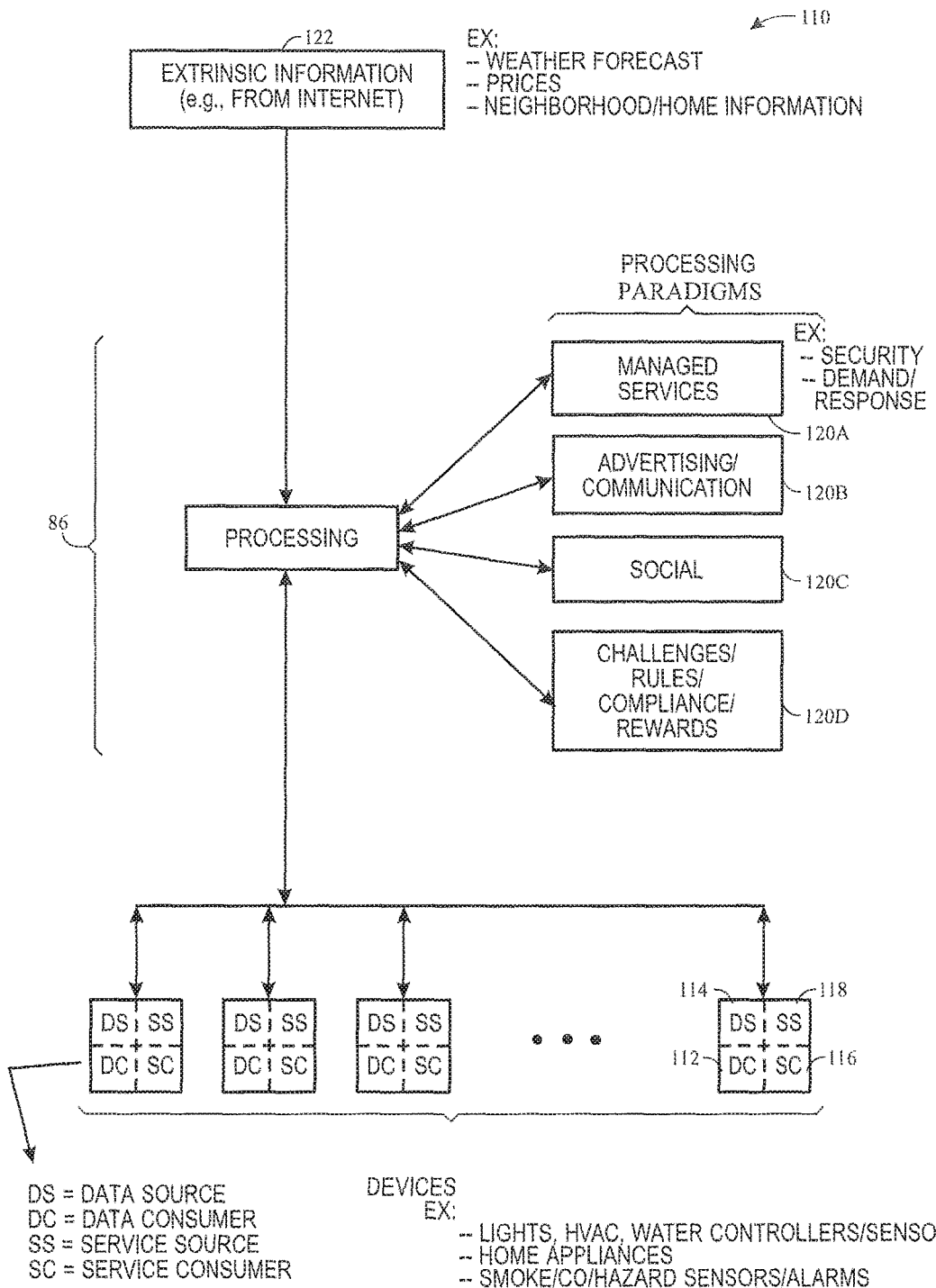
FIG. 4 is a block diagram of processing paradigms that may be used to control devices of the smart home environment, in accordance with an embodiment.

To further illustrate, FIG. 4 describes an abstracted functional view 110 of the extensible devices and services platform 80 of FIG. 3, with particular reference to the processing engine 86 as well as devices, such as those of the smart-home environment 30 of FIG. 2. Even though devices situated in smart-home environments will have an endless variety of different individual capabilities and limitations, they can all be thought of as sharing common characteristics in that each of them is a data consumer 112 (DC), a data source 114 (DS), a services consumer 116 (SC), and a services source 118 (SS). Advantageously, in addition to providing the essential control information needed for the devices to achieve their local and immediate objectives, the extensible devices and services platform 80 can also be configured to harness the large amount of data that is flowing out of these devices. In addition to enhancing or optimizing the actual operation of the devices themselves with respect to their immediate functions, the extensible devices and services platform 80 can be directed to "repurposing" that data in a variety of automated, extensible, flexible, and/or scalable ways to achieve a variety of useful objectives. These objectives may be predefined or adaptively identified based on, e.g., usage patterns, device efficiency, and/or user input (e.g., requesting specific functionality).

For example, FIG. 4 shows processing engine 86 as including a number of paradigms 120. Processing engine 86 can include a managed services paradigm 120a that monitors and manages primary or secondary device functions. The device functions can include ensuring proper operation of a device given user inputs, estimating that (e.g., and responding to an instance in which) an intruder is or is attempting to be in a dwelling, detecting a failure of equipment coupled to the device (e.g., a light bulb having burned out), implementing or otherwise responding to energy demand response events, or alerting a user of a current or predicted future event or characteristic. Processing engine 86 can further include an advertising/communication paradigm 120b that estimates characteristics (e.g., demographic information), desires and/or products of interest of a user based on device usage. Services, promotions, products or upgrades can then be offered or automatically provided to the user. Processing engine 86 can further include a social paradigm 120c that uses information from a social network, provides information to a social network (for example, based on device usage), and/or processes data associated with user and/or device interactions with the social network platform. For example, a user's status as reported to their trusted contacts on the social network could be updated to indicate when they are home based on light detection, security system inactivation or device usage detectors. As another example, a user may be able to share device-usage statistics with other users. In yet another example, a user may share HVAC settings that result in low power bills and other users may download the HVAC settings to their smart thermostat 46 to reduce their power bills.

The processing engine 86 can include a challenges/rules/compliance/rewards paradigm 120d that informs a user of challenges, competitions, rules, compliance regulations and/or rewards and/or that uses operation data to determine whether a challenge has been met, a rule or regulation has been complied with and/or a reward has been earned. The challenges, rules or regulations can relate to efforts to conserve energy, to live safely (e.g., reducing exposure to toxins or carcinogens), to conserve money and/or equipment life, to improve health, etc. For example, one challenge may involve participants turning down their thermostat by one degree for one week. Those that successfully complete the challenge are rewarded, such as by coupons, virtual currency, status, etc. Regarding compliance, an example involves a rental-property owner making a rule that no renters are permitted to access certain owner's rooms. The devices in the room having occupancy sensors could send updates to the owner when the room is accessed.

The processing engine 86 can integrate or otherwise utilize extrinsic information 122 from extrinsic sources to improve the functioning of one or more processing paradigms. Extrinsic information 122 can be used to interpret data received from a device, to determine a characteristic of the environment near the device (e.g., outside a structure that the device is enclosed in), to determine services or products available to the user, to identify a social network or social-network information, to determine contact information of entities (e.g., public-service entities such as an emergency-response team, the police or a hospital) near the device, etc., to identify statistical or environmental conditions, trends or other information associated with a home or neighborhood, and so forth.

An extraordinary range and variety of benefits can be brought about by, and fit within the scope of, the described extensible devices and services platform 80, ranging from the ordinary to the profound. Thus, in one "ordinary" example, each bedroom of the smart-home environment 30 can be provided with a smart wall switch 54, a smart wall plug 56, and/or smart hazard detectors 50, all or some of which include an occupancy sensor, wherein the occupancy sensor is also capable of inferring (e.g., by virtue of motion detection, facial recognition, audible sound patterns, etc.) whether the occupant is asleep or awake. If a serious fire event is sensed, the remote security/monitoring service or fire department is advised of how many occupants there are in each bedroom, and whether those occupants are still asleep (or immobile) or whether they have properly evacuated the bedroom. While this is, of course, a very advantageous capability accommodated by the described extensible devices and services platform 80, there can be substantially more "profound" examples that can truly illustrate the potential of a larger "intelligence" that can be made available. By way of perhaps a more "profound" example, the same bedroom occupancy data that is being used for fire safety can also be "repurposed" by the processing engine 86 in the context of a social paradigm of neighborhood child development and education. Thus, for example, the same bedroom occupancy and motion data discussed in the "ordinary" example can be collected and made available (properly anonymized) for processing in which the sleep patterns of schoolchildren in a particular ZIP code can be identified and tracked. Localized variations in the sleeping patterns of the schoolchildren may be identified and correlated, for example, to different nutrition programs in local schools.

As previously discussed, the described extensible devices and services platform 80 may enable communicating emergency information between smart-home environments 30 that are linked and/or to the proper authorities. For example, when a burglar breaks into a smart-home environment 30, a home security system may trip and sound an alarm and/or send emergency notifications to the neighbors, the police, the security company, and the like. However, in instances where the break in is preceded by a jamming attack on the wireless network, the notifications may not be sent out if their transmission is dependent upon the wireless network. Thus, another means to communicate with external parties may be desired. As such, the techniques disclosed herein solve this problem by detecting the jamming attack and sending emergency notifications via side channels that are not dependent upon the wireless network.

API

Although programs, applications, and/or application services may be used to communicate requests or commands to the smart home devices 10, in some embodiments these may not be sent directly to the smart home devices 10. The following figures illustrate smart device communication and/or control via an application accessing an API.

Figure 5:
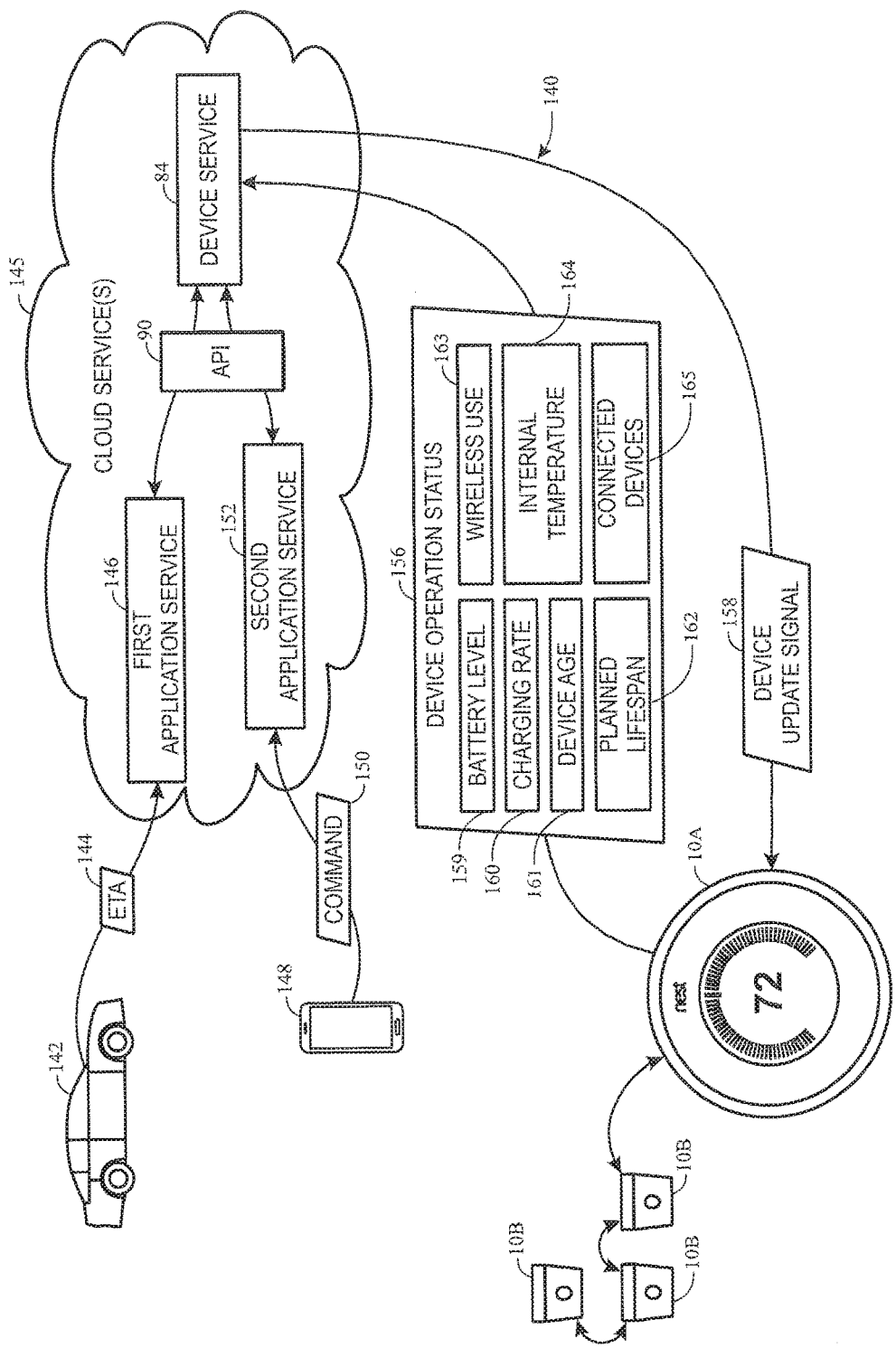
FIG. 5 is a block diagram of a system that provides access to smart home devices, in accordance with an embodiment.

For example, FIG. 5 illustrates a system 140 where an API may be used to access and/or control one or more smart devices. In the illustrated example, a person may desire to access a number of smart home devices 10, such as a first smart home device (e.g. thermostat 10A) and second smart home devices (e.g., hazard detector 10B (e.g., a smoke or carbon dioxide detector)). In the example of FIG. 5, the first smart home device 10A is an example of a smart thermostat, such as the Nest® Learning Thermostat by Nest Labs, Inc. (a company of Google Inc.), and the second smart home devices 10B are examples of smart hazard detectors, such as the Nest® Protect by Nest Labs, Inc. Two application programs are shown accessing the smart home devices 10A and/or 10B through the device service 84. Although FIG. 5 illustrates accessing the smart home devices 10A and/or 10B using two separate application programs, it should be appreciated that any suitable number of application programs may be used to access the smart home devices 10A and/or 10B.

In the example of FIG. 5, a first application 142 sends a first device request message 144 targeted to a smart home device 10 (e.g., the smart home device 10A) into cloud service(s) 145 and, more specifically, to a first application service 146. A second application 148 may be used to issue a second device request message 150 targeted to a smart home device 10 (e.g., the smart home device 10A) to a second application service 152 also among the cloud service(s) 145. In the example shown, the first application 142 is a navigation application that sends estimated-time-of-arrival (ETA) information in the device request messages 144. By sending a number of ETA messages as the device request messages 144, the first application 142 may be used to cause the smart home devices 10A and/or 10B to be prepared when a person arrives home. Thus, as an example, the first application 142 may send occasional device request messages 144 indicating the ETA to the first application service 146, which may forward this information to the device service 84 (e.g., via an API 90 of the cloud services 145, as discussed above). The device service 84 may hold the device request messages 144 from the first application 142 until an appropriate time. In the illustrated example, the second application 148 may be a third party home-automation application that may be running on a portable electronic device, such as a personal mobile device. The second application 148 may generate device request messages 150, such as commands to control or request information from the smart home devices 10A and/or 10B. In some embodiments, the second application service 152 may interface with the device service 84 by way of an API 90, as mentioned above.

Although the first application service 146, the second application service 152, and the device service 84 are illustrated in FIG. 5 as cloud service(s) 145, it may appreciated that some or all of these services may run on electronic devices that are not remote cloud-computer systems accessible by way of the Internet. Indeed, in some examples, the device service 84 may not be on a network that is remote from the smart home devices 10A and/or 10B, but rather may be running on an electronic device in the same local area network as the smart home devices 10A and/or 10B. For example, the device service 84 may, additionally or alternatively, run on a local server computer and/or a local wireless router on the same local area network as the smart home devices 10A and/or 10B. Moreover, some applications may communicate directly with the device service 84 (e.g., via the API) without first communicating with an application service such as the first application service 146 or the second application service 152.

Regardless of the number of applications that may issue device request messages (e.g., 144 or 150) to the device service 84, the device service 84 may not merely forward these messages to the smart home devices 10A and/or 10B that the device request messages are targeted too. Rather, the device service 84 may serve as the point of contact that application programs may use to access the smart home devices 10A and/or 10B. The device service 84 then may communicate information and/or commands provided by the applications to the smart home devices 10A and/or 10B, enabling coordination between the applications and the devices 10A and/or 10B.

In some embodiments, to enable additional functionalities in the applications (e.g., first application 142 and/or second application 148), the smart home devices 10A and/or 10B may occasionally transmit device operation status parameters 156 or other data based on the device operation status parameters 156 through the device service 84 and the proper application service (e.g., first application service 146 and/or second application service 152) to the proper applications (e.g., first application 142 and/or second application 148).

The device operation status parameters 156 may represent any suitable characteristics of the operation status of the smart home devices 10A and/or 10B that may affect the proper functioning of the smart home devices 10A and/or 10B. Thus, the device operation status parameters 156 may include, for example: a battery level 159 indicative of an amount of charge remaining in a battery of the smart home device; a charging rate 160 indicative of a current rate that the battery of the smart home device is charging; a current device age 161 indicative of a period of use since initial install, a period of use since manufacture, a period of use since original sale, etc.; a planned lifespan 162 indicative of an expected useful operational duration of the smart home device; an amount of recent wireless use 163 (selected within a timespan recent enough to substantially affect an internal temperature of the smart home device 10); a direct measurement of an internal device temperature 164; and/or device operation status parameters for connected devices 165. The operational status parameters for connected devices 165 may represent any suitable operational parameters that may describe the smart home devices 10 (e.g., smart home device 10A) through which the device service 84 may use to connect to a target smart home device 10 (e.g., one of the smart home devices 10B). For example, regarding the operational status parameters for connected devices 165, if the target smart home device 10 is the last smart home device 10B through three smart home devices 10 in three communication "hops", the device operation status parameters 156 associated with these three intervening smart home devices 10 may be included.

The various specific device operation status parameters 156 shown in FIG. 5 are provided by way of example. As such, the device operation status parameters 156 shown in FIG. 5 should not be understood to be exhaustive, but merely representative of possible operational parameters that may be considered for API-accessing applications. For example, additional device operation status parameters may include current state of the device (e.g., sleeping, awake, Wi-Fi active/inactive, executing a demand-response algorithm, executing a time-to-temperature algorithm, etc.).

The smart thermostat 10A and/or detector 10B may include a basic set of identifying information, such as: a user-defined device name, physical location in the structure, locale, software version and containing structure. The data model also exposes thermostat capabilities, such as whether the HVAC system can heat or cool, or has a fan. Further, the thermostat 10A may include three states related to presence: home, away or auto-away. In some embodiments, the API 90 may not expose the thermostat state, but may depend on this state when using thermostat mode to set target temperature. Thermostat 10A mode may have three "on" states (heat, cool, heat-cool) and one "off" state. The most common may be "on" (home). In this mode the thermostat 10A will try to keep the structure at a target temperature. A thermostat 10A can also be in away mode, which is entered when no motion is sensed in the house or when the user explicitly sets the structure to away. In this mode, it will activate the HVAC system if the temperature moves outside the defined "away" temperature range. The thermostat 10A may also be set to "off". In this mode it will only activate the HVAC system if the temperature moves outside a defined safety temperature range.

In some embodiments, target temperature, the desired temperature, typically set by the user may be modified using the API 90. From the API 90, applications can write the target temperature as part of a larger process.

For example, the applications may use the device operation status parameters 156 or data to affect subsequent interactions (e.g., via messages 144 or 150) that are transmitted to the smart home devices 10A and/or 10B. The device operation status parameters 156 may correspond only to a target smart home device 10 (e.g., the smart home device 10A), or may correspond to other smart home devices 10 that are in the vicinity of the target smart home device 10 (e.g., the smart home device 10A and the smart home devices 10B). In one example, when the target smart home device 10 for the device request messages 144 and/or 150 are the smart home device 10A, the device operation status parameters 156 may correspond substantially only to the smart home device 10A. In another example, when the target smart home device 10 is one of the smart home devices 10B, which is accessible by way of the smart home device 10A, the device operation status parameters 156 may contain operational parameter information about both the smart home device 10A and the smart home device 10B.

The second application 148 may include voice actions. For example, a user input to the second application 148 may be an audible cue to "Set [brand(e.g. 'nest')|thermostat|temperature] to [nn] degrees." The second application 148 may convert this into messages that ultimately become commands to transition the desired temperature of the thermostat 10A.

Further, an audible queue might be to "Turn on the heat." In such a scenario, the commands provided to the thermostat 10A would set the thermostat one degree Celsius above the current ambient temperature. If the thermostat 10A is in range mode, both the low and high points are raised one degree Celsius.

Additionally, an audible queue might be to "Turn on the [air conditioning|cooling|a.c.]." In such a scenario, the commands provided to the thermostat 10A would set the thermostat one degree Celsius lower the current ambient temperature. If the thermostat 10A is in range mode, both the low and high points are lowered one degree Celsius.

In some embodiments, an audible queue might be to "set [brand(e.g. 'nest')|thermostat] to away." In such a scenario, the commands provided to the thermostat 10A would change the mode of the thermostat 10A to "AWAY." When the audible queue is "set [brand(e.g. 'nest')|thermostat] to home," the commands provided to the thermostat 10A would change the mode of the thermostat 10A to "HOME."

i. Architecture

Figure 6:
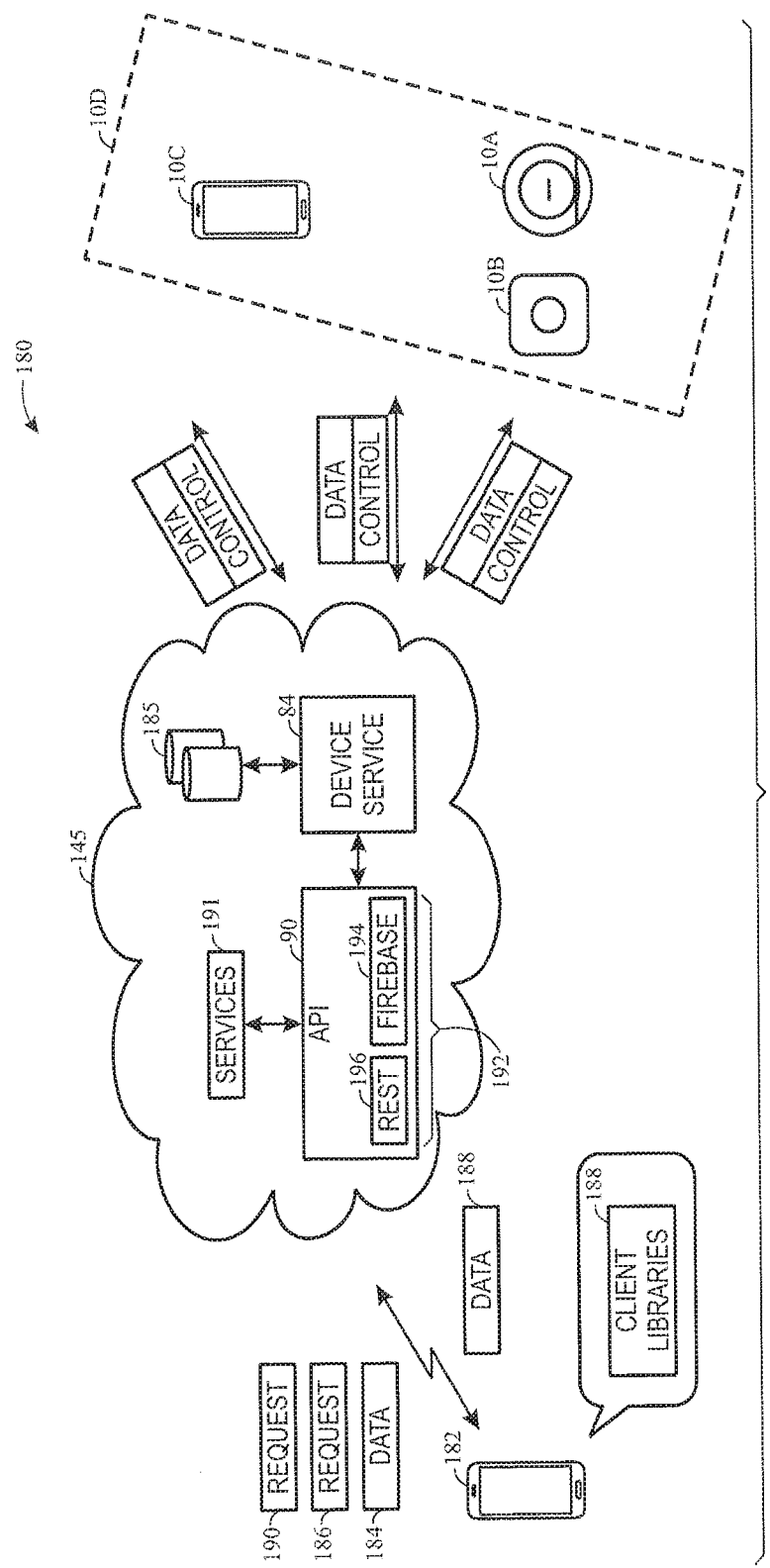
FIG. 6 is a block diagram illustrating various components of a system that includes cloud-based communication between electronic devices and smart-environment hosted smart devices, in accordance with an embodiment.

FIG. 6 illustrates a system 180 that uses an API 90 to access one or more device services 84 to request data from, control, and/or store data that may be useful to the smart devices (e.g., thermostat 10A, smoke and/or CO detector 10B, and/or other device 10C). As discussed above, the system 180 may be useful to enable one or more clients 182 (e.g., third-party client, electronic device, and/or a principle client of the device service 84) to: provide data 184 for use in the device services 84 (e.g., to a data store (e.g., data warehouse 185), to storage of one or more of the smart devices, and/or to a data model of the device service 84), provide a request 186 to control one or more of the smart devices via the device service 84, and/or to receive data 188 from one or more of the smart devices via the device service 84 (e.g., via providing a subscription and/or particular data query request 190), upon authorization from an authorization server (e.g., an additional service provided by services 191). As used herein, the term "client," "application programming interface (API) client," and "client application" may be used interchangeably and may refer to an integration point for the API 90 and/or device service 84. Further, it should be noted, as used herein, the terms "client device," "third party device," and "API client device" may be used interchangeably and refer to an electronic device interfacing with the integration point (e.g., client or API client).

In embodiments where a smart thermostat 10A is present, the API 90 and/or device services 84 may be used to: view a current temperature, view and/or set a target temperature, set a fan timer, view and/or set temperature modes (e.g., "heating" and/or "cooling"), view humidity data, and/or view online status and/or last connection information. In embodiments where a smoke and/or CO detector 10B is present, the API 90 and/or device services 84 may be used to view CO and/or smoke status, view battery health of the detector 10B, view last manual test status and/or a timestamp for the last manual test, and/or view online status and/or last connection information. Further, in embodiments where a structure 10D (e.g., a smart home environment containing smart devices) is associated with the device service 84, the API 90 and/or device services 84 may be used to: view a list of devices in the structure 10D, view energy event status (e.g., whether the structure 10D is under a preferable energy utilization period as defined by an energy utility program (e.g., Rush Hour Rewards by Nest®)), view and/or set an away state of the structure 10D, view a postal or zip code of the structure 10D, and/or set an estimated time of arrival to the structure 10. Many other data points may be accessed and/or written to the devices via the API 90 and/or device services 84.

To perform these functions, the client 182 may connect to the API 90. In one embodiment, the API 90 may include one or more hosts 192 that may receive and/or process the data 184 and/or the requests 186 and/or 190 in near real-time and/or real-time. The hosts 192 may include a Firebase host and/or one or more Representation State Transfer (REST) hosts 196 (e.g. periodic REST and/or REST streaming transactions).

Firebase organizes data as one large JSON document. Using this scheme, the device service 84 can listen for updates (e.g., insertions, deletions, modifications) on the trees of data that the client 182 has access to and/or is subscribed to, in order to synchronize these updates between the clients 182 and/or the devices (e.g., 10A-10C) and/or structures 10D.

Each data element is addressable by a Uniform Resource Locator (URL). Each data element location can store strings, numbers, Boolean values and/or parent/child objects or arrays. Using the API 90, a user's client can sync data from locations at multiple levels in the hierarchy. For example, an entire structure, including all devices, a single device in a structure, a group of data values (e.g., current and ambient temperatures), and/or a single data value (e.g., battery health state). As mentioned above, these data locations may be accessed by creating a client 182 application, using the client libraries 198 and/or using streaming and/or traditional REST communications.

A variety of access controls mechanisms are possible. As will be discussed in more detail below, in some embodiments, a custom login feature may be used to enable the device service 84 provider to utilize customized authentication payloads to authorize access to the APIs 90 and/or device services 84.

To provide data 184 and/or requests 186 and/or 190 to the host 192 in a manner that the API 90 may understand, an application of the client 182 may be constructed to provide this data 184 and/or requests 186 and/or 190. Upon authentication of access rights (which will be discussed in more detail below), the application may utilize REST and/or client libraries (e.g., Firebase client libraries 198) to subscribe to data values via the API 90. When a subscribed data value changes, the new data values are updated in real time and stored as a standard JSON document. The client 182 may then update and/or trigger an action based upon the subscribed data. Further, when the client 182 wishes to write data to the shared JSON document, the client 182 may provide the request via REST and/or Firebase. Accordingly, as mentioned above, the client 182 may generate and provide the data 184 and/or requests 186 and/or 190 as well as receive data 188.

The requests 186 and/or 190 and/or the data 184 are passed from the API 90 to the device service 84. The device service 84 maintains a data model of all relevant structures 10D as well as the relevant smart devices (e.g., thermostats 10A, detectors 10B, and/or devices 10C) associated with each of the structures 10D. The data model is generated and updated in a subscription-based approach. For example, as new structures 10D and/or smart devices (e.g., thermostats 10A, detectors 10B, and/or devices 10C) are activated, a subscription may be registered between the smart devices (e.g. 10A-10C) and/or the structure 10D and the device service 84. Rather than require continual polling for new and/or updated data, which may result in excessive heating and/or battery consumption of the smart devices, the subscription enables new and/or updated data provided to the device service 84 (e.g., via the API 90) to be provided in near-real time, upon changes to the data model maintained by the device service 84.

Figure 7:
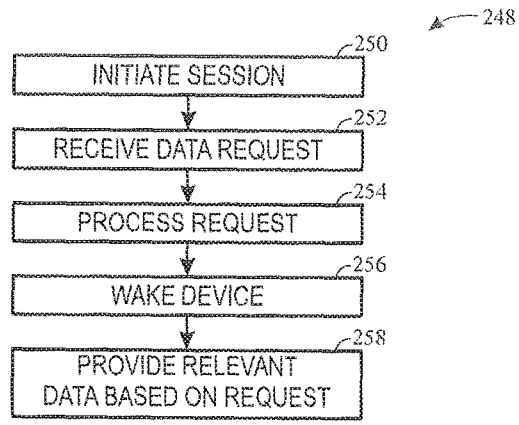
FIG. 7 illustrates a process for providing data requests via the subscription-based device service, in accordance with an embodiment.

FIG. 7 illustrates an embodiment of a process 248 for providing data requests via the subscription-based device service 84. First, a session between the data service 84 and one or more subscribing devices (e.g. devices 10A-10C) and/or structures 10D is created (block 250). The session may be established for a predetermined period (e.g., 1 hour, 1 day, 1 week, etc.) and may be closed at any time by either the subscribing device and/or the device service 84.

Next, when an interaction with the system 180 occurs, a data request is received by the device service 84 (block 252). In one embodiment, the data request may include a request to retrieve particular smart device information and/or a request to set particular smart device information. The request may be provided, in some embodiments, via the API 90, based upon communications from a client 182.

Upon receiving the request, the device service may process the request (block 254). For example, the device service 84 may update its maintained data model based upon the request. In some embodiments, the JavaScript Object Notation (JSON) data format may be used to maintain the device service 84's data model. One or more translation modules may translate non-JSON formatted data (e.g., tag-length-field (TLV) formatted data) into the JSON data format. Further details and examples of subscription services and translation into a JSON data format and processing received data are described in U.S. Ser. No. 61/627,996, filed Oct. 21, 2011, entitled "User friendly, network connected learning thermostat and related systems and methods" and in U.S. Ser. No. 14/508,884, filed Oct. 7, 2014, entitled "Systems and Methods for Updating Data Across Multiple Network Architectures," which are both incorporated by reference herein in their entirety for all purposes.

Next, the device service 84 may wake any subscribers of the request (e.g., smart devices 10A-10C and/or structures 10D associated with the request) (block 256). In one embodiment, the devices (e.g., thermostats 10A, detectors 10B, and/or devices 10C) and/or structures 10D may be equipped with wake-on-LAN (WOL) functionality that enables a device to sleep until particular data packets are received at the WOL equipped device. Upon receiving these particular packets, the devices may wake, and receive data that is provided based upon the received request (block 258). In some embodiments, packet filtering may be implemented on the devices, such that only particular data packets will wake the devices, helping to ensure that the devices are only awoken when relevant data is received at the device 10A-10C and/or the structure 10D. Further, buffering may be used to ensure that erroneous data is not used to wake the devices and/or structure. For example, if the client 182 sends a request to write a new target temperature to a thermostat 10A that is one degree above the current target temperature, but then immediately sends another request that cancels the prior request (e.g., reduces the target temperature down one degree), the requests may be cancelled out without waking the thermostat 10A (assuming both requests are received by the device service 84 in a buffer window prior to the thermostat 10A wake). In some embodiments, the buffer window may be 2-3 seconds.

Figure 8:
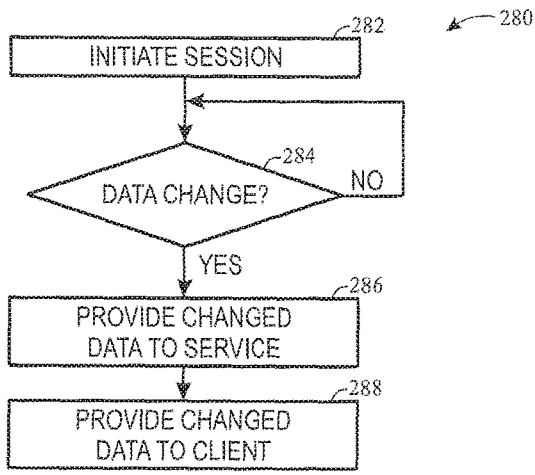
FIG. 8 illustrates a process for providing data from smart devices and/or structures to a client, in accordance with an embodiment.

As mentioned above, data 188 may also be provided to the client 182 from the smart devices (e.g., thermostat 10A, detector 10B, and/or device 10C) and/or structures 10D. For example, the client 182 may display and/or trigger actions based upon received data from the smart devices and/or structures 10D. FIG. 8 illustrates a process 280 for providing data from smart devices and/or structures to a client 182. As with the process 248 of FIG. 7, an http session is established between the device service 84 and smart devices (e.g., thermostats 10A, detectors 10B, and/or devices 10C) and/or structures 10D (block 280). Upon detecting a change of relevant data in the smart devices and/or structures 10D (decision block 284), the changed data is provided to the device service 84 (block 286). The device service 84 then updates the data model and provides the updates to the client 182 (block 288). The client 182 is then able to display the updated data and/or trigger other actions based upon the updated data.

In one example, a client may be created to interact with a thermostat 10A (e.g., using the client libraries 198). The client may be set up to monitor two values: current temperature and target temperature. To obtain changes to these two values, the client establishes a subscription to the thermostat object in a structure 10D. Then, when the temperature of the thermostat 10A is adjusted, the target temperature changes and the device service 84 updates the data model (e.g., JSON device and/or structure representation), which may be synchronized with the client 182 in near-real time. The client 182 may listen for changes and display a new target temperature and/or update the current temperature as it changes at the thermostat 10A.

ii. Authorization and Permissions

The API 90 and device service 84 may provide information to clients that may be used to build a better home experience. However, that information is ultimately owned by the user of the smart devices (e.g., thermostats 10A, detectors 10B, and/or devices 10C) and can only be shared with clients when the user explicitly allows it. Certain permissions may enable a client to access resources in a shared data model. As such, an authorization process may be used to enable the user to grant permissions to clients requesting to view and/or modify data associated with the user's smart devices (e.g., thermostats 10A, detectors 10B, and/or devices 10C) in the data model using the authorization server 191. The authorization process may use an open protocol framework (e.g., OAuth 2.0) to allow secure authorization of third party applications to obtain limited access to an HTTP service.

The authorization server 191 may provide functionality for managing the authorization code and access token granting processes, which will be described in more detail below. There may be an authorization process for web-based and PIN-based authorization. If a redirect universal resource identifier (URI) was entered when the client was registered, then a web-based authorization code may be in the redirected URI as a code query parameter. If a redirect URI was not entered when the client was registered, then a PIN-based authorization code may be displayed in a web page. PIN based authorization is generally used for devices with no web user interface, and that have an alphanumeric keypad interface.

The permissions may vary based on who the client is, the type of data being requested, the type of access being requested, and so forth. Indeed, in some embodiments, there may be various scopes, or groups of predefined permissions to certain data elements, that are assigned to the clients. Access to resources may be tied to a session (an issued access token). The end user may be asked to approve granting a series of scopes as part of the session initiation process. If the user approves the scopes, the permissions associated with the scopes at the time of issue are tied to the session for the lifetime of the session, as discussed in detail below. Also, in some embodiments, the disclosed techniques provide functionality to enable the client to insert their own data into the data model using the device service 84 (e.g., via the API 90), retrieve their own data from data model using the device service 84 (e.g., via the API 90), or to allow the client to authorize another third party to modify or view the client's data in the data model using the device service 84 (e.g., via the API 90).

Figure 9:
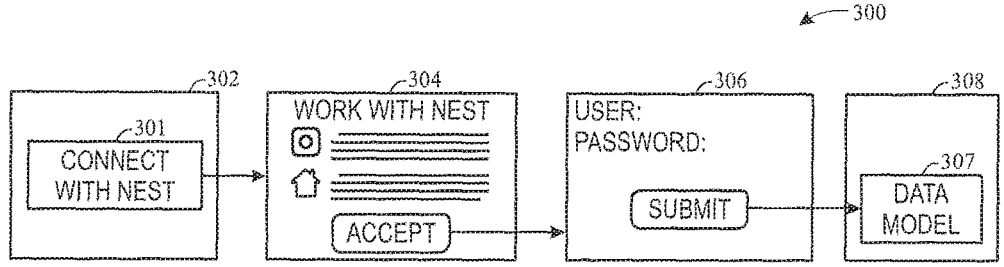
FIG. 9 illustrates a flow diagram of a process for a user to authorize a client to access user data in the data model via the device service, in accordance with an embodiment.

FIG. 9 illustrates a flow diagram of a process 300 for a user to authorize a client to access user data in the data model via the device service 84, in accordance with an embodiment. To interact with the user's smart devices (e.g., thermostats 10A, detectors 10B, and/or devices 10C) by manipulating data or viewing data in the data model, the user must first agree to let the client access user device data. The authorization process may begin with a link 301 to connect to the device service 84 on a client site/app 302 that the user may select. In response, a resource access permission page 304 and a login page 306 may be displayed that asks the user to grant access to the client and/or sign in if not already signed into an authorization server.

The resource access permission page 304, which is described in detail below, may display the permission and one or more justifications for the permission entered when the client was registered in the data model. If the user accepts the permission requested for the client, an authorization code may be returned from the authorization server to the user, which passes the authorization code to the client, and the client exchanges the authorization code and a client secret for an access token. The client may then make API calls to the device service 84 including the access token to retrieve and/or input data into the data model. For example, the client may request to see the current temperature and/or the target temperature using an API call and the access token which provides thermostat read permissions. As a result, the current temperature and/or the target temperature may be returned by the device service 84 and displayed on the client site/app 308. As should be appreciated, any data for which the client is granted permissions may be accessed in the data model 307 and used as desired on the client site/app 308. The user may revoke access at any time, which will inhibit the client from making any further requests for the user's smart devices' (e.g., thermostats 10A, detectors 10B, and/or devices 10C) data.

Figure 10:
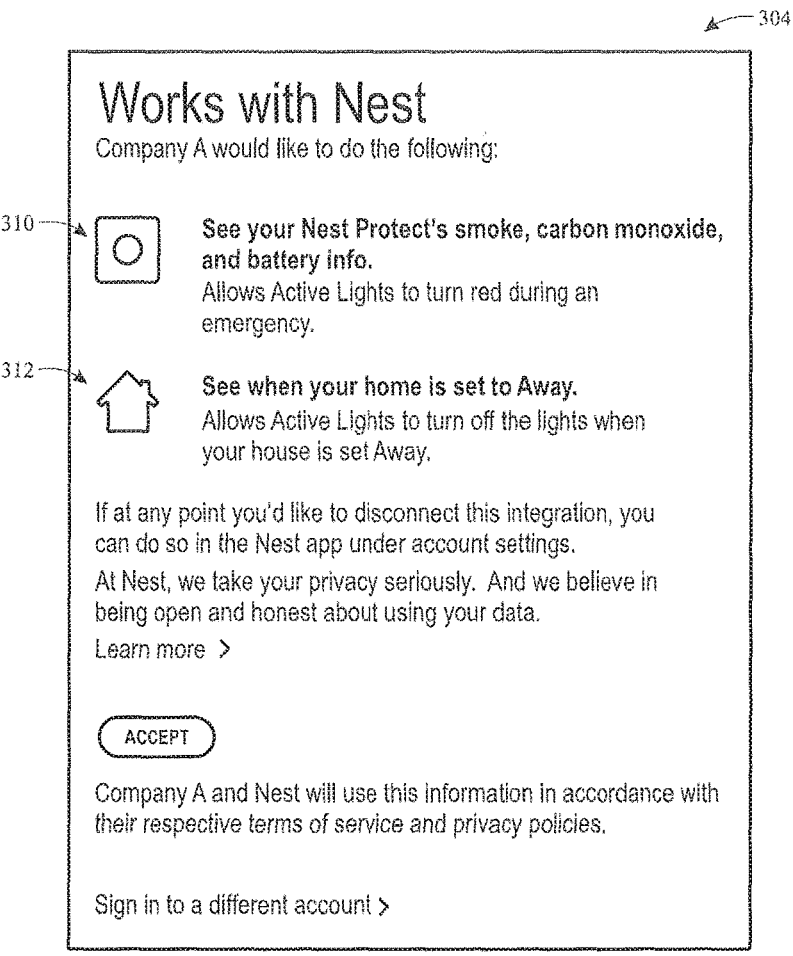
FIG. 10 illustrates the resource access permission page of FIG. 9, in accordance with an embodiment.

FIG. 10 illustrates the resource access permission page 304 of FIG. 9, in accordance with an embodiment. As discussed above, this page 304 asks the user to grant access to the client. In particular, the resource access permission page 304 displays the permissions and justifications for the permissions when the client was registered in the data model. The justification explains what the client will do with the requested data and how it will benefit the user. Justifications should include the client name, the action(s) the client can take, and the triggering event. For example, a sample template to write justifications include the following:
 "Allows [client name] to [take action] [because/ when . . . ]"
In some embodiments, the justifications may have a minimum word length (any suitable number, such as 5, 10, 15, 20, etc.), and contain less than or equal to a maximum number of characters (any suitable number, such as 140, 150, 160, etc.). The user may see the justification in the resource access permission page 304 and in a permissions view within a smart device (e.g., thermostats 10A, detectors 10B, and/or devices 10C) site/app.

For example, in the illustrated embodiment, the resource access permission page 304 indicates that Company A would like to see data about the detector 10B related to smoke, carbon monoxide, and battery info, and by doing so will allow certain lights to turn red during an emergency (310). Additionally, the page 304 indicates that Company A would like to see when the user's home is set to away, which allows certain lights to turn off when the house is set to away (312). The page 304 also notifies the user that the integration may be disconnected at any time to terminate the client from using the data.

Figure 11:
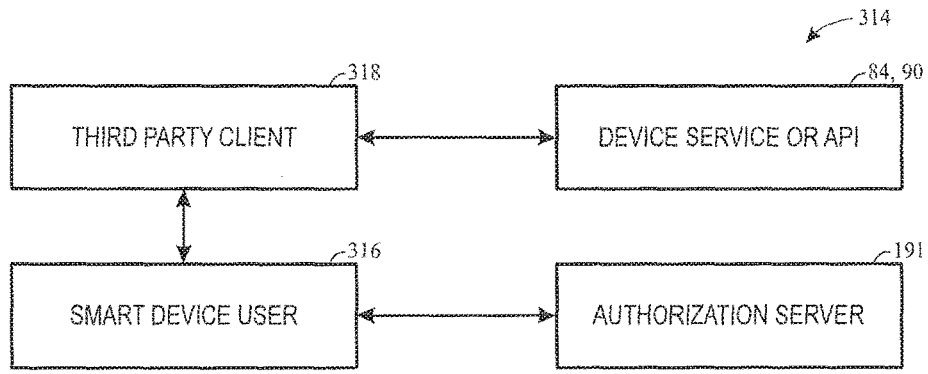
FIG. 11 illustrates a block diagram of a system for authorizing clients to use a user's smart device data via the web, in accordance with an embodiment.
Figure 12:
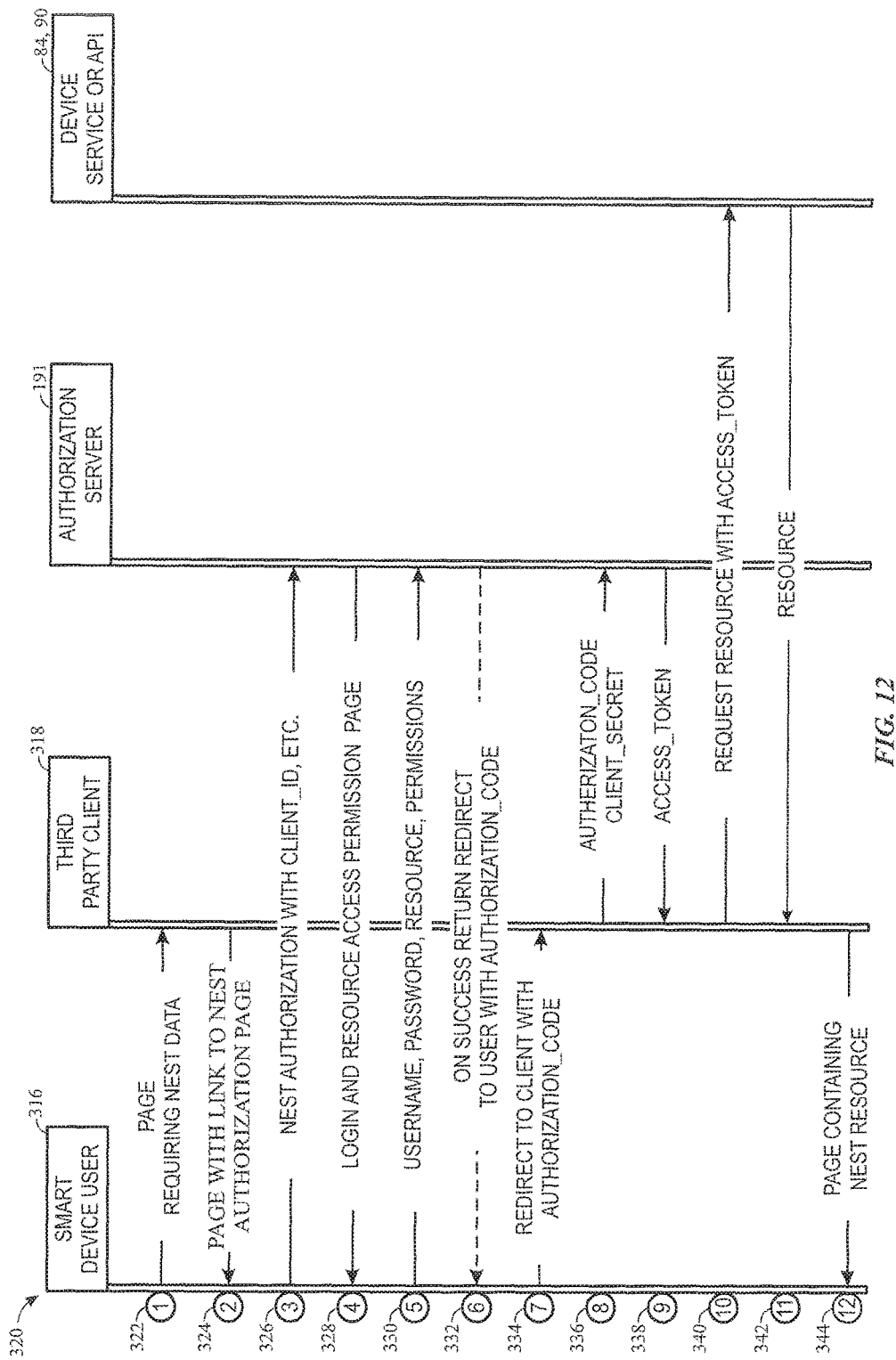
FIG. 12 illustrates a sequence diagram for authorizing clients to use a user's smart device data using the system of FIG. 11 via the web, in accordance with an embodiment.

FIG. 11 illustrates a block diagram of a system 314 for authorizing clients to interact with a user's smart device (e.g., thermostats 10A, detectors 10B, and/or devices 10C) data and/or operation via the web (e.g., server to server resource requests), in accordance with an embodiment. FIG. 12 illustrates a sequence diagram 320 for authorizing clients to use a user's smart device data using the system 314 of FIG. 11 via the web. As illustrated, the sequence diagram 320 depicts twelve events occurring in a sequential order. For clarity, both FIGS. 11 and 12 will be described together.

The system 314 may include a smart device user 316, a third party client 318, an authorization server 191, and the device service 84 and/or API 90. It should be noted that, in some embodiments, the device service 84 and/or the API 90 may receive the requests for resources from the client 318 and validate the access token provided by the client 318. It should also be noted that, in some embodiments, the authorization server 191 may provide functionality including querying client information and a list of scopes that the user granted to the client. As described in detail below, the scopes may group together one or more permissions for a specific functionality (e.g., viewing thermostat data, setting HVAC, etc.). The authorization server 191 may also authenticate the user 316 and fetch the user ID, validate the user's consent to grant the client's requested scopes, handle redirects, and receive requests for the authorization code and the access token. In some embodiments, the authorization server 191 may handle the requests via HTTP REST GET calls with query parameter format.

Additionally, the authorization server 191 may include one or more servers that provide varying functionalities. For example, an authorization server that is not exposed to the public may provide functionality for managing the authorization codes, access tokens, client secret, scopes, and permissions, whereas a publicly exposed authorization server may provide functionality for higher level functions of the authorization code and access token granting process, such as querying client information and list of scopes requested for a client, authenticate user and fetch user ID, validate user's consent to grant client's requested scopes, handle redirects, and receive requests to provide access tokens for authorization codes.

The user 316, which may be a customer/owner of resources requested, may be using a web browser in the illustrated embodiment. Event 1 322 of the sequence diagram 320 includes the user 316 sending a request to the client 318 webpage/app that incorporates data from the data model. In response, event 2 324 shows a page being returned to the user with a webpage containing a link to the authorization page. The link to the authorization page may include the following information: response type ("code"), client ID (ID is provided to the client 318 when registered), state (a value passed from the client 318 to authorization server 191 and may be used to protect against cross-site request forgery attacks). Event 3 326 may include the user 316 clicking the authorization link, thereby sending a GET request to the authorization server 191. The authorization server 191 responds with the resource access permission page 304 and the interstitial login page 306 if the user 316 is not already logged in, as depicted in event 4 328.

Then, as indicated by event 5 330, the user 316 submits a username, password, and resource permissions to the authorization server 191. If the login is successful, the authorization server 191 responds with a redirect to redirect uniform resource identifier (URI) to the user 316, as indicated by event 6 332. The redirect URI may contain the following parameters: code (an authorization code used to obtain an access token), a state (the same value passed to the authorization server 191 earlier, which the client 318 should validate has not changed upon receipt). The authorization code may be a short string of alphanumeric characters with different length requirements based on whether the authorization is web-based (e.g., 14, 16, 18 characters) or PIN (6, 8, 10 characters). Also, the authorization code may be subject to expiring if not used within a certain period of time based on whether the authorization is web-based (e.g., 5, 10, 15 minutes) or PIN (e.g., 24, 48, 72 hours). Further, the authorization server 191 may create an authorization entry in the authorization tree for the user and the client that is granted permission in the assigned scopes. In some embodiments, once the permission is granted, data synchronization between the API 90 and the data service 84 may begin.

In event 7 334, the user's web browser redirects to the client 318 with the authorization code. Upon receiving the request from the user 316 containing the authorization code, the client 318 may send a POST request to the authorization server 191 containing the following parameters in event 8 336: grant type ("authorization code"), code (the authorization code returned by the authorization server 191), client ID (the ID issued when the client was registered), and a client secret (a secret issued to the client 318 when registered).

As indicated by event 9 338, the authorization server 191 responds with an access token. The response may be an object in the JavaScript Object Notation (JSON) data format: \{"access_token":"some-random-string", "expires_at": "time-expires ISO8601 format"}. In some embodiments, the access token may not expire for an extended period of time (e.g., 10, 15, 20 years). Also, the access tokens may be long unique strings.

Then, as indicated by event 10 340, the client 318 requests the needed resource from the device service 84 using the API 90. The API 90 request may include the following parameter added: access token (the access token returned in the call to the authorization server 191). That is, in some embodiments, the API client or API client device may send one or more requests including the access token to retrieve, access, view, subscribe, or modify data elements of a data model representative of one or more smart environments. The access token may be associated with at least the API client or API client device and one or more scopes granted to the API client or API client device. As previously discussed, the one or more scopes may provide one or more access rights to one or more of the data elements of the data model defined by a hierarchical position of the data elements in the data model represented by a respective path to the data elements. It should be noted that the sending of the request including the access token may be implemented as computer instructions stored one or more tangible non-transitory computer-readable medias and executed by the API client or the API client device.

Sending the one or more requests with the access token enables downstream services (e.g., device service 84) to the API client 318 or API client device to use the access token to identify the one or more scopes granted to the API client or API client device. The device service 84 may process the request in accordance with the granted scopes to the associated access token and API client 318 or API client device. The device service 84 responds with the requested resource in event 11 342 and the client 318 includes the resource into a page included in a response to the user 316, as indicated by event 12 344. It should be appreciated that the client 318 may continue to make requests from the device service 84 to access or modify data in the data model based on the permissions that were granted for as long as the access token is valid. In some embodiments, the device service 84 responds with a data object including data objects from the data model (e.g., a metadata data object, a devices data object, a structures data object) based on the request and scopes associated with the access token. Further, in some embodiments the client 318 may perform a function in addition to displaying the returned data in a page, such as controlling a setting on the API client device based on the data, executing a control action on the API client device based on the data, and the like.

Figure 13:
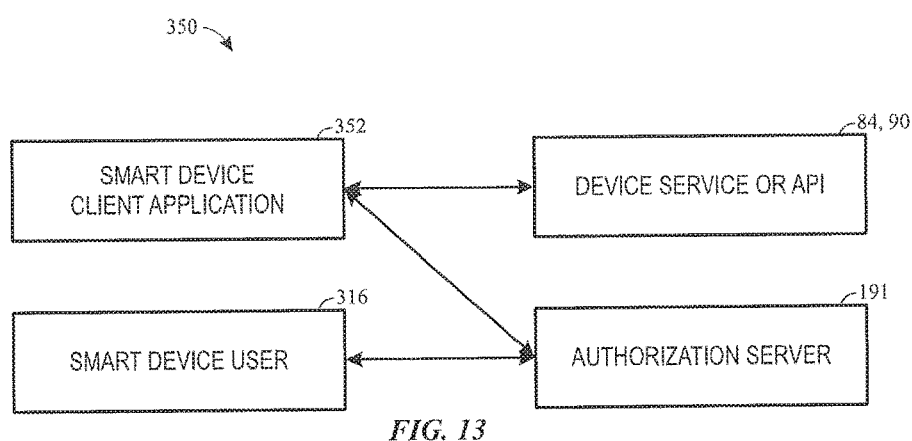
FIG. 13 illustrates a block diagram of a system for authorizing clients to use a user's smart device data via a PIN when the devices do not have a web UI, in accordance with an embodiment.
Figure 14:
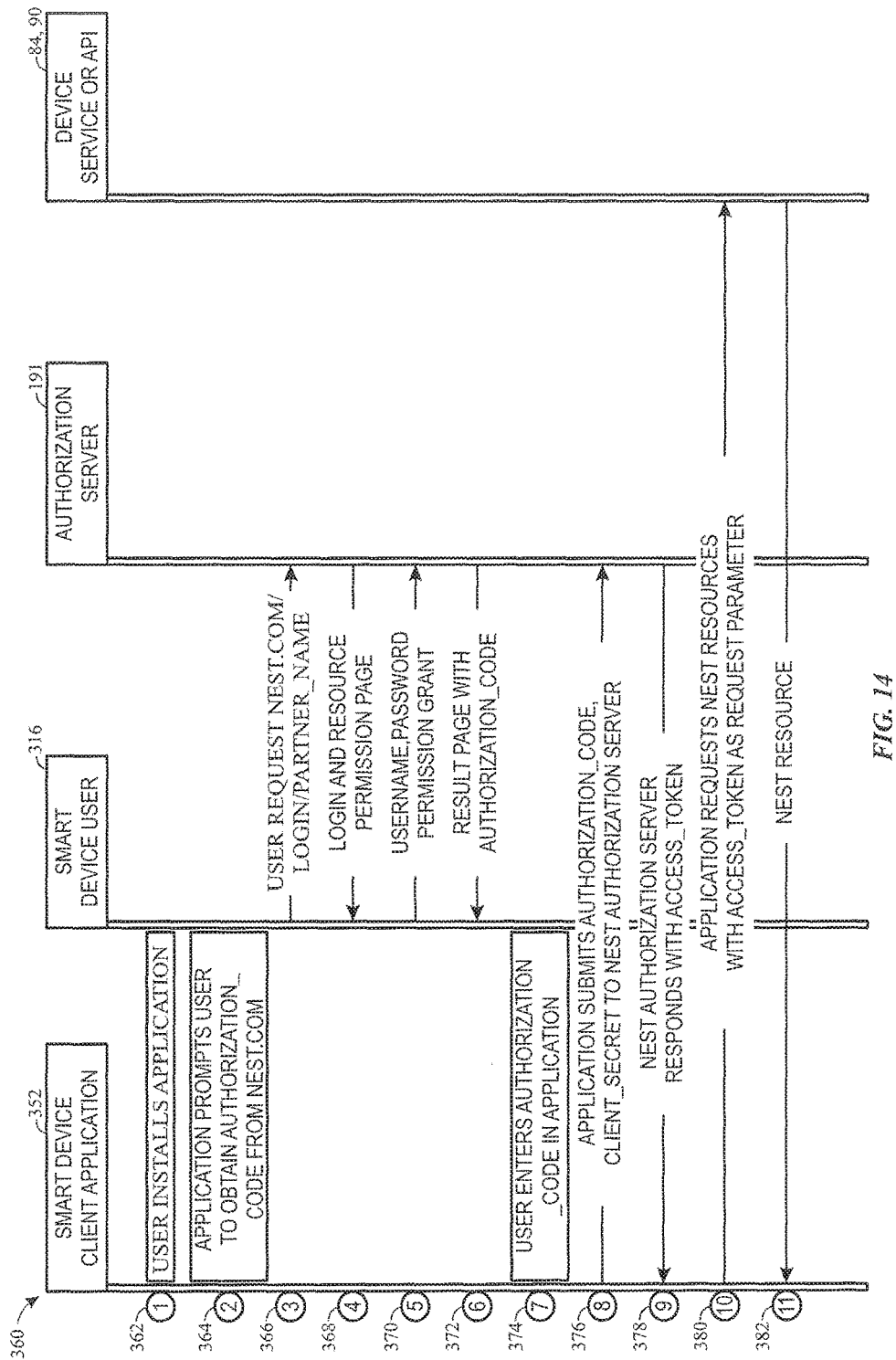
FIG. 14 illustrates a sequence diagram for authorizing clients to use a user's smart device data using the system of FIG. 13 via the PIN, in accordance with an embodiment.

FIG. 13 illustrates a block diagram of a system 350 for authorizing clients to use a user's smart device (e.g., thermostats 10A, detectors 10B, and/or devices 10C) data via a PIN when the devices do not have a web UI, in accordance with an embodiment. FIG. 14 illustrates a sequence diagram 360 for authorizing clients to use a user's smart device data using the system 350 of FIG. 13 via the PIN. For clarity, both FIGS. 13 and 14 will be described at the same time.

The system 350 may include a smart device client application 352, the smart device user 316, the authorization server 191, and the device service 84 and/or API 90. It should be noted that, in some embodiments, the device service 84 and/or the API 90 may receive the requests for resources from the client application 352 and validate the access token provided by the client application 352. Additionally, the authorization server 191 may include one or more servers that provide varying functionalities. For example, an authorization server that is not exposed to the public may provide functionality for managing the authorization codes, access tokens, client secret, scopes, and permissions, whereas a publicly exposed authorization server may provide functionality for higher level functions of the authorization code and access token granting process, such as querying client information and list of scopes requested for a client, authenticate user and fetch user ID, validate user's consent to grant client's requested scopes, handle redirects, and receive requests to provide access tokens for authorizations codes.

The sequence of events may begin with the user 316 installing the client application 352 that requires access to resources in the data model, as indicated by event 1 362 in the sequence diagram 360. In event 2 364, the client application 352 instructs the user to use a link to the authorization server 191 including the client's name. The user 316 may use a web browser to enter the link and request the page to the authorization server 191 including the client's name (event 3 366). The authorization server 191 responds with the resource access permission page 304 and the interstitial login page 306 if the user 316 is not already logged in, as depicted in event 4 368. The user 316 then submits approval or denial of the resource access permissions for the client and/or enters a username and password if login is required to the authorization server 191 (event 5 370). In event 6 372, the authorization server 191 responds with a result page that contains a user readable authorization code (personal identification number (PIN)).

The user may copy the PIN from the web browser and manually enter the PIN into the client application 352 (event 7 374). After the user enters the PIN, the client application 352 submits the PIN and a client secret (provided when the client was registered) to the authorization server 191, as depicted in event 8 376. Upon receipt of the PIN, the authorization server 191 responds to the client application 352 with an access token (event 9 378). The client application 352 can now make resource requests from the data model via the device service 84 providing the access token as a request parameter to the API 90 and/or the device service 84 (event 10 380). The device service 84 and/or the API 90 may analyze the access token and return the requested resources from the data model based on the permissions granted to the client application 352 (event 11 382).

In some embodiments, the client 318 or the client application 352 may have their access revoked by the user at any time. For example, the user may access a "settings" screen and revoke the permissions granted to the client. The authorization server 191 may generate and send an access token revocation message that deletes the access token assigned to the client 318 or the client application 352. The deletion may be detected and, if the client 318 or the client application 352 that had their access deleted was the last authorized client, then data synchronization between the API 90 and the data service 84 may be stopped. Further, any sessions that were authenticated with the deleted access token may be disconnected.

In some embodiments, multi-user integration (MUI) may enable the client 318 or client application 352 to open a single connection (HTTPS) and read data from multiple users. Each connection may be responsible for the portion of the users using a particular host. Using the single connection may improve efficiency between server-to-server integrations by reducing the overall number of connections. In one example, REST streaming may be used by clients making a call to a multiuser endpoint with a list of access tokens. In some embodiments, the response may include all data for each access token, including all structures and all devices, and metadata. The client may examine the response data to map the access tokens to the corresponding users and/or filter the data values for the information the client desires. To enable the client to map the access tokens, a metadata section may be included in each response that includes the access token associated with the data and the user.

If the client desires to modify the list of access tokens, the connection may be closed, the list updated, and the multi-user call may be made by the client again to reestablish the connection. In some embodiments, when data for users associated with additional access tokens is desired, the client may close the connection and add the add the additional access tokens to the list to send in another request to the multiuser endpoint. As long as the list does not exceed a threshold number of access tokens, the connection will be established and data will be returned for all of the access tokens in the list. That is, in some embodiments, the connection may not be established if more than a threshold number of access tokens are provided. It should be noted, that single-client integrations (e.g., mobile apps) may typically open a new connection for each access token and may not use MUI. To make a MUI call, the client 318 or client application 352 may use a specific endpoint (e.g., https://developer-api.nest.com/multiplex) to make a REST streaming call, or the like, and include a list of access tokens in the request. For example, the request URL may be entered as follows:

https://developer-api.nest.com/multiplex?auth=LIST_OF_ACCESS_TOKENS

The list_of_access_tokens_URL parameter may be of type list and be a comma-separated list with a configured maximum number of access tokens. The authorization server 191 may validate the list against the access tokens associated with the client 318 or the client application 352. In some embodiments, as mentioned above, the response may include all data values in an all objects so the client 318 or the client application 352 may filter the fields of interest and map the access tokens to the corresponding users (e.g., by identifying the access tokens provided in a metadata section of the response and mapping them to the users). Additionally or alternatively, there may be more than one response and each response may be particular for a single access token that was sent in the list of access tokens with the request. The metadata section including the access token provides a mechanism to identify which access token with which the data and/or user is associated.

In one embodiment of multi-user integration, a method for authorizing access for an application programming interface (API) client or API client device to data of one or more data models of one or more smart devices may include retrieving a number of access tokens from an authorization server. The method may also include providing, via a single connection, the plurality of access tokens in a request made by the API client or the API client device to the API. The plurality of access tokens are used to verify access rights of the API client or the API client device to read data for a plurality of users associated with the one or more data models of the one or more smart devices. The method may be implemented as computer instructions on a tangible, non-transitory computer-readable media and executed by the API client or API client device.

As mentioned above, there may be one or more scopes that include specific permissions associated with certain functionality that may be granted to application programming interface (API) clients and/or client applications. A scope may refer to a collection of permissions. Scopes are a unit of permission defining the ability to access or modify the user's data. Scopes may be identified by a unique name (e.g., 64 characters) and an ID number, as discussed below. Scopes enable identifying elements in the data model by permissions to which the client 318 has access. The elements may be located in the data model based on unique paths that the client 318 is granted access (e.g., read, write, read and write) via the scope granted. That is, there may be a one to one correspondence between a path in the data model and the element to which the client 318 has access. Thus, a scope may include providing various access rights to a bundle of paths to elements in the data model.

The scopes that are assigned and granted to the client 318 or the client application 352 may be tied to the session (access token) for the life of the session. In some embodiments, the API 90 may validate that the access token is signed by a client secret issued by the authorization server 191. After validation, the API 90 may allow access to the resources in the data model according to the granted scopes associated with the access token using the device service 84. In some embodiments, rules may be set up that allow access to the resources if certain conditions are met. The table below shows one such rule.

| Sample Rule |
|---|
| "users" : { <br>   "$user" : { <br>     ".read": "auth.for_user == $user", <br>   } <br> } |

The above rule indicates that the authenticated user can read the users/<user> element if the "for_user" field of the access token is <user>. Using this technique, rights information may be stored and used to limit third party access to the elements for which the third party has granted permissions. Moreover, updates (insertions, deletions, modification) on the rights tree may be detected and any needed changes may be made to synchronize various servers included in the system. An authorization tree may contain an object for each user who has granted any client 318 or client application 352 access. Within the user object there may be sub-objects for every client that has been granted access. Each client object contains information on rights granted to that client. The below table includes an example of an authorization tree.

| Authorization Tree |
|---|
| { <br>   auth: <br>   { <br>     55156: //user ID <br>     { <br>       1234: //client ID <br>       { <br>         scopes: ["thermostat read"], <br>         granted_at ... <br>         etc... |

-continued

```
Authorization Tree

}
        5678: //client ID
            {
                scopes: ["thermostat read/write", "smoke + CO read"],
                granted_at ...
            }
        }
    }
}
```

As displayed in the table, the user with ID 55156 granted scopes to two clients, client ID "1234" and client ID "5678". The scope granted to client ID "1234" includes only the thermostat read scope and the client ID "5678" includes both the "thermostat read/write" scope and the "smoke+CO read" scope. The various scopes and permissions bundled into each scope are discussed in detail below.

The permissions are designed and organized into scopes based on the types of data each client 318 might need. For example, for clients 318 that only check in and get status updates, a developer may only select a "read" permission for data elements, and, as a result, only choose a scope including read permissions to the associated element paths. However, if the client 318 is designed to set device values or status, the developer may choose a "read/write" permission for those elements and choose a scope including read/write permissions to the associated element paths. The scopes including the permissions that are selected for a particular client should match the client's features. As the client's features expand, the client 318 may need new permissions. In some embodiments, a new client version may be created with a scope that includes the newly required permissions and that client version may be offered to the users 316. It should be understood that if the client 318 is authorized the assigned scope, then the client may receive all of the permissions defined for that scope. Also, if multiple scopes are authorized for a client 318, then the client may receive a superset of all permissions combined contained in those scopes. Below is a table of some general scopes and the permissions that each scope includes, according to an embodiment.

Scope: Thermostat read
  Grants read permission to most of the Thermostat and Structure data values
Scope: Thermostat read/write
  Grants read permission to all of the Thermostat data values
  Grants write permission to these Thermostat data values:
    fan_timer_active, all target_temperature_x fields and hvac_mode
  Grants read permission to most of the Structure data values
Scope: Smoke+CO read
  Grants read permission to all the Smoke+CO Alarm data values and most of the
    Structure data values
Scope: Away read
  Grants read permission to most of the Structure data values
Scope: Away read/write
  Grants read permission to most of the Structure data values
  Grants read/write permission for away
Scope: ETA write
  Grants read permission to most of the Structure data values
  Grants write permission to eta
Scope: Postal code read
  Grants read permission for postal_code
Scope: Product data read/write
  Grants read permissions for all of the Company data values
  Grants read/write permissions to software version and all of the resource use data values Scopes and Permissions To illustrate, if a developer is registering a client 318 that listens to (e.g., reads) the ambient temperature, target temperature and the away state of the home, then the developer would choose the "thermostat read" scope, which provides only read access to those data elements. Conversely, a client 318 that needs to actively modify target temperature, heat/cool mode or fan timer should be assigned the "thermostat read/write" scope, which would provide write access to those data elements, and retain read access to the other thermostat and structure data elements. Another client 318 might track smoke and CO state, so the "smoke+CO alarm read" scope may be chosen to provide read permissions to those data elements. Still another client 318 could focus solely on the home, and take action when the user 316 arrives home, or after the user leaves the home. In such a case, the "away read/write and ETA write" scope may be chosen.

The below tables illustrate the various scopes for element paths in the data model for smart devices, such as thermostats 10A and detectors 10B, and a structure in more detail. The names of the scopes are across the top row of the table, the second row includes the scope ID, the third row includes a version number of the scope, and the leftmost column includes the field/data element paths. In some embodiments, a permission field in the data model may store all the permissions included for the selected scope(s). When the user 316 approves the requested scope for the client 318, an authorization session may be created and the string including all permissions for the client 318 may be copied into a row where authorization session information resides including the access token. The approved scopes for the client may be stored as part of a login string in the data model where the access token is stored. The access token is reused each time the client requests data from the data service 84. It should be noted, that in some embodiments, every scope has at least read permissions to an access_token and client_version element included in a "Metadata" object of the data model.

| Thermostat Read Scope | | | |
|---|---|---|---|
| | Name | Thermostat read | Thermostat read |
| Fields | ID | 10 | 19 |
| | Version | 1 | 2 |
| /devices/thermostats/device_id/device_id | | READ | READ |
| /devices/thermostats/device_id/local | | READ | READ |
| /devices/thermostats/device_id/software_version | | READ | READ |
| /devices/thermostats/device_id/structure_id | | READ | READ |

| Thermostat Read Scope | | |
| --- | --- | --- |
| Name | Thermostat read | Thermostat read |
| /devices/thermostats/device_id/name | READ | READ |
| /devices/thermostats/device_id/name_long | READ | READ |
| /devices/thermostats/device_id/last_connection | READ | READ |
| /devices/thermostats/device_id/is_online | READ | READ |
| /devices/thermostats/device_id/can_cool | READ | READ |
| /devices/thermostats/device_id/can_heat | READ | READ |
| /devices/thermostats/device_id/is_using_emergency_heat | | |
| /devices/thermostats/device_id/has_fan | READ | READ |
| /devices/thermostats/device_id/fan_timer_active | READ | READ |
| /devices/thermostats/device_id/fan_timer_timeout | READ | READ |
| /devices/thermostats/device_id/has_leaf | READ | READ |
| /devices/thermostats/device_id/temperature_scale | READ | READ |
| /devices/thermostats/device_id/target_temperature_f | READ | READ |
| /devices/thermostats/device_id/target_temperature_c | READ | READ |
| /devices/thermostats/device_id/target_temperature_high_f | READ | READ |
| /devices/thermostats/device_id/target_temperature_high_c | READ | READ |
| /devices/thermostats/device_id/target_temperature_low_f | READ | READ |
| /devices/thermostats/device_id/target_temperature_low_c | READ | READ |
| /devices/thermostats/device_id/away_temperature_high_f | READ | READ |
| /devices/thermostats/device_id/away_temperature_high_c | READ | READ |
| /devices/thermostats/device_id/away_temperature_low_f | READ | READ |
| /devices/thermostats/device_id/away_temperature_low_c | READ | READ |
| /devices/thermostats/device_id/hvac_mode | READ | READ |
| /devices/thermostats/device_id/ambient_temperature_f | READ | READ |
| /devices/thermostats/device_id/ambient_temperature_c | READ | READ |
| /devices/thermostats/device_id/humidity | | READ |
| /structures/structure_id/structure_id | READ | READ |
| /structures/structure_id/thermostats | READ | READ |
| /structures/structure_id/smoke_co_alarms | READ | READ |
| /structures/structure_id/away | READ | READ |
| /structures/structure_id/name | READ | READ |
| /structures/structure_id/country_code | READ | READ |
| /structures/structure_id/postal_code | | |
| /structures/structure_id/peak_period_start_time | READ | READ |
| /structures/structure_id/peak_period_end_time | READ | READ |
| /structures/structure_id/time_zone | READ | READ |
| /structures/structure_id/eta | | |
| /structures/structure_id/data_upload | | |

As described above and shown in the Thermostat Read Scope table, the thermostat read scope grants read permission to most of the thermostat and structure data values in the data model. Version 1 of the thermostat read scope does not provide read access to the humidity data values because the element may have been added to the data model after version 1 was created. As depicted, version 2 of the thermostat read scope grants read permission to the humidity data path in addition to all of the other elements included in version 1.

| Thermostat Read/Write Scope | | | |
| --- | --- | --- | --- |
| | Name | Thermostat read/write | Thermostat read/write |
| Fields | ID | 11 | 20 |
| | Version | 1 | 2 |
| /devices/thermostats/device_id/device_id | | READ | READ |
| /devices/thermostats/device_id/local | | READ | READ |
| /devices/thermostats/device_id/software_version | | READ | READ |
| /devices/thermostats/device_id/structure_id | | READ | READ |
| /devices/thermostats/device_id/name | | READ | READ |
| /devices/thermostats/device_id/name_long | | READ | READ |
| /devices/thermostats/device_id/last_connection | | READ | READ |
| /devices/thermostats/device_id/is_online | | READ | READ |
| /devices/thermostats/device_id/can_cool | | READ | READ |
| /devices/thermostats/device_id/can_heat | | READ | READ |
| /devices/thermostats/device_id/is_using_emergency_heat | | READ | READ |
| /devices/thermostats/device_id/has_fan | | READ | READ |
| /devices/thermostats/device_id/fan_timer_active | | READ | READ |
| | | WRITE | WRITE |
| /devices/thermostats/device_id/fan_timer_timeout | | READ | READ |
| /devices/thermostats/device_id/has_leaf | | READ | READ |
| /devices/thermostats/device_id/temperature_scale | | READ | READ |

-continued

| Thermostat Read/Write Scope | | |
|---|---|---|
| Name | Thermostat read/write | Thermostat read/write |
| /devices/thermostats/device_id/target_temperature_f | READ WRITE | READ WRITE |
| /devices/thermostats/device_id/target_temperature_c | READ WRITE | READ WRITE |
| /devices/thermostats/device_id/target_temperature_high_f | READ WRITE | READ WRITE |
| /devices/thermostats/device_id/target_temperature_high_c | READ WRITE | READ WRITE |
| /devices/thermostats/device_id/target_temperature_low_f | READ WRITE | READ WRITE |
| /devices/thermostats/device_id/target_temperature_low_c | READ WRITE | READ WRITE |
| /devices/thermostats/device_id/away_temperature_high_f | READ | READ |
| /devices/thermostats/device_id/away_temperature_high_c | READ | READ |
| /devices/thermostats/device_id/away_temperature_low_f | READ | READ |
| /devices/thermostats/device_id/away_temperature_low_c | READ | READ |
| /devices/thermostats/device_id/hvac_mode | READ WRITE | READ WRITE |
| /devices/thermostats/device_id/ambient_temperature_f | READ | READ |
| /devices/thermostats/device_id/ambient_temperature_c | READ | READ |
| /devices/thermostats/device_id/humidity | | READ |
| /structures/structure_id/structure_id | READ | READ |
| /structures/structure_id/thermostats | READ | READ |
| /structures/structure_id/smoke_co_alarms | READ | READ |
| /structures/structure_id/away | READ | READ |
| /structures/structure_id/name | READ | READ |
| /structures/structure_id/country_code | READ | READ |
| /structures/structure_id/postal_code | | |
| /structures/structure_id/peak_period_start_time | READ | READ |
| /structures/structure_id/peak_period_end_time | READ | READ |
| /structures/structure_id/time_zone | READ | READ |
| /structures/structure_id/eta | | |
| /structures/structure_id/data_upload | | |

As described above and shown in the Thermostat Read/Write Scope table, the thermostat read/write scope grants read permission to all of the thermostat data values, grants write permission to fan_timer_active, all target_temperature_x fields and hvac_mode data elements, and grants read permission to most of the structure data values. It should be noted that, in some embodiments, certain authorization rules may ensure that when data is written (e.g., modified) by a third party, the modified data includes a field (e.g., "touched_by") that is set equal to a reserved value indicating that a third party made a change and/or a modified at date/time that is set to date/time the data was modified. In this way, third party activity with resources in the data model may be logged and monitored.

| Smoke + CO Read Scope | | | |
|---|---|---|---|
| | Name | Smoke + CO read | Smoke + CO read |
| Fields | ID | 12 | 21 |
| | Version | 1 | 2 |
| | /devices/smoke_co_alarms/device_id/device_id | READ | READ |
| | /devices/smoke_co_alarms/device_id/locale | READ | READ |
| | /devices/smoke_co_alarms/device_id/software_version | READ | READ |
| | /devices/smoke_co_alarms/device_id structure_id | READ | READ |
| | /devices/smoke_co_alarms/device_id/name | READ | READ |
| | /devices/smoke_co_alarms/device_id/name_long | READ | READ |
| | /devices/smoke_co_alarms/device_id/last_connection | READ | READ |
| | /devices/smoke_co_alarms/device_id/is_online | READ | READ |
| | /devices/smoke_co_alarms/device_id/battery_health | READ | READ |
| | /devices/smoke_co_alarms/device_id/co_alarm_state | READ | READ |
| | /devices/smoke_co_alarms/device_id/smoke_alarm_state | READ | READ |
| | /devices/smoke_co_alarms/device_id/ui_color_state | READ | READ |
| | /devices/smoke_co_alarms/device_id/is_manual_test_active | | READ |
| | /devices/smoke_co_alarms/device_id/last_manual_test_time | | READ |
| | /structures/structure_id/structure_id | READ | READ |
| | /structures/structure_id/thermostats | READ | READ |
| | /structures/structure_id/smoke_co_alarms | READ | READ |
| | /structures/structure_id/away | READ | READ |
| | /structures/structure_id/name | READ | READ |

| Smoke + CO Read Scope | | |
|---|---|---|
| Name | Smoke + CO read | Smoke + CO read |
| /structures/structure_id/country_code | READ | READ |
| /structures/structure_id/postal_code | | |
| /structures/structure_id/peak_period_start_time | | |
| /structures/structure_id/peak_period_end_time | | |
| /structures/structure_id/time_zone | READ | READ |
| /structures/structure_id/eta | | |
| /structures/structure_id/data_upload | | |

The smoke+CO read scope grants read permission to all the smoke+CO alarm data values and most of the structure data values, as show in the table above. The smoke+CO read scope version 2 includes the same permissions for all of the data values included in version 1 but adds additional read permission to the is_manual_test_active data element and the last manual test time data element. The name data value may be displayed in user interface labels, while the name_long may be used in long form text. Device_id may be a string that uniquely represents this device. When a device is connected to multiple clients, each developer may see a different device_id for that device. In embodiments where the same developer has installed multiple clients for the device, the developer may see the same device_id. The locale data value may include the language and country code assigned to the device. Software_version may include a string that represents the firmware currently installed on the device. Structure_id may include a string that uniquely represents this structure (the structure that the device is paired with). Last_connection may include the timestamp of the last successful connection to the data service 84. Is_online may include the online status that is determined by using the last_connection time and an expected reconnection window that is device specific. Battery_health may include a string that states whether the battery is OK or whether it needs to be replaced.

Co_alarm_state may include values that increase in severity. For example, when the CO levels are rising, the co_alarm_state may show "warning" and when the user should exit the home, the co_alarm_state may show "emergency." Smoke_alarm_state may include values that increase in severity. For example, when the smoke levels are rising, the smoke_alarm_state may show "warning" and when the user should exit the home, the smoke_alarm_state may show "emergency." The is_manual_test_active data value is normally "false" but may be "true" when a smoke or CO test is started. Last_manual_test_time may include the timestamp of the last successful manual smoke or CO test. The ui_color_state data value may be derived from is_online, battery_health, co_alarm_state, and smoke_alarm_state. The ui_color_state may mirror the color that is displayed on an app and/or the device.

| Away Read Scope | | |
|---|---|---|
| | Name | Away read |
| Fields | ID | 14 |
| | Version | 1 |
| /structures/structure_id/structure_id | | READ |
| /structures/structure_id/thermostats | | READ |
| /structures/structure_id/smoke_co_alarms | | READ |
| /structures/structure_id/away | | READ |
| /structures/structure_id/name | | READ |
| /structures/structure_id/country_code | | READ |
| /structures/structure_id/postal_code | | |
| /structures/structure_id/peak_period_start_time | | |
| /structures/structure_id/peak_period_end_time | | |
| /structures/structure_id/time_zone | | READ |
| /structures/structure_id/eta | | |
| /structures/structure_id/data_upload | | |

As described above and shown in the Away Read Scope table, the away read scope grants read permission to most of the structure data values. For example, version 1 of the away read scope grants read permission to /structures/structure_id/structure_id, /structures/structure_id/thermostats, /structures/structure_id/smoke_co_alarms, /structures/structure_id/away, /structures/structure_id/name, /structures/structure_id/country_code, and /structures/structure_id/time_zone. Version 1 of the away read scope does not provide read or write permission to the following data elements: /structures/structure_id/postal_code, /structures/structure_id/peakperiod_start_time, /structures/structure_id/peak-period_end_time, /structures/structure_id/eta, or /structures/structure_id/data_upload. It should be noted that the away field may indicate whether the structure is occupied and may include three states: home (someone is in the house, either because the smart device determines that someone is in the house based on motion sensor data or the user has explicitly set the structure to home via an application, the client, or ETA), away (the user has explicitly set the structure to away), auto-away (the smart device has determined that no one is in the structure).

| Away Read/Write Scope | | |
|---|---|---|
| | Name | Away read/write |
| Fields | ID | 15 |
| | Version | 1 |
| /structures/structure_id/structure_id | | READ |
| /structures/structure_id/thermostats | | READ |
| /structures/structure_id/smoke_co_alarms | | READ |
| /structures/structure_id/away | | READ WRITE |
| /structures/structure_id/name | | READ |
| /structures/structure_id/country_code | | READ |
| /structures/structure_id/postal_code | | |
| /structures/structure_id/peak_period_start_time | | |
| /structures/structure_id/peak_period_end_time | | |

Away Read/Write Scope

| Name | Away read/write |
|---|---|
| /structures/structure_id/time_zone | READ |
| /structures/structure_id/eta | |
| /structures/structure_id/data_upload | |

As described above and shown in the Away Read/Write Scope table, the away read/write scope grants read permission to most of the structure data values (e.g., the same data values that read permissions are granted in the away read scope) and grants read/write permission for the away data value.

ETA Write Scope

| Name | | ETA write |
|---|---|---|
| Fields | ID | 17 |
| | Version | 1 |
| /structures/structure_id/structure_id | | READ |
| /structures/structure_id/thermostats | | READ |
| /structures/structure_id/smoke_co_alarms | | READ |
| /structures/structure_id/away | | |
| /structures/structure_id/name | | READ |
| /structures/structure_id/country_code | | READ |
| /structures/structure_id/postal_code | | |
| /structures/structure_id/peak_period_start_time | | |
| /structures/structure_id/peak_period_end_time | | |
| /structures/structure_id/time_zone | | READ |
| /structures/structure_id/eta | | WRITE |
| /structures/structure_id/data_upload | | |

As described above and shown in the ETA Write Scope table, the ETA write scope grants read permission to most of the structure data values and grants write permission to the eta data value. For example, version 1 of the ETA write scope grants read permission to /structures/structure_id/structure_id, /structures/structure_id/thermostats, /structures/structure_id/smoke_co_alarms, /structures/structure_id/name, /structures/structure_id/country_code, and /structures/structure_id/time_zone. Version 1 of the away read scope does not provide read or write permission to the following data elements: /structures/structure_id/away, /structures/structure_id/postal_code, /structures/structure_id/peakperiod_start_time, /structures/structure_id/peak-period_end_time, /structures/structure_id/eta, or /structures/structure_id/data_upload. It should be noted that ETA is an object, set on a structure and only write access is allowed. The ETA field should be used to provide information on when the smart thermostat 46 should prepare the temperature of a house for people arriving.

Postal Code Read Scope

| Name | | Postal code read |
|---|---|---|
| Fields | ID | 22 |
| | Version | 1 |
| /structures/structure_id/postal_code | | READ |

As described above and shown in the Postal Code Read Scope table, the postal code read scope grants read permission to the postal code data value.

Product Data Read/Write Scope

| Name | | Product data read/write |
|---|---|---|
| Fields | ID | 23 |
| | Version | 1 |
| /devices/$company/$product_type/product_id/identification/device_id | | READ |
| /devices/$company/$product_type/product_id/identification/serial_number | | READ |
| /devices/$company/$product_type/product_id/location/structure_id | | READ |
| /devices/$company/$product_type/product_id/software/version | | READ/WRITE |
| /devices/$company/$product_type/product_id/resource_use/electricity/value | | READ/WRITE |
| /devices/$company/$product_type/product_id/resource_use/electricity/measurement_reset_time | | READ/WRITE |
| /devices/$company/$product_type/product_id/resource_use/electricity/measurement_time | | READ/WRITE |
| /devices/$company/$product_type/product_id/resource_use/gas/value | | READ/WRITE |
| /devices/$company/$product_type/product_id/resource_use/gas/measurement_reset_time | | READ/WRITE |
| /devices/$company/$product_type/product_id/resource_use/gas/measurement_time | | READ/WRITE |
| /devices/$company/$product_type/product_id/resource_use/water/value | | READ/WRITE |
| /devices/$company/$product_type/product_id/resource_use/water/measurement_reset_time | | READ/WRITE |
| /devices/$company/$product_type/product_id/resource_use/water/measurement_time | | READ/WRITE |
| /structures/structure_id/devices/$company/$product_type | | READ |

As described above and shown in the Product Data Read/Write Scope table, the product data read/write scope grants read permission to some of the company and structures data values and grants read/write permission to most of the company data values. For example, version 1 of the product data read/write scope grants read permission to /devices/$company/$product_type/product_id/identification/device_id, /devices/$company/$product_type/product_id/identification/serial number, /devices/$company/$product_type/product_id/location/structure_id, and /structures/structure_id/devices/$company/$product_type. Further, the product data read/write scope provides read/write permissions to /devices/$company/$product_type/product_id/software/version, /devices/$company/$product_type/product_id/resource_use/electricity/value, /devices/$company/$product_type/product_id/resource_use/electricity/measurement_reset_time, /devices/$company/$product_type/product_id/resource_use/electricity/measurement_tim e, /devices/$company/$product_type/product_id/resource_use/gas/value, /devices/$company/$product_type/product_id/resource_use/gas/measurement_reset_time /devices/$company/$product_type/product_id/resource_use/gas/measurement_time, /devices/$company/$product_type/product_id/resource_use/water/value, and /devices/$company/$product_type/product_id/resource_use/water/measurement_reset_time.

To assign scopes to clients 318 and/or client applications 352, a developer may first need to register the client 318 and/client application 352 in the data model. Developers may need a developer account to be eligible to create clients. Developer accounts may be created by users and the users may only be allowed one developer account. When initially created, the developer account may have low provisioning limits. Provisioning limits define how many clients a developer may have associated with it, and how many unique users a client may have. Each client may have its own user limit. User limits may be defined as soft and hard. Soft limits may be exposed to the developer and hard limits may be enforced programmatically. In some embodiments, a client active flag may (e.g., Boolean) may be set that indicates if the client is active. If the client active flag is false, no new sessions may be authorized and no access tokens can be validated. Also, a developer active flag (e.g., Boolean) may indicate if the developer is active. If the developer active flag is false, no new clients may be created, but existing clients may continue to work, including initiating new sessions.

The authorization server 191 may collect various statistics during operation. For example, the authorization server 191 may collect statistics related to authorizations, created access tokens requests, successful created access tokens requests, failed created access tokens requests, access token validation requests, successful access token validation requests, failed access token validation requests, access tokens by user requests, deleted access tokens requests, successful deleted access tokens requests, failed deleted access tokens requests, created client secrets requests, retrieved client secret requests, successful retrieved client secret requests, failed retrieved client secret requests, deleted client secret requests, successful deleted client secret requests, failed deleted client secret requests, and/or reserved client sessions.

When creating a client, the developer may select the scopes that the client may need based on their intended use of the data and functionality. It should be noted that the term client may refer to a developer created integration point which defines the set of scopes an end user will be asked to grant the developer. It should also be noted that the term vendor may refer to an organization that produces third party devices (e.g., an electronic device produced by a manufacturer that does not host the data model) in a service or data streams. The data model may include two tables to store vendor data (vendors table) and associations with developers (vendor developer association table). The vendors table may contain the following fields at a minimum: unique ID (a UUID), data path name, and created at timestamp. The UUID is assigned when the vendor record is created. The UUID value may not be changed after creation. The data path name may include a unique string, with no spaces, that may be used to identify the vendor's section of the data model. The data path name is not intended to be exposed to end users. The value of the data path name may not be changed after it is created. The created at timestamp may include the timestamp of when the vendor was created.

The vendor developer association table may map the vendors to the developers that created the vendors in the data model. The vendor developer association table may include at least three columns: vendor ID, developer ID, and created at timestamp. The vendor ID may include the ID of the vendor, which may be a foreign key to the vendors table. The developer ID may include the ID of the developer, which may be a foreign key to the developers table. The created at timestamp may include the timestamp of when the vendor developer association was created. In some embodiments, there may be a one to one relationship between a developer and a vendor. That is, there may be a programmatic restriction that only allows one developer to have one vendor.

APIs may be used to manage the vendors and the vendor developer associations. For example, functionality provided by the APIs may include creating a vendor, associating a vendor with a developer (associating a vendor with a developer may add the developer's user to the vendor user group), and disassociating a vendor from a developer (disassociating a vendor from a developer may inhibit new clients being created with the vendor data scopes but may not remove vendor data scopes and permissions from existing clients and authorization sessions).

In some embodiments, an assignable permission may be used by the scopes. An assignable permission may include an attribute placeholder in certain element data paths that will be replaced with the vendor data path names when clients 318 are created by the developer. For example, a general definition of an assignable permission may include /$vendor/* and /structures/*/$vendor/clients/*. The assignable permission after being assigned to a client for a vendor named "Company A" may include/companya/* and /structures/*/companya/clients/*. If a scope is assignable, a replacement may be run on all placeholders when the scope is added to the client 318. In some embodiments, scopes with assignable attributes may be restricted to developers who are in the vendor user group.

The assignable permissions and associated vendors may enable a developer to have a vendor associated with it and the string to access the data element. The assignable permission allows a vendor to provide its specific data into the data model and to read that data as desired using their vendor specific data path. As such, the data model may include a section with vendor's device id and data specific to the client to be entered into the model. The assignable permission offers selective visibility into the data model based on vendor. Each device added gets a new device id and permissions levels to allow access to certain data. Each vendor may only be allowed to see data specific to each respective vendor. To enable a client to enter and read data related to their devices into the data model, a vendor record may be created in the vendors table and a record may be created that associates the vendor to the developer in the vendor developer association table. The vendor can then register specific devices (the vendor has a device of a device type to associate with a structure, so a record is created for that device in a user's structure in the data model) and use device services 84 to access the data model including the vendor specific data (using data path name with the vendor's name inserted via the assignable permissions). In some embodiments, a first vendor specific information in the data model may be accessed by one or more other vendors if the first vendor authorizes the one or more other vendors.

In some embodiments, a client 318 may be locked with the scopes that are provided by the developer when creating the client 318. If new elements are added to the data model and included in different versions of certain scopes, a new client may be created and assigned the scopes including the new elements. In some embodiments, updatable client scopes may be used to version the client. If it is desirable to change the scope information for a client, a different version of the client including the desired scopes may be selected. For example, version 1 of the client may be assigned scope with ID "10" and version 2 of the client may be assigned scopes with IDs "10" and "20". A message may appear in an end user app that indicates a developer has updated their client and would like to have access to the following permissions. If the user 316 approves, then the permissions for version 2 are copied into the permissions list for the authorization session and included in the string including the access token without having to go through a back and forth process between the device service 84 and/or API 90 and the client 318. The process may include one click by the user to change an existing session for a client 318 to modify the allowed scopes.

In some embodiments, various database tables may be used to manage vendors, developers, clients, access tokens, and the like. The tables may be designed in a relational manner. That is, some of the tables may share elements that are the same to match the elements and pull all of the information related to those particular elements. For example, a client table may include a client ID and a user table may include a user ID. An access token table may include an access token ID data element and the client ID and the user ID data elements. In doing so, the access token table shows which client ID's and user ID's are associated with which access token ID's. Similarly, an authorization code table may include an authorization code ID data element and both the user ID and the client D. In doing so, the authorization code table shows which client ID's and user ID's are associated with which authorization code ID's. In addition, a scopes table may be used to maintain a scope ID and the permissions included in the scopes. When the user approves a scope for a client, the scope ID that is approved and the access token ID that correlates to the client may be stored in an access token and scopes table, and so forth.

In some embodiments, the authorization server 191 may include one or more servers that provide different functionality. For example, one server may not be exposed to the public and include low level functions for managing authorization codes, access tokens, client secrets, scopes and permissions, while a second server may be exposed to the public and include functions for higher level logic of the authorization code and access token granting process (query client information and list of scopes assigned, authenticate user and fetch user ID, validate user's consent to grant client's requested scopes, handle redirects, receive request for authorization code and access token in a GET REST web service call with query parameter format).

The internally-facing server (e.g., the server that is not publicly exposed) may include multiple API URLs that provide various functionalities. For example, the functionalities may include creating new authorization codes, creating new access tokens, validating access tokens, deleting access tokens, creating new client secrets, retrieving client ID, deleting client secrets, and the like. The requests and responses may be in the form of JSON.

In some embodiments, an API URL to retrieve an authorization code may be used. A request to the API URL may include the user ID, client ID, PIN request, permissions, and/or associated scope IDs. The response may return a status, the authorization code, expires at date/time, and/or the scope IDs.

In some embodiments, an API URL to retrieve an access token may be used. A request to the API URL may include the client ID, client secret, and/or authorization code. The response may return a status, the access token, and/or expires at date/time.

In some embodiments, an API URL to validate an access token may be used. A request to the API URL may include the access token, which may be a long unique string. In some embodiments, the access token may include a leading letter, "c", a dot ".", and a long random string where the characters are all URL compatible (e.g., c.hpNS6bLYNOq YzhAyAIR200dzR6asdfswerASDFAFS324235). The response may return a status, the user ID, the client ID, the user token, permissions, and the scope IDs if the access token is valid.

In some embodiments, an API URL to delete an access token may be used. If the deletion is successful, a response may include the access token, expires at date/time, created at date/time, ID, and client ID. If the deletion fails, the response may include a status indicating the same.

In some embodiments, an API URL to create a client secret and/or replace an existing client secret for a client ID may be used. A response may include the client ID and the client secret that is created.

In some embodiments, an API URL to get the client secret may be used. A response may include the client secret that is requested.

In some embodiments, an API URL to get a client ID and a client secret may be used. A response may include the client ID and the client secret that is requested.

In some embodiments, an API URL to delete a client secret may be used. If a deletion request is successful, the response may include a status indicating that the deletion was successful. If the deletion request failed, then the response may include a status indicating that the deletion failed.

The publicly exposed server used by the authorization server 191 may also provide various functionality, such as validating an access token, getting an authorization code, revoking access to a user's data for a client, removing authorizations for all user's clients, getting all clients for a user, getting a specific client or a user with sessions, getting all clients, checking if a client exists, getting a client ID, updating a client, deleting a client, creating a client, setting the active state on a client, setting the users limit on a client, getting the status of a client's users limit, getting developer information, updating a developer, creating a new developer account, setting the active state on a developer, setting the clients limit on a developer, setting the support flags on a developer, updating a justification for a scope, getting all clients for a developer, getting client for a specific developer, getting all client categories, getting all scopes, getting all restrictions on a scope, adding a restriction to a scope, removing a restriction from a scope, obtaining an access token using an authorization code, populating target structure with a fake device (thermostat), and/or deleting a session. The functionalities may be included in various API URLs, as generally described below.

In some embodiments, an API URL that validates an access token may be used. A request to the API URL may include the access token. If the access token is not valid, only a valid field may be returned indicating that the access token is not valid. If the access token is valid, then the valid field, user ID, client ID, company name, client name, user token, permissions, session ID, and/or scope IDs may be returned.

In some embodiments, an API URL to get an authorization code may be used. A request may include a client ID. If successful, the response may include a status and the authorization code, expires at date/time, and scope IDs.

In some embodiments, an API URL to revoke access to user's data for a client may be used. A request to the API URL may include an access token associated with a client and user. If revocation is successful, the response may include a status and a message indicating that the session has been deleted. If revocation is unsuccessful, an error response may be returned and include a reason for the error, such as the session was not found or was unable to be deleted.

In some embodiments, an API URL to remove authorizations for all user's clients may be used. A request to the API URL may include an access token. If removal is successful, the response may include a status and a message indicating that the session has been deleted. If removal is unsuccessful, an error response may be returned and include a message indicating that the session was unable to be deleted.

In some embodiments, an API URL to get all clients for a user (including sessions) may be used. A request to the API URL may include an access token associated with the clients and the user. A response may include an ID, name, company name, description, redirect URI, scopes (ID, justification, name, version), targeted number users, intended usage, active, active, users limit, visibility IDs, category IDs, sessions, modified at date/time, created at date/time, and so forth.

In some embodiments, an API URL to get a specific client for a user with sessions may be used. A request may include an access token associated with the client and the user. A response may include information related to the client, such as an ID, name, company name, description, redirect URI, scopes (ID, justification, name, version), targeted number users, intended usage, active, active, users limit, visibility IDs, category IDs, sessions, modified at date/time, created at date/time, and so forth.

In some embodiments, an API URL to get all clients may be used. A response may include client information, such as ID, name, company name, description, redirect URI, support URL, scopes (ID, justification, name, version), targeted number users, intended usage, active, active, users limit, visibility IDs, category IDs, sessions, modified at date/time, created at date/time, and so forth.

In some embodiments, an API URL to check if a client exists may be used. A request may include an access token and parameters including a name (e.g., URL encoded name to check). A response may include a status, name, in use field, and so forth.

In some embodiments, an API URL to update a client may be used. A request may include an access token and fields related to the client to update, such as name, description, redirect URI, support URL, targeted number users, and/or intended usage. It should be noted that all fields may be optional and only the fields included in the request may be updated. The response may include a status and all fields related to the client, such as ID, name, company name, description, redirect URI, support URL, scopes (ID, justification, name, version), targeted number users, intended usage, active, users limit, visibility IDs, category IDs, developer IDs, modified at date/time, created at date/time, and so forth.

In some embodiments, an API URL to delete a client may be used. A request may include an access token associated with the client to delete. A response may include a status indicative of whether the deletion request was successful. In some embodiments, a client may be deleted if it has fewer than a threshold number of users (e.g., 25, 30, 35) to which it is associated. For example, in some embodiments, the owner may delete clients that have less than 25 users.

In some embodiments, an API URL to create a client may be used. A request may include an access token and fields including developer ID, name, description, redirect URI, support URL, targeted number users, intended usage, scopes (ID, justification), and/or category IDs. In some embodiments, the name may be unique. A response may include a status and fields including ID, name, company name, description, redirect URI, support URL, scopes (ID, justification, name, version), targeted number users, intended usage, active, visibility IDs, category IDs, developer ID, secret, modified at time/date, and/or created at time/date. An error response may be returned in several instances, including when there is no developer account, the provisioning limit is exceeded, the user does not own the developer account, the developer is not active, there is a duplicate client name, the requestor is unauthorized, and/or the requestor is not a staff user.

In some embodiments, an API URL to set active state on a client may be used. A request may include an access token and an active state. A response may include a status and the active state.

In some embodiments, an API URL to set the users limit on a client may be used. A request may include an access token and a soft and a hard number of users limit. A response may include a status and the soft and hard limits.

In some embodiments, an API URL to get the status of a client's user limit may be used. A request may include an access token. A response may include a status, user limit, user count, and/or status OK (e.g., set to "true" if the users limit is not exceeded and set to "false" if over users limit).

In some embodiments, an API URL to get developer information may be used. A request may include an access token. A response may include a status and developer information, such as ID, user ID associated with the developer, active state, client limit, address information, name, phone, company name, company URL, industry, company size, support (commercial and paid), modified at time/date, and/or created at time/date.

In some embodiments, an API URL to update a developer may be used. A request may include an access token and developer information to update, such as phone, company name, address information, company URL, industry, and/or company size. It should be noted that, in some embodiments, all fields in the body of the request may be optional and only the submitted fields may be updated. A response may include a status and the developer's information, such as ID, user ID, active, client limit, address information, name, phone, company name, company URL, industry, company size, support (commercial and paid), modified at time/date, and/or created at time/date.

In some embodiments, an API URL to create a developer account may be used. A request may include an access token and developer information, such as user ID, name, phone, company name, address information (e.g., first street information, second street information, city, state, postal code, country), company URL, industry, and/or company size. A response may include a status and the developer's information, such as ID, user ID, active, client limit, address information (e.g., first street information, second street information, city, state, postal code, country), name, phone, company name, company URL, industry, company size, support (commercial and paid), modified at time/date, and/or created at time/date.

In some embodiments, an API URL to set the active state on a developer may be used. A request may include an access token and active state of a developer. A response may include a status and the active state of the developer.

In some embodiments, an API URL to update a scope's justification may be used. A request may include an access token, scope ID, and updated justification. The response may include a status, scope ID, and updated justification.

In some embodiments, an API URL to get all clients for a developer may be used. A request may include an access token. A response may include client information, such as client ID, name, company name, description, redirect URI, support URL, scopes (ID, justification, name, version), targeted number users, intended usage, active, users limit, visibility IDs, category IDs, secret, modified at date/time, and/or created at date/time.

In some embodiments, an API URL to get all client for a specific developer may be used. A request may include an access token. A response may include a status and client information, such as client ID, name, company name, description, redirect URI, support URL, scopes (ID, justification, name, version), targeted number users, intended usage, active, users limit, visibility IDs, category IDs, developer ID, secret, modified at date/time, and/or created at date/time.

le;2qIn some embodiments, an API URL to get all client categories may be used. A response may include a status, client category ID, and name for the client category.

In some embodiments, an API URL to get all scopes may be used. A response may include a status, scope ID, scope name, and version of the scopes.

In some embodiments, an API URL to get all restrictions on a scope may be used. Restrictions may limit a scope to particular data elements, clients, users, and so forth. A response returned by this API URL may include a status and names of user groups restricting the scope.

In some embodiments, an API URL to add a restriction to a scope may be used. A request may include the restriction to be added to the scope and scope ID. A response may include a status and a message field indicating that the scope restriction has been added.

In some embodiments, an API URL to delete a restriction to a scope may be used. A request may include the restriction to be deleted and scope ID. A response may include a status and a message field indicating that the scope restriction has been deleted.

Server to Server Call from Client to Authorization Server to Obtain an Access Token from an Authorization Code API URL The server to server call from a client to the authorization server 191 to obtain an access token from an authorization code API URL displayed above includes the contents of a sample JSON request and response. As displayed, the request may include an URL parameters including the authorization code provided in the call to /oauth2/authorize, the client ID requesting access to a user's data, the client secret key provided by the authorization server 191 to the client, and the grant type. The response may include a status, content type, and a body including fields related to the access token, and the expires in number of seconds until the token expires. An error may occur in several scenarios including when a parameter is missing, an authorization code is not found, an authorization code expired, a client secret not found, a client is not active and a redirect URI parameter is present. If any of the above errors occurs, an error response may include a status including a different status ID for the error, content type, and a body including a message indicating which error occurred.

---

Server to Server Call from Client to Authorization Server to Obain an Access Token from an Authorization Code API URL

---

POST
/oauth2/access_token?code=STRING&client_id=STRING&client_secret=STRING&grant_type=authorization_code
Request:
    url parameters:
        code : the authorization_code provided in the call to /oauth2/authorize.
        client_id : id of the client (application) requesting access to a user's data.
        client_secret : secret key provided by Nest to client. This is also
        sometimes called a "application key".
        grant_type : may be authorization_code
Response:
    status: 200
    content type : application/json
    body :
        {
        "access_token":"STRING",
        "expires_in":LONG // number of seconds until token expires
        }
Error Response:
    Missing parameter:
        status: 400
        contenttype: application/json
        body: {"error":"missing_paramenter", "error_description":"missing
        required parameters: PARM_NAME"}
    Authorization code not found:
        status: 400
        contenttype: application/json
        body: {"error":"oauth2_error", "error_description":"authorization code
        not found"}
    Authorization code expired:
        status: 400
        contenttype: application/json
        body: {"error":"oauth2_error", "error_description":"authorization code
        expired"}
    Client secret not found:
        status: 400
        contenttype: application/json
        body: {"error":"oauth2_error", "error_description":"client secret not
        found"}
    Client is not active:
        status: 403
        contenttype: application/json
        body: {"error":"client_not_active", "error_description":"client is not
        active"}
    redirect_uri parameter present:
        status: 400
        contenttype: application/json
        body: {"error":"input_error","error_description":"redirect_uri not
        allowed"}

In some embodiments, an API URL to populate a target structure with a fake device (e.g., thermostat, smoke detector) to test a client's access and/or usage of the data model may be used. A response may include a status and an empty message body for the sub-elements of the fake device.

In some embodiments, an API URL to delete a session (invalidate the access token) may be used. A request to delete the session, which invalidates the access token, may include the access token to be invalidated. A response may include a status.

iii. Data Model

As discussed above, clients 182 communicate with the structures 10D and devices (e.g. 10A-10C) via a shared data model (e.g., a shared JSON document) stored and/or accessible by the device service 84. For example, application programming interface (API) clients or API client devices may send one or more requests to the API 90 or device service 84 to retrieve, access, view, subscribe, or modify data in the data model representative of one or more smart environments. Sending the requests may be implemented by the API client or API client device as computer instructions stored on one or more tangible, non-transitory computer-readable media and executed by a processor. Data in the data model may be organized hierarchically. At the top level of the hierarchy are metadata, devices, and structures. Specific device types are modeled under the devices object, such as thermostats and/or hazard detectors (e.g., smoke and CO alarms). In some embodiments, the metadata data object, the devices data object, and the structures data object may be peers relative to one another (e.g., at the same relative level to one another) in the hierarchy. In addition, the data model may be a single unified instance that is scalable for additional devices (e.g., thermostats, hazard detectors, and/or party devices), companies, and/or structures. For example, below is an example of a hierarchically structured data model, in accordance with an embodiment.

| Data Model with Metadata, Devices, and Structures |
| --- |

```
{
  "metadata": {
    "access_token": "c.FmDPkzyzaQe..." ,
    "client_version": 1
  },
  "devices": {
    "thermostats": {
      "peyiJNo0IldT2YlIVtYaGQ": {
        "device_id": "peyiJNo0IldT2YlIVtYaGQ" ,
        "locale": "en-US" ,
        "software_version": "4.0" ,
        "structure_id": "VqFabWH21nwVyd4RWgJgNb292wa7hG_dUwo2i2SG7j3-BOLY0BA4sw" ,
        "name": "Hallway (upstairs)" ,
        "name_long": "Hallway Thermostat (upstairs)" ,
        "last_connection": "2015-10-31T23:59:59.000Z" ,
        "is_online": true ,
        "can_cool": true ,
        "can_heat": true ,
        "is_using_emergency_heat": true ,
        "has_fan": true ,
        "fan_timer_active": true ,
        "fan_timer_timeout": "2015-10-31T23:59:59.000Z" ,
        "has_leaf": true ,
        "temperature_scale": "C" ,
        "target_temperature_f": 72 ,
        "target_temperature_c": 21.5 ,
        "target_temperature_high_f": 72 ,
        "target_temperature_high_c": 21.5 ,
        "target_temperature_low_f": 64 ,
        "target_temperature_low_c": 17.5 ,
        "away_temperature_high_f": 72 ,
        "away_temperature_high_c": 21.5 ,
        "away_temperature_low_f": 64 ,
        "away_temperature_low_c": 17.5 ,
        "hvac_mode": "heat" ,
        "ambient_temperature_f": 72 ,
        "ambient_temperature_c": 21.5 ,
        "humidity": 40
      }
    },
    "smoke_co_alarms": {
      "RTMTKxsQTCxzVcsySOHPxKoF4OyCifrs": {
        "device_id": "RTMTKxsQTCxzVcsySOHPxKoF4OyCifrs" ,
        "locale": "en-US" ,
        "software_version": "1.01" ,
        "structure_id": "VqFabWH21nwVyd4RWgJgNb292wa7hG_dUwo2i2SG7j3-BOLY0BA4sw" ,
        "name": "Hallway (upstairs)" ,
        "name_long": "Hallway Protect (upstairs)" ,
        "last_connection": "2015-10-31T23:59:59.000Z" ,
        "is_online": true ,
        "battery_health": "ok" ,
        "co_alarm_state": "ok" ,
        "smoke_alarm_state": "ok" ,
        "is_manual_test_active": true ,
```

| Data Model with Metadata, Devices, and Structures |
|---|

```
                "last_manual_test_time": "2015-10-31T23:59:59.000Z" ,
                "ui_color_state": "gray"
            }
        },
        "$company": {
            "$product_type": {
                "CPMEMSnC48JlSAHjQIp-aHI72IjLYHK_ul_c54UFb8CmPXNj4ixLbg": {
                    "identification": {
                        "device_id": "CPMEMSnC48JlSAHjQIp-
kHI72IjLYHK_ul_c54UFb8CmPXNj4ixLbg" ,
                        "serial_number": "1L090B50230"
                    },
                    "location": {
                        "structure_id": "VqFabWH21nwVyd4RWgJgNb292wa7hG_dUwo2i2SG7j3-
BOLY0BA4sw"
                    },
                    "software": {
                        "version": "1.0"
                    },
                    "resource_use": {
                        "electricity": {
                            "value": 42.789 ,
                            "measurement_reset_time": "2015-01-01T01:01:01.000Z" ,
                            "measurement_time": "2015-01-01T01:02:35.000Z"
                        },
                        "gas": {
                            "value": 0.345234545 ,
                            "measurement_reset_time": "2015-01-01T01:01:01.000Z" ,
                            "measurement_time": "2015-01-01T01:02:35.000Z"
                        },
                        "water": {
                            "value": 10000.3 ,
                            "measurement_reset_time": "2015-01-01T01:01:01.000Z" ,
                            "measurement_time": "2015-01-01T01:02:35.000Z"
                        }
                    }
                }
            }
        }
    },
    "structures": {
      "VqFabWH21nwVyd4RWgJgNb292wa7hG_dUwo2i2SG7j3-BOLY0BA4sw": {
            "structure_id": "VqFabWH21nwVyd4RWgJgNb292wa7hG_dUwo2i2SG7j3-
BOLY0BA4sw" ,
            "thermostats": [ "peyiJNo0IldT2YlIVtYaGQ", ... ] ,
            "smoke_co_alarms": [ "RTMTKxsQTCxzVcsySOHPxKoF4OyCifrs", ... ] ,
            "devices": {
                "$company": {
                    "$product_type": [ "CPMEMSnC48JlSAHjQIp-
aHI72IjLYHK_ul_c54UFb8CmPXNj4ixLbg", ... ]
                }
            },
            "away": "home" ,
            "name": "Home" ,
            "country_code": "US" ,
            "postal_code": "94304" ,
            "peak_period_start_time": "2015-10-31T23:59:59.000Z" ,
            "peak_period_end_time": "2015-10-31T23:59:59.000Z" ,
            "time_zone": "America/Los_Angeles" ,
            "eta": {
                "trip_id": "myTripHome1024" ,
                "estimated_arrival_window_begin": "2015-10-31T22:42:59.000Z" ,
                "estimated_arrival_window_end": "2015-10-31T23:59:59.000Z"
            }
        }
    }
}
```

As illustrated, metadata may be added to the data model. The metadata object includes additional information that is provided when making a call to the API (e.g., via REST and/or Firebase). The access_token element acts as an authorization element that is used to provide proof that a user has authorized the client 182 to make API calls on their behalf. The access_token element is also used to identify which user to which the data is associated with when receiving responses from a MUI call, as described above. The client_version is an indication of the last user-authorized version of a client 182 and is associated with the access_token.

Further, specific device types are modeled under the "devices" object. For example, in the current example, a thermostat 10A and detector 10B are modeled. It should be noted that other devices types may be modeled, such as cameras, security alarms, and the like. Additionally, a "company" object may be modeled under the "devices" object, as explained in detail below. Further, a structure is modeled. A structure represents a physical building. Structures 10D contain devices (e.g. 10A-10C) as well as information for the building as a whole. For example, in one embodiment, an estimated time of arrival to the structure 10D and/or an "away" mode indicating that no one is currently occupying the structure may be maintained at the data model. Each of the devices and/or structures has an associated unique identifier, which enables the API calls to be accurately routed to the proper device object.

In some embodiments, the data model may be hierarchically constructed in a manner where the structures are at a higher level and devices are at a sub-level of a corresponding structure that the devices are associated with. Users of the system 180 may each have their own structure and/or device objects in the data model, which may be identified by an associated user identifier. Below is an example of a data model structure, where structures and devices are associated with a user.

Example Data Model 1

```
{
    "auth": {
        "505": {
            "myapp": "antoken" //antoken is a customized token
            payload
        }
    },
    "users": {
        "505": { //505 is a unique user identifier
            "structures": { //structures object
                "f3d0c560-03f2-11e1-98a4-1231381aa376":
                { //structures unique identifier
                    "country_code": "US",
                    "name": "home",
                    "away": false,
                    "location": "Sunnyvale, CA",
                    "postal_code": "94087",
                    "away_setter": 1
                    "devices": { // device associated with the structure
                        "01AA01AB431100RF": { //device unique
                        identifier
                            "temperature_scale": "F",
                            "country_code": "US",
                            "current_temperature": 21.5,
                            "name": "Senior Zirconia",
                            "fan_mode": "auto",
                            "device_locale": "en_US",
                            "target_temperature_type": "heat",
                            "can_cool": false,
                            "postal_code": "94087",
                            "current_humidity": 52,
                            "can_heat": true,
                            "last_connection": 1355181256000,
                            "has_fan": false,
                            "target_temperature": 20,
                            "online": false
                        }
                    }
                }
            }
        }
    }
}
```

As illustrated, in the above embodiment, structure f3d0c560-03f2-11e1-98a4-1231381aa376 is implemented as a sub-level of the user 505, indicating that the structure is associated with this user. Any number of structures may be implemented and/or associated with a particular user. Further, one structure may be associated with many users. Further, the device 01AA01AB431100RF is implemented as a sub-level of structure object f3d0c560-03f2-11e1-98a4-1231381aa376, indicating that this device is a device of that structure. Any number of devices may be implemented and/or associated with a particular structure.

In an alternative embodiment, a topology of associations between devices and structures may be provided in the data model, as illustrated in the following Example Data Model 2:

Example Data Model 2

```
{
    "users": {
        "505": {
            "structures": {
                "s1": { },
                "s2": { }
            }
            "devices": {
                "d1": { }
                "d2": { }
            }
            "topology": {
                "structures": {
                    "s1": ["d1", "d2"],
                    "s2": ["d3"]
                },
                "properties": {
                },
                "wings": {
                },
                "floors": {
                }
            }
        }
    }
}
```

In Example Data Model 2, two structures s1 and s2 are associated with user 505. Further, devices d1 and d2 are associated with the user 505. The topology section associates the devices d1 and d2 with the structure s1 and associates a third device d3 that is not associated with the user 505 to the structure s2.

Honing in on the device objects, the devices (e.g., 10A-10C) may share a common base set of information such as a user-supplied name, software version and online status. Additionally, the data model may include information specific to a particular device type. For example, smoke and/or CO detectors 10B may build upon the common base set of information, adding alarm states. Further, thermostats 10A may add upon the common base set of information to add data that may enable control of HVAC systems and data regarding an observed climate of thermostat 10A. Below is an example of thermostat 10A and detector 10B objects of the data model.

Devices Data Model Objects

```
{
"devices": {
    "thermostats": {
```

-continued

| Devices Data Model Objects |
|---|

```
        "peyiJNo0IldT2YlIVtYaGQ": {
            "device_id": "peyiJNo0IldT2YlIVtYaGQ" ,
            "locale": "en-US" ,
            "software_version": "4.0" ,
            "structure_id":
"VqFabWH21nwVyd4RWgJgNb292wa7hG_dUwo2i2SG7j3-BOLY0BA4sw" ,
            "name": "Hallway (upstairs)" ,
            "name_long": "Hallway Thermostat (upstairs)" ,
            "last_connection": "2014-10-31T23:59:59.000Z" ,
            "is_online": true ,
            "can_cool": true ,
            "can_heat": true ,
            "is_using_emergency_heat": true ,
            "has_fan": true ,
            "fan_timer_active": true ,
            "fan_timer_timeout": "2014-10-31T23:59:59.000Z" ,
            "has_leaf": true ,
            "temperature_scale": "C" ,
            "target_temperature_f": 72 ,
            "target_temperature_c": 21.5 ,
            "target_temperature_high_f": 72 ,
            "target_temperature_high_c": 21.5 ,
            "target_temperature_low_f": 64 ,
            "target_temperature_low_c": 17.5 ,
            "away_temperature_high_f": 72 ,
            "away_temperature_high_c": 21.5 ,
            "away_temperature_low_f": 64 ,
            "away_temperature_low_c": 17.5 ,
            "hvac_mode": "heat" ,
            "ambient_temperature_f": 72 ,
            "ambient_temperature_c": 21.5 ,
            "humidity": 40
        }
    },
    "smoke_co_alarms": {
        "RTMTKxsQTCxzVcsySOHPxKoF4OyCifrs": {
            "device_id": "RTMTKxsQTCxzVcsySOHPxKoF4OyCifrs" ,
            "locale": "en-US" ,
            "software_version": "1.01" ,
            "structure_id":
VqFabWH21nwVyd4RWgJgNb292wa7hG_dUwo2i2SG7j3-BOLY0BA4sw" ,
            "name": "Hallway (upstairs)" ,
            "name_long": "Hallway Protect (upstairs)" ,
            "last_connection": "2014-10-31T23:59:59.000Z" ,
            "is_online": true ,
            "battery_health": "ok" ,
            "co_alarm_state": "ok" ,
            "smoke_alarm_state": "ok" ,
            "is_manual_test_active": true ,
            "last_manual_test_time": "2014-10-31T23:59:59.000Z" ,
            "ui_color_state": "gray"
        }
    }
    "$company": {
        "$product_type": {
            "CPMEMSnC48JlSAHjQIp-aHI72IjLYHK_ul_c54UFb8CmPXNj4ixLbg": {
                "identification": {
                    "device_id": "CPMEMSnC48JlSAHjQIp-
kHI72IjLYHK_ul_c54UFb8CmPXNj4ixLbg" ,
                    "serial_number": "1L090B50230"
                },
                "location": {
                    "structure_id":
"VqFabWH21nwVyd4RWgJgNb292wa7hG_dUwo2i2SG7j3-BOLY0BA4sw"
                },
                "software": {
                    "version": "1.0"
                },
                "resource_use": {
                    "electricity": {
                        "value": 42.789 ,
                        "measurement_reset_time": "2015-01-01T01:01:01.000Z" ,
                        "measurement_time": "2015-01-01T01:02:35.000Z"
                    },
                    "gas": {
                        "value": 0.345234545 ,
                        "measurement_reset_time": "2015-01-01T01:01:01.000Z" ,
```

| Devices Data Model Objects |
|---|
| ```
                            "measurement_time": "2015-01-01T01:02:35.000Z"
                        },
                        "water": {
                            "value": 10000.3 ,
                            "measurement_reset_time": "2015-01-01T01:01:01.000Z" ,
                            "measurement_time": "2015-01-01T01:02:35.000Z"
                        }
                    }
                }
            }
        }
    }
}
``` |

As illustrated, a device identifier (device_id:String) may be associated with the thermostat 10A and/or detector 10B. The device_id element holds the unique identifier of the particular device. Further, each device may include the following elements: a country and language preference (locale: String), a software version (software_version: String), an associated structure (structure_id:String), a name (name:String) (e.g., short name for use in user interface labels), a long name (name_long:String) (e.g., for a more descriptive name), a last connection timestamp (last_connection:String), and a device connection status (is_online: Boolean).

The thermostat may add additional elements. Some of the elements may allow for the use of varied temperature scales (e.g., Fahrenheit and/or Celsius). The thermostat-specific elements may include: an indication that the HVAC system has a cooling ability (can_cool:Boolean), an indication that the HVAC system has a heating ability (can_heat:Boolean), a heat pump system emergency heating status indicator (is_using_emergency_heat:Boolean), an indication of an ability to control the fan separately from heating or cooling (has_fan:Boolean), an indication if the fan timer is engaged, which may be used with a fan timer timeout to turn on the fan for a user-specified preset duration (fan_timer_active: Boolean), a timestamp showing when the fan timer reaches 0 (fan_timer_timeout: String), an indicator to display an energy-saving temperature indication (has_leaf:Boolean), a temperature scale to use (e.g., Celcius or Fahrenheit (temperature_scale: String), a desired target Fahrenheit temperature (target_temperature_f:int), a desired target Celsius temperature (target_temperature_c:float), a maximum target temperature in Fahrenheit (target_temperature_high_f:int), a maximum target temperature in Celsius (target_temperature_high_c:float), a minimum target temperature in Fahrenheit (target_temperature_low_f:int), a minimum target temperature in Celsius (target_temperature_low_c:float), a maximum away temperature in Fahrenheit (away_temperature_high_f:int), a maximum away temperature in Celsius (away_temperature_high_c:float), a minimum away temperature in Fahrenheit (away_temperature_low_f:int), a minimum away temperature in Celsius (away_temperature_low_c:float), an HVAC mode indicating heating, cooling, and/or heating-cooling modes (hvac_mode:String), an ambient temperature measured at the thermostat 10A in whole degrees Fahrenheit (ambient_temperature_f:float), an ambient temperature measured at the thermostat 10A in half degrees Celsius (away_temperature_low_c:float).

The detectors 10B may include additional elements as well. These additional elements may include: an indication of battery life/health and/or an estimate of time to end of life of the detector 10B (battery_health:enum string), a carbon monoxide detection alarm state (co_alarm_state:enum string), a smoke detection alarm state (smoke_alarm_state: enum string), an indication of whether or not the manual smoke and carbon monoxide alarm test is active (is_manual_test_active:Boolean), a timestamp indicating the time of the last successful manual test (last_manual_test_time: string), and/or an indicator of a color representative of device status (e.g., gray for offline, green for OK, yellow for warning, and/or red for emergency) (ui_color_state:enum_ string). The indicator of the color representative of device status may be derived from: is_online, battery_health, co_alarm_state, and/or smoke_alarm_state.

The company ($company: string) may represent a variable provided when a client is created and provided the "product data read/write" scope. The company variable may identify the company (e.g., client) as an entity that can share product data with the API 90 and/or device service 84. As illustrated, the company variable may include an element for a product type variable ($product_type:string) that is provided when a client is created with the product data read/write" scope. The product type variable may define the type of product, device, or appliance manufactured by the company.

The product type variable may be an object or an array, depending on the storage location. The product type variable may include a product unique identifier. For each product unique identifier, there may be several additional elements. For example, each product unique identifier may include an element for: identification, location, software, and resource use (resource_use). The identification (identification) element may contain product identifiers. For example, the identification element may contain: a device identifier (device_id:string), which is a unique device identifier for the product; and a serial number (serial_number:string), which is a serial number of the product or device. The location element may include a unique identifier for the structure (structure_id:string). The software element may include the software version identifier for the product (version:string). The resource use element may include elements for electricity, gas, and/or water. The electricity, gas, and/or water elements may include resource use data values and measurement timestamps. For example, the environment and gas elements may include a number of joules (value:number) consumed in a time period, a timestamp that identifies the start of the measurement time period (measurement_reset_time:string), a timestamp that identifies the measurement time (the time when the resource use data was measured) (measurement_time:string). The water element may include a number of liters consumed in the time period, a timestamp that identifies the start of the measurement time period (measurement_reset_time:string), a timestamp that identifies the measurement time (the time when the resource use data was measured) (measurement_time:string). It should be noted that, the devices object may be scalable to include one or more company objects and each of the one or more company objects may be scalable to include one or more product (e.g., device) type objects.

Additionally, as mentioned above, structures may be represented as an object of the data model. Below is an example of a shared structure object and its associated data that may be read and/or written to.

| Structures Data Model Object |
|---|
| {<br>   "structures": {<br>      "VqFabWH21nwVyd4RWgJgNb292wa7hG_dUwo2i2SG7j3-BOLY0BA4sw":<br>   {<br>      "structure_id":<br>"VqFabWH21nwVyd4RWgJgNb292wa7hG_dUwo2i2SG7j3-BOLY0BA4sw" ,<br>        "thermostats": [ "peyiJNo0IldT2YllVtYaGQ", ... ] ,<br>        "smoke_co_alarms": [ "RTMTKxsQTCxzVcsySOHPxKoF4OyCifrs", ... ] ,<br>        "away": "home" ,<br>        "name": "Home" ,<br>        "country_code": "US" ,<br>        "postal_code": "94304" ,<br>        "peak_period_start_time": "2014-10-31T23:59:59.000Z" ,<br>        "peak_period_end_time": "2014-10-31T23:59:59.000Z" ,<br>        "time_zone": "America/Los_Angeles" ,<br>        "eta": {<br>           "trip_id": "myTripHome1024" ,<br>           "estimated_arrival_window_begin": "2014-10-31T22:42:59.000Z" ,<br>           "estimated_arrival_window_end": "2014-10-31T23:59:59.000Z"<br>        }<br>      }<br>   }<br>} |

The structures object may include: a unique identifier: (structure_id:string), one or more lists of devices associated with the structure (e.g., an array of thermostats 10A (thermostats:array) and/or an array of detectors 10B (smoke_co_alarms:array) that contain the unique identifiers of the thermostats 10A and/or detectors 10B, respectively). Further, the structure may include one or more indications of characteristics and/or statuses of the structure. For example, the structure object may include: an indication of the structure state (e.g., "away" state when no occupants are in the structure) (away:string), a name associated with the structure (name:string), a country code associated with the structure (country_code:string), a postal code associated with the structure (postal_code:string), a start time for an energy event (e.g. Rush Hour Rewards by Nest®) (peak_period_start_time:string), an end time for an energy event (e.g. Rush Hour Rewards by Nest®) (peak_period_end_time:string), a time zone associated with the structure (time-_zone:string), estimated time of arrival to the structure (eta object that includes: a unique identifier for the estimated time of arrival instance (trip_id:string), a beginning time for an estimated arrival window (estimated_arrival_window_begin: string), and/or an ending time for an estimated arrival window (estimated_arrival_window_end:string). In instances where there is a particular estimated time of arrival rather than a window of arrival time, the beginning and end times may be set equal to the particular estimated time of arrival.

In the API 90, the concept of "Home" or "Away" is a powerful aspect that may affect the behaviors of certain smart device (e.g. thermostat 10A, detector 10B, and/or device 10C) features. For example, many energy savings and/or convenience features may be implemented using the "Home" or "Away" concept. For example, when integrated with other devices in the structure via the API 90, clients 182 can further manage user comfort and safety. For example, clients can: turn off the lights when the home goes into Away, send a notification if the house is Away and the garage door is open, play music when the house switches to Home, etc.

The indication of structure state (e.g. "away" mode) may include an indication for "home" when someone is occupying the structure, "away" when a user has explicitly set the structure to away, and/or "auto-away" when it has algorithmically been determined that no one is in the structure.

Users have the ability to manually activate Home/Away via smart device controls, web applications, etc., while the API 90 offers an additional access point via the clients 182. The API 90 provides the ability to directly set Home and Away, as well as listen for changes to these states. Further, a variety of signals within the structure may be used to detect human presence in a Home, and can set a sub-state of Away, called Auto-Away. If the device service 84 and/or the smart devices detect no presence for an extended period of time, they may automatically set the home to Auto-Away. Upon detection of human presence, the state of the structure may return to the Home state.

As mentioned above, depending on their access rights, clients 182 can read and/or write to the sections of the data model. Accordingly, subscribing to changes to the data model enables clients 182 to react in real time to changes made to the system 180. Thus, using the API 90, clients 182 may access smart device services 84 to control and/or provide data to one or more smart devices. For example, when a structure and/or thermostat is set to "away" mode, this status may be provided through the API 90 to the clients 182, which may then turn off one or more devices (e.g., smart lighting systems, etc.).

In some embodiments, the device service 84 responds with a data object including data objects from the data model (e.g., a metadata data object, a devices data object, a structures data object) based on the request and scopes associated with the access token. Further, in some embodiments the clients 182 may perform a function in addition to displaying the returned data in a page, such as controlling a setting on the API client device based on the data, executing a control action on the API client device based on the data, and the like.

iv. Third-Party Device Data Provisioning and Access

As previously discussed, vendors that do not have direct access to the device services 84 may wish to provide data to the device services 84 for many reasons. For example, vendor data may be useful for reporting by the device services 84 and/or may be used in conditional triggers to control one or more smart devices (e.g., thermostat 10A, detector 10B, and/or device 10C) and/or structures 10D that are under the influence of the device service 84. Further, this data may be accessible by other vendors, who may base control of these or other smart devices based in part upon the provided vendor data.

Further, the device service 84 provider may desire to expand a sensor network within the structure 10D and/or improve device (e.g., 10A-10C) and/or structure 10D reporting and/or control algorithms. Thus, it may be beneficial to take in such data from third-parties (e.g., those who do not have direct access to the device services 84). Accordingly, the API 90 may include support for data provision from these third-parties.

Specifically, the APIs 90 may support the reception of data streams of "events" and/or "time variant data." In one embodiment, the event data may be provided as a named value with a name, timestamp and other data that may be extensible. Event data may be provided upon occurrence of a particular event. For example, event data representative of motion detection may occur when one or more third-party sensors detect motion in the structure 10D.

Time variant data provision may relate to providing an account of data over varying time periods. For example, this data may provide a historical account of particular data values of a third-party sensor. Further details and examples of time variant profiles are described in U.S. Ser. No. 62/061,593, filed Oct. 8, 2014, entitled "Fabric Network," which is incorporated by reference herein in its entirety for all purposes. In some embodiments this may be supplemented with the current data values. For example, re-using the motion detection example discussed above, the time variant data provision may provide a historical account of motion detected by the third party sensor (e.g., motion detected at 5:00, no motion detected at 6:00, etc.).

Figure 15:
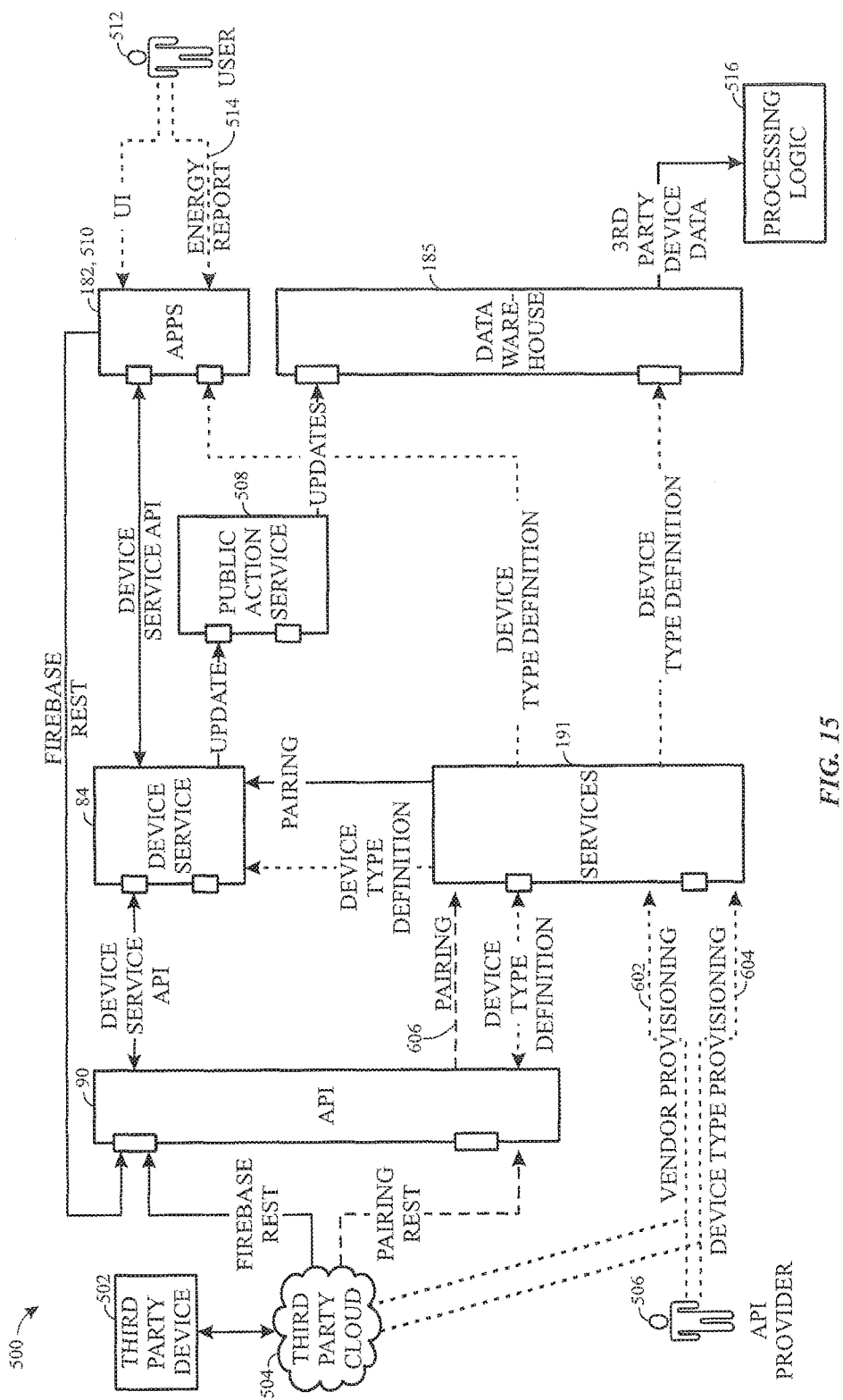
FIG. 15 is a schematic diagram, illustrating a system third-party vendor and device provisioning that enables consumption of third-party device data via the API, in accordance with an embodiment.
Figure 16:
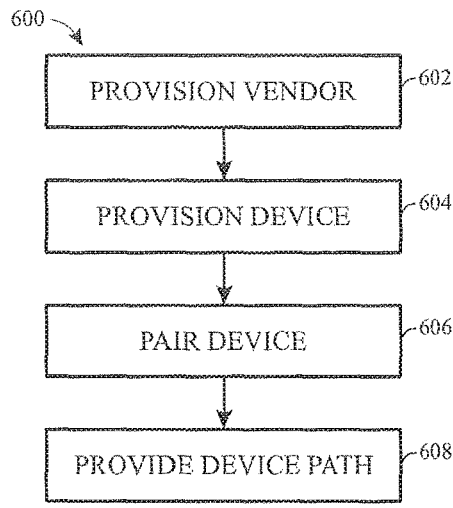
FIG. 16 is a flowchart, illustrating a process for provisioning third-party vendors and third-party devices, such that third-party device data may be consumed via the API, in accordance with an embodiment.
Figure 17:
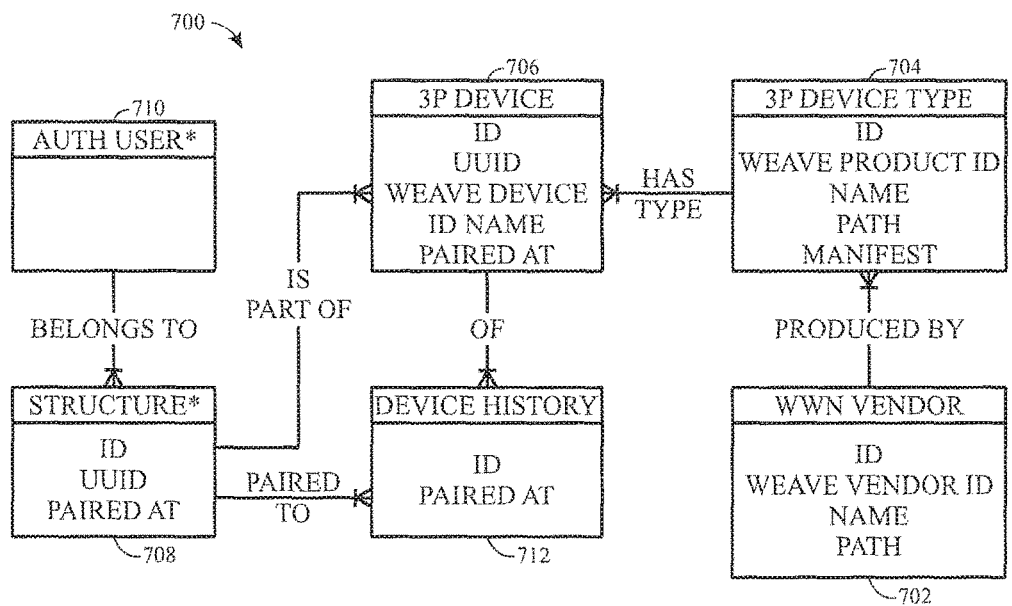
FIG. 17 is a relational diagram, illustrating a relationship of entities stored in the system when provisioning third-parties/third-party devices in the system, in accordance with an embodiment.

FIG. 15 is a schematic diagram, illustrating a third-party vendor and device provisioning system 500 that enables consumption of third-party device data via the API 90, in accordance with an embodiment. FIG. 16 is a flowchart, illustrating a process 600 for provisioning third-party vendors and third-party devices, such that third-party device data may be consumed via the API 90. FIG. 17 is a relational diagram, illustrating a relationship of entities stored in the system 500 when provisioning third-parties/third-party devices 502 in the system 500. For clarity, these FIGS. will be discussed together.

To consume data from a third-party and/or third-party device 502 (e.g., via data sent through a third-party cloud 504 to the API 90), the system 500 may be provided awareness information regarding the third-party (e.g., the "vendor") and/or the third-party devices. This information may be stored in the system 500, in a manner that enables the system 500 to identify and/or classify third-party data that is received. This awareness data (e.g., provisioning data) may be provided, for example, from the third-party and/or third-party device 904 and/or the API 90 provider 506. This provisioning data may be provided to the Services 191, which may include one or more provisioning modules (e.g., portions of machine-readable instructions, implemented on a processor) for provisioning a vendor (block 602) and/or for provisioning a device (block 604).

Vendor Provisioning

Vendors that wish to provide and/or retrieve data to and/or from the system 500 may be provisioned for such data provision and/or retrieval. By utilizing vendor provisioning, administrators of the system 500 may control particular vendors that may interact with the system 500. For example, a vendor may provide a request for interactivity rights with the system 500, which may be sent to the administrators of the system 500. Once the administrators verify that the vendor is legitimate and/or meets interactivity rights eligibility, the administrator may enable the vendor to provide vendor-specific information that may be used to facilitate interactivity with the system 500.

Vendor provisioning (block 602) may begin by submitting, via a provisioning process initiated by the third-party and/or third-party device 502 (e.g., via the third-party cloud 504) and/or by the API provider 506. In the provisioning process, the third-party and/or third-party device 502 and/or by the API provider 506 may provide (e.g., via a web service call) information to populate vendor-specific information (e.g., the vendor entity 702 of FIG. 17, which will be discussed in more detail below) to the services 191. The services 191 may maintain this vendor-specific information, which may be used to tie particular devices with the newly provisioned vendor. Thus, if a request for device provisioning (block 604, which will be described in more detail below) for "Device A" is provided by "Company B," portions of the vendor-specific device information for "Company B" may be tied to device type-specific information for "Device A." For example, as illustrated in FIG. 17, the Device Type Entity 704 has a "Produced By" relationship with the Vendor Entity 702.

Device Provisioning

To consume data from third-parties and/or third-party devices 502. The system 500 may be provided particular information regarding the devices 502. Specifically, a device manifest (e.g., the device manifest section illustrated in the Device Type Entity 704 of FIG. 17) is used to maintain compatibility information regarding the third-party devices 502. Information for the manifest may be provided via the third-party and/or third-party device 502, a third-party cloud 504, and/or the API provider 506 to the services 191. The services 191 may consume this information and create a device type definition for the device 502 being provisioned.

First, build-time profiles for expected third-party device types are defined. These build-time profiles provide a description of particular device capabilities and/or metadata regarding data provided by these devices. For example, profiles may provide data type information, data units, data constraints, etc. These profiles may closely resemble Weave profiles, which are described in more detail in U.S. patent application Ser. No. 13/926,335, filed Jun. 25, 2013, entitled "Efficient Communication for Devices of a Home Network", which is incorporated by reference in its entirety for all purposes. Weave is an application-layer protocol for communicating data. The profiles are defined as protobuf messages using field metadata annotations to describe manifest sections corresponding to a given profile and how the fragment of the data model JSON corresponding to a profile is validated.

Below is a code snippet example of the profile defining protobuf definitions, in accordance with an embodiment.

```
Device definition
// Device message is a union of all supported profiles.
// Device manifest is an instance of this type.
message Device {
    // Required profiles.
    optional IdentificationProfile identification = 1 [ (field_metadata) = {
        api_required: TRUE
        manifest_required: true
    }];
    optional LocationProfile location = 2 [ (field_metadata) = {
        api_required: TRUE
        manifest_required: true
    }];
    optional SoftwareProfile software = 3 [ (field_metadata) = {
        api_required: TRUE
        manifest_required: true
    }];
    // Optional profiles.
    optional ResourceUseProfile resource_use = 256 [ (field_metadata) = {
      api_required: MANIFEST
    }];
}
Primary profiles definition
message IdentificationProfile {
    // some metadata (not provided) may annotate fields generated by public API
    optional string device_id = 1 [ (field_metadata) = {
    }];
    optional uint64 node_identifier = 2 [ (field_metadata) = {
        weave_tag_kind: CORE
        weave_tag_number: 0x0001
        api_writable: TRUE
    }];
    optional string serial_number = 3 [ (field_metadata) = {
        weave_tag_kind: CORE
        weave_tag_number: 0x0007
        api_required: TRUE
    }];
    optional uint32 vendor_id = 4 [ (field_metadata) = {
        weave_tag_kind: CORE
        weave_tag_number: 0x0002
        manifest_required: true
    }];
    optional string vendor_description = 5 [ (field_metadata) = {
        weave_tag_kind: CORE
        weave_tag_number: 0x0003
        manifest_writable: true
    }];
    optional uint32 product_id = 6 [ (field_metadata) = {
        weave_tag_kind: CORE
        weave_tag_number: 0x0004
        manifest_required: true
    }];
    optional string product_description = 7 [ (field_metadata) = {
        weave_tag_kind: CORE
        weave_tag_number: 0x0005
        manifest_writable: true
    }];
    optional string revision = 8 [ (field_metadata) = {
        weave_tag_kind: CORE
        weave_tag_number: 0x0006
        manifest_writable: true
    }];
}
message LocationProfile {
    optional string structure_id = 1 [ (field_metadata) = {
        weave_tag_kind: CORE
        weave_tag_number: 0x000A
        api_required: TRUE
        validation: {
            orderly: {
                prefix: "string"
                suffix: "/[af09]{8}[af09]{4}[af09]{4}[af09]{4}[af09]{12}/"
            }
        }
    }];
}
message SoftwareProfile {
    optional string version = 1 [ (field_metadata) = {
        weave_tag_kind: CORE
        weave_tag_number: 0x000B
        api_required: TRUE
```

```
    }];
    optional int64 update_time = 2 [ (field_metadata) = {
        weave_tag_kind: CORE
        weave_tag_number: 0x000C
        api_writable: TRUE
    }];
    optional string description = 3 [ (field_metadata) = {
        weave_tag_kind: CORE
        weave_tag_number: 0x000D
        api_writable: TRUE
    }];
}
Resource use profile definition
message ResourceUseProfile {
    message ResourceUse {
        enum MeasureType {
            // removed for brevity
        }
        message Units {
            message Unit {
                enum BaseUnit {
                    // removed for brevity
                }
                optional BaseUnit base = 1 [ (field_metadata) = {
                    weave_type: UINT_1
                    weave_tag_number: 0x16
                }];
                // Exponent applied to the base unit.
                // For example hertz would have an exponent value of -1.
                optional int32 exponent = 2 [ (field_metadata) = {
                    weave_type: SINT_1
                    weave_tag_number: 0x17
                }];
            }
            repeated Unit units = 1 [ (field_metadata) = {
              weave_tag_number: 0x15
            }];
            // SI prefix indicated decadic multiple or fraction of the unit
            // For example millimeters would have an exponent value of 3.
            optional int32 prefix_exponent = 2 [ (field_metadata) = {
              weave_type: SINT_1
              weave_tag_number: 0x17
            }];
            optional string description = 3 [ (field_metadata) = {
              weave_tag_number: 0x09
            }];
        }
        // Measure type
        required MeasureType measure_type = 1 [ (field_metadata) = {
            weave_type: UINT_2
            weave_tag_number: 0x06
        }];
        // Measure units
        optional Units units = 2 [ (field_metadata) = {
            weave_tag_number: 0x13
        }];
        // Resource description
        optional string description = 3 [ (field_metadata) = {
            weave_tag_number: 0x09
        }];
        // Data source, this field is intentionally left as a free form
        optional string source = 4;
        // Measured value
        optional double value = 5 [ (field_metadata) = {
            weave_tag_number: 0x1E
            api_required: true
        }];
        // When was the last reset of the measured value, seconds since UNIX Epoch
        optional uint64 measurement_reset_time = 6 [ (field_metadata) = {
            weave_tag_number: 0x1F
            api_required: true
        }];
        // Measurement time, seconds since UNIX epoch
        optional uint64 measurement_time = 7 [ (field_metadata) = {
          api_required: true
        }];
    };
    optional ResourceUse electricity = 1 [ (field_metadata) = {
        api_required: MANIFEST
```

```
    }];
    optional ResourceUse gas = 2 [ (field_metadata) = {
        api_required: MANIFEST
    }];
    optional ResourceUse water = 3 [ (field_metadata) = {
        api_required: MANIFEST
    }];
}
Metadata
// Field metadata
message FieldMetadata {
    // Weave types
    enum WeaveType {
        // (portions removed for brevity)
    }
    // Weave tags
    enum WeaveTagKind {
        ANONYMOUS = 0 [ (weave_tag_metadata) = {
            tag_control: 0x0
        }];
        CONTEXT = 1 [ (weave_tag_metadata) = {
            tag_control: 0x1
        }];
        CORE = 2 [ (weave_tag_metadata) = {
            tag_control: 0x2
            tag_control: 0x3
        }];
        FULLY_QUALIFIED = 4 [ (weave_tag_metadata) = {
            tag_control: 0x6
            tag_control: 0x7
        }];
    }
    enum ApiSemantics {
        // Field is not writable
        FALSE = 1;
        // Field is writable if present in manifest
        MANIFEST = 2;
        // Field is writable
        TRUE = 3;
    }
    // Weave type; defaults to a type derived from proto field type
    // double => FLOAT_8
    // float => FLOAT_4
    // int32, sint32, sfixed32 => SINT_4
    // int64, sint64, sfixed64 => SINT_8
    // uint32, fixed32 => UINT_4
    // uint64, fixed64 => UNIT_8
    // bool => BOOLEAN
    // string => STRING
    // bytes => BYTES
    // Enum type => may be accompanied by weave_type and/or explicit validation
    // Message type => STRUCTURE
    optional WeaveType weave_type = 1;
    // Weave tag kind
    optional WeaveTagKind weave_tag_kind = 2 [ default = CONTEXT ];
    // Weave Profile Id, used to annotate top level device fields as profiles
    // and with fully qualified tags
    optional uint64 weave_profile_id = 3;
    // Weave tag number
    optional uint32 weave_tag_number = 4;
    // Validation applied to the field both at manifest creation time and
    // update validation time
    optional Validation validation = 5;
    // Allow updating field in the payload, api required fields are api writable
    optional ApiSemantics api_writable = 6;
    // Require updating field in the payload
    optional ApiSemantics api_required = 7;
    // Allow setting field in the manifest
    optional bool manifest_writable = 8 [ default = true ];
    // Require setting field in the manifest
    optional bool manifest_required = 9;
}
Validation
// Describes how a field is validated, the only supported validation
message Validation {
    // Describes Orderly validation statement
    // See http://orderlyjson.org/docs for Orderly details
    message OrderlyValidation {
        // Anything that goes before the field name in Orderly, aka definition
```

-continued

```
        // prefix; includes type and range
        optional string prefix = 1;
        // Anything that goes after the field name in Orderly, aka definition
        // suffix; includes enum values
        optional string suffix = 2;
    }
    optional OrderlyValidation orderly = 1;
}
```

Once the profiles are defined, these profiles may be imported and used in subsequent device type manifests, which may be used to describe and/or translate received third-party device 502 data. In embodiments where a profile is compatible with Weave (or other application-layer protocol), an indicator of this compatibility may be provided in the profile (e.g., by providing the compatible Weave (or other application-layer protocol) profile identifier in the profile). Upon release of the profiles, new device type manifests may be created using the released profiles. The device type manifests are runtime artifacts represented by a serialized protocol message and provide device type definitions for the particular third-party device 502 being provisioned.

Below is an example of a third-party device manifest. In particular, the example third-party device manifest is for an Acme brand washer with revision 201410161.0b that provides energy and water resource usage in the supplied units. The device manifest enables the system 500 to understand data that is provided to it via this type of third-party device 502.

```
        identification: <
            vendor_description: "Acme",
            product_description: "WSHR1138",
            revision: "201410161.0b",
        >,
        resource_use: <
            electricty: <
                measure_type: ENERGY
                units: <
                units: <
                    base: KILOGRAM
                >
                units: <
                    base: METER
                    exponent: 2
                >
                units: <
                    base: SECOND
                    exponent: 2
                >
            >
            description: "Energy consumption in joules"
            source: "power sensor"
        >
        water: <
            measure_type: VOLUME
            units: <
                units: <
                    base: METER
                    exponent: 3
                >
                exponent: 3
            >
            description: "Water consumption in liters"
            source: "Flowmeter"
        >
        >
```

These device type definitions may be provided to the device service 84, the applications 182 and/or 510, and/or the data warehouse 185, where they may be used to interpret and/or translate data received from the third-party devices 502, as will be discussed in more detail below.

Device Pairing

Once the device type is defined, a device 502 of that type may be paired (block 606). Pairing of third-party devices 502 is essentially registering the device 502 with the system 500, which may aid in the system 500's understanding of data provided by the device 502.

The pairing process includes two basic steps. In one step, the pairing process collects information about the device 502, such as a location (e.g., structure) of the device, a serial number (or other unique identifier) of the device 502, etc. This information may be provided by a user attempting to pair the device 502 (e.g., via a graphical user interface prompt requesting the device-specific information). For example, a pairing request (e.g., a REST message) may be provided to the API 90 from the third-party and/or third-party device 502 and/or the third-party cloud 504. This pairing request may include the device-specific information. The API 90 may transform payload data provided in the pairing request into a format interpretable by the services 191 and may provide the transformed data to the services 191. For example, the API 90 may receive the request in an ISO 8601 format and translate data from the request into an alternative format expected by the services 191.

In a second step, the pairing process determines the device type of the device 502 and ties the device type to the device-specific payload data of the third-party device 502. To do this, the services 191 may retrieve an associated provisioned device type and form a relationship between the device-specific payload data and the associated device type. For example, as illustrated in FIG. 17, during the pairing process, the Device Type entity 704 may be tied to the Device entity 706 (e.g., a "Has Type" relationship). Further, the Device entity 706 may be tied to a particular structure (e.g., an "Is Part Of" relationship). Additionally, historical device pairing information may be stored (e.g., by the Device History entity 712).

Upon registration with the system 500, paired devices are then provided for subsequent distribution by the publication service 508 (e.g., via an update message), which may lead to publication to the data warehouse 185 (e.g., via a second update message).

Providing Device Data

Once the vendor is provisioned (block 602), the device is provisioned (block 604), and the device is paired (block 606), the system 500 is able to receive and interpret third-party and/or third party device 502 data. The third-party and/or third party device 502 and/or the third-party cloud 504 may provide data via a data provision message (e.g., a Firebase and/or REST message) to the API 90.

Upon receiving third-party data, the API 90 may translate the payload into a format interpretable by the device service 84. Upon receiving the translated payload, the device service 84 may retrieve the device type definition for the particular device 502. For example, when the device service 84 starts, it may load all available device type definitions from the services 191. If the device 502 is of a known device type (e.g., has an associated device type definition loaded in the device service 84), the associated device type definition may be used to subsequently translate and/or describe incoming data from the device 502 and/or cloud 504. Occasionally, the device 502 may be of an unknown device type (e.g., has no associated device type definition loaded in the device service 84). For example, a device type may be provisioned after the device service loads all available device type definitions. When the device type is unknown (e.g., has no associated device type definition loaded in the device service 84), the device service 84 may provide a request to the services 191 for a new device type definition associated with the device 502. Upon receiving this new device type definition from the services 191, the new device type definition may be used to translate and/or describe incoming data from the device 502 and/or cloud 504. This device type definition acquisition may occur during pairing of the third-party device 502 and/or as data is received from the third-party device 502 and/or cloud 504

For example, the associated device type definition may be used to describe incoming data from the third-party device 502 and/or third-party cloud 504. The device service 84 may propagate third-party payload data to the applications 182 and/or 510 and/or the publication service 508 (e.g., via a data update message), which may result in the payload data being stored in the data warehouse 185 (e.g., via a second update message). The device type definitions may be provided not only to the device service 84, but also the applications 182 and/or 510, and/or the data warehouse 185, which may enable the payload to be interpreted by each of these entities. For example, accumulated third-party payload data that is stored in the data warehouse 185 may be interpreted using the device type definition, such that an energy report 514 may be provided to the user 512. Further, any other processing logic 516 may use the device type definition to understand the third-party payload data.

Below is an example of a sample third-party device data that conforms to the device manifest example that is provided above. Specifically, the third-party device data represents washer data that provides energy and water usage. As illustrated below, the payload provides time-variant data related to a particular instance (or instances of use) for the washer with serial number 123456789.

```
{
    "identification": {
        "serial_number": "123456789"
    },
    "resource_use": {
        "energy": {
            "value": 50.2,
            "measurement_reset_time": 946684800,
            "measurement_time": 1414794859
        },
        "water": {
            "value": 123.7,
            "measurement_reset_time": 946684800,
            "measurement_time": 1414794859
```

-continued

```
        }
    }
}
```

Data Entities

Moving now to a more-detailed discussion of data entities useful for third-party data submission, FIG. 17 is a relationship diagram 700, illustrating the relationship between third-party vendor and/or device entities stored in the system 500 to enable third-party data consumption and/or provision. Specifically, the vendor entity 702 represents a third-party entity that sends third-party device data. In some embodiments, access scopes may be based upon a vendor identity. For example, a vendor scope may correspond to an ability to read and write data under a vendor path in the data model. Multiple clients 184 may be associated with one vendor (e.g. third-party 502). The clients 184 may be associated with a vendor entity 702. Accordingly, exchanging an access token granted to a client 184 associated to a vender entity 702 (e.g., either directly or via a developer) may return permissions corresponding to that vendor entity 702. The vendor entity 702 may include a vendor path attribute, which may be unique across all vendor entities 702.

The 3P (third-party) Device type entity 704 represents a class of devices belonging to a single vendor that have the same information payload. Device types are immutable. Accordingly, once the device type metadata is obtained, it can be cached indefinitely. Device types can be versioned. For example, differing data pathways may be provided for device types with different version. Thus, in one embodiment, versioning may be handled, for example, by appending a version to common prefix, for example washer_v1 may relate to a first version of a dishwasher device type and washer_v2 may relate to a second version the dishwasher device type.

Using the vendor entity 702 and the 3P device type entity 704, third party devices may be provisioned (block 604). The 3P device type entity 704 includes a vendor identity attribute that identifies the vendor that the 3P device type entity 704 belongs to.

The 3P device type entity 704 includes a path attribute that may be used to access devices of a particular device type. The path attribute may be unique across all device types for a particular vendor entity 702. Accordingly, device types may be retrieved using a combination of the vendor 702 path with the 3P device type 704 path.

Further, the device type entity 704 contains a serialized device manifest field that describes device metadata and payload for the particular device type represented by the 3P device type entity 704.

The 3P (third-party) device entities 706 are created upon a first pairing of the device 502 (block 606) with the API 90 and/or device service 84. The device entity 706 represents an identifiable entity (e.g., a device) that produces data conforming to a given device type. For example, the device entity 706 might represent a particular dishwasher that conforms to the washer_v2 device type.

As discussed above, devices are associated with particular structure entities 708. The device entity 706 is paired with the structure entities 708, which is associated with a user entity 710. Further, a device history entity 712 (e.g., a data table) stores a history of pairings between the device entity 706 and the structure entity 708.

Pairing of the third-party device 502 may be triggered by providing a POST request to the API 90 at the path /devices/<vendor_path>/<device_type_path> with a post body containing the third-party device payload. Below is an example of such a post body.

| POST request Body for Device Pairing |
|---|
| {<br>"identification": {<br>"serial_number": "abcdefgh",<br>...<br>},<br>"location": {<br>"structure_id":<br>"VqFabWH21nwVyd4RWgJgNb292wa7hG_dUwo2i2SG7j3BOLY0BA4sw",<br>...<br>},<br>... // other profiles<br>} |

As illustrated, the payload provided in the post body may include device-identifying information, such as a serial number (e.g., identification/serial_number) and/or a structure identifier (e.g., location/structure_id) of the structure associated with the device.

The device-identifying information may be used to uniquely identify a device of a particular type for a particular vendor, while the structure identifier may indicate which structure the device should be paired to. In some embodiments, these fields may be required in order to successfully pair with the API 90 and/or device service 84.

In the device services 84, each of the paired third-party devices 502 may be stored in a "Third-Party Device" portion of the data model (e.g., a specially designated portion of the data model for third-party devices 502). These devices 502 may be provisioned at runtime, thus enabling introduction of new third-party device pairings without requiring new service stack releases.

When pairing completes successfully, the services 191 may provide a newly-assigned internal identifier for this third-party device 502. The device service 84 may then insert this internal identifier into the original payload (e.g., the POST request body) and return the result. Below is an example of the payload with added internal identifier.

embodiments, the path point <device_id> may refer to the obfuscated device identifier. Based upon this DELETE request, the API 90 may request the services 191 to delete the identified device 502. When the services 191 complete the unpairing successfully, the services 191 return a success indication to the API 90, which returns a similar indication.

The discussion now turns to a more detailed look at how the system 500 consumes and/or presents third-party data. As mentioned above, access permissions to read and/or write to the data model may be defined using a path leading to devices and/or structures. To enable definition of permissions for specific vendors, the path may include an intermediate reference to the particular vendor. For example, the devices attribute may include a sub-attribute named "vendor" or "vendor_path" followed by the third-party vendor devices. Accordingly, the path to the third-party vendor devices may include a vendor field, allowing particular permissions to be provided for a particular third-party vendor.

The API 90 may receive a request to read and/or write data to the data model of the device service 84 and may then request authentication rights (e.g., from the services 191). Upon verifying the authentication rights, the API 90 may provide the vendor, device type, and/or device identifier path

| Returned Payload after Pairing |
|---|
| {<br>"identification": {<br>"device_id": "peyiJNo0IldT2YlIVtYaGQ",<br>"serial_number": "abcdefgh",<br>...<br>},<br>"location": {<br>"structure_id":<br>"VqFabWH21nwVyd4RWgJgNb292wa7hG_dUwo2i2SG7j3BOLY0BA4sw",<br>...<br>},<br>... // other profiles<br>} |

Accordingly, the system 500 may now use and/or store device information from the third-party devices 502. Thus, device data may then be provided to the device services (block 608) from these devices 502. Further, upon proper validation of a third-party and/or third-party device 502, a third-party application 182 and/or an application 510 of the API provider 506 may be used to provide this data to a user 512.

When devices 502 are no longer in use (or data is no longer provided to the system 500), they may be unpaired from the system 500. To do this, a DELETE request to the API 90 at the path /devices/<vendor>/<device_type>/<device_id>. In some embodiments, the internal device identifier is obfuscated during the pairing process. In such elements to construct a corresponding device service 84 read and/or write request that it provides to the device service 84.

The device service 84 may validate the received request. Upon validation, the request may be processed, resulting in the read and/or write to the data model.

v. Third-Party Insight Data Provision and Access

In some embodiments, a third-party vendor may desire to provide additional data to the system 500. For example, the vendor may wish to provide a stream of data relating to particular logs and/or metrics. To do this, the third-party may provide a stream descriptor, which describes the particular data that will be provided to the system 500. Then, the vendor may provide data in a format corresponding to the stream descriptor, noting the association with the stream descriptor.

Discussing first the stream descriptors, the stream descriptors provide a description of any stream data that a third-party wishes to post. Below is an example of stream descriptor for amp and watt measurements that may be provided via a subsequent data stream.

---
Metric Stream Descriptor
---

```
{
"metric_stream_descriptor": {
    "version": 1 // version number
    "description": "energy measurements", // a human readable description of the stream
    "fields": [ // a list of fields in a stream
        {
            "description": "current", // a human readable description of the field
            "relative": true, // whether measurements are absolute or relative to the preceding sample
            "exponent": 1, // scaling (in base 10) for the measurement
            "logical_minimum": 0, // expected minimum for any sample. Need details on diff between this and physical
            "logical_maximum": 100, // expected maximum for any sample.
            "physical_minimum": 0,
            "physical_maximum": 1000,
            "units": { // an object describing the units for samples in this field
                "system": "si", // this or english
                "description": "Amps", // human readable description
                "unit_composition": [
                    {"quantity": "current", "exponent": 1
                    }
                ]
            }
        },
        {
        "description": "Watts",
        "relative": true,
        "exponent": 1,
        "logical_minum": 0,
        "logical_maximum": 100,
        "physical_minimum": 0,
        "physical_maximum": 1000,
        "units": {
            "system": "si",
            "description": "watts",
            "unit_composition": [ // a more complicated example representing kg *
            m 2/s 3
                {"quantity": "mass",
                "exponent": 1
                },
                {"quantity": "length",
                "exponent": 2
                },
                {"quantity": "time",
                "exponent": -3
                }
            ]
        }
        }
    ]
}
}
```

Additionally, state information regarding a device may be described and provided by a third-party vendor. Below is a state-based stream descriptor.

---

```
{
    "state_stream_descriptor": {
        "version": 1 // currently this should always be 1
        "description": "smoke detector states", // a human readable description of the stream
        "fields": [ // a list of fields in a stream
            {
                "description": "smoke", // a human readable description of the field
                "states": [
                    {
                    "name": "all clear",
                    "description": "state when acceptable levels of smoke are detected"
                    "value": 0
                    },
                    {
                    "name": "heads up 1",
                    "description": "first gentle alert on smoke"
                    "value": 1
                    },
                    {
                    "name": "heads up 2",
                    "description": "more urgent alert"
                    "value": 2
                    },
                    {
                    "name": "heads up 3",
                    "description": ""
                    "value": 2
                    }
                ]
            },
            {
                "description": "co", // a human readable description of the field
                "states": [
                {
                "name": "all clear",
                "description": "state when acceptable levels of coare detected"
                "value": 0
                },
                {
                "name": "heads up 1",
                "description": "first gentle alert on co"
                "value": 1
                },
                {
                "name": "heads up 2",
                "description": "more urgent alert"
                "value": 2
                },
                {
                "name": "heads up 3",
                "description": ""
                "value": 2
                }
                ]
            }
        ]
    }
}
```

In creating the descriptors, the vendor may determine and indicate whether the descriptor is for public or private use. Public descriptors can be used by other developers, while private descriptors may only be used by the creating vendor. Accordingly, when the API 90 provider desires, it can create public descriptors for third-party vendors to use, especially when the API 90 provider has particular information it would like to collect from third-parties (e.g., energy usage, motion events, carbon-monoxide states, etc.).

Upon completion of the creation of the stream descriptors, the developers may provide the descriptor to the API 90, which may return a descriptor identifier. To post data, the third-party vendor may provide the data-stream in accordance with the format provided in the descriptor, along with the descriptor identity provided from the API 90. Below is an example of data posted via a described data stream.

```
{
    "stream": {
        "descriptor": {
```

```
            "developer": 1240985,
            "id": 1240958
        }
        "source": {
            "manufacturer": "Nest",
            "type": "D2A",
            "id": 1240958098,
            "qualifier": "the thermostat"
        }
        "data": [
            [12098650986098, 5.60986, 1.23498],
            [12098650986099, 5.60986, 1.23498],
            [12098650986100, 5.60986, 1.23498],
            [12098650986101, 5.60986, 1.23498],
            [12098650986102, 5.60986, 1.23498],
            [12098650986103, 5.60986, 1.23498],
            [12098650986104, 5.60986, 1.23498],
            [12098650986105, 5.60986, 1.23498]
        ]
    }
}
``` vi. Third-Party Activity Monitoring

As more third-parties utilize the API 90 to communicate with and/or control the system 180, it may become increasingly beneficial to monitor third-party activities.

Tracking API 90 activities may be desirable to determine a particular responsible party for data reads and/or writes of the device service 84 data model. The API 90 activity log may transparently capture both read and/or write operations that propagate from the API 90 on behalf of the clients 182 and/or the client 182 vendors.

Multiple levels of granularity may be used to track these data reads and/or writes. For example, activity logging logic (e.g., machine instructions implemented on a processor-based computer system) may track modifications and/or access to the data model at the devices level, the structure level, and/or an overall shared data level.

Below is an example of a JSON structure for an activity log. In some embodiments, the activity log data is provided based upon a particular account (e.g., at an account and/or user level).

Activity Log JSON Example

```
Top Level
{
    "sessions" : [<SessionDetails>]
}
SessionDetails:
{
    "client_id": <number>,
    "session_id": <string>,
    "events": [<EventSpecification>]
}
EventSpecification:
{
    "action": "put"/"subscribe",
    "action_targets": [<ActionTarget>],
    "timestamp": <number: timestamp in ms, when modification took place>,
}
ActionTarget
{
    "bucket_name": <full bucket name>,
    "type": "merge/overwrite" (put only),
    "value": <json values that were put>, (put only)
    "oldvalue": <full object response json, pre-put> (put, overwrite only)
    "structure_name": <name field out of containing structure bucket>,
    "structure_id": <structure identifier>,
    "where_id": string (device/shared only, both put/subscribe),
```

Activity Log JSON Example

```
    "where_name": <name from where bucket matching where_id>
(device/shared only,   both put/subscribe),
    "label": <string from shared bucket> (device/shared only, both put/subscribe)
}
```

In certain embodiments, the "sessions" element at the top level is an array maintained in sorted order by timestamp. When data from the activity log is to be read, the number of returned events may be reduced, by returning only events that have occurred within a certain time period (e.g., the last 5, 7, 10, 15 days, etc.). In some embodiments, this time period may be configured using a parameter (e.g., in the read call, etc.).

The "events" are an array of events (e.g., "put" and/or data "subscribe" events) that may be a combination of actions (e.g. "action_targets") and the time in which the actions happened. As illustrated in the example above, much event metadata may be captured. For example, "bucket_name" may represent a particular location where the event occurred. "Type" may refer to a particular event type (e.g., merge and/or overwrite for "put" activities). "Value" may refer to a new value that has been written via a "put" activity and "oldvalue" may refer to the data that existed prior to the "put". Structure information corresponding to the activity may also be stored (e.g., the structure name and/or identifier. Further, "where" information that describes a more granular location within the structure may be provided (e.g., a "where" identifiers and/or name).

The "SessionDetails" may include a client 182 identifier, a session identifier, and the events performed during the session. Accordingly, the activity logging logic may be used to obtain a particular client (e.g. "client_id") responsible for performing a particular action (e.g., a put and/or subscribe event).

In one embodiment, activity logs may be used by the API 90 vendor to determine when API 90 activities have caused changes to smart devices (e.g., thermostats 10A, detectors 10B, and/or other smart devices 10C). For example, when unexpected target temperature changes occur at a thermostat 10A, the activity logs may be used to discern if a third-party is responsible for the change.

Further, in some embodiments, one or more third-party vendors may be provided access to the activity logs. The activity logs may help the third-party vendors to understand how their client applications are effecting the environment 30. In some embodiments, the third-party vendors may access activity log entries for actions and/or events caused by all vendors. In alternative embodiments, the third-party vendors may have access to only the actions and/or events caused by that particular third-party vendor.

Client and Device Interactions

Having now discussed the details of the how communications between client devices (e.g., clients 182) and smart devices and/or smart environments 10 may be facilitated, the discussion now turns to particular interactions between the client 182 devices and the smart devices and/or smart environments 10 that enhance the smart environment experience. The following discussion is broken up into various broad categories of usage. However, it may be important to note that while a particular device or technology is discussed with regard to one category, such technology may be applicable in other of the categories. For example, a discussion of sensor interaction may be discussed in a sensor section of the following discussion. However, sensors may be wearable, and thus, may apply to the wearable section below, as well. The discussion categorization below is not intended to limit a particular technology to a particular categorization. Instead, the categorization is provided to simplify the discussion.

Mobility

The interaction discussion begins with mobility based interactions. Clients 182 (e.g., client electronic devices, such as a cellular phone, global positioning system, etc.) may interact with the smart devices and/or smart environments 10, based upon mobility of client 182 and/or a user associated with the client 182. The following embodiments relate to such interactions.

ETA-Based Control of Smart Device

Figure 18:
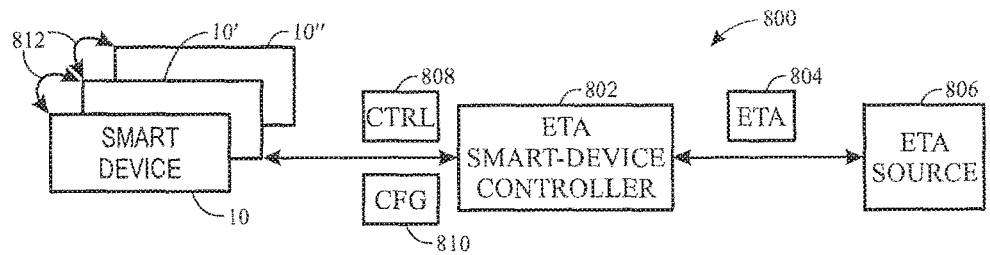
FIG. 18 is a schematic drawing illustrating a system for providing control of the smart electronic device of FIG. 1 using an ETA, in accordance with an embodiment.

FIG. 18 illustrates a system 800 for providing control of the smart electronic device of FIG. 1 using an ETA, in accordance with an embodiment. In the illustrated system 800, one or more smart devices and/or smart environments 10 may be controlled by an ETA smart device controller 802. The controller 802 may be a processor-based system that receives an ETA 804 from an ETA source 806.

The ETA 804 may, in some embodiments, be an estimated time of arrival to the smart home environment. For example, an automobile may include a navigation system that acts as the ETA source 806 to provide a time-based ETA (e.g. 4:02 PM) to the controller 802. Other ETA sources 806 that may provide similar ETAs 802 may include a navigation app on a smart device, a portable global positioning system (GPS), etc.

Alternatively, in some embodiments, the ETA may be associated with estimated time of arrival of an event. For example, as will be discussed in more detail below, the ETA source 806 may include an alarm clock, activity monitor, etc. that is able to determine a household occupant's wake time. Accordingly, the ETA 804 may be an ETA for the user's wake time.

Indeed, the ETA 804 may represent any estimate of arrival time for any event. For example, the ETA 804 may represent an estimated sleep time, an estimated away time, etc. The ETAs 804 may be based upon data from one or more devices that may be used to derive the ETA 804.

Based upon the received ETA 804, the controller 802 may provide ETA-based control of one or more smart devices and/or smart environments 10. For example, as will be discussed in more detail below, a thermostat may be controlled to heat and/or cool an environment prior to an ETA of returning back to the environment. In some embodiments, the controller 802 may provide a control operation 808 to one or more of the devices and/or smart environments 10. The control operation 808 may be a device-readable instruction that may be interpreted by the smart devices and/or smart environments 10. Alternatively, the controller 802 may provide a configuration setting change 810 to the smart devices and/or smart environments 10.

In some embodiments, the controller 802 may provide the control operation 808 and/or configuration setting 810 to one or more smart devices and/or smart environments 10 to affect control of a secondary smart device and/or smart environments 10' and/or 10". For example, the smart device and/or smart environments 10 may forward the control operation 808 and/or configuration setting change 810 to device 10, which may forward the control operation 808 and/or change 810 to the devices and/or smart environments 10' and/or 10" (e.g., via communication channel 812).

Figure 19:
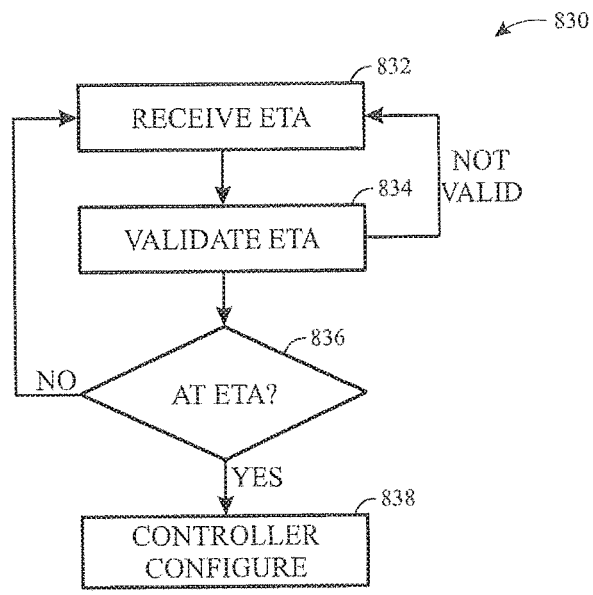
FIG. 19 is a flowchart of a method for providing control of the smart electronic device of FIG. 1 using an ETA, in accordance with an embodiment.

Turning now to a more detailed discussion of the ETA-based control, FIG. 19 illustrates a flowchart of a method 830 for providing control of the smart electronic device of FIG. 1 using an ETA, in accordance with an embodiment.

First, an ETA is received (block 832). The ETA may be a time (e.g., 4:32 PM and/or 16:32), a duration (e.g. 30 minutes from now), or other indicator.

The received indicator may be validated (block 834). For example, as will be discussed in more detail below, one or more criteria for acknowledging a received ETA may be created. The criteria may help ensure that purposeful and accurate ETA-based control occurs. For example, in one embodiment, the criteria may require multiple consistent ETAs to be received prior to using an ETA to control a device. If the criteria are not met (e.g., the ETA is not valid) the ETA is ignored and the process 830 begins again.

When the ETA is valid, a determination is made as to whether the current time matches the ETA (e.g., it is 4:32 PM and the ETA is 4:32 PM and/or the ETA is 0 minutes) (decision block 836). If the ETA is not met, the process 830 begins again. However, when the ETA matches the current time, control of the smart device is executed (block 838).

Figure 20:
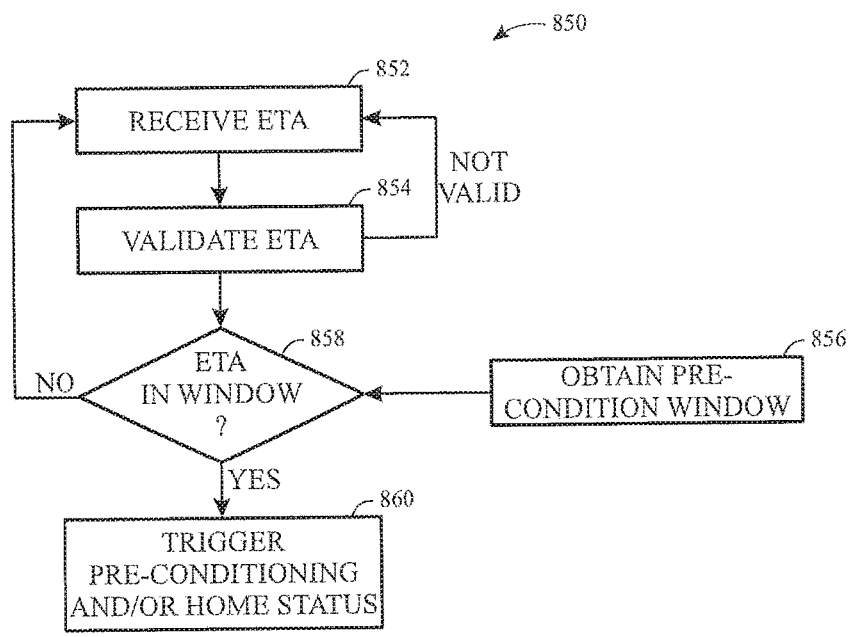
FIG. 20 is a flowchart of a method for providing control of the smart electronic device of FIG. 1 using an ETA, in accordance with an embodiment.

It may be beneficial to create a pre-conditioning window for triggering ETA-based control. FIG. 20 illustrates a flowchart of a method 850 for providing control of the smart electronic device of FIG. 1 using a pre-conditioning window, in accordance with an embodiment.

First, an ETA is received (block 852). The ETA may be a time (e.g., 4:32 PM and/or 16:32), a duration (e.g. 30 minutes from now), or other indicator.

The received indicator may be validated (block 854). For example, as will be discussed in more detail below, one or more criteria for acknowledging a received ETA may be created. The criteria may help ensure that purposeful and accurate ETA-based control occurs. For example, in one embodiment, the criteria may require multiple consistent ETAs to be received prior to using an ETA to control a device. If the criteria are not met (e.g., the ETA is not valid) the ETA is ignored and the process 830 begins again.

A pre-conditioning window may be obtained (block 856). For example, the pre-conditioning window may be obtained as a static instruction stored in a tangible, non-transitory, computer-readable medium. Alternatively, the pre-conditioning window may be derived based upon a desired pre-conditioning time for a device. For example, for an embodiment of controlling a thermostat, the pre-conditioning window may be based upon an estimated pre-conditioning time (e.g., a time to reach a programmed set point).

When the ETA is valid, a determination is made as to whether the ETA is in the pre-conditioning window (e.g., it is 4:32 PM and the ETA is 4:32 PM and/or the ETA is 0 minutes) (decision block 858). If the ETA is not met, the process 850 begins again. However, when the ETA is in the pre-conditioning window, pre-conditioning of the smart device is triggered (block 860).

Figure 21:
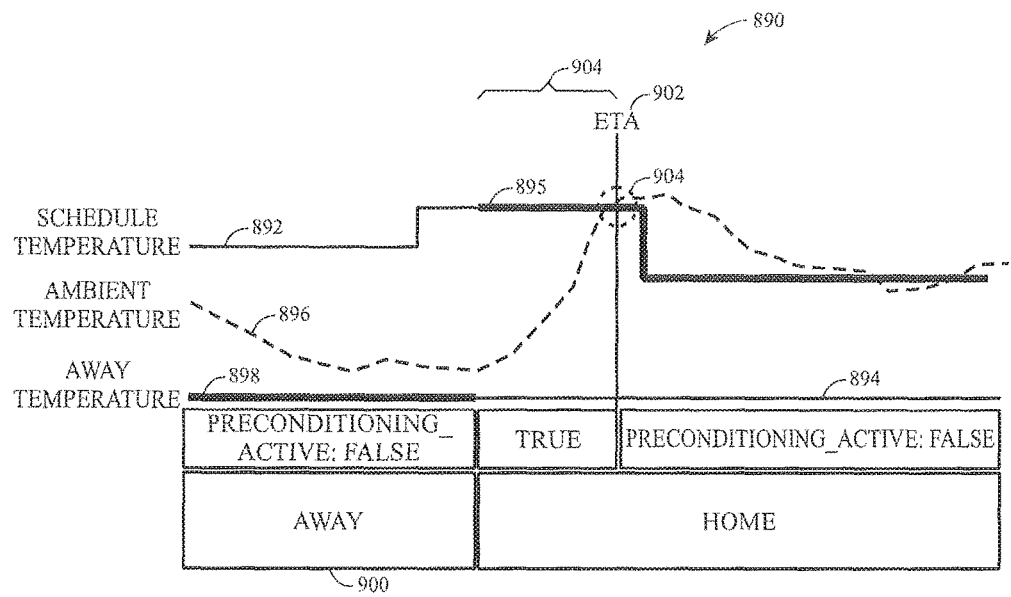
FIG. 21 is a temperature profile of a thermostat using the ETA control system, wherein preconditioning is active on the thermostat, in accordance with an embodiment.

FIG. 21 is a temperature profile 890 of a thermostat using the ETA control system, where preconditioning is active on the thermostat, in accordance with an embodiment. Line 892 represents a scheduled/programmed temperature for the thermostat (e.g., a programmed temperature when occupants are present). Line 894 represents the away temperature (e.g., the programmed temperature when occupants are not present).

As illustrated, when the thermostat is in away mode 900 (e.g., when occupants are not present within an environment), the thermostat's programmed temperature 898 is set to the away temperature 894. Accordingly, the ambient temperature 886 approaches the programmed away temperature 894.

When the ETA 902 is received (and is optionally validated), an ETA 902 set point is generated. A pre-conditioning window 902 may be created based upon the ETA 902. For example, to reach the programmed temperature 892, the HVAC may need to begin cooling and/or heating at the beginning of the pre-conditioning widow 902. Accordingly, when the pre-conditioning window 902 is reached, pre-conditioning begins (e.g., the thermostat begins climate control at the programmed temperature 892. Thus, the 886 temperature progresses towards the programmed temperature 892. If the pre-conditioning time is estimated properly, the ambient temperature 886 should reach or come relatively close to the programmed temperature 892 at the ETA 902, as illustrated by region 904. Accordingly, when an occupant arrives (e.g., at home and/or a particular event), set-points may be accurately met. Thus, an HVAC system may cool an environment to a programmed level by arrival home and/or when waking.

Figure 22:
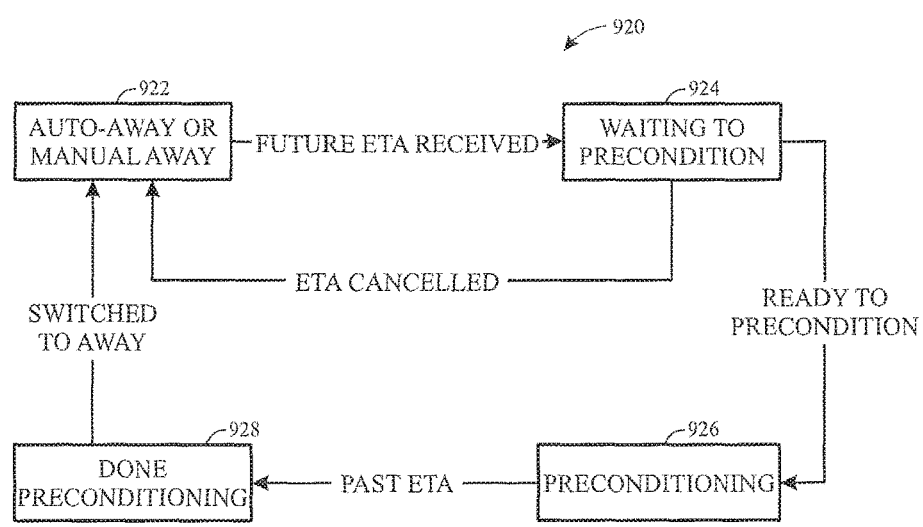
FIG. 22 is a state diagram of a thermostat using the ETA control system, wherein preconditioning is active on the thermostat, in accordance with an embodiment.

FIG. 22 is a state diagram 920 of a thermostat using the ETA control system, where pre-conditioning is active on the thermostat, in accordance with an embodiment. When the thermostat is in an away mode (block 922), the thermostat stays in away mode until an ETA is received. When an ETA is received, the thermostat waits for the pre-conditioning window (e.g., the time needed to condition the environment to an ETA set point). If the pre-conditioning window is not reached, the thermostat stays in away mode (block 922). However, when the pre-conditioning window is reached, preconditioning commences (block 926). Thus, when the ETA passes, the pre-conditioning finishes (block 928). If, at any point, the ETA is cancelled and/or deleted, the thermostat may return to away mode (block 922). Further, if, after the pre-conditioning is finished, occupancy is not detected or occupancy is not detected for a certain duration after pre-conditioning ends, the thermostat may return to away mode (block 922).

Figure 23:
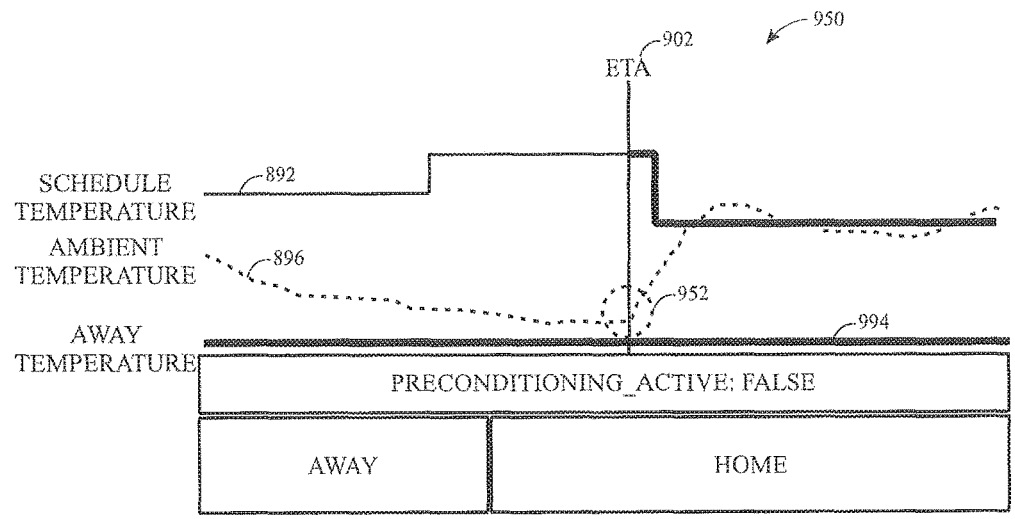
FIG. 23 is a temperature profile of a thermostat using the ETA control system, wherein preconditioning is disabled on the thermostat, in accordance with an embodiment.

FIG. 23 is a temperature profile 950 of a thermostat using the ETA control system, where preconditioning is disabled on the thermostat, in accordance with an embodiment. Line 892 represents a scheduled/programmed temperature for the thermostat (e.g., a programmed temperature when occupants are present). Line 894 represents the away temperature (e.g., the programmed temperature when occupants are not present). Line 896 represents the ambient air temperature (e.g., the HVAC controlled air temperature).

As illustrated, when the thermostat is in away mode 900 (e.g., when occupants are not present within an environment), the thermostat's programmed temperature 898 is set to the away temperature 894. Accordingly, the ambient temperature 886 approaches the programmed away temperature 894.

When the ETA 902 is received (and is optionally validated), an ETA 902 set point is generated. In contrast to the embodiment of FIG. 21, which included a pre-conditioning window, the current embodiment does not pre-condition. Instead, upon reaching the ETA 902, the HVAC transitions to active conditioning. Thus, an HVAC system may cool an environment at or near an ETA (e.g., arrival home and/or when waking).

Figure 24:
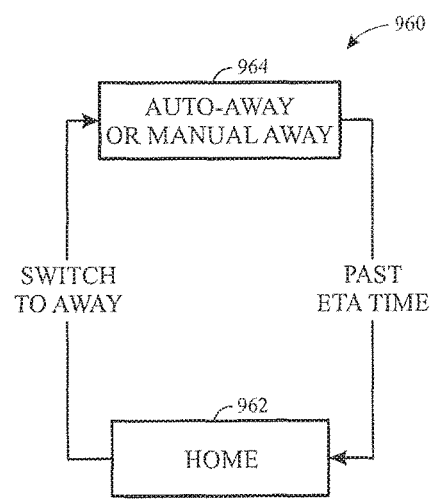
FIG. 24 is a state diagram of a thermostat using the ETA control system, wherein preconditioning is disabled on the thermostat, in accordance with an embodiment.

FIG. 24 is a state diagram 960 of a thermostat using the ETA control system, wherein preconditioning is disabled on the thermostat, in accordance with an embodiment. When the thermostat is in a home mode (e.g., when an occupant is at the conditioned environment) (block 962), the thermostat conditions at a scheduled temperature (e.g. line 892 of FIG. 23). When the thermostat transitions to away mode (block 964) (e.g., auto-away when occupants are no longer detected or manual away triggered by an operator of the HVAC system), the thermostat stays in away mode until an ETA is received. When an ETA is received, the ETA logic may be implemented. Because the current ETA scheme is related to enabling HVAC environment conditioning, the current ETA scheme may be implemented when the thermostat is in an away mode (or any other mode where thermostat environment conditioning is not active). In the current embodiment, when a thermostat is in an inactive conditioning state and an ETA passes, the thermostat transitions back to an active conditioning state (e.g., a home state (block 962)).

Figure 25:
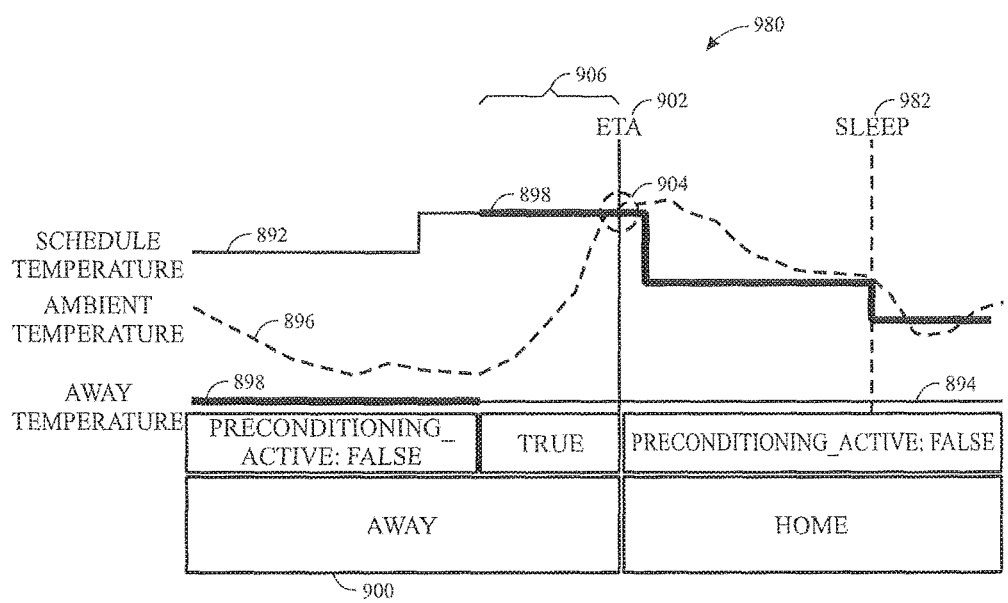
FIG. 25 is a temperature profile of a thermostat using the ETA control system, wherein preconditioning is enabled during an away mode, in accordance with an embodiment.

In some embodiments, it may be beneficial to retain an "away" or "home" state, while modifying activities typically associated with those states. For example, FIG. 25 is a temperature profile of a thermostat using the ETA control system, wherein preconditioning is enabled during an away mode, in accordance with an embodiment.

Line 892 represents a scheduled/programmed temperature for the thermostat (e.g., a programmed temperature when occupants are present). Line 894 represents the away temperature (e.g., the programmed temperature when occupants are not present).

When the ETA 902 is received (and is optionally validated), an ETA 902 set point is generated. A pre-conditioning window 902 may be created based upon the ETA 902. For example, to reach the programmed temperature 892, the HVAC may need to begin cooling and/or heating at the beginning of the pre-conditioning widow 902. Accordingly, when the pre-conditioning window 902 is reached, pre-conditioning begins (e.g., the thermostat begins climate control at the programmed temperature 892. Thus, the ambient temperature 896 progresses towards the programmed temperature 892. If the pre-conditioning time is estimated properly, the ambient temperature 886 should reach or come relatively close to the programmed temperature 892 at the ETA 902, as illustrated by region 904.

As illustrated, when the thermostat is in away mode 900 (e.g., when occupants are not present within an environment) and the pre-conditioning window 906 has not been reached, the thermostat's programmed temperature 898 is set to the away temperature 894. Accordingly, the ambient temperature 886 approaches the programmed away temperature 894.

When the pre-conditioning window 906 is reached, the programmed temperature 898 is set to a pre-conditioning temperature, thus causing the ambient temperature 896 to progress towards the scheduled temperature 892.

Accordingly, when an ETA 902 is reached (e.g., at home and/or a particular event), the scheduled temperature 892 set-points may be accurately met. Further, the "away" mode 900 may still accurately represent that the HVAC system is away (e.g., either auto-away or manual away), even when pre-conditioning is enabled. Thus, an HVAC system may condition an environment to a programmed level by arrival home and/or when waking.

Additionally, the ETA logic may be used to adjust set point times for particular events/activities associated with set points. For example, in the illustrated embodiment, a sleep set point 982 triggers a temperature adjustment of the scheduled temperature 892. The sleep set point 982 may be adjusted to provide a more comfortable and/or more energy efficient sleep environment. The sleep set point 982 time may be adjusted based on a number of attributes. For example, the sleep set point 982 time may be adjusted based upon an indication that sleep will occur at a particular time. In one embodiment, the sleep set point 982 time may be set based upon a period of time after bedroom lights are turned off after a particular threshold time period (e.g., sleep set point 982 time=Lights out time+15 minutes, when the lights out is at or after 10:00 PM).

Any number of set points and associated times may be added to the HVAC system. For example, ETA set points for multiple occupants may be set (allowing for adjusted temperatures for each occupant). Further, wake set points may be set. Wake set point times may be calculated based upon data received from an alarm clock, an alarm clock app, an activity monitor, etc.

In some embodiments, an "arriving" mode may be implemented within the thermostat. The arriving mode may be a transitional mode between "home" and "away" that is implemented upon receiving an indication that someone will be arriving at the controlled environment. For example, when an ETA is provided to the thermostat, the thermostat may take this as an indication that a user is on their way to the environment, regardless of when that user will actually arrive at the environment.

The "arriving" mode may be useful in scenarios where it may be desirable for multiple thermostats to perform in the same manner, based upon an ETA. For example, in a two-story house, one thermostat may have a longer pre-conditioning period than another thermostat. Accordingly, using the pre-conditioning schemes discussed above, the thermostats may begin conditioning the environment at separate times. Alternatively, by placing the thermostats in "arriving" mode, the thermostats may both begin conditioning based upon receiving an indication that someone will arrive, instead of a pre-conditioning estimate for each individual thermostat. Accordingly, the thermostats may both use the same trigger point (e.g., 5 minutes after receiving an indication that someone will eventually arrive at the environment) to begin conditioning the environment. Thus, the thermostats will have common execution, at least with regards to execution tasks associated with the "arriving" mode.

Figure 26:
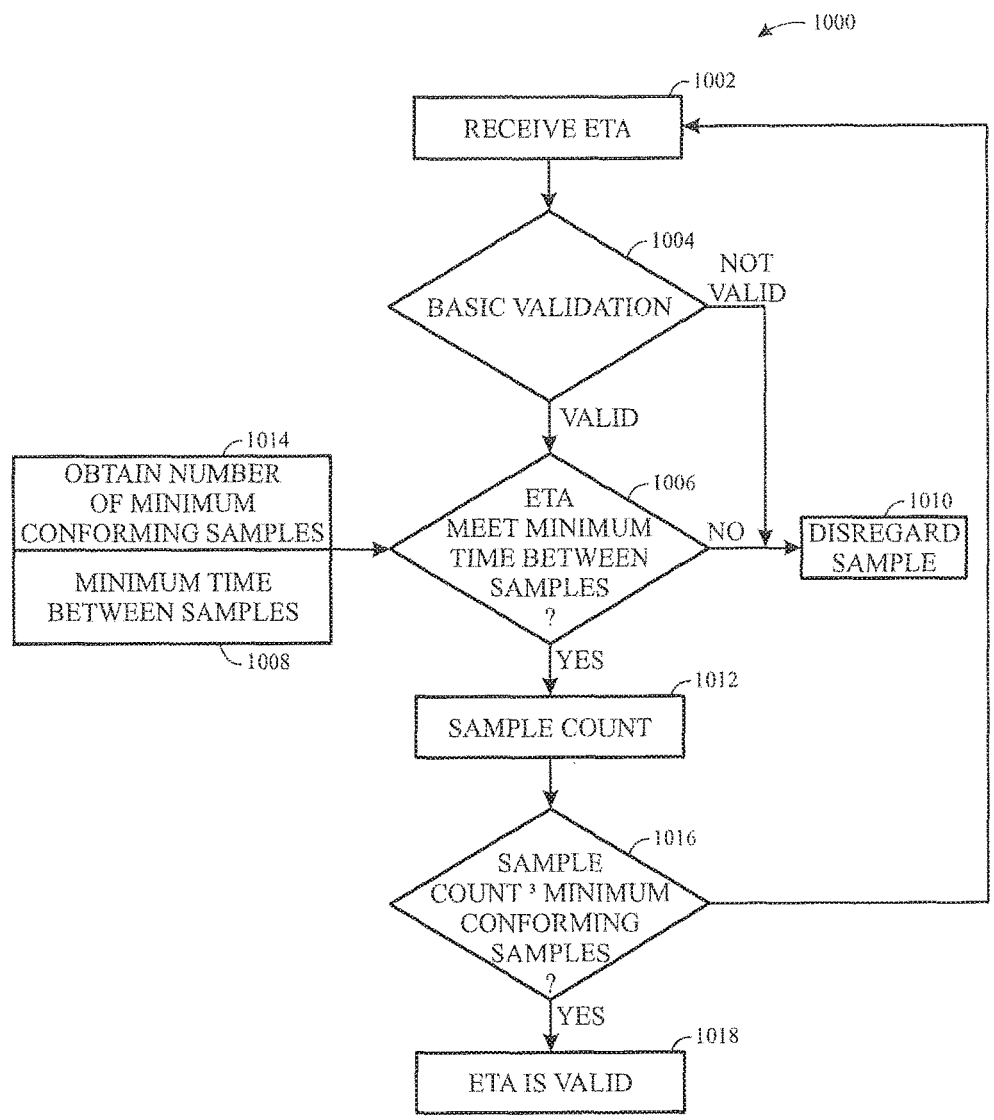
FIG. 26 is a flowchart illustrating a method for validating an ETA, in accordance with an embodiment.

FIG. 26 is a flowchart illustrating a process 1000 for validating an ETA, in accordance with an embodiment. First, an ETA is received (block 1002). The ETA may be associated with a trip or event indicator, which may be used to associate received ETAs with other received ETAs of the trip or event.

Next, a determination is made as to whether the ETA meets a basic validity check (decision block 1004). For example, the basic validity check may include a determining whether the ETA is in future, whether the ETA meets formatting guidelines, whether the ETA is within a maximum ETA interval, etc.

If the ETA is valid according to the basic validation, a determination is made as to whether the ETA meets the minimum time between ETA samples (decision block 1006). For example, it may be beneficial to only use ETAs that are received at least a certain time interval between one another. The minimum time between samples may be obtained (block 1008) either from an external or internal data source.

The interval between the samples may be obtained by comparing other ETAs associated with the trip/event id and determining the difference in time between the ETAs (e.g., based upon stored timestamp data associated with the ETAs). If the received ETA fails the basic validation (decision block 1004) and/or does not meet the minimum time between ETA samples (decision block 1006), the ETA sample is disregarded (block 1010) and reception of new ETAs (block 1002) commences.

To limit unintended control, a minimum number of conforming ETA estimates may be mandated prior to enabling set point control. This allows control to occur after the system is more confident that the ETA should be used. As with obtaining the minimum time between samples, the minimum number of conforming samples may be obtained from either internal and/or external data sources.

If the ETA meets the time interval between the ETA samples (decision block 1006), a sample count is incremented (block 1012). If the incremented sample count is not greater than or equal to a minimum number of conforming samples (decision block 1016), the ETA is noted, but is not used for control of the system. The system continues receiving ETAs (block 1002) until the sample count is greater than or equal to the number of minimum conforming samples. Once the sample count is greater than or equal to the minimum number of conforming samples, the ETA is noted as valid and is used as a basis of control for the system (block 1018).

Figure 27:
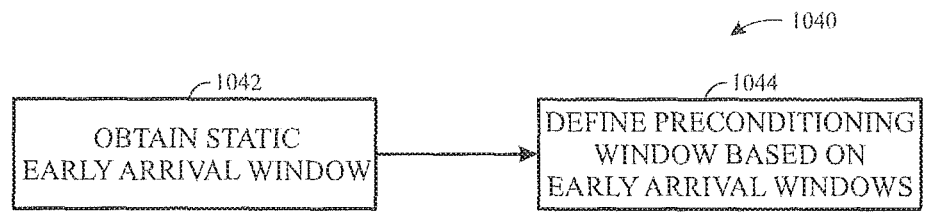
FIG. 27 is a flowchart illustrating a method for defining a pre-conditioning window statically, in accordance with an embodiment.

FIG. 27 is a flowchart illustrating a process 1040 for defining a pre-conditioning window statically, in accordance with an embodiment. The process 1040 begins by obtaining a static early arrival window (block 1042). In one embodiment, the state early arrival window may be stored as a machine-readable instruction in a tangible, non-transitory, machine-readable medium of the ETA service. Additionally and/or alternatively, the static early arrival window may be provided from an external data source.

The pre-conditioning window (or other control set point time) may then be defined based upon the static early arrival window (block 1044). For example, when the static early arrival window is 20 minutes, the pre-conditioning window is set to 20 minutes prior to the ETA.

Figure 28:
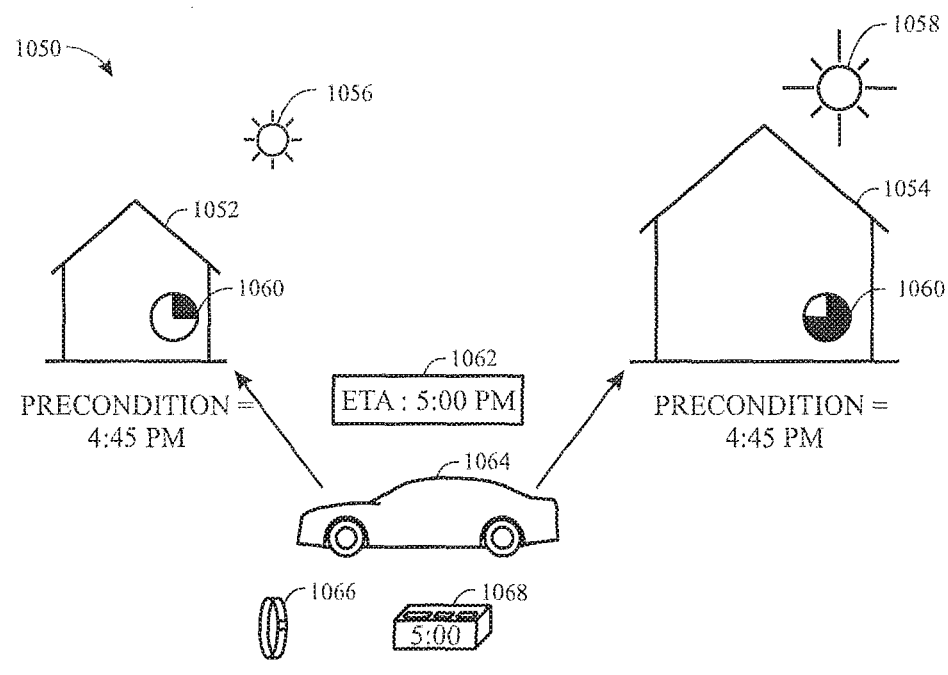
FIG. 28 is a schematic drawing of a system using a static pre-conditioning window, in accordance with an embodiment.

FIG. 28 is a schematic drawing of a system 1050 using a static pre-conditioning window, in accordance with an embodiment. The illustration of FIG. 28 provides two houses, a small house 1052 and a large house 1054. Further, the small house 1052 is illustrated with milder weather conditions 1056 than the extreme weather conditions 1058 of the large house 1054. Both the small house 1052 and the large house 1054 use the static 15 minute early arrival window 1060. Accordingly, despite the varied conditions of the small and large houses 1052 and 1054, the pre-conditioning initiation time for these homes will be the same. For example, if an application from a device (e.g., vehicle 1064, activity monitor bracelet 106, and/or alarm clock 1068) provides an ETA 1062 of 5:00 to both houses 1052 and 1054, pre-conditioning will begin at 4:45 (5:00-15 minutes) at both houses 1052 and 1054.

Figure 29:
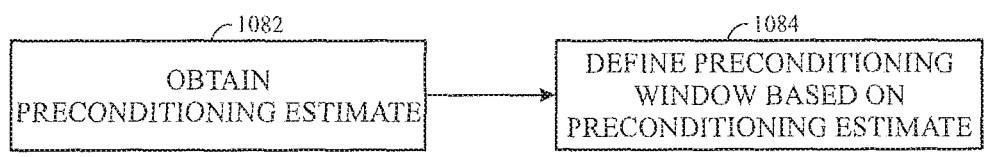
FIG. 29 is a flowchart illustrating a method for defining a pre-conditioning window dynamically, in accordance with an embodiment.

FIG. 29 is a flowchart illustrating a process 1080 for defining a pre-conditioning window dynamically, in accordance with an embodiment. The process 1080 begins by obtaining a pre-conditioning estimate (block 1082). As described in U.S. Pat. No. 8,606,374, filed Sep. 14, 2010, U.S. Pat. No. 8,452,457, filed Sep. 30, 2012, U.S. Pat. No. 8,630,742, filed Sep. 30, 2012, U.S. application Ser. No. 13/866,602, filed Apr. 19, 2013, and U.S. patent application Ser. No. 14/256,741, filed Apr. 18, 2014, all of which are incorporated herein by reference herein in their entirety for all purposes, a number of factors may be used to determine an environment's pre-conditioning estimate. For example, the build quality, size, ceiling height, location, etc. of a conditioned environment may be used to determine a pre-conditioning estimate. Further, ambient weather conditions, etc. may also be used.

Once the pre-conditioning estimate is determined, the pre-conditioning window is defined based on the pre-conditioning estimate (block 1084). Accordingly, an environment's particular characteristics may be used to control pre-conditioning times (or pre-conditioning times for any other event and/or activity set points).

Figure 30:
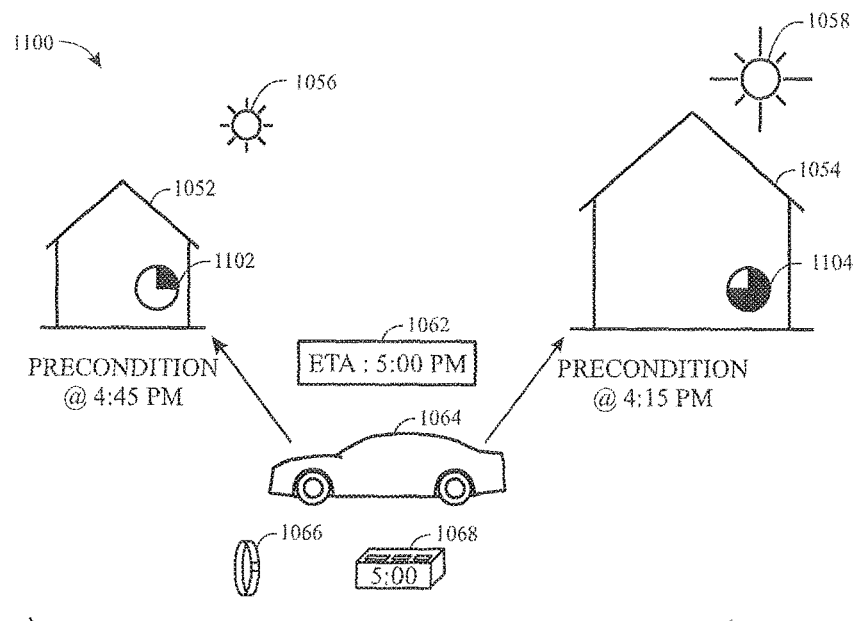
FIG. 30 is a schematic drawing of a system using a dynamic pre-conditioning window, in accordance with an embodiment.

FIG. 30 is a schematic drawing of a system 1100 using a dynamic pre-conditioning window, in accordance with an embodiment. Similar to FIG. 28, the illustration of FIG. 30 provides two houses, a small house 1052 and a large house 1054. Further, the small house 1052 is illustrated with milder weather conditions 1056 than the extreme weather conditions 1058 of the large house 1054.

In contrast to the illustration of FIG. 28, in FIG. 30, the small house 1052 and the large house 1054 use the personalized pre-conditioning estimates as a basis for determining each house's pre-conditioning window. As mentioned herein, the varied conditions of the small and large houses 1052 and 1054 may result in varied pre-conditioning times. For example, because the large house 1054 has more space to condition, the pre-conditioning may take longer. Further, the large house has extreme weather conditions 1058 in comparison to the mild conditions 1056 of the small house 1052. This may also add to the pre-conditioning time of the large house 1054. Indeed, as illustrated, the pre-conditioning window 1102 for the small house is 15 minutes, whereas the pre-conditioning window 1104 for the large house 1054 is 45 minutes. Accordingly, if an application from a device (e.g., vehicle 1064, activity monitor bracelet 106, and/or alarm clock 1068) provides an ETA 1062 of 5:00 to both houses 1052 and 1054, pre-conditioning will begin at 4:45 (5:00-15 minutes) at the small house 1052 and at 4:15 (5:00-45 minutes) for the large house 1054.

Figure 31:
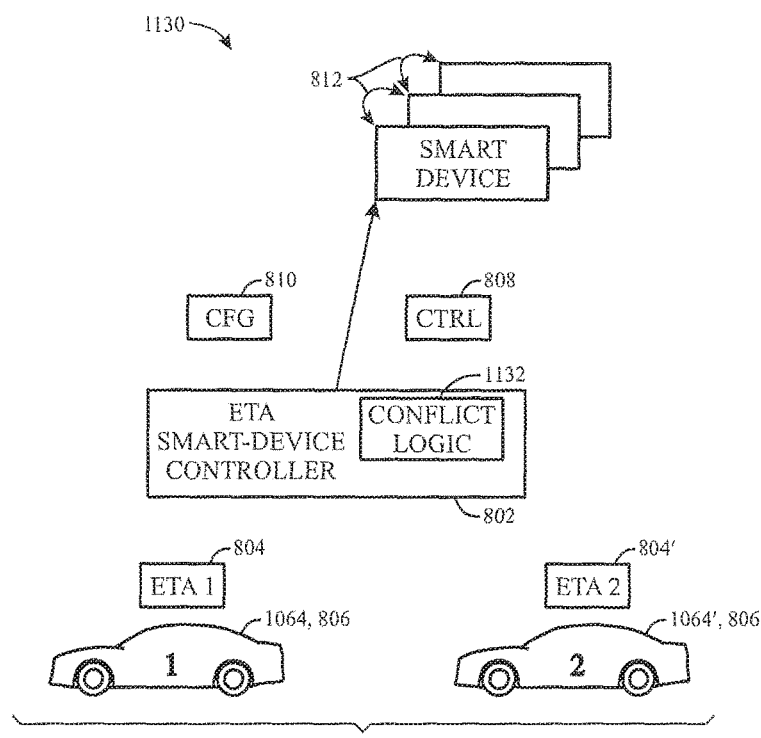
FIG. 31 is a schematic drawing of a system for providing control of the smart electronic device of FIG. 1 using ETA conflict logic, in accordance with an embodiment.

In some instances, there may be multiple sources of ETAs 404. Accordingly, control and/or configuration of devices based upon ETAs may use conflict resolution logic to determine which of a plurality of ETAs 804 should trigger control and/or configuration changes. FIG. 31 is a schematic drawing of a system 1130 for providing control of the smart electronic devices and/or smart environments 10 of FIG. 1 using ETA conflict logic 1132, in accordance with an embodiment. In the illustrated system 1100, one or more smart devices and/or smart environments 10 may be controlled by an ETA smart device controller 802. The controller 802 may be a processor-based system that receives ETAs 804 and 804' from a plurality of ETA sources 806 (e.g., in-vehicle applications 1064 and 1064').

Based upon the received ETAs 804 and 804', the controller 802, when used in conjunction with conflict logic 1132, may provide appropriate multi-ETA-based control and/or configuration changes to one or more smart devices and/or smart environments 10.

The conflict logic 1132 may provide control and/or configuration changes based upon both ETAs 804 and 804' when control and/or configuration changes do not conflict based upon multiple ETAs. For example, in a system where control of a smart television is to be turned on at the arrival of the in-vehicle application 1064 and where control of an HVAC is to be pre-conditioned based upon the arrival of the in-vehicle application 1064', both ETA-based controls may be implemented, because they are not mutually-exclusive control events.

However, when mutually-exclusive events occur, the conflict resolution logic 1132 may prioritize a particular ETA 804 or 804' to trigger control. For example, in a system where pre-conditioning is triggered by either ETA 804 or 804', the conflict resolution logic 1132 may enable pre-conditioning to occur by prioritizing one ETA over the other. The logic 1132 may prioritize a particular ETA based on any number of factors. For example, an operator of the system 1130 may provide an indication to prioritize one ETA over another. Additionally or alternatively, the logic 1132 may prioritize an ETA that is closer in time than the other ETAs. Thus, in the pre-conditioning example, pre-conditioning will begin based upon the earliest arrival time, providing a pre-conditioned environment for all occupants arriving at the environment.

While prioritization of a particular ETA may occur for mutually-exclusive control and/or configuration change events, the alternative ETAs may continue to be tracked. By tracking the alternative ETAs, the conflict logic 1132 may adjust prioritization of the ETAs when changes occur. For example, when the conflict logic 1132 prioritizes ETAs based upon the closest ETA in time, ETA 804 may obtain priority. However, if the ETA 804 changes, making it further in time than ETA 804', the logic 1132 may dynamically change priority to ETA 804'.

In some embodiments, it may be beneficial to obtain a confidence level prior to adjusting ETA prioritization. Accordingly, the logic 1132, in some embodiments, may retain a current priority until the prioritization change would result in a particular time interval difference for a control and/or configuration change. For example, prioritization of ETA 804' over ETA 804 may be implemented when a control or configuration change would be impacted by a certain time interval (e.g., 10 minutes or more).

Additionally or alternatively, the prioritization may be changed after an ETA changed is confirmed by a particular number of sent ETAs. For example, the prioritization may remain fixed until ETA 804 is sent a certain number of times (e.g., 3 times) and each of the sent ETAs indicates that the ETA has indeed changed.

Further, the controller 802 may predict deviations from a particular provided ETA 804 or 804' which may be used in the control and/or configuration changes as well as the prioritization by the logic 1132. For example, in some embodiments, the controller 802 may notice that ETA 804' is consistently later than an actual arrival time. This can be discerned by comparing the actual arrival time (e.g., as determined based upon occupancy sensors at the environment) with the ETA. When the controller 802 notices a pattern of deviation from an actual arrival time, the controller 802 may derive a modified ETA based upon the observed deviation. Accordingly, in an example where ETA 804 is based upon an assumption of traveling at a posted speed limit, a modified ETA may be derived using particular observations of actual arrival time, which may impacted by any number of factors (e.g., whether the driver is a slow driver, a fast driver, etc.).

Figure 32:
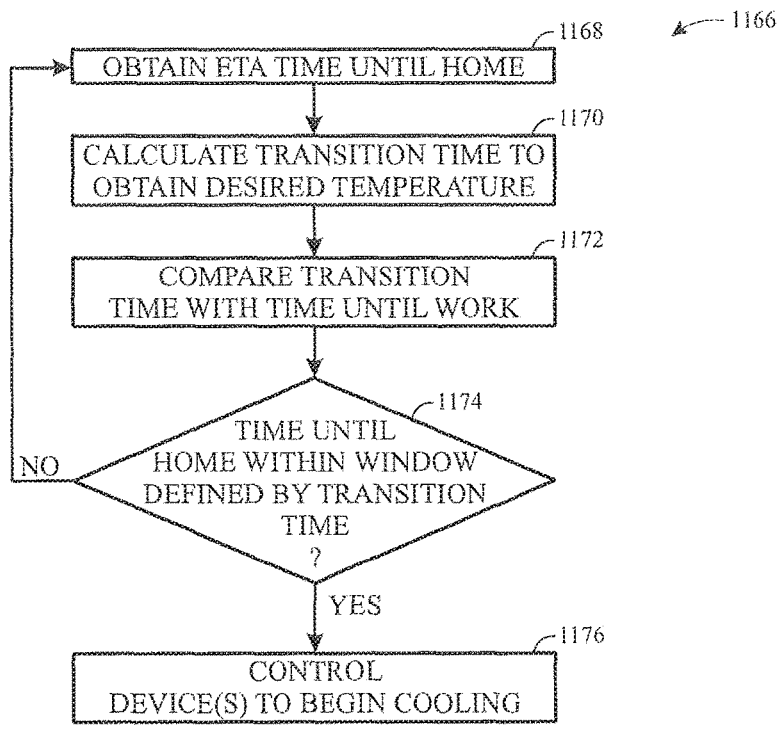
FIG. 32 is a flow diagram illustrating a method for transitioning temperatures based upon an estimated time of arrival, in accordance with an embodiment.
Figure 33:
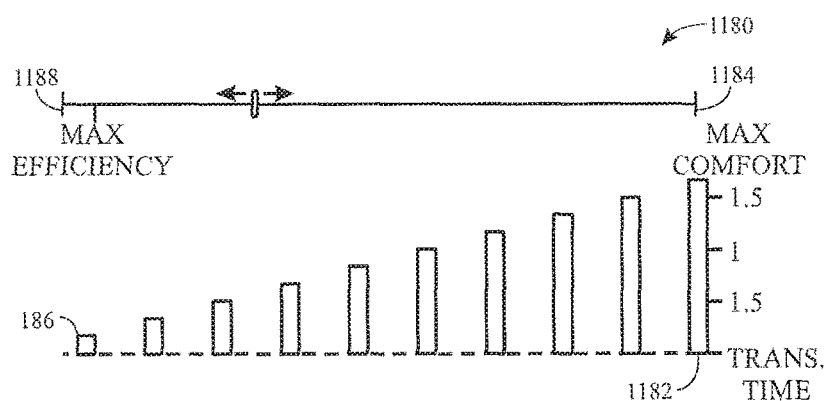
FIG. 33 is block diagram illustrating window creation for the method of FIG. 6, in accordance with an embodiment.

In some embodiments, tradeoffs between energy efficiency and comfort may help to define a preconditioning window. FIGS. 32 and 33 illustrate such an embodiment.

In the embodiment of FIG. 32, a comparison of the ETA information and an expected temperature transition time (e.g., an amount of time to adjust an environment's temperature from a current temperature to a desired temperature) is used to automatically begin temperature adjustment, such that the home is at a desired temperature at the ETA of a client 182 (e.g., a vehicle). Accordingly, the transition state of the temperature adjustment may be completed prior to the client 182 operator entering the environment controlled by the device 10A. The process 1166 begins by obtaining an estimated time of arrival ("ETA") (block 168). In one embodiment, block 1168 may be triggered by setting a map application destination (e.g. an in-car navigation system and/or Google Map Application) to "home." As mentioned above, the ETA may be provided by an application communicating directly and/or indirectly with the smart device(s). Further, a transition time to obtain a desired temperature from a current ambient temperature is calculated (block 1170). The transition time is compared with the ETA (block 1172). Next, a determination is made as to whether or not the transition time is greater than or equal to the ETA (decision block 1174). In some embodiments, a time window may be defined based upon the transition time. For example, additional time (e.g., 0.5 hours, 1.5 hours, etc.) may be added to a transition time to ensure a desired temperature is reached prior to the vehicle's ETA. This will be described in more detail with regards to FIG. 7.

If the transition time is less than the ETA, the process continues to poll for new ETA's from the application (or counts down until the transition time is greater than or equal to the ETA). When the transition time is equal to or greater than the ETA, the smart device (e.g., the thermostat 10A) may be controlled to begin the temperature adjustment (e.g., cooling) (block 1176). Thus, by the time the vehicle arrives at the climate-controlled destination, the transition to the desired temperature may be complete.

FIG. 33 illustrates a window creation operation for the ETA-based temperature adjustment. As illustrated in FIG. 33, there may be tradeoffs associated with beginning temperature adjustment prior to arrival. For example, some users may prefer a guarantee that the desired temperature is reached prior to arrival. To do this, a relatively large window may be created that starts the temperature adjustment early. Alternatively, other users may wish to factor in energy savings, which may be achieved by using a relatively small window. Thus, to provide flexibility, a graphical user interface 180 (e.g., a slider) may enable a user to select between these competing tradeoffs. As illustrated, a relatively large window 1182 (here, Transition Time+a 1.5 hour buffer) is created to help ensure maximum comfort 1184 (e.g., ensure that the desired temperature is reached prior to arrival). In contrast, a relatively small window 1186 (here, Transition Time+0.1 hours) to help ensure maximum efficiency 1188 (e.g., ensure that less energy is used).

As may be appreciated, ETA-based control and/or configuration of smart devices allows pre-conditioning of an environment for arrival at the environment and/or arrival of an event. Accordingly, added comfort and/or efficiency may be obtained using ETA-based control and/or configuration.

Geography-Fencing Applications

In some embodiments, geography-fencing (geo-fencing) may be used in interactions between the clients 182 and the smart devices and/or smart environments 10. Geo-fencing uses location-based boundaries to trigger certain interactions. For example, crossing a geo-fence boundary may result in triggering of a particular function of the smart device and/or environment 10. Below are examples of particular embodiments that may use geo-fencing in interactions between the clients 182 and the smart devices and/or smart environments 10.

Vehicular Application

Figure 34:
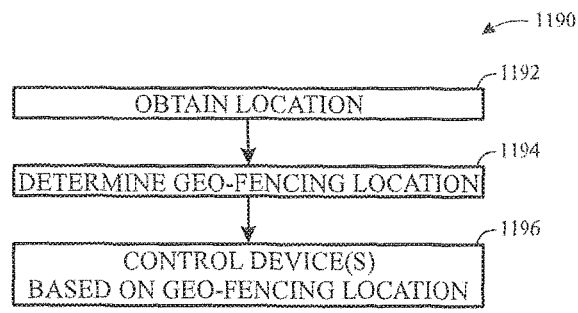
FIG. 34 is a flow diagram illustrating a method for controlling devices using geo-fencing, in accordance with an embodiment.
Figure 35:
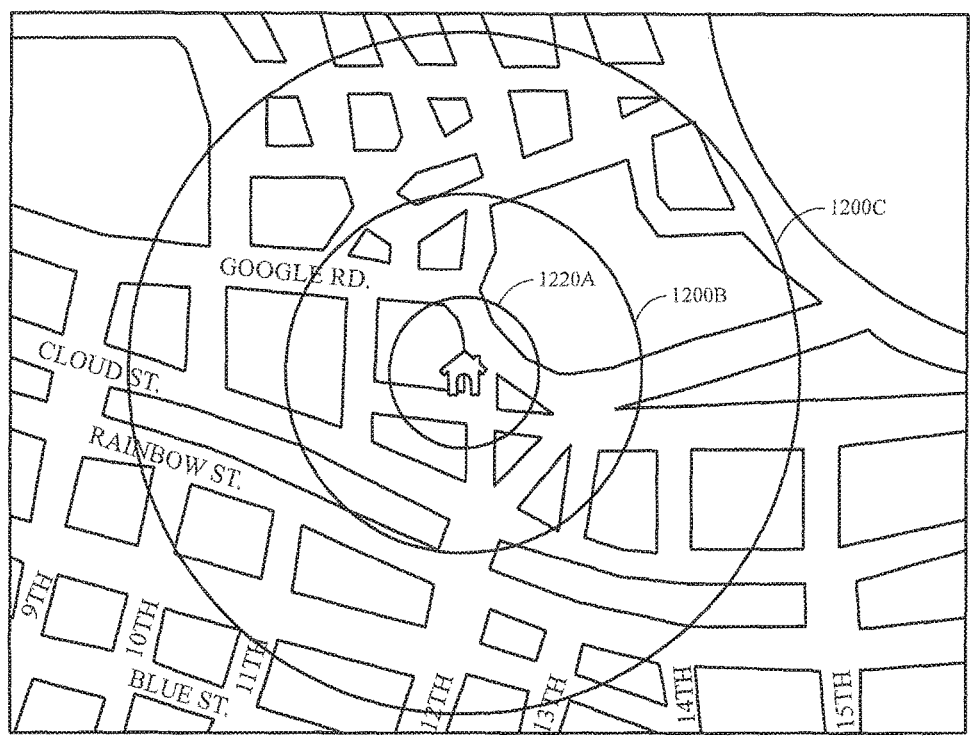
FIG. 35 is a block diagram illustrating a set of geo-fence boundaries, in accordance with an embodiment.
Figure 36:
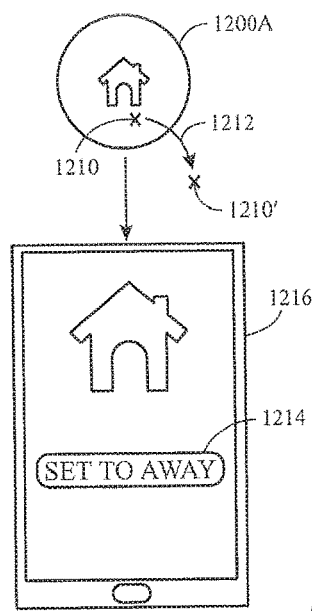
FIG. 36 is a block diagram illustrating a geo-fencing application on a handheld electronic device, in accordance with an embodiment.

In some embodiments, a vehicular application (e.g., first application 142 of FIG. 5) or other application may provide a location of the vehicle or other device to the smart devices (e.g., smart devices 10A and/or 10B of FIG. 5). This information may be used to control the smart devices (e.g., via geo-fencing). FIGS. 34-37 relate to such embodiments. FIG. 34 is a process 1190 for controlling smart devices via data obtained from a vehicular application. FIG. 35 illustrates an example of geo-fencing boundaries 1200. FIG. 36 relates to a location-based application on a smart phone (e.g., Google Now) and FIG. 37 relates to a location-based application within a vehicle and other vehicular-based API 90 use cases. These figures will be discussed together.

The process 1190 begins with obtaining a location of a vehicle (or other structure providing location information) (block 1192). As mentioned above, this may be done by providing, for example, global-positioning-system (GPS) coordinates from the vehicular application to the smart devices (e.g., via one or more APIs). Next, geo-fence locations are determined (block 1194). As illustrated in FIG. 36, one or more geo-fencing boundaries 1200 may define locations (e.g., perimeters). Any number of boundaries of any shape or size may be used to create geo-fences. Operation of the smart devices (e.g., 10A and/or 10B) may be altered when the vehicle is located within and/or transitions into one of the boundaries 1200 (block 1196).

For example, when leaving the home boundary 1200A, the vehicular application may automatically prompt the user to set the thermostat to an "AWAY" mode. As illustrated in FIG. 36, the location 1210 has moved 1212 to the location 1210' (e.g., from the home zone 1200A to outside the home zone 1200A). Based upon the location 1210' and/or the transition outside of the boundary 1200A, the prompt 1214 may be provided. In the illustrated embodiment, the prompt 1214 is provided on a handheld device 1216 (e.g., a tablet computer, a programmable remote control, and/or a cellular telephone).

In addition, the application (e.g., Google Now) on the handheld device 1216 may display various information on one or more card visualizations. A card may refer to a panel of relevant information displayed, such as whether a door or window is open in the home, the last person who came to or left the home, the statuses of the smart devices in the home (e.g., operating state), and so forth.

Further, the handheld device 1216 may include an app (Google Maps) that provides navigational directions from one location to another. In some embodiments, if the user sets the destination on the app to "HOME", the app may use cloud services 145 to notify the thermostat 10A so the ETA may be set and the thermostat 10A can pre-cool or pre-heat the home to the preferred temperature by the time the user arrives.

Figure 37:
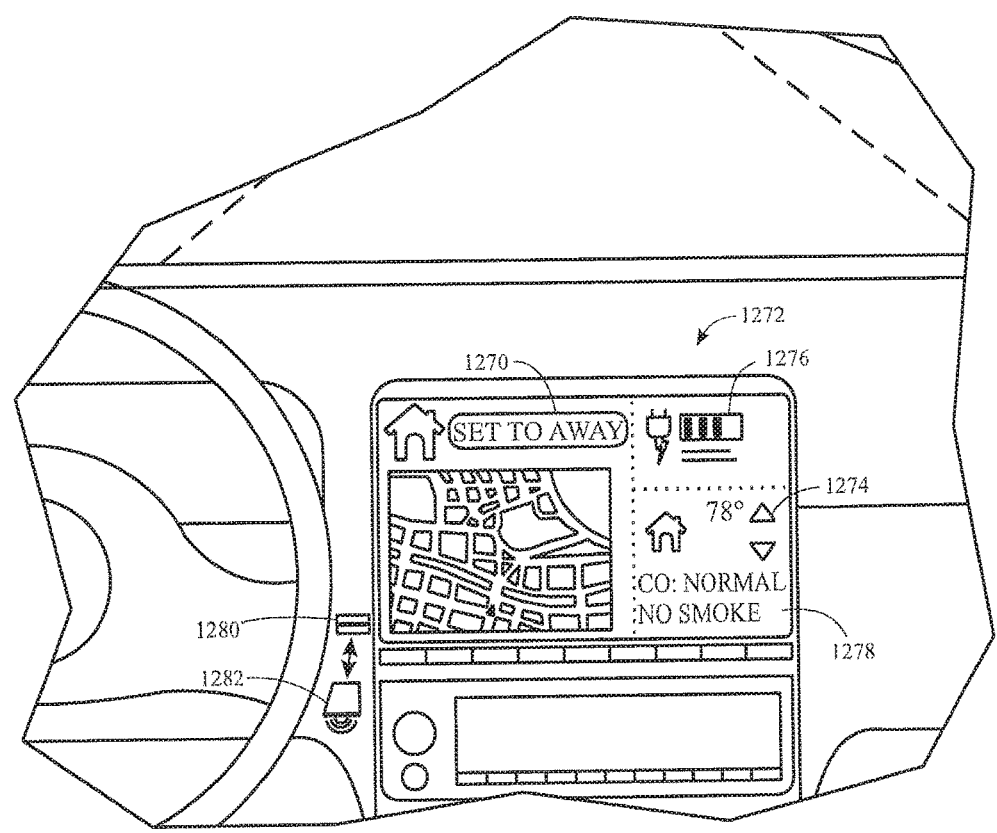
FIGS. 37 and 38 are block diagrams illustrating vehicle interactions with smart devices, in accordance with one or more embodiments.

FIG. 37 provides an illustration of vehicular application embodiments. For example, FIG. 37 illustrates an embodiment providing access and/or control via an in-dash graphical user interface 1272 as well as an embodiment of using a vehicle on-board diagnostics system (e.g., OBD-II) dongle via the API 90.

Graphical User Interface

As illustrated, in the vehicular application embodiment, a prompt 270 may be provided in a graphical user interface of the vehicle, here an in-dash graphical user interface 272.

In addition to the "AWAY" mode prompt, the vehicular application or other application may provide an automatic prompt suggesting to set one or more of the smart devices (e.g., thermostat 10A) to "HOME" mode (e.g., not "AWAY"). For example, if the location were indicated as being within boundary 1200A or a transition into boundary 1200A was detected (e.g., by transition from location 1210' to location 1210), the application may automatically prompt to set one or more of the smart devices to "HOME."

In some embodiments, an application running on a mobile device or computer may maintain circles of authorized family members and/or friends and enable tracking and/or viewing the location of the people in the circle on a map. Using the location of the people in the circles and geofencing, the smart devices may be controlled in certain ways. For example, when the first person in a desired circle (e.g., family circle) arrives in the home zone 1200A, a notification may be sent or pushed to a primary user to ask if the primary user desires to set the thermostat 10A to the "HOME" mode. Likewise, when the last person in a desired circle (e.g., family circle) leaves the home zone 1200A, a notification may be sent or pushed to the primary user to ask if the primary user desires to set the thermostat 10A to the "AWAY" mode.

In some embodiments, a vehicular application (e.g., an application running on the graphical user interface 1272) may allow manual configuration adjustments for smart devices. For example, the vehicular applications may allow a user to manually set "HOME" and/or "AWAY" mode of a thermostat without having to physically access a separate application (e.g. a smart phone or tablet computer application) and/or without receiving a prompt to set the mode. In other words, the user would not have to engage a graphical user interface of a smart phone or tablet, but could access configuration adjustments directly from the vehicular application (e.g. via the in-dash graphical user interface 1272). Additionally, other configuration adjustments may be possible. For example, a temperature adjustment graphical user interface 1274 may enable changes to the desired temperature of the thermostat 10A.

As mentioned above, one or more messages may be sent from the vehicular application to the smart devices, which may be interpreted by a processor to control the smart devices. Accordingly, when user inputs (e.g., temperature adjustments or mode change adjustments) are made at the vehicular application, one or more control messages may be provided via the API(s). These messages are interpreted and cause the relevant control of the smart devices.

In some embodiments, energy consumption data may be provided from the vehicular application to the smart devices (or a cloud service 145 associated with the smart devices). For example, gasoline and/or electrical power usage 1276 may be provided to cloud services 145. When electrical power usage 1276 is provided, the cloud services 145 may provide an optimal vehicle charging schedule based on utility cost information known to the cloud services 145. For example, in some situations, utility companies may provide cheaper energy at off-peak times. When the cloud services 145 determine that a future recharge of the vehicle may be needed, the cloud services 145 may provide a recharging schedule based upon these off-peak energy times.

Further, when the energy usage data is provided to the cloud services 145, additional services may be provided. For example, the vehicular energy consumption data may allow integration with energy conservation games (e.g., Nest Leaf) available for other smart devices (e.g., the thermostat 10A). Accordingly, energy usage reports may provide not only energy usage for smart devices within the home, but also energy consumption of vehicles related to that home.

As mentioned above, device operation status 1156 and/or other data may be provided from smart devices to applications (e.g., the vehicular application (first application 142)). Indeed, operational status of these smart devices (e.g., smoke and/or carbon monoxide detectors (e.g., smart devices 10B) may be provided the vehicular application. For example, in the embodiment of FIG. 37, a status GUI 1278 provides an indication of the current operating status of a smoke detector and/or carbon monoxide detector. In other examples, an alarm system status, ambient temperature, or any other operational and/or sensor data may be provided for display within a vehicle. If a CO or smoke alarm is activated by smart devices 10B, the alarm system status may be sent to the vehicle(s), which may roll-down the windows in the vehicle, unlock the doors in the vehicle, and/or stop charging the vehicle to prepare the vehicle for departure from the emergency situation detected at the structure.

Onboard Diagnostics System Dongle

As illustrated in FIG. 37, a vehicle may be equipped with an onboard diagnostics system 1280. The diagnostics system 1280 may, in some embodiments, be accessed using a dongle 1282 that electrically couples to the diagnostics system 280. Via the diagnostics system 1280, the dongle 1282 may communicate (e.g., wirelessly) vehicular data to the API 90. This communicated data may be provided for display and/or control in a smart environment 30.

For example, in one embodiment, data relating to the vehicle's ignition status (e.g., "On" or "Off") may be provided. When the car is off and when the vehicle is close to the environment 30 (e.g., as discerned via GPS or other coordinates provided by vehicle system, by GPS or other coordinates of the driver's smart-phone, and/or GPS or other coordinates provided by the diagnostics system 1280, etc.), the occupancy state of the environment 30 may be discerned as occupied (e.g. "home"). However, when the ignition is on and/or the vehicle is not near the environment, the occupancy state of the environment 30 may be discerned as unoccupied (e.g., "away"). As mentioned herein, the occupancy status may be used to control smart-devices. For example, when "home," lights may be activated, a "home" thermostat 10A mode may be activated, etc. Further, when the occupancy status is un-occupied (e.g., "away"), lights may be deactivated, a thermostat 10A's "away" mode may be activated, etc.

In some embodiments, coordinates provided by the dongle 1282 regarding the vehicle's location may be used to monitor vehicle driving patterns and/or predict locations where the vehicle may be travelling. For example, geo-boundaries may be setup for particular points of interest (e.g., office, gym, home, etc.). Additionally, time boundaries may be set, which indicate a likelihood that particular points of interest will be visited (e.g., 9:00 AM-5:00 PM, Monday-Friday may be a likely time period to be at the office). Upon receiving a trigger event (e.g., ignition switches from off to on), processing may occur to determine a likely location where the vehicle is travelling to. Environmental controls may occur based upon these predictions. For example, an estimated time of arrival to the predicted destination may be provided to systems of the environment 30, which may result in pre-conditioning of the environment 30.

In some embodiments, transitioning ignition states may be used in determining occupancy status. For example, transitioning from off to on during a particular time of data (e.g. between 6 am and 10 am Monday-Friday) may indicate that an occupant is leaving for work and may result in discerning un-occupied status. Transitioning from on to off when the vehicle is near home and/or between 4 pm and 10 pm Monday through Thursday may indicate that the occupant is returning home and the occupancy status may change to occupied. Any number of variables may be used in conjunction with these transitions. For example, as shown above, time periods, vehicle locations, etc. may be used to infer occupancy status and/or other characteristics.

In some embodiments, the dongle 1282 may receive data from systems of the environment 30. Upon receiving this data, the dongle 1282 may provide the data to the diagnostics system 1280, which may present information based upon the data. For example, in some embodiments, detector 10B alarm data provided to the dongle 1282 may be presented on the graphical user interface 1272. In some embodiments, the dongle 1282 itself may provide an audible or visual indication of the data.

Vehicle Conditional Control

Figure 38:
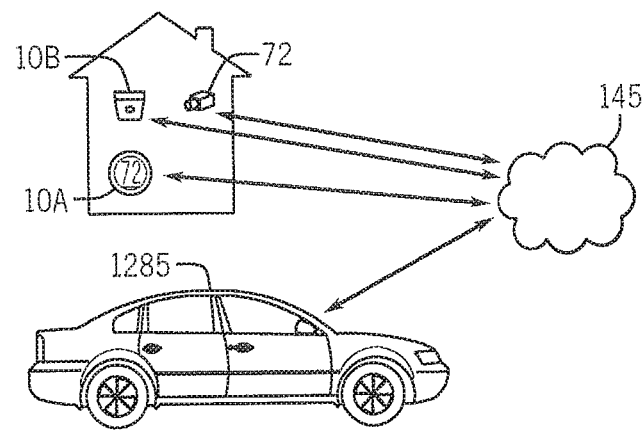

In some embodiments, a vehicle output may be a condition for a thermostat 10A, smoke detector 10B, and/or video camera 72 output and/or a thermostat 10A, smoke detector 10B, and/or video camera 72 condition may be used for a vehicle output. FIG. 38 provides a relational control between a vehicle 1285 and smart devices 10A and/or 10B and/or video camera 72 using cloud services 145. In some embodiments, the vehicle 1285 may be an electric vehicle.

In some embodiments, the vehicle 1285 may be pre-conditioned at a certain time, such as when the user goes to work, to a certain temperature based on the user's preferred temperature obtained from the thermostat 10A. In some instances, the vehicle 1285 may still be plugged in and charging when pre-cooling is initiated. Further, the temperature setting of the vehicle 1285 may be matched to the temperature setpoint preference of the home when the smart device 10A switches to "AWAY" mode.

In one embodiment, during a Rush Hour Rewards event, the vehicle 1285 may not charge to save energy. Also, if the smart devices 10A and/or 10B enter the "AWAY" mode and the vehicle 1285 is near the structure, the vehicle 1285 may lock its doors. Further, in some embodiments, a live feed from the video camera 72 may be streamed into the vehicle 1285 as desired.

In addition, in some embodiments, an app installed on computer system included in the vehicle 1285 may detect certain conditions in the vehicle 1285 and send messages to the smart devices 10A/10B and/or smart video camera 72 in response. For example, shifting the car from park to drive or reverse while the vehicle 1285 is parked near the home may cause the smart devices 10A/10B to enter the "AWAY" mode, which may change the temperature setpoint on the thermostat 10A.

Also, in some embodiments, as the user is driving home, the cabin temperature of the vehicle 1285 may be used to set the temperature setpoint of the thermostat 10A based on a geo-location of the vehicle 1285. for example, the cabin setpoint in the vehicle 1285, actual cabin temperature, and/or a "feels like" temperature (relationship between "feels like" in car and "feels like" in the home) may be sent to the smart thermostat 10A and used as the setpoint for when the user arrives home. Using the geo-location and ETA as described above, the thermostat 10A may pre-cool or pre-heat so the actual temperature in the home is close to the setpoint set using the information from the vehicle 1285.

In certain embodiments, the vehicle 1285's micro-location may be used to trigger certain events. For example, when the vehicle 1285's location indicates that the vehicle is approaching the garage, the garage door may be opened automatically. Further, the front door may remained locked, while the door between the garage and environment 10D may be unlocked.

In one embodiment, when the user has time of use rates, the smart devices 10A/10B may access a value charging database to automatically adjust the cooling strategy to minimize electricity costs. In addition, in some embodiments smart environment load control may be used to allow only one high load appliance to operate at a time (e.g., vehicle charging or the HVAC operating) to minimize the negative impacts on the local transformer and grid. Also, a model may be implemented to allow for transformer cooling. Neighbors that use the thermostat 10A and own an electric vehicle may employ the disclosed techniques to reduce strain on the transformer and grid.

In certain embodiments, the electric vehicle 1285 may only charge when a certain percentage of green energy has been stored by solar panels installed on a user's home. Likewise, in some embodiments, the thermostat 10A may only operate the HVAC when a certain percentage of green energy to maximize the amount of green energy used.

Home Appliances, Fixtures, and Automation Systems

In addition to mobility-based interactions, home appliance and/or home fixture data may interact with the smart devices and/or smart environments 10. For example, clients 182 (e.g., client electronic devices, such as a cellular phone, global positioning system, etc.) may include home appliances, fixtures and/or automation systems that interact with the smart devices and/or smart environments 10. The following embodiments relate to such interactions.

Automation System Interaction

Figure 39:
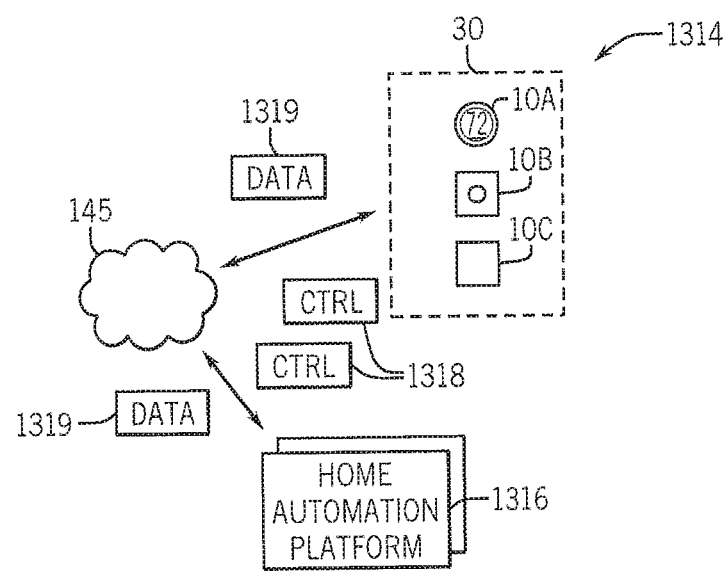
FIGS. 39 and 40 are block diagrams illustrating automation system interactions with smart devices, in accordance with one or more embodiments.

As the number of smart devices increase, an increasing number of smart device platforms have become available. As illustrated in FIG. 39, which illustrates a system 1314 running one or more home automation platforms 1316, these platforms may communicate with smart devices (e.g., thermostat 10A, detector 10B, and/or other devices 10C) to control these devices and/or to receive condition data for controlling other devices. Utilizing the cloud 145 (e.g., an API 90 of the cloud 145), the home automation platforms 1316 may provide control signals 1318 to one or more smart devices (e.g., thermostat 10A, protector 10B, and/or other devices 10C of the environment 30). The control signals 1318 may cause operational changes in the smart devices. For example, the control signals 1318 may increase a target HVAC temperature (e.g., by changing (reducing and/or increasing) the thermostat 10A's target temperature). Further, heating and/or cooling modes, fan activation, deactivation, and/or speeds and/or occupancy status modes (e.g., "HOME" and/or "AWAY") may be modified via control signals 1318. Further, the home automation platforms 1316 may be provided control signals affecting changes in the environment 30 containing smart devices. For example, an occupancy state (e.g., "HOME" and/or "AWAY") may be changed using control signals 1318.

The smart devices (e.g., thermostat 10A, detector 10B, and/or other devices 10C) may provide data 1319 to the home automation platforms 1316. This data 319 may be presented in a graphical user interface (GUI) provided by the platforms 1316 and/or may be used in conditional rules for controlling other devices, as determined via the home automation platforms 1316. Specifically, in some embodiments, data 1319 relating to the thermostat 10A may include whether the thermostat 10A is online or offline (e.g., is connected to a home network), the current target temperature of the thermostat 10A (e.g., the temperature to reach in the environment 30 by HVAC conditioning), a current ambient temperature determined from the thermostat 10A, a fan status (e.g., either active or inactive), an HVAC mode (e.g., "heating", "cooling", and/or "heating and cooling", and/or a name associated with the thermostat 10A (e.g., "Downstairs thermostat"). It should be noted that the thermostat 10A may directly interface with sophisticated HVAC equipment capable of modulating between more than just "heating" or "cooling" settings by providing variable speeds and the like. Using the thermostat 10A coupled to and interfacing with the sophisticated HVAC equipment may enable more efficient temperature control. Further, the data 1319 relating to the environment 30 may indicate a current occupancy state of the environment 30 (e.g., "HOME" and/or "AWAY") and/or a name associated with the environment 30 (e.g., "Vacation Home").

Figure 40:
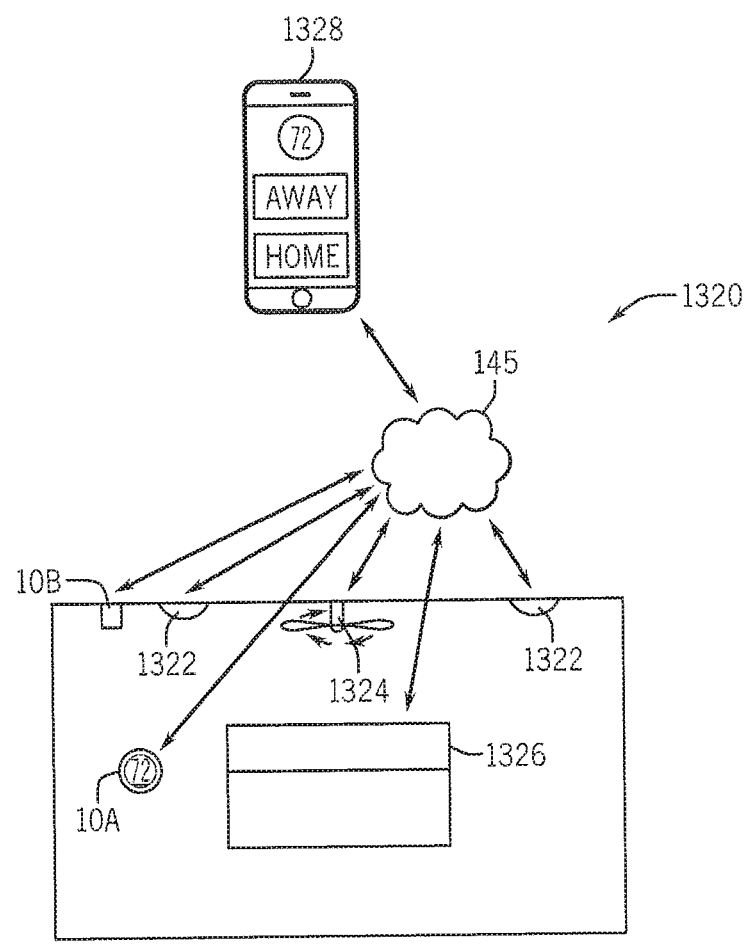

Some automation systems may control lights, window shades, fans, and/or other smart environment 10D fixtures. Based on data received from the API(s) interfacing with the smart devices 10A and 10B, these automation systems may activate and/or deactivate certain lights, raise and/or lower certain window shades, and/or activate and/or deactivate fans. FIG. 40 illustrates one such automation system 1320.

As depicted, the system 1320 may include smart lights 1322, smart fan 1324, smart window shades 1326, and smart devices 10A and 10B. However, any smart device previously discussed in the smart environment 30 may be controlled by the automation system 1320. The devices and/or smart environment 10 of the automation system 320 may be communicably coupled directly to each other or indirectly (e.g., via cloud services 145).

Data regarding the smart devices and/or smart environment 10 may impact the client devices 182 or vis-versa. For example, in some embodiments, when the smart devices 10A and 10B enter the "AWAY" mode or "AUTO-AWAY" mode, a condition may cause the smart window shades 1326 to lower. Also, when the smart devices 10A and 10B enter the "HOME" mode, a condition may cause the smart window shades 1326 to rise. In addition, the smart lights 1322 may be deactivated as a condition of the smart devices 10A and 10B entering the "AWAY" mode and be activated as a condition of the smart devices 10A and 10B entering the "HOME" mode.

In some embodiments, when a thermostat 10A (or other device) is in "AWAY" mode or "AUTO-AWAY" mode, it may be desirable to simulate occupancy of the smart environment. Accordingly, the window shades 1326 may be raised, lowered, opened, and/or closed at certain intervals (e.g., raised in the morning, lowered at night, and/or randomly raised and/or lowered), to simulate occupancy. In certain embodiments, a motion sensor, e.g., from a smart light bulb and/or motion detection by a camera 72, may indicate motion outside the smart environment. Windows shades 1326 near the motion may be raised, lowered, opened and/or closed to simulate occupancy to persons causing the motion event. Further, as will be discussed herein, audio systems, lighting systems, etc. may be used to simulate occupancy.

In some embodiments, unauthorized intrusions into the environment 30 may also be hindered by the shades 1326. For example, in embodiments where the shades 1326 are light-blocking shades, an unauthorized intrusion (e.g., as indicated to the cloud services 145 from an alarm system) may be hindered by raising all light-blocking shades during the unauthorized intrusion. Accordingly, authorities, such as police officers, etc. and/or others may be able to have better visibility into smart environment, such that the intruders may be observed within the environment. Additionally and/or alternatively, when the shades 326 are security shades meant to block access into and/or out of the environment, the shades 326 may be lowered and/or closed during the detected unauthorized intrusion event.

In addition, when the smoke detector 10B detects an alarm condition (e.g., smoke present), the smart window shades 1326 may be raised and the lights 1322 may be activated.

During a Rush Hour Rewards event, the automation system 1320 may initiate an energy savings mode by deactivating the smart lights 1322, lowering the smart window shades 1326, and activating the smart fan 1324. Further, all smart devices controlled by the automation system 1320 may enter energy savings modes during the Rush Hour Rewards event.

Additionally, mobile devices 1328 and/or applications that have access to and control of the automation system 1320 may change the thermostat 10A settings (mode, temperature) and change the settings of the smart devices 10A and 10B to either "AWAY" or "HOME" mode. The user may adjust the thermostat 10A with the mobile devices 1328 remotely from the structure in which the thermostat 10A is located over a wireless or wired communication network. In some embodiments, the mobile devices 1328 may include a smart phone, tablet, laptop, remote controller, computer, vehicle based computer system, and so forth. In some embodiments, the user may set the temperature on the thermostat 10A for a particular scene or "recipe" in combination with a setting of the smart lights 1322, the smart shades 1326, and/or the smart fan 1324. All energy used by the smart devices controlled by the automation system 1320 may be sent to the central server 64 for reporting.

The API(s) may enable other automation systems to interact with the smart devices 10A and/or 10B. For example, an automation system may use the API(s) to view temperatures of the thermostat 10A, increase/decrease temperatures of the thermostat 10A, view humidity, may receive alarm states or other device operation status 156 from the thermostat 10A and/or detector 10B, set modes of operation (e.g., "heat," "cool," "HOME," and/or "AWAY" on the thermostat 10A and/or detectors 10B, etc.), and/or activate/deactivate a fan. The automation system may also enable viewing the alarm state (e.g., whether there is an emergency or not) of the detectors 10B. In some embodiments, the automation system may use the alarm state obtained from the detectors 10B to create "recipes". Recipes may refer to a combination of controls executed by smart devices based on a trigger condition. For example, one recipe may include turning off speakers of a sound system when the alarm state of the detectors 10B indicates there is an emergency. Further, another recipe to execute when the detectors 10B enter an alarm state may include unlocking the doors of the home, blinking the lights in the home any suitable color (e.g., red) to light a path to the exit, alerting the civil services via a smart phone, flashing the external lights, play alarm through an audio system, and/or alert the neighbors using social media.

In some embodiments the automation system may be controlled via a universal remote controller that enables controlling the thermostat 10A, detectors 10B, fans, lights, shades, appliances, speakers, key systems, garage doors, and so forth. The universal remote controller may be an electronic device (mobile device, tablet, etc.) with a touchscreen that may be handheld, disposed on a wall or a surface, and so forth. The universal remote controller may enable controlling all of the smart devices in the automation system from one central location. The universal remote controller may accept voice commands, set reminders, wake the user up on time, and/or fetch live internet content (e.g., weather, stocks, and news) that is relevant to the user.

In some embodiments, the user may speak to the universal remote controller to: set the temperature of the thermostat 10A, change HVAC mode, and set fan. Some examples of specific voice commands may include "setting the bedroom thermostat to XX degrees", "make the temperature 1 degree warmer", "make the temperature hotter", "make the bedroom 2 degrees cooler", "set the thermostat to XX degrees". The user may also speak to the universal remote controller to set a preferred sleep and wake temperature on the thermostat 10A. The universal remote controller may emit feedback after it performs the requested action. For example, the user may say "listen to my baby's bedroom" and the universal remote controller may reply "activating microphone in baby's bedroom" and then commence to send notifications when a loud noise is detected in the baby's bedroom.

In some embodiments, the universal remote controller may receive questions asked by the user, process the questions, and emit an answer using one or more speakers. For example, the user may ask the universal remote controller "what's the current temperature in the bedroom?", "what's the current temperature of the thermostat?", and the universal remote controller may emit the answer by looking up the information about the thermostat 10A using cloud services 145 and/or API(s) 90.

Further, the universal remote controller may announce the start and end times for a Rush Hour Rewards event (obtained from the smart devices 10A and/or 10B and/or central server 64) to encourage the user to conserve energy. In addition, the universal remote controller may project audio greetings in certain scenarios. For example, when the smart devices 10A and/or 10B switch to the "HOME" mode, the universal remote controller may greet the user. Also, when the detectors 10B enter an alarm state, the universal remote controller may project notifications and/or an alarm from its speakers. In some embodiments, where a video camera is mounted to a front door of a house, the user may speak to a visitor via the universal remote controller microphone/speaker.

Additionally, in some embodiments, the remote controller (or other component of the system) may implement a status change upon certain events. For example, the remote controller (or other component of the system) may reduce volume of a television, audio/video receiver, speaker system, etc. upon detection of a higher priority audible event. For example, in certain embodiments, hazard alarms provided by the hazard detector 10B may take priority over entertainment. Accordingly, when the system becomes aware of active hazard detector 10B alarms, the remote controller may reduce the volume of other audible devices, to aide in the perception of the active hazard detector 10B alarms.

In some embodiments, system 1314 may use the one or more home automation platforms 1316 to integrate functions of an alarm clock with functions of other devices in the smart environment 10D. For example, the system 1314 may obtain, via the cloud services 145, certain data pertaining to devices in the smart environment 10D, such as motion, active alarms, occupancy status, Rush Hour Rewards periods, etc.

When the system 1314 may become aware of motion from one or more cameras 72, the system 1314 may provide a notification to a smart environment 10D occupant via a speaker of the alarm clock. Further, an audio feed from the camera 72 detecting the motion may be provided at the alarm clock.

When the system 1314 becomes aware of alarms (e.g., hazard alarms triggered by the hazard detector 10B), the system 1314 may present the alarms at the alarm clock. For example, the alarm clock may subscribe to alarm status of the hazard protectors 10B and may provide an alarm when the alarm status is active. Alternatively, in some embodiments, a recipe of the system 1314 may take control of the audio in the alarm clock upon discerning the active alarm, in essence pushing the active alarm to the alarm clock.

In some embodiments, the alarm clock status may impact other smart devices 10 in the smart environment 10D. For example, sleep modes of the alarm clock and wake times of the alarm clock may be provided to the system 1314, where they are used to activate sleep and/or wake temperatures of the thermostat 10A. Conversely, sleep and wake times discerned by the thermostat 10A and/or other smart devices may be used to automatically set alarms and/or sleep modes of the alarm clock or provide a prompt to automatically set alarms and/or sleep modes.

In some embodiments, the system 1314 may obtain occupancy information based on data from one or more smart devices in the smart environment 10D. The system 1314 may cause the alarm clock to greet an occupant as they arrive at the smart environment 10D.

Additionally, in some embodiments, the system may become aware of an energy saving period (e.g., a Rush Hour Rewards event). The system may cause the alarm clock to announce the energy saving period, such that the occupants are aware of the energy saving period.

In some embodiments, the system 1314 may become aware that the user usually arrives at home at a certain time based on the smart devices changing mode to "HOME" from "AWAY" and/or from other data (e.g., data received via video camera 72, among other things). Further, the system 1314 may determine that the user prefers watching a certain television show when the user arrives home. Using this information, the system 1314 may notify the user that his or her show is about to start when the system determines that the user is not going to be at home at the scheduled air time of the show. In some embodiments, the system 1314 may ask the user if the user desires the system to set the DVR to record the show or the system 1314 may automatically set the DVR to record the show. Also, in some embodiments, the system 1314 may access an ETA to determine whether the user will be home in time for the show. If not, the system 1314 may notify the user that he or she will miss the beginning of the show and/or automatically start recording the show.

Appliance and Fixture Interaction

Figure 41:
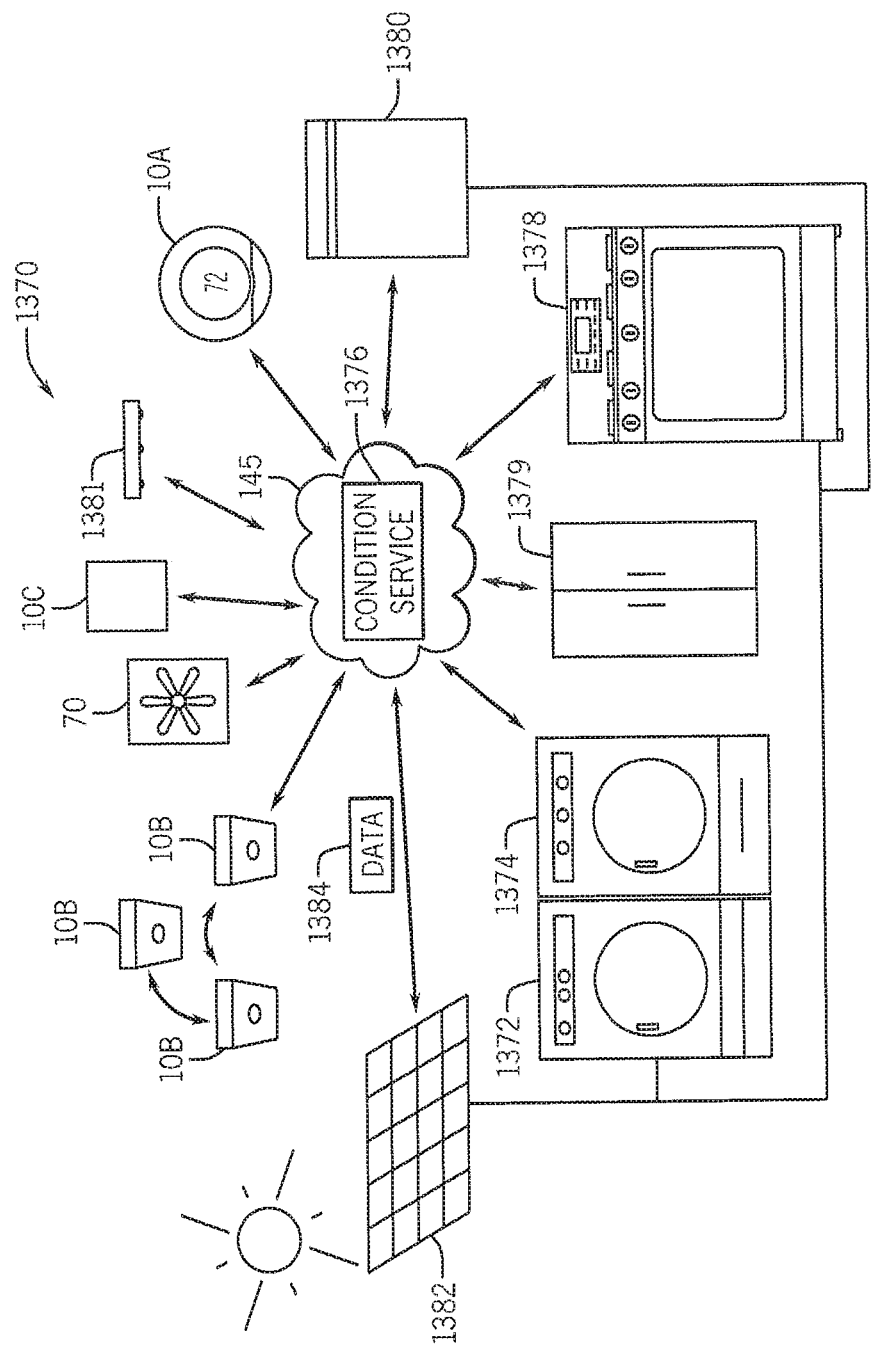
FIG. 41 is a block diagram of a system that integrates household appliances with a thermostat, smoke/carbon monoxide detector, or both, in accordance with an embodiment.

In some embodiments, environment appliances may interact with the smart devices and/or smart environment 10 (e.g., via the cloud services 145) without facilitation from an automation system. FIG. 41 illustrates such a system 1370 that links data (e.g., conditions and outputs) between washers 1372, dryers 1374, ovens 1378, refrigerators 1379, wall air conditioners 70, etc. and thermostats 10A, detectors 10B, and/or other devices 10C.

Certain appliances may include features that are beneficial in situations where there is delayed user involvement. For example, the washing machine 1372 may include a system to maintain unattended laundry. When laundry left unattended in the washing machine 1372, a fan may periodically pull moisture from the drum of the washing machine 1372 and also periodically tumble the unattended laundry. Similarly, the dryer 1374 may include an unattended laundry system that intermittently tumbles unattended laundry after a dryer cycle.

Household Appliances

Typically, these unattended laundry systems are activated manually via an onboard interface of the washing machine 1372. However, under certain scenarios, this system may be activated automatically, using occupancy status discerned from the smart devices 10A, 10B, and/or 10C.

For example, the thermostat 10A is set to "AWAY" when the thermostat detects an indication that no one is in the temperature-controlled environment. Further, when the detectors 10B are equipped with occupancy sensors, similar household occupancy status may be defined. The status from the detectors 10B may be provided to the thermostat 10A, which in turn may automatically be set to "AWAY." Further, thermostat 10A users may manually set the thermostat to "AWAY," upon leaving the house.

In any of these cases, when an indication that no occupants are present is discerned, the away status may be provided to a service (e.g., service of the washer 1372, dryer 1374, cloud service 145, condition service 1376 (e.g., a website that provides graphical conditional rule generation), etc.), which may use the status as a condition for activating the unattended laundry systems and/or a smart automatic vacuum cleaner. Accordingly, the laundry systems and/or vacuums may clean while no occupants are in the environment 10D. In this way, the user may return to an environment (e.g., home or building) where the floors are clean, while the vacuum does not get in their way by operating when the user is present in the environment.

In some embodiments, when the occupancy status is set to "AWAY" for more than a threshold period of time (e.g., 1, 2, 3, 4, 5, 6, or 7 days), the service may prompt the user via the mobile device to confirm whether the user desires to place the smart devices (e.g., thermostat 10A, detectors 10B, appliances) into a eco-friendly mode, such as a "vacation" mode that saves energy.

When the washing machine 1372 and/or the dryer 1374 are running a cycle and the respective unattended laundry systems are not enabled, the service may provide a washer 1372 and/or dryer 1374 command to activate the respective unattended laundry system. Thus, the laundry will remain fresh and/or wrinkle free, despite the operator leaving the laundry unattended and not manually activating the unattended laundry systems.

In some embodiments, when the away status is provided to the service (e.g., service of the washer 1372, service of the dryer 1374, service of the oven 1378, service of the refrigerator 1379, cloud service 145, condition service 1376), the service may use the status as a condition for activating or deactivating certain other features of the appliances.

For example, when the thermostat 10A and/or smoke detector 10B enter the "AWAY" mode, an energy savings mode may be activated by the refrigerator 1379 and when the devices 10A and 10B enter the "HOME" mode, the refrigerator 1379 may deactivate the energy savings mode.

In addition, when the thermostat 10A and/or smoke detector 10B enter the "AWAY" mode, the user may monitor the status of the oven 1378 (e.g., temperature, cook time remaining, etc.) via an application on a portable computing device (e.g., smart phone, laptop, computer), computer system installed in a vehicle, or the like. In some embodiments, automatic oven notifications may be enabled when the thermostat 10A and/or smoke detector 10B enter the "AWAY" mode so that the user can receive alerts related to certain events, such as the oven over-heating, the oven being on when the user is not at home, current temperature of the oven, cook time remaining, and/or a detected gas leak. Further, when the smart devices 10A/10B enter the "AWAY" mode, the oven 1378 and/or other appliances may enter a "vacation mode" to save energy. The user may use the app on their mobile device to turn the oven on and off. In addition, if the user changes the temperature scale of the thermostat 10A (e.g., from F to C), then the oven temperature scale may be automatically changed to match.

Additionally, when the thermostat 10A and/or smoke detector 10B enter the "AWAY" or "AUTO-AWAY" mode, the washer 1372 may automatically activate washer 1372 status notifications in an application installed on a portable computing device (e.g., smart phone, laptop, computer), computer system installed in a vehicle, or the like. Likewise, when the thermostat 10A and/or smoke detector 10B enter the "AWAY" or "AUTO-AWAY" mode, the dryer 1374 may automatically activate washer 1374 status notifications in an application installed on a portable computing device (e.g., smart phone, laptop, computer), computer system installed in a vehicle, or the like. The status notifications may provide information related to whether the washer 1372 and/or dryer 1374 are activated, the stage of a cycle currently activated, the amount of time left in a cycle, whether the unattended laundry systems are activated, whether the door is open, amount of energy being used, and the like.

Also, the wall air conditioner appliance 70 may be controlled by the "AWAY" status from the service (e.g., wall air conditioner appliance 70 service, cloud services 145, condition service 1376). For example, when the thermostat 10A enters the "AWAY" or "AUTO-AWAY" mode, the wall air conditioner appliance 70 may deactivate.

When the thermostat 10A enters the "HOME" mode, the wall air conditioner appliance 70 may activate.

Further, some dryers 1374 may be equipped with an economy boost option that may place the dryer in a more time-consuming but energy-consuming state. When no occupancy is indicated or detected (e.g., by the thermostat 10A entering an "AWAY" mode), the service may provide a command for the dryer 1374 to enter the economy boost option. When the smart devices 10A/10B enter the "HOME" mode, the unattended laundry systems and/or the economy boost option may remain activated. Also, when the smart devices 10A/10B are in the "HOME" mode, the service may provide a command for the washer 1372 and/or dryer 1374 to enter a quiet mode.

As mentioned above, certain utility providers offer lower energy rates during off-peak hours of operation. Rush Hour Rewards, by Nest, provides incentives to consumers to use less energy during peak usage times. Users enrolled in the Rush Hour Rewards receive periodic peak energy usage events defining a peak usage time when energy consumption should be avoided to obtain a reward from the cloud services 145. When the Rush Hour Reward event occurs, the washer 1372, dryer 1374, and/or dishwasher 1380 receives the peak event signal from the cloud services 147 and calculates the peak start time and duration. The peak start time is adjusted by a default cycle length for the washer 1372 and/or dryer 1374 to ensure that a consumer does not inadvertently start a cycle just before the event is to begin. For example, if a washing machine 1372, dryer 1374, and/or dishwasher 1380 cycle is typically 30 minutes, the peak start time is adjusted by 30 minutes, to ensure that the washer 1372, the dryer 1374 and/or dishwasher 1380 is not active during the peak event.

In one example, a Rush Hour peak event may begin at 2:00 pm and last for 4 hours. With a default cycle time of 30 minutes, the washer 1372, dryer 1374, and/or dishwasher 1380 adjusts the peak event start to 1:30 pm and ends the event at 6:00 pm (4 hour and 30 minute duration). These adjustments to the Rush Hour peak event help to ensure that the washer 1372, dryer 1374, and/or dishwasher 1380 is not in operation during the peak event.

Once a new peak event start time and duration is calculated, the service may send a command to the washer 1372 and/or dryer 1374 and/or dishwasher 1380 to enter a Smart Delay. When in Smart Delay, the washer 1372 and/or dryer 1374 and/or dishwasher 1380 will inform the consumer that a peak event is in process and that a more energy friendly time to run the cycle is approaching. The consumer may provide an input to allow the washer 1372, dryer 1374 and/or dishwasher 1380 to automatically start when the event is complete, or the consumer may override the Smart Delay and start the cycle immediately.

When the washer 1372, dryer 1374 and/or dishwasher 1380 receive the peak event signal 30 minutes or less from the start of the event, the service sends a command for the washer 1372 and/or dryer 1374 and/or dishwasher 1380 to enter a deep power reduction mode. Accordingly, if the washer 1372 and/or dryer 1374 and/or dishwasher 1380 is in operation prior to receiving the peak event, the washer 1372 and/or dryer 1374 and/or dishwasher 1380 will reduce power usage for a brief period of time. Further, the dryer will also enter economy boost for the remainder of the cycle. If not running a cycle, the washer 1372 and/or dryer 1374 and/or dishwasher 1380 will enter Smart Delay. When the Rush Hour peak event has concluded, the washer 1372 and/or dryer 1374 and/or dishwasher 1380 return to normal operation. Also, during a Rush Hour Reward event, the dishwasher 1380, washer 1372, and any other suitable appliance may reduce the amount of hot water flow.

In addition, when the Rush Hour Reward event occurs, a service (e.g., a service of the washer 1372, a service of the dryer 1374, the cloud services 145, the condition service 1376, or the like) may cause a warning to be sent to the user if the user attempts to start a cycle during the Rush Hour Reward event. In some embodiments, the warning may be sent to the application the user used to attempt to start the washer 1372 and/or the dryer 1374 during the Rush Hour Reward event. The application may be located on a portable computing device (e.g., smart phone, laptop, computer, etc.), a browser, a computer system installed in a vehicle, or the like. Also, during the Rush Hour Reward event, the refrigerator 1379 may enter an eco-mode to conserve energy. Further, during the Rush Hour Reward event, the wall air conditioner appliance 70 may activate an energy savings mode.

In a similar fashion, some environments 30 may be equipped with a photovoltaic cell (e.g., solar panel) 1382. Energy capture data 1384 may be provided to the cloud 145, which may be used to discern if there will be enough generated energy from the cell 1382 to run one or more of the appliances (e.g., the oven 1378 and/or the dishwasher 1380). To make this discernment, weather information (e.g., obtained via the thermostat 10A or another source) may be used to determine if the sun will be shining for a long enough time period to generate enough energy to run the appliance. If enough energy will be generated within a certain time period, the system 1370 may delay operation of the appliance until enough energy is generated. If, however, not enough energy will be generated in the certain time period, operation of the appliance may commence, using an alternative energy source (e.g., from the electric grid).

To further encourage energy efficiency, energy usage of the washer 1372 and/or dryer 1374 (e.g., kilowatt hour (kHW) utilization information), along with any of the other devices and/or services described herein may be accumulated by the cloud services 145. For example, Nest may accumulate the energy usage of lighting, external automation systems, etc. to include this information in energy utilization reports. Further, the energy consumption may be incorporated in energy conservation information and/or games, such as Nest Leaf. In addition, water usage by the washer 1372 and/or any other appliance may be sent to the cloud services 145 for any suitable use, such as reporting and/or analysis.

In some embodiments, data from the thermostat 10A, the detectors 10B, and/or other devices 10C may be used as conditions for controlling the washer 1372, dryer 1374, the stove-top/oven 1378, dishwasher 1380, smart vacuum 1381, and/or other appliances. For example, when the detectors 10B detect smoke and/or gas, certain functionalities of the washer 1372, dryer 1374, a stove-top/oven 1378, smart vacuum 1381, and/or dishwasher 1380 may be disabled. For example, gas access may be disabled at a burner on the stove-top/oven 1378 and/or the smart vacuum 1381 and/or any movement-enabled robot may be shut down wherever it is located as to inhibit the vacuum 1381 from getting in the way of a user that is trying to exit the building. In another example, the smart vacuum and/or any movement-enabled robot may be controlled to drive to the nearest wall or corner of a room or drive underneath a table or couch to remove itself from any walkways to clear a path for a user to exit the environment during an emergency detected by the detector 10B.

Further, visual and/or audible indicators of these appliances may be used to alert occupants to the detected smoke and/or gas. For example, lights on these appliances may blink and/or speakers of these devices may beep. Additionally and/or alternatively, the appliances may be controlled to stabilize the environment 30. For example, upon detecting emergency situations, the appliances (e.g., oven 1378 fans, vents, etc.) may be activated and/or deactivated in order to push and/or pull air from one location to another. Any appliances or robots in the environment 30, such as the smart vacuum 1381, which include cameras, may be operated to point their cameras at the emergency so that a user can remotely view what the emergency is. In some embodiments, the smart vacuum or camera-enabled robot may be driven near the emergency so the camera can obtain a clear vantage point of the emergency with its camera.

In one embodiment, data accumulated in the environment 30 may be used to discern that occupants are either leaving the environment 30 and/or are going to bed. For example, when a thermostat 10A is placed into "AWAY" mode, this may indicate that an occupant has left the environment 30. Additionally, when relatively little activity is detected via sensors of the thermostat 10A and/or detector 10B, this may indicate that occupants are in bed or have left the environment 30.

Upon discerning such an activity, when an appliance (e.g., oven 1378) is left on, the system may notify the occupant that the appliance is still active. For example, the system may provide a notification and/or prompt for acknowledgement that the appliance is still on at the occupant's smart phone, via the detector 10B, etc. In embodiments where the occupant is prompted to acknowledge that the appliance is still active, when the occupant does not provide an acknowledgement within a pre-determined time period (e.g. 10 minutes, etc.), the appliance may automatically be deactivated by the system, depending on safety settings of the system. However, when the occupant does provide an acknowledgement, the appliance may be left in an active state. In some embodiments, the occupant may provide a particular amount of time before providing a subsequent prompt. For example, the occupant may acknowledge the active appliance, providing an indication that the occupant will be back in 10 minutes.

In some embodiments, when it is discerned that an occupant is going to bed and/or is leaving the environment 30, the dishwasher 1380 may be activated. This may result in the dishwasher running when it will likely not be heard by the occupants (e.g., because they are away or are sleeping).

In some embodiments, data from the washer 1372, dryer 1374, a stove-top/oven 1378, dishwasher 1380, and/or other appliances may be used as conditions for controlling the thermostat 10A, the detectors 10B, other devices 10C and/or structures 30. For example, when an occupant manually activates the washer 1372, dryer 1374, a stove-top/oven 1378, the dishwasher 1380, and/or other appliances, it may be clear that the environment 30 is occupied. Accordingly, if the structure 30 and/or thermostat 10A are set to "AWAY," their occupancy status may be changed to "HOME." Additionally, when hot water is drawn by the washer 1372, dishwasher 1380 and/or any other suitable appliance, the occupancy status may be set to "HOME."

In some embodiments, a target oven 1378 temperature may be used to adjust a thermostat 10A temperature. For example, the system 1370 may become aware of a correlation between a rising ambient environment temperature and target oven 1378 temperatures. The target thermostat 10A temperature may be adjusted downward to counteract the effects of the oven 1378 temperature on the ambient environment 30 temperature. Additionally, the temperature setpoint of the thermostat 10A may be adjusted based on the status of the oven 1378. For example, if the status of the oven 1378 is "ON," then the target thermostat 10A temperature may be adjusted downward to counteract the effects of the oven 1378 temperature on the ambient environment 30 temperature. Additionally, the temperature setpoint of the thermostat 10A may be adjusted based on the status of the oven 1378. For example, if the status of the oven 1378 is "ON," then the target thermostat 10A temperature may be adjusted downward to counteract the effects of the oven 1378 temperature on the ambient environment 30 temperature.

Environmental Control Devices

Figure 42:
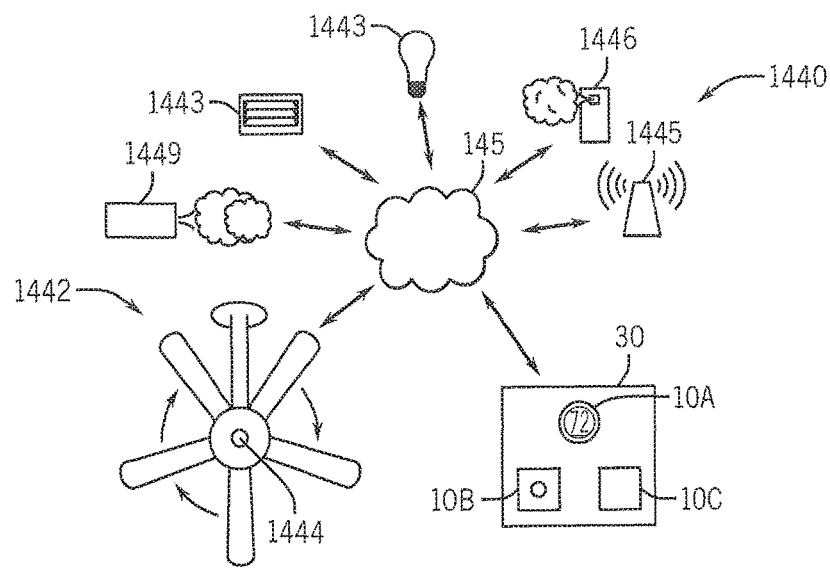
FIG. 42 is a block diagram illustrating a system providing relational control/reporting relating to a smart ceiling fan in the smart environment, in accordance with an embodiment.

In some embodiments, smart ceiling fan 1442, smart vent 1443, and/or other environmental control devices 1445 (portable fans, air purifier, humidifier, air fresheners, heaters, etc.) data (e.g., conditions) may be used to affect changes in a thermostat 10A, detector 10B, and/or other smart device 10C and/or a thermostat 10A, detector 10B, and/or other smart device 10C data (e.g., conditions) may be used to affect changes in the smart ceiling fan 1442, smart vent 1443, and/or other environmental control devices 1445. FIG. 42 provides an illustration of a system 1440 providing relational control between various environmental control devices, such as a smart ceiling fan 1442, a smart vent 1443, a scent-providing device 1446, color changing lights 1448, and/or other environmental control devices 1445 in a smart-device enabled environment 30.

In some embodiments, the fan 1442 and/or the other environmental control devices 1445 may be controlled based upon other device data. In one embodiment, when the thermostat 10A is in a heating mode, the smart ceiling fan 1442 may be automatically controlled (e.g., by the environment 30) to reverse rotation and/or enter a heat destratification mode. Heat stratification occurs because warm air from a heater tends to rise to the ceiling. Using a destratification mode, the rotational speed of the fan 1442 may be reduced, pushing the air off of the ceiling without creating a draft.

Further, when the thermostat 10A is in a heating mode, the other environmental control devices 1445, may be automatically controlled (e.g., by the environment 30) to enter a corresponding state. For example, an air purifier, a heater, a humidifier, an air freshener (e.g., scent-providing device 1446), and/or a portable fan, may enter a state that corresponds to the heating mode of the thermostats 10A. Likewise, when the thermostat 10A is in a cooling mode, the fan 1442, the smart vent 114, the scent-providing device 1446, lights 1448, and/or the other environmental control devices 1445 may be automatically controlled to enter a corresponding state. For example, when the thermostat 10A enters a cooling mode, the portable fan, air purifier, or the like may turn on a respective fan. Also, when the thermostat 10A turns on a fan of the HVAC, the fan 1442 and/or the other environmental control devices 1445 may also turn on a fan. Additionally, when the thermostat 10A is in a particular mode (e.g., cooling or heating), the vents 1443 may be automatically actuated to a certain angle to control airflow. Further, if the user manually adjusts the angle of the vents 1443, the vents 1443 may communicate the state of the vents 1443 to the thermostat 10A, which may adjust the temperature control for the room including the adjusted vents 1443 accordingly (e.g., set temperature cooler or warmer).

Also, the fan 1442, the vents 1443, and/or the other environmental control devices 1445 may be controlled based upon a "HOME" or "AWAY" mode status of the smart devices 10A, 10B, and/or 10C. That is, the fan 1442, the vents 1443, and/or the other environmental control devices 1445 may be synchronized with the occupancy status of the smart devices 10A, 10B, and/or 10C. For example, when the smart devices 10A, 10B, and/or 10C are in the "HOME" mode, the fan 1442 and/or the other environmental control devices 1445 may be turned on (e.g., turn on fan, emit air freshener, turn on heater, purify air, humidify air, etc.) or off depending on the preferences of the user. Additionally, when the smart devices 10A, 10B, and/or 10C are in the "HOME" mode, the vents 1443 may actuate to a particular angle to control a location of airflow into particular rooms and/or to control the temperature of the room. Likewise, when the smart devices 10A, 10B, and/or 10C enter the "AWAY" mode, the fan 1442 and/or the other environmental control devices 1445 may be turned off or on depending on the preferences of the user. For example, it may be useful to turn such devices off when in "AWAY" mode, as energy can be saved, by not conditioning an unoccupied environment 30. Additionally, when the smart devices 10A, 10B, and/or 10C are in the "AWAY" mode, the vents 1443 may be actuated to a certain angle to control airflow into particular rooms to control the temperature of the room. Thus, in this way, occupancy data obtained from the smart devices 10A, 10B, and/or 10C may be used to control the fan 1442 and/or the other environmental control devices 1445.

In some embodiments, the ETA variable of the smart devices (e.g., the thermostat 10A, the detectors 10B, and/or other smart devices 10C) may be used to control the fan 1442, the vents 1443, and/or the other environmental control devices 1445. For example, when the ETA is set, the smart devices 10A, 10B, and/or 10C may provide (e.g., via the cloud services 145) the information to the fan 1442 and/or the other environmental control devices 1445, which may turn on a fan or turn off a fan, freshen the air, purify the air, humidify the air, or the like so that the air is at a user preferred condition by the time the user arrives at the building. Also, the vents 1443 may actuate to a certain angle to allow more airflow into the room and/or to cool the room faster based on the ETA. Alternatively, the fan 1442 and/or the other environmental control devices 1445 may query (e.g., via the cloud services 145) the smart devices (e.g., the thermostat 10A, the detectors 10B, and/or other smart devices 10C) for the ETA to determine whether to perform a function.

Additionally, when the smart devices 10A and 10B enter a Rush Hour Rewards event to conserve energy (e.g., by turning off the HVAC), the ceiling fan 1442 and/or the other environmental control devices 1445 may be turned on and/or the vents 1443 may be actuated to a certain angle. For example, the air purifier, humidifier, air freshener, portable fan or heater, may be turned on to preserver a level of comfort or satisfaction in the environment 30. In some instances, the other environmental control devices 1445 may turn off when the smart devices 10A and 10B enter the Rush Hour Rewards mode. In any embodiment, it should be noted that the fan 1442 and/or the other environmental control devices 1445 may be synchronized with the smart devices 10A and 10B to consume energy in a similar fashion (e.g., based on the same energy consumption schedule or usage schedule).

In one embodiment, the fan 1442 may be used as an extension of the HVAC fan. For example, when the HVAC fan is running, the fan 1442 may be controlled to operate simultaneously, acting as an external fan extension for the forced air fan (e.g., G-wire) of the HVAC system. In another embodiment, the fan 1442 and/or the other environmental control devices 1445 may be synchronized with the hazard detector 10B. For example, in some embodiments, when the hazard detector 10B triggers an alarm based on a detected hazardous condition, any and/or all externally-vented fans may be activated. Additionally or alternatively, in some embodiments, when a hazard is detected, such as the presence of carbon monoxide, the fans included in the environmental control devices 1445 (e.g., air purifier, portable fan, air freshener) may be turned off so air is not circulated.

Further, fan 1442 data may be used to control other devices within the environment 30. In some embodiments, the thermostat 10A may be controlled based upon fan 1442 data. For example, in one embodiment, thermostat 10A setpoints may be altered based upon whether or not a fan 1442 is active and/or particular speed settings of the active fan 1442. For example, wind chill caused by the fan may make an environment 30 feel cooler than it actually is. Thus, the HVAC may cool to a higher temperature, taking into account the artificial temperature differentiation caused by the wind chill. In some embodiments, particular set-points may be used based upon whether the occupancy status is occupied or unoccupied. Accordingly, the fan 1442 and/or the HVAC system may operate less when the environment 30 is unoccupied. However, in some instances, when the smart devices 10A or 10B are in the "AWAY" mode, the fan 1442 may be periodically activated to circulate the air in the unoccupied rooms.

In one embodiment, the fan 1442 may provide occupancy-relevant data via a sensor 1444, which may be used in determining occupancy status of the environment 30. As mentioned herein, occupancy status may be used to control lighting, control thermostat "home" and/or "away" mode activation, etc.

In some embodiments, energy usage of the fan 1442 (e.g., kWh usage for the current fan speed) may be provided to systems of the environment 30 via the API 90. This may be used in energy consumption calculations and/or reporting for the environment 30.

In one embodiment, an environmental scene may be orchestrated in the smart-device enabled environment 30. For example, when the scent-providing device 1446 provides a scent (e.g., lavender), other devices may be controlled to provide a complementary environment 30 configuration. For example, color changing lights 1448 may be adjusted to a color (e.g., purple) associated with the scent, the thermostat 10A may be adjusted to a temperature associated with the scent, etc. Additionally, the fan 1444 may be controlled to distribute the scent throughout the environment 30.

In some embodiments, the scent-providing device 1446 may be controlled based upon data received from the hazard detector 10B. For example, when a hazard detector 10B in a kitchen detects smoke, it may be likely that food has been burnt. Accordingly, the scent-provision device 1446 may be controlled to provide an odor-reducing scent in the kitchen, to try and neutralize the smell of the burnt food, remove smoke from the kitchen, etc. Further, the fan 1442 may be controlled to disperse the scent in the kitchen.

Additionally, in some embodiments, when a hazard or movement is detected by the thermostat 10A and/or the hazard detector 10B, the lights 1448 or lights of the environmental control device may be activated, such that a path light is provided. For example, a light of the scent-provision device 1446 may be activated, etc.

In security embodiments, the environment 30 may be configured to thwart an environment 30 invasion. For example, upon detection of unauthorized occupancy in the environment 30 (e.g., by detecting movement from the thermostat 10A, hazard detector 10B, other smart devices 10C), an indication of the unauthorized occupancy may be provided to the cloud services 145. Based upon this indication, the lights 1448 may illuminate to full power. Further, a fog generation system 1449 may produce fog in the smart environment 30, which may deter movement by the unauthorized occupants.

Shade Integration

Figure 43:
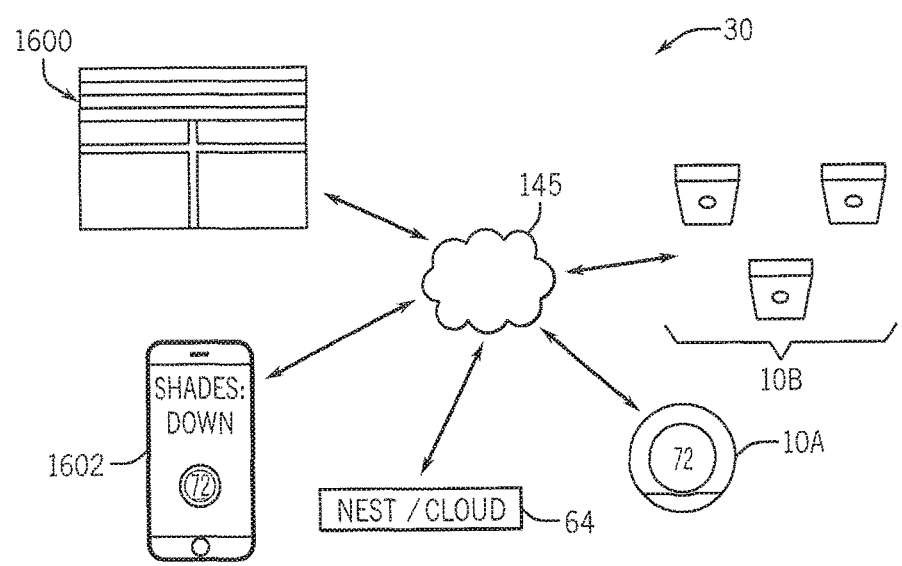
FIG. 43 is a block diagram illustrating control/reporting relating to smart shades within a smart-device enabled environment, in accordance with an embodiment.

In some embodiments, smart shade data (e.g., conditions) may be used to affect changes in a thermostat 10A or detectors 10B and/or a thermostat 10A or detectors 10B may be used to affect changes in the smart shades. FIG. 43 provides an illustration of relational control between smart shades 1600 and a smart-device enabled environment 30. The smart shades 1600 may be installed on or near windows throughout the interior of a structure, such as a home, and/or a vehicle to allow and/or block light through a window as desired. In some embodiments, the smart shades 1600 may be controlled based on data obtained via cloud services related to the smart devices 10A and 10B and the smart shades 1600 may provide information to smart devices 10A and/or 10B and/or central server or cloud-computing system 64 via cloud services 145. The smart shades 1600 may include blinds, window tinting, and the like.

In some embodiments, when the detectors 10B detect an alarm state (e.g., CO detected and/or smoke detected), the smart shades 1600 may be raised to create awareness to people external to the structure that there may be a fire in the structure and convenience for emergency services. Further, the smart shades 1600 may be used to save energy by lowering to cool the structure to offset a high ambient temperature without having to activate the HVAC or raise the temperature on the thermostat 10A.

In some embodiments, as discussed above, the smart devices 10A and/or 10B may include ambient light sensors and temperature sensors. The sensors may be used to determine whether the smart devices are in direct sunlight (e.g., whether the sunlight is warming up a room or not). If the smart devices 10A and 10B determine that they are in direct sunlight, they can contact the smart shades 1600 and instruct the smart shades 1600 to remove the sunlight by lowering rather than activating the HVAC. The smart shades 1600 may be separately controlled. That is, some but not all of the smart shades 1600 may be raised and lowered in coordination with the smart devices 10A and 10B as desired to help provide a desired temperature. Further, the user may control the smart shades 1600 and/or the thermostat 10A from an app on a mobile device 1602.

Further, in some embodiments, when the smart devices 10A and 10B enter the "AWAY" mode or "AUTO-AWAY" mode, the smart shades 1600 may lower. Also, when the smart devices 10A and 10B enter the "HOME" mode, the smart shades 1600 may rise. Also, during a Rush Hour Rewards event, the smart shades 1600 may be lowered.

Doorbell Integration

In some embodiments, doorbell data (e.g., conditions) may be used to affect changes in a thermostat 10A or detectors 10B and/or a thermostat 10A or detectors 10B may be used to affect changes in the doorbells. As illustrated in FIG. 2, the doorbells 52 may be installed on or near doors that function as gateways to a structure, such as a home (e.g. a smart environment 10D). In some embodiments, the doorbells 52 may be controlled based on data obtained via cloud services (e.g., cloud services 145) related to the smart devices 10A-C and the doorbells 52 may provide information to smart devices 10A-C and/or central server or cloud-computing system 64 via the cloud services 145.

In some embodiments, the doorbell 52*s* may include light-emitting diodes (LED) that flash certain colors based on various conditions of the smart devices 10A-C. For example, when the hazard detectors 10B are in an alarm state due to a hazardous condition detected and/or intrusion detection or other alarms are provided by an alarm system, the LED's may flash a certain color (e.g., red). This may enable the user to determine that there is a hazard detected prior to entering the home. In some embodiments, the LED's may flash the same color as the detectors 10B during the alarm state. That is, the LED's may replicate the alarm state.

In certain embodiments, the doorbell 52 may use the LED's to provide an indication that a previous hazard or alarm (e.g., from the hazard detector 10B and/or an alarm system) was detected since someone has occupied the environment. That is, the LED's may be used to provide a history of events that occurred on the hazard detector 10B while the person was away. For example, in one embodiment, if a hazard condition is detected when the occupancy status is set to "AWAY", the doorbells may flash a certain other color (e.g., yellow). In some embodiments, when the occupancy status is subsequently set to "HOME" (or otherwise indicates that occupants are present), this indicator may subside. Further, when the doorbell 52 is pushed, a video camera 72 proximate the door or within the doorbell or lock itself may be turned on and a picture may be taken.

In certain embodiments, the doorbell 52 may use the LED's to provide a warning indication regarding smart devices 10A, 10B, 10C. For example, in one embodiment, if a warning condition is detected (e.g., an appliance (e.g., an oven) is on when the occupancy status is set to "AWAY"), then the doorbells may flash a certain other color (e.g., green).

In some embodiments, when the doorbell 52 is pushed, an occupancy simulation may be triggered with various smart devices 10C to simulate that the home owner is at home. For example, smart shades may move slightly, music may be turned on, lights may be turned on, a television may be turned on, or the like. In this way, a potential burglar may be deterred by the home occupancy simulation. As mentioned herein, the simulation actions may be implemented on a time delay. For example, upon the doorbell 52 being pushed, the actions may be implemented on a random delay within a particular range of time (e.g., 30 seconds to 1 minute) or at a set delayed time (e.g., 30 seconds for lights, one minute for the music, etc.).

Sprinkler Integration

Figure 44:
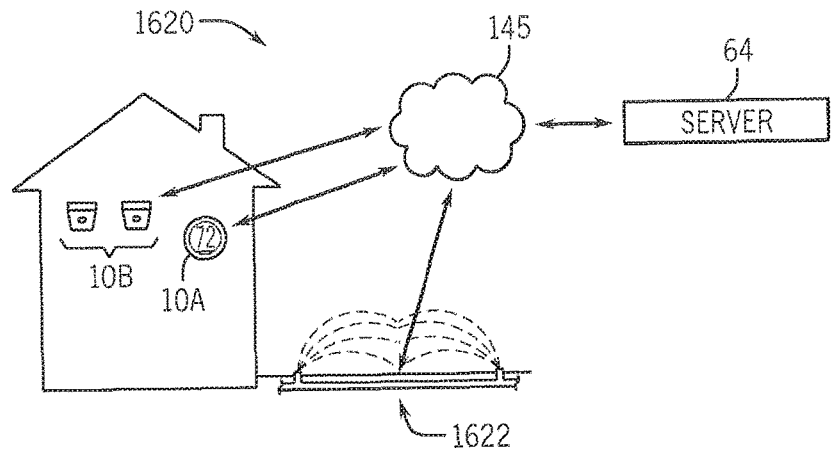
FIG. 44 is a block diagram illustrating a system including relational control/reporting of smart sprinklers, in accordance with an embodiment.

In some embodiments, smart sprinkler data (e.g., conditions) may be used to affect changes in a thermostat 10A, detectors 10B, and/or other smart devices 10C and/or a thermostat 10A, detectors 10B, and/or other smart devices 10C may be used to affect changes in the smart sprinklers. FIG. 44 provides an illustration of a system 1620 including relational control between smart sprinklers 1622. The smart sprinklers 1622 may be installed in a yard surrounding a structure, such as a home. In some embodiments, the smart sprinklers 1622 may be controlled based on data obtained via cloud services 145 related to the smart devices 10A and 10B and the smart sprinklers 1622 may provide information to smart devices 10A and/or 10B and/or central server or cloud-computing system 64 via cloud services 145.

The smart sprinklers 1622 may include wireless communication circuitry to communicate with the smart devices 10A and 10B. In some embodiments, when the detectors 10B are in an alarm state (e.g., smoke detected) for a configurable amount of time, the smart sprinklers 1622 may be activated to provide water to the yard surrounding the house to cool the property during a fire. Further, the smart sprinklers 1622 may provide water usage data to the central server 64, which may be used for reporting or in any suitable manner.

Additionally, the smart sprinklers 1622 may be synchronized with a security system of the environment 30. For example, if a break-in is detected (e.g., window broken) or the security alarm is tripped for some reason, the smart sprinklers 1622 may activate to deter burglar from running away or provide a visual cue to draw attention to the building so others look in the direction of the building. In this way, the onlookers may notice that the alarm is going on in the house or unusual activity is occurring and alert the authorities.

Garage Door Openers

Figure 45:
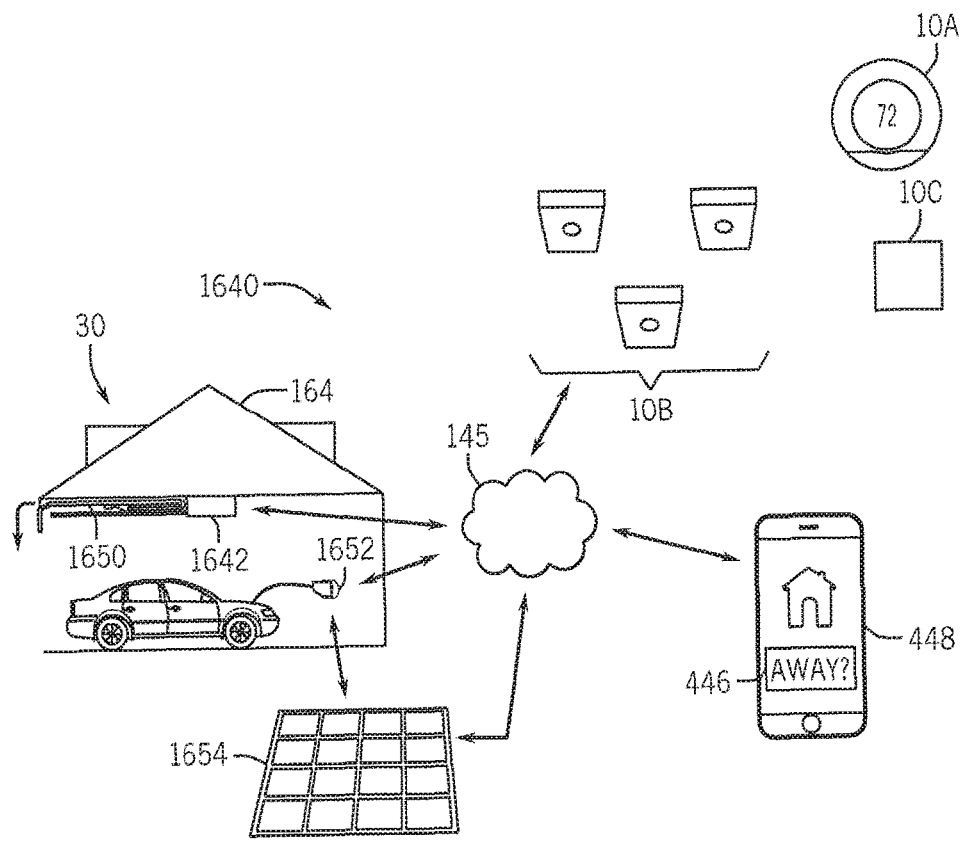
FIG. 45 is a block diagram of garage interactions with a thermostat, smoke/carbon monoxide detector, and/or other smart devices, in accordance with an embodiment.

In some embodiments, a garage door opener may be used as either a condition for a thermostat 10A, detector 10B, and/or other device 10C control and/or a thermostat 10A, detector 10B, and/or other device 10C condition may be used for a garage door opener control. FIG. 45 provides a system 1640 that integrates a garage door opener 1642 with smart devices 10A and/or 10B.

In the provided embodiment, the garage door opener 1642 status may indicate that someone is arriving and/or leaving the environment 30 (e.g., via the garage 1644). Accordingly, a prompt 1646 may be provided on a user's device 1648 (e.g., smart phone) prompting to change the mode of the thermostat 10A (e.g., from "HOME" to "AWAY" or vice versa). Alternatively, the thermostat 10A may be set to "HOME" or "AWAY" automatically without prompting a user.

Further, in cases where a user inadvertently leaves the garage door 1650 open, data (e.g., conditions) of the thermostat 10A, detector 10B, and/or other devices 10C may be used to trigger closure of the door 1650. For example, a conditional rule might trigger closure of the door 1650 on the thermostat being "AWAY" for 30 minutes or longer. Thus, the door 1650 may be closed, adding household security. Any "AWAY" mode duration may be used to trigger the closure. For example, the duration could be 10 minutes, 30 minutes, 1 hour, 2 hours, etc.).

In some embodiments, the thermostat 10A may use the garage door 1650 to add ventilation to the environment 30. In one embodiment automatic garage ventilation may occur for weather related events. For example, the thermostat 10A may determine that the current weather conditions are particularly hot and/or cold. The thermostat 10A determination may be used to automatically control the garage door opener 1642 to either fully or partially open and/or close the garage door 1650. This action may result in more efficient ventilation of the environment 30.

Additionally and/or alternatively smoke and/or carbon monoxide events may also result in automatic ventilation via the garage. For example, when the detector 10B detects smoke and/or carbon monoxide, the system may provide a control command to the garage door opener 1642 to open/close the garage door 1650, allowing for proper ventilation of smoke and/or carbon dioxide. For example, in some embodiments where carbon monoxide is detected, the garage door opener 1642 may be controlled to open the garage door 1650 to allow the carbon monoxide to escape. When smoke is detected, the opener 1642 may be controlled to close in an attempt to reduce oxygen from a potential fire.

In some embodiments, data from the garage door 1650 may be used to control the thermostat 10A, the detector 10B, and/or other devices 10C. For example, the garage door opener 1642 may be equipped to detect when a garage door 1650 is forced open as opposed to voluntarily opened. Upon detection of a forced opening or opening during an unexpected time (e.g., during work hours), the system may trigger events in the environment 30. For example, a camera 72 in the garage may be activated to record activities occurring in the garage. Additionally and/or alternatively, alarms may be triggered (e.g., via the speakers of the detector 10B, etc.). However, in some embodiments, upon detection that an occupant of the smart environment 10D opened the garage door 1650, the cameras may be deactivated. In some embodiments, when the garage door is opened or closed, the camera 72 may be configured to take a picture of the area proximate to the garage door and send it to a smartphone or the like of the user. In certain embodiments, when the picture is taken, the picture and/or a link to the picture may be provided in an application associated with the garage door opener 1642. When such an embodiment is used, motion event notifications from the camera 72 situated near the garage may be deactivated, such that the garage door opener 1642 controls events related to the garage door 1650, as the garage door opener 1642 may be able to provide more relevant notifications, while motion events from the camera 72 may inundate a user with less relevant notifications.

Electric Vehicle Chargers

In some embodiments, the garage 1644 (or other location within the environment 30, a parking lot and/or garage, or elsewhere) may be equipped with an electric vehicle charger 1652. Data from the charger 1652 (e.g., energy usage data) may be used in reporting and/or control from elsewhere in the environment 30. Further, conditions from the environment 30 (e.g., data from the thermostat 10A. detector 10B, or other devices 10C) may be used to control the charger 1652.

In one embodiment, when smoke and/or carbon monoxide are detected (e.g., via the detector 10B), a control signal may be sent to the electric vehicle charger 1652 to deactivate charging. This may, in some cases, provide additional security in the case of a fire or other emergency event.

The charger 1652 may serve multiple purposes. For example, while the charger 1652 may be used to provide power to a vehicle, the charger 1652 may also be used to provide power to electronic devices within a smart device environment. In embodiments where the environment is equipped with energy savings programs (e.g., discounted energy pricing when usage occurs at off-peak times), the environment may provide energy saving operation commands to the charger 1652. For example, the charger 1652 may pull large amounts of energy. Thus, it may be more cost efficient to charge devices at off-peak times (e.g., when discounted energy is available). Thus, via the APIs 90, the system may disable charging during peak times and enable charging during the off-peak time periods. In some embodiments, the user may be presented options to delay charging during Rush Hour Rewards (e.g., peak times where energy may be conserved to save money). In addition, based on previous times that the driver has left in the vehicle, a schedule of the user may be learned by the electric vehicle charger, the one or more smart devices 10A or 10B, the cloud server 64, the services 145, or the like so that control signals may be sent to the vehicle to precondition the vehicle for the driver before entering the vehicle.

Further, in some embodiments, the charger 1652 may be coupled with a power generation source 1654, such as a solar power generator. In some embodiments, the power generation source 1654 may provide power during the peak times and use grid charging during off-peak times. In some embodiments, the power generation source 1654 may be used whenever the power generation source 1654 is able to generate sufficient power for the charger 1652.

However, when the power generation source 1654 is unable to generate power, such as when the power generation source 1654 is a solar power source and there is limited sunlight, smart devices, such as the thermostat 10A and/or other devices 10C may be controlled to enter a low power, mode, because the power generation source 1654 is unable to generate sufficient power for the charger 1652. As mentioned above, depending on the configuration, the power generation source 1654 may be used during peak grid demand and/or during off-peak grid demand periods. Accordingly, such control of the smart devices 10A and/or 10C to enter low-power mode may occur during the peak grid demand periods and/or during the off-peak grid demand periods, depending on the configuration. Further, in some embodiments, forward-prediction may be used to control the smart devices 10A and/or 10C to enter low power mode. For example, when the charger 1652 has sufficient power to provision power to electronic devices of the environment, but it is likely that a vehicle may need to be charged later in the day and subsequent power generation will likely not be feasible (e.g., because there is limited sunlight), the electronic devices (e.g., thermostat 10A and/or other smart devices 10C) may be controlled to enter low power mode, such that the power may be preserved for subsequent vehicle charging.

Further, the charger 1652 and/or the power generation source 1654 may be used to provide power to the electronic devices in a smart home environment 30 based on the occupancy state of the smart devices 10A, 10B, and/or 10C. For example, the charger 1652 and/or the power generation source 1654 may provide power to the electronic devices when the occupancy status is set to "HOME" or "AWAY," depending on user preferences. In addition, the charger 1652 and/or the power generation source 1654 may provide power to the electronic devices in the smart home environment 30 during disaster recovery events based on occupancy state. For example, if a tornado is present in an area including the smart devices 10A, 10B, and/or 10C and the occupancy state is set to "HOME," the charger 1652 and/or the power generation source 1654 may provide power to the electronic devices because grid power may have been interrupted by the tornado.

Lighting and Electrical Integration

Figure 46:
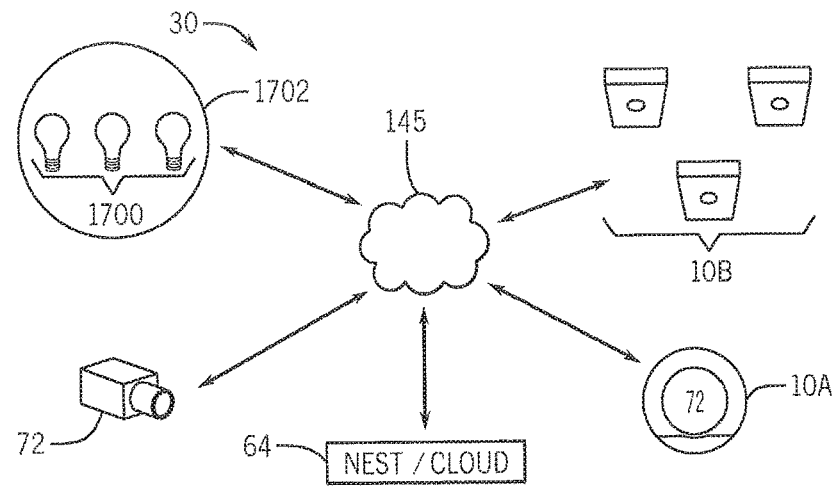
FIGS. 46 and 47 are block diagrams illustrating control/reporting relating to smart lighting and/or electrical systems within a smart-device enabled environment, in accordance with an embodiment.
Figure 47:
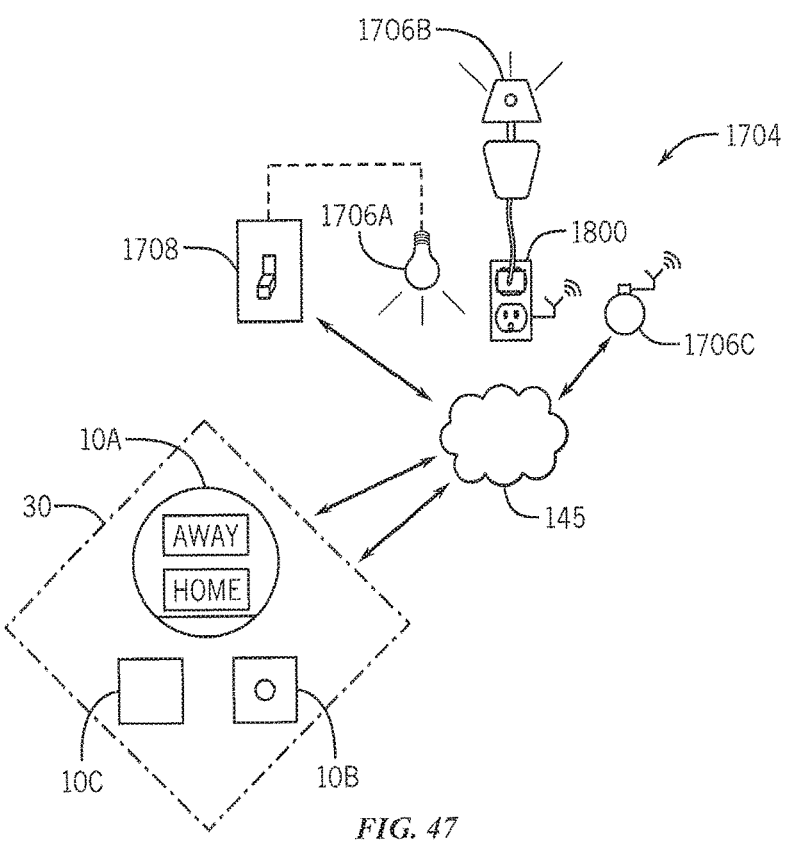

In some embodiments, smart light data (e.g., conditions) may be used to affect changes in a thermostat 10A or detectors 10B and/or a thermostat 10A or detectors 10B may be used to affect changes in the smart lights. FIG. 46 provides an illustration of relational control between smart lights 1700 and a smart-device enabled environment 30. The smart lights 1700 may be disposed throughout the interior and/or exterior of a structure, such as a home.

As previously discussed, in some embodiments, the smart lights 1700 may be controlled based upon other device data obtained via cloud services 145. As used herein, the smart lights (e.g., smart lights 1700) may refer to smart bulbs, smart plugs with attached lights, smart light switches, etc.). The lights may have access to Rush Hour Rewards information obtained by the smart devices 10A and 10B and may blink the lights a desired color (e.g., green) at the beginning of a peak period and another color (e.g., orange) at the end of the of the peak period. Also, the smart lights 1700 may check on the Rush Hour Rewards peak period start/end time and dim the lights by a user-specified percentage during the peak period. In some embodiments, the smart lights 1700 may automatically determine the percentage to dim (e.g., a default percentage) based on efficiency and power saving information obtained via cloud services 145 without user input. Additionally, the lights 1700 may automatically turn off during a Rush Hour Rewards peak period.

In some embodiments, when the detectors 10B are in an alarm state (e.g. CO detected, smoke detected, or both), the smart lights 1700 may be automatically controlled. For example, the smart lights 1700 may flash a desired color (e.g., red) for a configurable amount of time (e.g., 4-5 seconds). That is, when the detectors 10B detect an emergency, the lights may flash red and white for a number of cycles (e.g., 20). After the flashing cycles are complete, the smart lights 1700 may turn to full brightness warm white to light the house and assist with exiting. In some embodiments, when the detectors 10B are in an alarm state, the smart lights 1700 may change color to red and remain red until the alarm is no longer set. In additional embodiments, when the detectors 10B are in an alarm state, the smart lights 1700 may turn on and off to create strobe lighting. Also, the smart lights 1700 may light the path to the exit in the home based on the room in which the user is detected. In some embodiments, the lights 1700 may enable providing a smart exit path that does not necessarily lead to the front door, but is based on sensor determinations within the smart home environment 30. For example, if the front door is blocked by an obstruction, but sensors determine that a path to a window on the first floor is unobstructed, the lights may guide a path to that window.

As mentioned above, in some embodiments, the smart lights 1700 may be used for added security measures. For example, the smart lights 1700 may check the away status of the smart devices 10A and 10B and, when the status is in "AWAY" mode, the smart lights 1700 may randomly turn on and off throughout the house to simulate that someone is home. Further, when the smart devices 10A and 10B go into "AWAY" mode, the smart lights 1700 may automatically dim to a certain percentage (e.g., 5%, 10%, 15%, 20%, etc.) of brightness. In some embodiments, when the smart devices 10A and/or 10B enter the "AWAY" mode or "AUTO-AWAY" mode, the smart lights 1700 may automatically turn off. Further, when the smart devices 10A and/or 10B enter "HOME" mode, the smart lights 1700 may automatically turn on.

Further, in some embodiments, the camera 72 may detect motion (e.g., inside or outside of an environment 30). The motion event may be provided to the cloud services 145, which may result in control of the smart lights 1700. For example, the smart lights 1700 may instantly activate after detection of the motion. However, in some embodiments, to more realistically simulate occupancy of the environment 30, the lights 1700 may be activated after a certain period of time (e.g., 5 seconds, a random time period in a certain range of time (e.g., between 3 seconds and 1 minute, etc.).

In some embodiments, the smart lights 1700 may illuminate to full power, may flash, etc. inside and/or outside an environment 30, upon detection of unauthorized occupancy of the environment 30. This may bring attention to the environment 30, which may discourage continued unauthorized occupancy of the environment 30. Further, audio may be played from smart speakers, such as warning indications, dog barks, or other unauthorized occupancy deterrents.

Additionally, in some embodiments, the electricity used by the smart lights 1700 may be sent to the central server or a cloud-computing system 64 via cloud services 145. The electricity information may be used for reporting or for making operational decisions. For example, smart lights 1700 that require more electricity may be used less often if the user directs the smart devices 10A and 10B to operate in more efficient modes.

Further, the smart lights 1700 and the thermostat 10A may coordinate control to produce a "scene". For example, a scene may be configured for a romantic dinner where the lights are dimmed to a certain percentage and the thermostat 10A is set to a certain desirable temperature to enhance the mood during the dinner. In some embodiments, the smart lights 1700 may be dimmed or brightened for certain temperatures to enhance the feeling of being cooler/warmer. This may enable the user to save money on energy while keeping the user comfortable.

In some embodiments, the smart lights 1700 may create a boundary (e.g. geo-fence) 1702 that may be used to control the away state of the smart devices 10A and 10B. For example, when the user enters geo-fence 1702 of the smart lights 1700 (e.g., mobile device enters the geo-fence 1702), the smart devices 10A and 10B may be set to "HOME" mode. Likewise, when the user leaves the geo-fence 1702, the smart devices may be set to "AWAY" mode.

Further, in some embodiments the smart lights 1700 may be used to detect occupancy in the rooms of a structure using sensors. Room profiles may be maintained for each room, such as "warmer than average", "average", and "cooler than average". Based on motion signals sent from the smart lights 1700 and the room profile for the particular room in which motion is detected, the thermostat 10A may adjust the temperature warmer/cooler. In addition, the smart lights 1700 may detect that no occupancy has been detected in the structure for a configurable amount of time (e.g., 15, 20, 25, 30 minutes) and a notification can be sent to an application tailored for the smart lights 1700 installed on the user's mobile device asking how long to suspend cooling or heating while the user is away. For example, although the thermostat 10A may have learned to keep the heat on during the daytime hours on the weekend, the smart lights 1700 may detect the user is not home for 30 minutes if the user ran out to grab lunch and can prompt the user to stop heating the house (e.g., deactivate HVAC). Fine tuning of the thermostat 10A control for just a few hours each day may save energy consumption.

Also, in some embodiments, day/night schedules maintained for the thermostat 10A and the smart lights 1700 settings may be enhanced. For example, the smart lights 1700 may be used to emit color temperature. That is, some colors may enhance cool temperatures, such as soft whites, whereas other colors emitted may enhance warm temperatures, such as warm yellow tones. The smart lights 1700 may adjust the light color emitted based on the temperature setpoint of the thermostat 10A throughout the day/night schedules. Thus, the color temperature of the smart lights 1700 may be tied to the HVAC operating mode (e.g., cooling, heating, "HOME", "AWAY", etc.) and/or the ambient target temperature of the thermostat 10A.

In some embodiments, the video camera 72 data (e.g., conditions) may be used to produce smart light 1700 outputs and smart light 1700 conditions may be used to produce video camera 72 outputs. For example, the smart lights 1700 may increase brightness when motion is detected or seen near the video camera 72. In some instances, when motion is detected by the smart lights 1700 may cause the smart devices 10A or 10B to enter a "HOME" mode. Also, the smart lights 1700 brightness in a room may increase when the video camera 72 is activated. Additionally, when a smart light 1700 detects a disturbance (e.g., when a light is broken), the video camera 72 may focus on the area where the smart light 1700 was disturbed to try to capture what caused the disturbance. In some embodiments, the video camera 72 focus may be adjusted based on the smart lights 1700 setting (e.g., brightness, color, etc.).

If there are multiple users (e.g., family) living in a home, profiles may be maintained for each user. The profiles may include each user's preferences for lighting, temperature, security, and/or other smart device settings at certain times of the day and night. For example, a light profile for a particular user may indicate that the user prefers the lights dimmed as the user prepares for bed at a certain time of the night (e.g., 9 PM) and the thermostat 10A set to a particular temperature. When the smart lights 1700 and/or smart devices 10A and/or 10B detect that particular user to be home, that particular user's profile may be applied to control the smart lights 1700 and/or smart devices 10A and/or 10B. That is, the smart devices in the smart environment 30 may detect specific users based on beacons (Bluetooth, ZigBee, etc.) emitted from the user's mobile device(s), wearables, and the like, to receivers (smart lights 1700, smart plugs, smart switches, smart devices 10A and/or 10B, etc.). The beacons may include a signature specific to the user, which may be used to determine that the user is present. Additionally or alternatively, sound signatures for each user may be obtained and used to determine that the user is present. For example, each user may emit unique sounds, such as breathing patterns, footsteps (heavy or light steps), talking, coughing, laughing, and so forth that may be used to determine who is present in the home and apply that user's profile to control the smart devices.

In some embodiments, certain user's profiles may take priority over other users when multiple users are present in the home. For example, the mother or father's user profile may trump the children's, or vice versa, when determining which profile to apply. Also, when the users are in different rooms, the smart devices may detect which user is in which room and control the temperature, lighting, and so forth, for that particular user in that particular room. Thus, using the described techniques may enhance the HVAC zoning by cooling and/or warming particular rooms when occupancy is detected in that room while deactivating or operating the HVAC system more efficiently when the user is not present in other rooms. As may be appreciated, this may enable granular control for a conscientious home.

The smart lights 1700 may track the lighting over the course of a number of days and nights to determine a user's lighting schedule. When the user sets the smart devices 10A and/or 10B to "AWAY" mode or the smart devices 10A and/or 10B enter "AUTO-AWAY", the lighting schedules may be applied to create the appearance that the user is at home. This may be beneficial when the user goes on vacation or a business trip and is away from the home for numerous days (e.g., akin to a vacation mode). As mentioned above, random lighting may be used by the smart lights 1700 when the smart devices 10A and/or 10B enter "AWAY" mode.

FIG. 27 illustrates embodiments of lighting and electrical interaction with a smart environment 30. Smart lighting may be controlled by many mechanisms. For example, as illustrated, lightbulbs 1706A-C are controlled via different mechanisms. Lightbulb 10A is controlled by a smart electrical switch 1708. Lightbulb 10B is controlled by a smart electrical plug and/or electrical plug adapter 1800. Lightbulb 10C is a smart-bulb having its own control circuitry. Lightbulbs may be controlled by other mechanisms as well.

The lightbulbs 1706A-C may interact with other devices (e.g., the thermostat 10A, detector 10B, and/or other devices 10C) of the environment 30 (e.g., via cloud 145 communications). Certain user-defined lightbulbs 1706A-C may be turned on and/or off based upon the occupancy mode of a thermostat 10A. For example, certain lightbulbs 1706A-C may be turned on and/or off (e.g., via the switch 1708, the plug 1800, or independently) when the thermostat 10A enters an away mode. Further, certain lightbulbs 1706A-C may be turned on and/or off (e.g., via the switch 1708, the plug 1800, or independently) when the thermostat 10A enters a home mode.

When an alarm is triggered (e.g., via a detector 10B) the lightbulbs 1706A-C may be turned on to secure a safe pathway out of the environment 30. The lightbulbs 1706A-C may be controlled to flash when an alarm sounds (e.g., from the detector 10B), which may provide increased alarm visibility. In addition, external lights, such as pool lights, outdoor lights, etc. may be activated (e.g., flashed, solidly lit, randomly lit). Also, during an alarm, the lights may be activated at colors corresponding to different states (e.g., yellow for warning state, red for alarm state, green for all-clear state).

In embodiments where the environment 30 is equipped with energy savings programs (e.g., discounted energy pricing when usage occurs at off-peak times), the lightbulbs 1706A-C, switches 1708, and/or plugs 1800 may be controlled to limit energy consumption during peak (e.g., more expensive) energy periods.

Energy consumption statistics for these devices may be provided via the cloud 145 to the environment 30 for reporting. If consumption reaches a threshold consumption amount defined at the system (e.g., by a user), the devices may be turned off and/or run at lower energy levels.

In some embodiments, the lightbulbs 1706A-C, the smart switch 1708, and/or the plug 1800 may provide conditional data useful in the control of smart devices (e.g., the thermostat 10A, the detector 10B, and/or other device 10C) of the smart environment 30.

For example, when lightbulbs 1706A-C, switches 1708, and/or plugs 1800 are activated, occupancy is likely (unless the activation is based upon system control). Accordingly, data indicating manual activation of these devices may be used to impact the occupancy status of the environment 30. As mentioned herein, the occupancy status may be used to change a mode of the thermostat 10A from "AWAY" to "HOME." Further, during a time when occupancy is unexpected, an indication of unexpected occupancy may be sent to an occupant (e.g., at their smart phone, tablet, etc.). Additionally and/or alternatively, an input may be provided to an alarm system of the environment 30 indicating the occupancy and/or an alarm may be triggered (e.g., by the detector 10B and/or other devices 10C). In some embodiments, when occupancy is not expected but occupancy is detected, the lighting may be activated to focus on the areas where occupancy is detected (e.g., to try to put a spotlight on an intruder in the environment).

Smart Plug Integration

Figure 48:
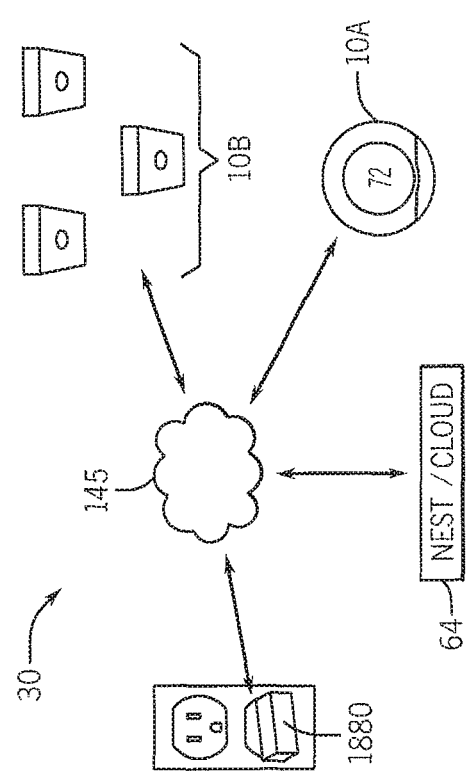
FIG. 48 is a block diagram illustrating control/reporting relating to smart plugs 680 and smart devices in a smart environment, in accordance with an embodiment.

In some embodiments, smart plug data (e.g., conditions) may be used to affect changes in a thermostat 10A or detectors 10B and/or a thermostat 10A or detectors 10B may be used to affect changes in the smart plugs. FIG. 48 provides an illustration of relational control/reporting between smart plugs 1850 and smart devices 10A and/or 10B in a smart environment 30. The smart plugs 1850 may be plugged into electrical sockets throughout a home and use be capable of wireless communication (e.g., using Bluetooth low energy). In some embodiments, the smart plugs 1850 may provide information to smart devices 10A and/or 10B and/or central server or cloud-computing system 64 via cloud services 145. For example, energy usage may be tracked by the smart plugs 1850 and sent to the smart devices 10A, 10B, and/or 10C to be aggregated into a report which may be sent to a user or other entity.

In some embodiments, the smart plugs 1850 may use one or more sensors (e.g., infrared) to detect occupancy. The occupancy information obtained from the smart plugs 1850 may be sent to the smart devices 10A/10B and/or central server 64. The smart devices 10A and/or 10B may enter the "HOME" mode or the "AWAY" mode based on the occupancy information detected by the smart plugs 1850. Further, the smart plugs 1850 may detect which user is present in the structure and the temperature may be set by the thermostat 10A based on the particular user's preferences.

When the detectors 10B enter an alarm state (e.g., detect smoke and/or CO), the smart plugs 1850 may deactivate any appliances or electronic devices connected to the smart plugs 1850 and/or turn on all lights connected to the smart plugs 1850. In some embodiments, the smart plugs 1850 may include certain lights or light-emitting-diodes that turn a color when the detectors 10B are in an alarm state. Further, in some embodiments, the lights of the smart plugs 1850 may be controlled automatically based on the occupancy status of the smart devices 10A and/or 10B (e.g., turn on the lights when "HOME"). In another embodiment, a smart nightlight may also change colors based on the alarm state 10B of the detectors 10B. In some embodiments, the light of the plugs and/or nightlight may turn on or off based on the alarm state of the detectors 10B. The smart plugs 1850 may perform dimming depending on the alarm state of the detectors 10B.

During a Rush Hour Rewards event, the smart plugs 1850 may deactivate all heavy load appliances. The smart plugs 1850 may send energy usage information to the smart devices 10A/10B and/or the central server 64 via cloud services 145. Further, information regarding the smart devices 10A/10B (e.g., temperature setpoint, operating mode (cooling, heating, "HOME", "AWAY", etc.), alarm state, etc.) may be displayed in an app tailored for the smart plugs 1850 on a mobile device and/or computer.

In some embodiments, a user profile may be generated based on data from the smart plugs 1850 indicating the user's preferences for the states of various devices plugged into the smart plugs 1850 at various times. Facial recognition, audio signature recognition, or the like may be used by the smart plugs 1850 to detect a particular user in a room and the user's profile may be applied to control the devices plugged into the smart plugs 1850 and/or to control the temperature setpoint of the device 10A.

Lock and Key Integration

Figure 49:
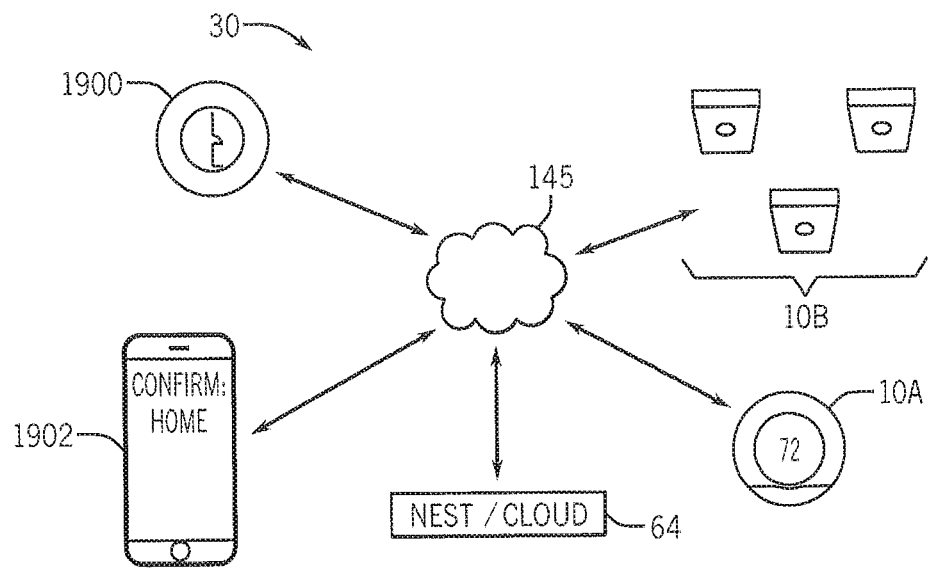
FIG. 49 is a block diagram illustrating control/reporting relating to a smart key system in the smart environment, in accordance with an embodiment.

In some embodiments, smart key system data (e.g., conditions) may be used to affect changes in a thermostat 10A or detectors 10B and/or a thermostat 10A or detectors 10B may be used to affect changes in the smart key system. FIG. 49 provides an illustration of control/reporting relating to a smart key system 1900 in the smart environment 30. The smart key system 1900 may be installed on one or more doors of a structure, such as a home. In some embodiments, the smart key system 1900 may be controlled based on data obtained via cloud services 145 related to the smart devices 10A and 10B and the smart key system 1900 may provide information to smart devices 10A and/or 10B and/or central server or cloud-computing system 64 via cloud services 145.

The smart key system 1900 may be operated (e.g., locked and/or unlocked) based on wireless signals received from a mobile device 1902 over a wireless communication protocol (e.g., Bluetooth low energy (BLE), ZigBee, Wi-Fi). For example, when the user walks up to the door including the smart key system 1900, the smart key system 1900 may detect the user's mobile device 1902 based on the wireless signal and unlock the door. Likewise, when the user's mobile device 1902 leaves a boundary surrounding the smart key system 1900 (detected based on the wireless signals), the smart key system 1900 may lock. In this way, a "geo fence" may be used to enable locking and unlocking the smart key system 1900 when the user leaves the geo fence and/or when the user enters the geo fence. The detection of the user's mobile device 1902, wearable, or electronic device capable of emitting a wireless signal, may be sent to the smart devices 10A and/or 10B and/or the central server 64 to aid in setting the home/away modes. For example, when the user enters the home by unlocking the smart key system 1900, the smart devices 10A and/or 10B may enter the "HOME" mode and when the user exits the home by locking the smart key system 1900, the smart devices 10A and/or 10B may enter the "AWAY" mode.

The wireless signals (BLE) may be used to personalize the user's settings for the thermostat 10A. For example, upon the smart key system 1900 detecting the user entering the structure, the thermostat 10A may set the temperature to the user's preferred temperature. If multiple users enter the structure, the temperature may be set to the user with the highest priority (e.g., mother, father, grandparent, etc.). In addition, when the smart key system 1900 detects the user's mobile device 1902, wearable, or the like, a notification may be sent to the mobile device 1902 for the user to confirm whether the user is home. This may set the smart devices 10A and/or 10B to the "HOME" mode and cause the user's preferred temperature to be set. Likewise, when the smart key system 1900 detects that the user's mobile device 1902 has exited and locks, a notification may be sent to the mobile device 1902 for the user to confirm that the user is away.

The smart key system 1900 may include firmware polls the network for certain information, such as new messages for the smart key system 1900 (e.g., new PIN code, an alert from another smart device on the network). When the smart devices 10A and 10B are in the "HOME" mode, the smart key system 1900 may reduce the polling frequency (e.g., instead of 4 seconds, check every 12 seconds). Likewise, when the smart devices 10A and 10B enter the "AWAY" mode, the smart key system's frequency of polling the network may be increased. Thus, in this way occupancy data obtained from the smart devices 10A and 10B may be used to control the frequency of the smart key system 1900 checking in using the network. Lowering the frequency when the user is home may save battery life of the smart key system 1900. When the smart devices 10A/10B are in the "AWAY" mode for a period of time and the smart key system 1900 has a low battery life, then a notification may be sent to the user to turn off the radio in the product (e.g., put in hibernate mode where it does not poll the network). Further, Bluetooth low energy (BLE) may be used as secondary authentication. For example, PIN-code may be entered as first authentication and BLE communication from a mobile device is second authentication where both levels of authentication are used to access the structure.

In some embodiments, tampering with the smart-key system 1900 may cause certain actions to be triggered. For example, an alarm of a security system may be activated, or the like. Moreover, it should be noted, that tampering detected by any of the smart devices 10C (e.g., garage door, window, door, doorbell, etc.) may cause any alarm of the security system to be activated. Other actions may be performed to deter a potential threat when tampering is detected, such as turning on the lights, music, or the like. That is occupancy simulation (e.g., actions that simulate that the owner is occupying the building) may occur when tampering is detected.

Figure 50:
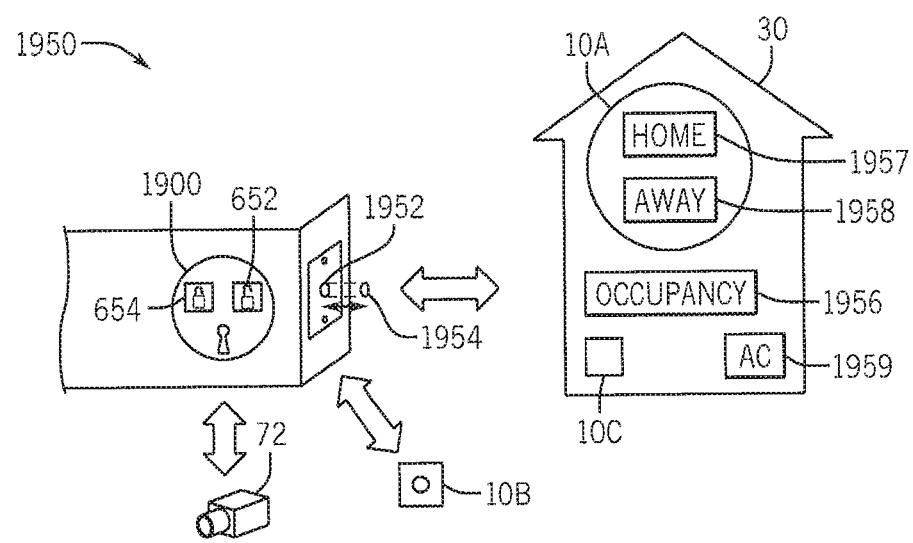
FIG. 50 is a block diagram illustrating control/reporting between relating to a smart-lock in a smart-device enabled environment, in accordance with an embodiment.

In some embodiments, a smart-lock 1900 condition may be used to affect changes in a thermostat 10A or other smart device and/or a thermostat 10A or other smart device condition may be used to affect changes in the smart-lock 1900. FIG. 50 provides an illustration of a system 1950 relational control/reporting between a smart-lock 1900 and a smart-device enabled environment 30.

As may be appreciated, accessing a smart-lock 1900 may be nearly the first interaction an occupant has with the environment 30 when entering the environment 30. Further, the occupant's interaction with the smart-lock 1900 may be nearly the last smart-device interaction with the environment 30 when leaving the environment 30. Accordingly, smart-lock 1900 status indicators may be desirable for use in determining environment 30 occupancy status 1956.

In some embodiments, environment occupancy detection may be improved using status indications from the smart-lock 1900. For example, when the smart-lock 1900 is in an unlocked state 1952, it may be more likely that someone is occupying the environment. When the smart-lock 1900 is in a locked state 1954, it may be more likely that no one is occupying the environment 30 than when in the unlocked state 1952. This may result in quicker and/or more accurate control of smart-devices based upon the occupancy status 1956.

Upon the smart-lock transitioning from a locked state 1954 to an unlocked state 1952, it may be likely that an occupant is returning to the environment 30. Accordingly, this state transition may be used to modify the occupancy state 1956 of the environment 30. For example, when the state transition occurs and the camera 72 or other data-collecting device captures data indicative of occupancy within the environment 30, the occupancy status 1956 may be updated.

However, indications discernable from the smart-lock 1900 status indicators may vary depending on occupant practices. In some embodiments, it may be desirable to combine other sensor information with a lock state transition to discern occupancy. For example, some occupants may lock the smart-lock 1900 upon entering an environment 30. Accordingly, merely relying on a status transition may not be appropriate in some scenarios.

In some embodiments, these states and/or state transitions may be used with other sensor information, e.g., occupancy-relevant information from a camera 72, a thermostat 10A, a detector 10B, and/or other devices 10C. For example, a camera 72 or other data-collection device may be used to capture data that indicates someone is leaving the environment 30. This indication, when followed by a transition from an unlocked state 1952 to a locked state 1954, may indicate that occupants have left the environment 30. Accordingly, an occupancy status 1956 of the environment 30 may be adjusted more quickly and/or accurately. Further, when captured data indicates someone is entering and/or occupying the environment 30 and the state changes from a locked state 1954 to unlocked state 1952, the occupancy status 1956 may be updated.

The environment 30 occupancy status 1956 may be used for example, to transition a thermostat 10A that is in "Home" mode 1957 more accurately and/or quickly to an "Away" mode 1958. In some embodiments, upon detecting the departure of the occupants and/or arrival of occupants, a user may be prompted more quickly and/or accurately to transition to the "Away" mode and/or "Home" mode, respectively (e.g., on their smart-phone).

The environment 30 occupancy status 1956 may also be used for other types of device control. For example, when no one is occupying the environment 30, lights may be controlled to turn off and/or on for security purposes and/or turn on periodically to give the impression that there are occupants in the environment 30. Further, in some embodiments, when occupancy status 1956 indicates there are no occupants, cameras 72 may activate, providing increased security while the environment 30 is unoccupied.

In some embodiments, smart-lock 1900 may be controlled based upon data from other devices (e.g., thermostat 10A, detector 10B, and/or other devices 10C). For example, when the detector 10B detects smoke (e.g., from a fire) and/or carbon monoxide, the smart-lock 1900 may be automatically transitioned from a locked state 1954 to an unlocked state 1952, enabling efficient emergency exit from the environment 30 and/or more efficient access by emergency response teams. In such embodiments, the transition to the unlocked state 1952 may occur after a period of un-acknowledgement of an alarm or may occur immediately upon an alarm trigger. Additionally, in some embodiments, when the alarm of the detectors 10B flash a certain color (e.g., red), then the smart-lock 1952 may transition from the locked state 1954 to the unlocked state 1952. In addition, lights or light-emitting-diodes in the smart-lock 1952 may flash the same color as the detectors 10B during the alarm state.

In some embodiments, a vacation status 1959 (e.g., indicated based upon a vacation mode set at an alarm system, a thermostat 10A, etc.) may result in varied functionality at the smart-lock 1900. For example, the vacation status 1959, when set, may indicate that there is no expected access to the environment 30 during a vacation duration. Thus, any operation of the smart-lock 1900 (e.g., transitioning from a locked state to an unlocked state) during the vacation duration may be unexpected and an alarm (e.g., at the smart-lock 1900, at the detector 10B, or other device 10C) may be triggered. In some embodiments, a user may be notified of the alarm event and/or operation of the smart-lock 1900 and may be prompted to disable the alarm.

As may be appreciated from the above discussion, a multitude of environmental appliances, fixtures, and control systems may interact with the smart devices and/or smart environments 10. The cloud services 145 provide a mechanism for facilitating such interactions.

Water Related Device Integration

Figure 62:
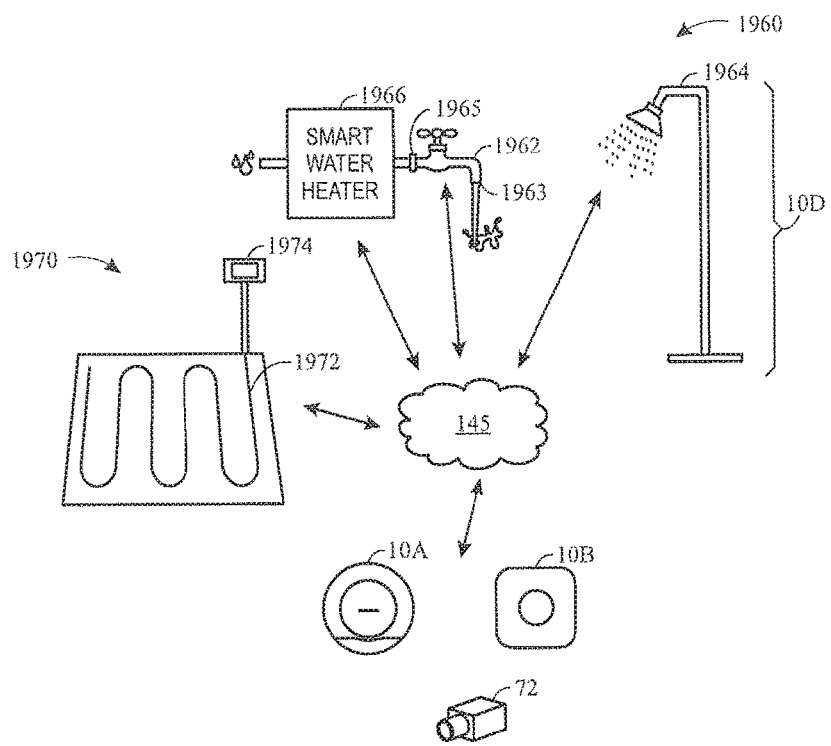
FIG. 62 is an illustration of an integration of a smart faucet, smart shower and/or water heater systems in the smart environment, in accordance with an embodiment.

In some embodiments, water related devices (e.g., smart faucet 1962, leak sensor 1963, a smart shower 1964, a shutoff valve 1965, a flow monitor, pool pumps, pool heaters, and/or water heater system 1966) data (e.g., conditions) may be used to affect changes in other smart devices (e.g., a thermostat 10A, detectors 10B, cameras 72) and/or other smart devices (e.g., a thermostat 10A, detectors 10B, cameras 72) may be used to affect changes in the water related devices. FIG. 62 provides an illustration of an integration 1960 of the smart faucet 1962, the leak sensor 1963, the smart shower 1964, the shutoff valve 1965, and/or water heater systems 1966 in the smart environment 10D. In some embodiments, the water related devices may be controlled based on data obtained via cloud services 145 related to the smart devices (e.g., thermostat 10A, hazard detector 10B, and/or camera 72). Further, the water related devices may provide information to smart devices (e.g., the thermostat 10A, the hazard detector 10B, and or camera 72. The interaction between the water related devices and the smart devices may be facilitated by the cloud services 145.

For example, in certain embodiments, upon an active alarm triggering from a hazard detector 10B or other activity (e.g., someone is at the door of the smart environment 10D), the smart shower 1964, smart faucets 1962, and/or smart water heater systems 1966 may produce a temperature change in the water (e.g., produce cold water). The temperature change may aid in notifying the occupant of the event.

For example, when an occupant is showering, this may encourage the occupant to leave the shower, which may result in the occupant becoming aware of the active alarm and/or the person at the door.

Further, when the smart faucet 1962 and/or smart shower system 1964 is equipped with LEDs or other visual indication devices, the visual indicators may activate, notifying the occupants of the active alarms. For example, the smart shower may be equipped with a color changing LED ring. Upon detection of an active alarm, the LED ring may activate with a red color, indicating an active alarm. Additionally and/or alternatively, a less invasive color (e.g., blue or green) may be activated when someone is at the door.

In some embodiments, the smart water heater 1966 may be synchronized with the occupancy status of the smart devices 10A, 10B, and 72. For example, when the occupancy status indicates that the smart devices are in an "AWAY" mode, then the smart water heater 1966 may stop heating the water to conserve energy. Likewise, when the occupancy status indicates that the smart devices are in a "HOME" mode, then the smart water heater 1966 may start heating the water so a user may obtain water relatively quickly if so desired. In some embodiments, the smart water heater 1966 may use a time-to-temperature algorithm to heat water prior to the user arrives at home using the ETA obtained via cloud services 145 related to the smart devices 10A, 10B, and/or 72.

In some embodiments, a discernment may be made as to whether hot water is being used, despite no occupancy or smart devices 10A, 10B, and/or 10C being in "AWAY" mode. For example, when in "AWAY" mode, dishwashers, washing machines, etc., may still be using hot water. Accordingly, in such scenarios, the smart water heater 1966 may remain active, until the hot water is no longer being used.

In some embodiments, during a Rush Hour Rewards event, the smart water heater 1966 may initiate an energy savings mode by deactivating the heating of water or heating the water to a lesser, more energy efficient, temperature. Further, the smart water heater 1966 may schedule when to activate and deactivate heating based upon the schedule of temperature setpoints from the thermostat 10A, whether an emergency is detected by the detector 10B (as discussed above), or the like. It should be appreciated that any of the water related devices may change flow rates during the Rush Hour Rewards event.

In some embodiments, energy usage data and/or water usage data from the smart water heater 1966 may be provided to the cloud services 145. The cloud services 145 may incorporate the energy usage into an energy usage report for the environment 30, which may report on energy usage, water usage, etc. for a variety of components in the environment (e.g., HVAC systems, faucets, etc.).

In some embodiments, the leak sensor 1963 and the shutoff valve 1965 may provide information to the smart devices 10A, 10B, and/or 72, such as whether water is leaking, how long the water has been leaking, how often the water leaks, whether the shutoff valve has been used, how often the shutoff valve has been used, and the like. The smart devices 10A, 10B, and/or 72, may aggregate the information, package the information, and send the information to insurance companies to aid the insurance companies in determining whether the environment is deserving of a discount on a premium. For example, if the water does not leak and the shutoff valve has not been used, then the insurance company may determine that the premium for an insurance plan deserves a discount.

Further, in some embodiments, the shutoff valve 1965 and the leak sensor 1963 may be synchronized with the occupancy status from the smart devices 10A, 10B, and/or 72. For example, the leak sensor 1963 and the shutoff valve 1965 may use the occupancy status of whether the smart device is operating in a "HOME" or "AWAY" mode to differentiate between an emergency state and normal activity. For example, if the smart devices are operating in the "AWAY" mode and the leak sensor 1963 and/or flow monitor detects that water is running from the faucet 1963, then the leak sensor 1963 may determine that there is an issue and notify the user or a neighbor. Additionally, if the shutoff valve 1965 is triggered when the mode of the smart devices is "AWAY," then a notification of an issue may be sent to the user or a neighbor. In some embodiments, the leak sensor

1963 may include a one-touch emergency contact functionality may be triggered when there is a leak.

In some embodiments, pool pumps and/or pool heaters may be synchronized with the occupancy status of the smart devices 10A, 10B, and/or 72. For example, the pool pump and/or pool heater may deactivate when the smart devices are in the "AWAY" mode or may activate when the smart devices are in the "HOME" mode. Additionally, when the smart devices indicate that there is a Rush Hour Rewards event, the pool pump and/or pool heater may deactivate to conserve energy and save money. In some embodiments, the pool pump and pool heater may be synchronized with the ETA setting of the smart devices. For example, when the ETA is set, the pool heater may start heating the pool water so it is at a desired temperature when the user arrives.

Floor Heater Integration

In some embodiments, smart floor heating system data (e.g., conditions) may be used to affect changes in other smart devices (e.g., a thermostat 10A, detectors 10B, cameras 72) and/or other smart devices (e.g., a thermostat 10A, detectors 10B, cameras 72) may be used to affect changes in the smart floor heating systems. FIG. 62 provides an illustration of an integration 1970 of smart floor heater (radiant floor heater) 1972 and floor heater thermostat 1974 in the smart environment 10D. In some embodiments, the smart floor heater 1972 and/or floor heater thermostat 1974 may be controlled based on data obtained via cloud services 145 related to the smart devices (e.g., thermostat 10A, hazard detector 10B, and/or camera 72). Further, smart floor heater 1972 and/or floor heater thermostat 1974 may provide information to smart devices (e.g., the thermostat 10A, the detectors 10B, and or camera 72). The interaction between the smart floor heater 1972 and/or floor heater thermostat 1974 may be facilitated by the cloud services 145.

For example, when the smart devices 10A and 10B are in the "HOME" mode, the floor heater thermostat 1974 may turn on heating of the smart floor heater 1972 and/or set the temperature of the floor heater thermostat 1974 to a user preferred temperature or a default temperature. Likewise, when the smart devices 10A and 10B enter the "AWAY" mode, the floor heater thermostat 1974 may turn off heating of the smart floor heater 1974 or reduce the temperature of the smart floor heater 1974 to a more energy efficient temperature. Thus, in this way occupancy data obtained from the smart devices 10A and 10B may be used to control the floor heater thermostat 1974 and the smart floor heater 1972.

Additionally, when the thermostat 10A is tracking predicted occupancy and/or predicted thermostat 10A settings (e.g., set points), the floor heater 1974 may be controlled in correlation with the thermostat 10A. For example, when it is predicted that an occupant likes to wake up to a relatively warmer set point than a set point prior to wake up, the floor heater may also be adjusted to turn on and/or programmed with a warmer set point based upon this prediction/scheduling of the thermostat 10A. This may be facilitated through the cloud services 145. In some embodiments, the configuration of the ambient air conditioning and the floor conditioning may be somewhat inverse. For example, in some embodiments, it may be useful to heat a floor in a cold ambient air environment. Further, it may be useful to alleviate heat in a warm ambient air environment, by reducing heat provided by the floor. Accordingly, the programming of the thermostat 10A may be used to implement such configurations in the floor heater 1972 and/or the floor heater thermostat 1974 via the cloud services 145.

In some embodiments, occupancy in particular areas of an environment may be used to control the floor heater 1972 or thermostat 1974. For example, when a camera 72, hazard detector 10B, and/or thermostat 10A detects occupancy in a particular area of the environment, floor heating in the particular area of the environment may be activated, while other floor heating in the environment that is not in the particular area is not activated.

Further, in some embodiments, data or usage of the floor heater thermostat 1974 may be provided to the smart devices (e.g., the thermostat 10A, the detectors 10B, and/or camera 72). For example, the floor heater thermostat 1974 may send information indicating that a user has manually adjusted the temperature or changed a power state of the smart floor heater 1972 to the smart devices. Such information may be used by the smart devices to adjust the mode of the smart devices (e.g., set the mode to "HOME"). Also, such information may aid the smart devices in determining exactly where in the home the user is located. Thus, precision and granularity of the occupancy information used by the smart device (e.g., the thermostat 10A, the detectors 10B, and or camera 72) may be increased.

In some embodiments, the ETA variable of the smart devices (e.g., the thermostat 10A, the detectors 10B, and/or camera 72) may be used to control the floor heater thermostat 1974. For example, when the user sets the ETA, the smart devices may provide the information to the floor heater thermostat 1974, which may begin heating the smart floor heater 1972 so that the floor is at a user preferred temperature by the time the user arrives at the building. Alternatively, the floor heater thermostat 1974 and/or the smart floor heater 1972 may query the smart devices (e.g., the thermostat 10A, the detectors 10B, and or camera 72) for the ETA to determine whether to start heating the smart floor heater 1972. Thus, in some embodiments, the ETA variable me be readable, as well as writable. In addition, the floor heater thermostat 1974 and/or the thermostat 10, the detectors 10B, other smart devices 10C, and/or the camera 72 may be connected to other smart devices via cloud services 145 and may forward the ETA to the other devices so they can prepare for the arrival of the user as well.

In some embodiments, energy usage of the floor heater 1972 may be obtained and provided to the cloud services 145. For example, an estimated usage may be calculated based upon an operational time of the floor heater 1972. By providing the energy usage of the floor heater 1972, the energy usage may be included in an energy usage report of a set of smart devices (e.g., an HVAC system controlled by thermostat 10A).

Further, in some embodiments, the floor heater 1972 may be controlled based upon demand events. For example, during peak grid usage, the floor heater 1972 may be controlled to off, such that power is not drawn by the floor heater 1972 during the peak grid usage. Once the peak grid usage period is over, the floor heater 1972 may be controlled to on, such that power is drawn by the floor heater 1972.

Alarm Systems Integrations

In some embodiments, data from alarm systems (e.g., environment 30 alarm systems 1976 and/or network security alarm and notification systems 1978) may be used to affect changes in other smart devices (e.g., a thermostat 10A, detectors 10B, cameras 72, or other smart devices 10C) and/or other smart devices (e.g., a thermostat 10A, detectors 10B, cameras 72, and other smart devices 10C) may be used to affect changes in the alarm systems (e.g., environment 30 alarm systems 1976 and/or network security alarm and notification systems 1978). Network security alarm and notification system 1978 may monitor for network malware, spyware, and the like.

For example, environmental alarms, notifications, and/or controls (e.g., from thermostat 10A, hazard detector 10B, and/or camera 72) may be provided for display at the network security alarm and notification systems 1978, via the cloud services 145. Accordingly, network alarms and notifications from the network security alarm and notification systems 1978 may be presented along with environmental alarms, notifications, and/or controls provided from the cloud services 145. Conversely, network alarms and notifications from the network security alarm and notification systems 1978 may be provided to the cloud services 145. The environment 30 alarm 1976 may receive these network alarms and notifications and may trigger an environment 30 alarm, based upon received network alarms and notifications. Accordingly, the environment 30 alarm 1976 may sound a siren, flash lights, etc., when a network alarm, such as a network intrusion is detected by the network security alarm and notification systems 1978.

Sensor Interaction

Figure 51:
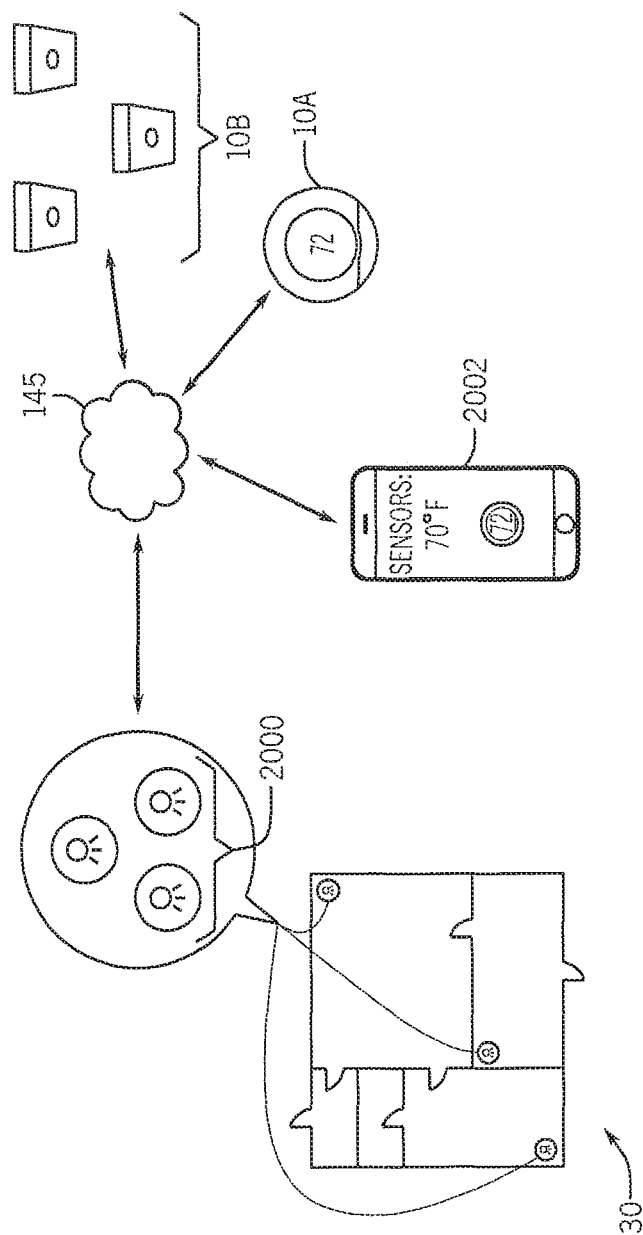
FIG. 51 is a block diagram illustrating control/reporting relating to wireless sensors in the smart environment, in accordance with an embodiment.

Turning now to a discussion of sensor interaction, some clients 182 (e.g., electronic client devices) may act as sensors, which "sense" particular items. In some embodiments, wireless sensor data (e.g., conditions) may be used to affect changes in a thermostat 10A and/or detectors 10B or vis-versa. FIG. 51 provides an illustration of relational control between wireless sensors 2000 in the smart environment 30. The wireless sensors 2000 may be placed in any suitable location throughout the smart environment 30. For example, as shown in the overhead view of the user's house, one wireless sensor 2000 is placed in three rooms of the smart environment 30. The wireless sensors 2000 may include proximity, motion, moisture, humidity, and temperature sensors. The wireless sensors 2000 may use the wiring already installed in a home to send notifications to the user when certain conditions are detected. For example, when a water leak is detected, the wireless sensors 2000 may send a signal the user's mobile device 2002. In some embodiments, the sensors 2000 may provide the measured ambient temperature of each room to a mobile device used by the user, the thermostat 10A, or both. The wireless sensors 2000 may provide information to smart devices 10A and/or 10B and/or central server or cloud-computing system 64 via cloud services 145.

In some embodiments, the multiple sensors 2000 may enable determining occupancy of specific rooms in a structure and customizing the temperature for each room based on the occupancy data. Further, an app installed on the user's mobile device 2002 may receive the detected conditions (humidity, temperature, moisture, etc.) from the wireless sensors 2000 and enable the user to control the thermostat 10A. For example, a wireless sensor 2000 located in the living room may indicate that the ambient temperature in the living room is 70° F., which may be displayed on a graphical user interface (GUI) of the mobile device 2002. The user may control the thermostat 10A to change the temperature as desired in the living room. In some embodiments, the wireless sensors 2000 may provide data to the thermostat 10A and/or cloud server 64 to determine the ideal ambient temperature for the user in each room at each time of day and night to provide comfort and/or energy efficiency as desired.

Audio System/Speaker Integration

Figure 52:
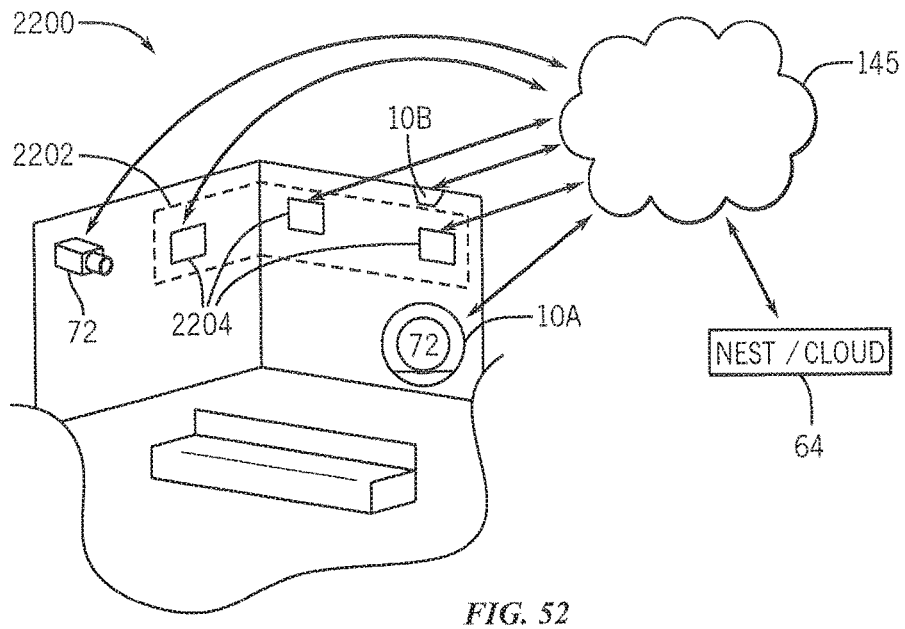
FIGS. 52 and 53 are block diagrams illustrating an audio system integrated with smart devices, in accordance with an embodiment.

In some embodiments, a thermostat 10A and/or detector 10B condition may be used for an audio system output and/or an audio system condition may be used for the thermostat 10A and/or detectors 10B output. FIG. 52 provides a system 2200 that integrates an audio system 2202 with smart devices 10A and/or 10B. The audio system 2200 may consist of speakers 2204, among other things. The audio system 2200 may be communicably coupled directly to the smart devices 10A and 10B over a local area network or indirectly via a wireless network and using the cloud services 145.

In some embodiments, when the detector 10B detects an alarm condition, such as smoke detected and/or CO detected, the audio system 2202 (e.g., all audible devices) may be deactivated, dimmed, or muted so that the alarm coming from the smoke detector 10B may be heard more clearly. In some embodiments, a noise, such as a chime, may be emitted from the speakers 2204 before muting them during emergency events. Additionally or alternatively, the audio system 2202 may be used to broadcast the alarm, project a prerecorded alarm message, or the like, using the speakers 2204 when the hazard detector 10B detects the alarm condition. The broadcasted alarm may be modified from the hazard detector LOB's alarm to be quieter, in synchronization, etc.

In some embodiments, activating or interacting with the audio system 2202 may cause the smart devices 10A and/or 10B to enter the "HOME" mode. Also, when the smart devices 10A and/or 10B switch from the "AWAY" mode to the "HOME" mode, the audio system 2202 may activate and play music. In addition, audio feedback may be played from the speakers 2204 of the audio system 2202 when the smart devices 10A and/or 10B switch from the "HOME" mode to the "AWAY" mode, music may be turned off, or some combination thereof. In some embodiments, when the smart devices 10A and/or 10B enter the "AWAY" mode, the audio system 2202 may power the speakers 2204 in a power saving mode and, when the smart devices 10A and/or 10B enter the "HOME" mode, the audio system 2202 may wake up the speakers 2204 and/or a wireless module.

Further, the wireless module may be consistently activated while the audio system 2202 is activated to enable communication with the other smart devices and/or the central server 64. Powering the audio system 2202 down in certain scenarios, such as when the smart devices 10A and/or 10B enter the "AWAY" mode may enable energy savings. The audio system 2202 may send energy consumption information to a central server or a cloud-computing system 64 via cloud services 145 for reporting.

In some embodiments, the audio system 2202 may aid in home/away sensing for the smart devices 10A and/or 10B. For example, infrared sensors included in the speakers 2204, an amplifier, a sound bar, and/or the like, may provide inputs via cloud services 145 to the smart devices 10A and/or 10B when motion is detected in a structure, which may be used as an indicator to set the mode to "HOME", via cloud services 145 and/or API(s). Also, inputs received by an application used by the audio system 2202 may be sent to the smart devices 10A and/or 10B and/or central server 64, which may be used as an indicator to set the mode to "HOME", via cloud services 145 and/or API(s).

Further, the video camera 72 conditions may be used to produce audio system 582 outputs. For example, when the video camera 72 detects or sees that a person is present in the structure, the user may use a video camera app installed on a mobile device to speak through the speakers 2204 to the person in the structure. This feature may use one or more API(s) to enable communication between the video camera 72 and the audio system 2202. Additionally or alternatively, when the video camera 72 sees someone in the house, a pre-recorded message may be played using the speakers 2204.

Further, in some embodiments, when motion is detected by the video camera 72 (e.g., internal or external to the environment 3) and there are no occupants in the environment 30 (e.g., when in "AWAY" mode), the speakers 2204 and/or other smart devices may simulate occupancy. For example, a dog bark may be played through the speakers 2202, an AV system output may be played through the speakers 2202, etc.

In another embodiment, the audio system 2202 may access certain fields in a data model related to the smart devices 10A and/or 10B if proper permissions have been granted. For example, the audio system 2202 may read the estimated time of arrival (ETA) field in the data model to determine the length of time before the user will arrive and turn on audio after that length of time expires.

Figure 53:
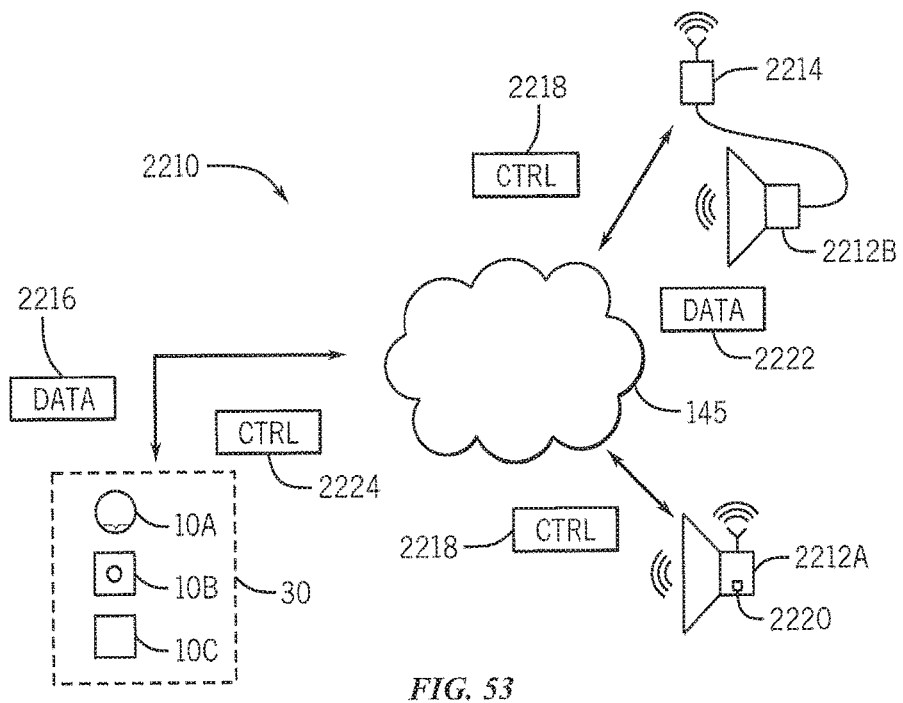
Figure 54:
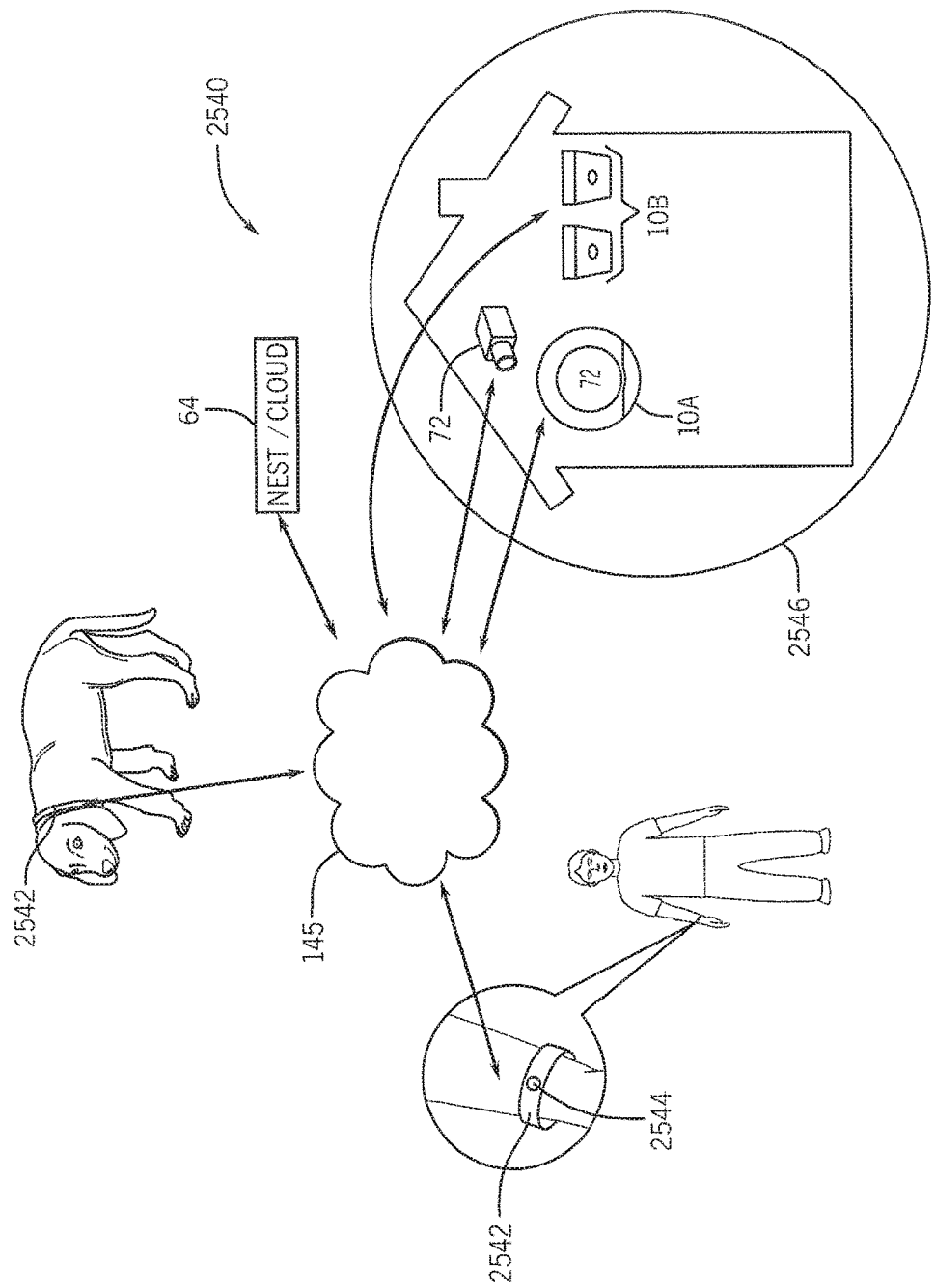
FIG. 54 is a block diagram illustrating a system that integrates wearable devices with smart devices, in accordance with an embodiment.

FIG. 53 illustrates embodiments of audio system interaction with a smart environment 30. Smart audio systems may be controlled by many mechanisms. For example, as illustrated in the system 2210, speakers 2212A-B are controlled via different mechanisms. Speaker 2212A is a wireless speaker that is independently controlled. Speaker 2212B is attached to an audio bridge 2214 that is equipped with wireless communications. Data 2216 may be provided from the smart devices (e.g., 10A, 10B, and/or 10C) to the cloud 145. This data 2216 may be useful in controlling the speakers 2212A-B. For example, based upon the data 2216, control signals 2218 may be sent to the speakers 2212A-B (e.g., through the bridge 2214). For example, in one embodiment, when an audible alarm is triggered (e.g., by detector 10B or other devices 10C), as indicated in the data 2216, a control signal 2218 may be sent to the speakers 2212A-B (e.g., independently for speaker 2212A and/or via the bridge 2214 for speaker 2212B) to reduce any audio that is outputted from the speakers 10A-B and/or to output the audible alarm at the speakers 10A-B. By reducing the audio that is outputted from the speakers 10A-B and/or outputting (e.g., broadcasting) the audio alarm at the speakers 10A-B, the occupants may be able to more clearly hear the audible alarm. Further, additional information may be outputted through the speakers 10A-B. For example, low battery indications, intercom messages, etc. may be sent to the speakers 10A-B.

In some embodiments, the speakers 10A-B may include data capture devices. For example, speaker 10A may be equipped with a microphone 2220. Data 2222 from the microphone 2220 and/or other data capture devices may be used to provide control signals 2224 to the smart devices (e.g. thermostat 10A, detector 10B, and/or other devices 10C). In one embodiment, voice commands may be captured by the microphone 2220, which may be translated into control signals 2224 associated with these voice commands. Exemplary voice commands may include, "decrease temperature," "increase temperature," "set to 'away'," "set to 'home'," "turn off fan," "turn on fan," etc. Further, in some embodiments, status of smart devices (e.g., thermostat 10A, hazard detector 10B, and/or other smart devices 10C) may be presented via the speakers 2212 and/or 2214. For example, an alarm activation and/or deactivation status may be presented by the speakers 2212 and/or 2214.

Wearables Interaction

In some embodiments, a wearable output may be used as a condition for a thermostat 10A, hazard detector 10B, or other smart device 10C output and/or a thermostat 10A, hazard detector 10B, and/or other smart device 10C condition may be used for a wearable 2542 (e.g., smart wristband, smart bracelet, smart necklace, smart anklet, smart chest strap, smart watch, smart collar) output. FIG. 24 provides a system 2540 where wearables 2542 for humans and/or animal pets interact with smart devices and/or smart environments 10.

In some embodiments, the wearable 2542 may send various information to the smart devices 10A-C via the cloud services 145 and/or API(s) interfacing with the smart devices 10A-C. For example, in one embodiment, a user may be outside running and the wearable 2542 may include a button 2544 that, when pressed, sends an estimated time of arrival (ETA) to the smart devices 10A and/or 10B based on a location derived by a geographical position system (GPS) included in the wearable 2544. The thermostat 10A may use the ETA to begin cooling the structure prior to the user arriving home so that the structure can assist in cooling down the user upon arrival. That is, if the ETA sent from the wearable indicates the user will be arrive in 30 minutes, the thermostat 10A may determine that the user prefers the house to be 70° F. after a run and it will take 20 minutes to cool the house to 70° F. Thus, after 10 minutes expires, the thermostat 10A may begin cooling the house so that the house is 70° F. when the user arrives in 30 minutes.

In another embodiment, boundaries may be used to create a geo-fence with which the wearable 2542 may interact. For example, as depicted, a home boundary 2546 may be used and when the wearable 2542 exits the home boundary 2546 the smart devices 10A and/or 10B may be set to "AWAY" mode, and when the wearable 2542 enters the home boundary 2546 the smart devices 10A and/or 10B may be set to "HOME" mode. When the smart devices 10A and/or 10B switch to the "HOME" mode (wearable inside the home boundary 2546), the thermostat 10A may begin pre-cooling the structure for the user's arrival. As may be appreciated, the wearable 2542 may be equipped by the user while on a run, walk, bike ride, etc. to pre-cool the house or set it to "AWAY" mode. However, the wearable 2542 may function similarly when equipped by a user in a vehicle.

Additionally, the wearable 2542 may include temperature sensors that detect the user's temperature. The wearable 2542 may send the user's temperature to the thermostat 10A, which may adjust the thermostat 10A accordingly. For example, after the user returns from a run, their body temperature may be elevated and the thermostat 10A may lower the temperature setpoint to cool down the user.

In some embodiments, the wearable 2542 may track when the user is asleep and awake and provide that data to the smart devices 10A and 10B. Using the sleep and wake time data, the thermostat 10A may begin pre-cooling or pre-heating a room to a desired temperature a configurable amount of time (e.g., 10, 15, 20, 25, 30 minutes) before the user wakes up or before the user's alarm clock goes off. Likewise, the thermostat 10A may cool or heat the house to a preferred sleep temperature prior to the user getting into bed. In some instances, the user may prefer certain temperatures during certain stages of sleep and/or times of the night, which the wearable 2542 may track and provide to the thermostat 10A, and the thermostat 10A may adjust the temperature setpoint accordingly throughout a night. For example, if the occupant's sleep pattern indicates that the occupant is exiting deep sleep, the thermostat may be adjusted to either subtly wake the occupant or encourage further deep sleep. That is, in some embodiments, by using the data from the wearable 2542 obtained via the cloud services 145, the thermostat 10A may adjust the temperature according to the user's sleep pattern to enable the user to continue sleeping comfortably.

Also, a notification may be sent to the wearable 2542 to output based on a condition of the detectors 10B or other unexpected events. For example, a notification may be sent to the wearable 2542 upon the alarm system status changing to an alarm state (e.g., in the case of smoke or CO detected) or upon an unexpected event that occurs when the occupant is not in the environment 10D (e.g., when the environment 10D mode is "AWAY"). The wearable 2542 may display the notification on a display, display the alarm by flashing a certain color, or make a certain audible sound upon receipt of the notification. In some embodiments, the wearable 2542 may vibrate when the detectors 10B enter an alarm state. In some embodiments, the vibration may mimic audible alarms provided by the hazard detectors 10B. For example, when the hazard detector provides 2 beeps for smoke and 3 beeps for carbon monoxide detection, the wearable may vibrate 2 times for smoke and 3 times for carbon monoxide detection.

In some embodiments, where the wearable 2542 is a smart watch, the smart watch may include a graphical user interface (GUI) that enables the user to set the thermostat 10A mode (e.g., cooling, heating, ranged), set the temperature, and/or activate/deactivate the fan. Further, the smart watch may enable the user to set the away status of the smart devices 10A and 10B to "HOME" or "AWAY".

Further, in some embodiments where the wearable 2542 is equipped to detect up/down and/or left/right movement, the wearable 2542 may be used to control the thermostat 10A. For example, left and/or right movements may result in cycling HVAC modes. Additionally, up/down movements may increase/decrease the set points of the thermostat 10A, respectively. Thus, the thermostat 10A settings may be modified without the use of a graphical user interface.

When the wearable 2542 is a smart collar for an animal/pet owned by the user, such as a dog or a cat, certain data (e.g., conditions) may be used to set the output of the smart devices 10A and/or 10B. The wearable 2542 for the pet may be capable of wireless communication over wireless protocols including Bluetooth low energy, Wi-Fi, etc. In some embodiments, when the pet is home as indicated by the wearable 2542 (smart collar), the smart devices 10A and/or 10B may not switch to the "AWAY" mode. Additionally, if the pet is home as indicated by the wearable 2542 and the user is not home, then the thermostat 10A may set to a preferred temperature chosen for the pet.

Further, when the detectors 10B enter an alarm state (e.g., detect smoke and/or CO), a notification is sent to an app tailored for the pet wearable 2542. All relevant people that are part of a pet-owner family may receive the notification, such as all family members that own the pet, a pet walker, a neighbor, etc. As should be appreciated, the people included in the pet-owner family may be configured. The notification sending may be based on whether the pet is detected as being home based on data from the wearable 2542 and the detectors 10B are in an alarm state.

In addition, the pet occupancy may be uploaded to the smart devices 10A/10B and/or central server or cloud environment 64. In some embodiments, a video camera 72 may be used to confirm ownership of the pet. The pet occupancy information may enable inhibiting false motion notifications caused by the pet motion, which may inhibit switching the home/away mode incorrectly. Further, the video camera 72 may be used to transition the smart devices 10A and 10B between the home/away modes. For example, if the video camera 72 detects the pet, then the smart devices 10A and/or 10B may be set to the "HOME" mode.

In some embodiments, pet monitoring may include monitoring a feeding schedule of the pet. In some embodiments, an automated feeder 2543 may feed pets at a particular schedule. As the wearable 2542 is in proximity to the automated feeder 2543, the camera 72 may capture images and/or video of the pet feeding at the automated feeder 2543. In some embodiments, triggering the image and/or video capture by the camera 72 may not be dependent upon the wearable 2542. For example, the automated feeder may provide an indication of a feeding to the cloud services 145, which may trigger the capture of images and/or video by the camera 72. The camera 72 may provide a static image of the feeding and/or video footage of the feeding (or a link to the video footage) to a feeding history app or other service via the cloud services 145.

Further, the wearable 2542 may include a Bluetooth tag that may be used track people and/or pets as desired, such as kids, pets, and elderly people. The Bluetooth tag wearable 2542 may be used for emergency notifications. For example, if the detectors 10B enter an alarm state (e.g., detect smoke and/or CO) and the Bluetooth tag wearable 2542 indicates that the wearer (e.g., kid, pet, elderly) is at home, then the notification to a user may include that information.

In some embodiments, when the wearable 2542 indicates that the wearer has left the environment 10D, a camera 72 may be activated as a security measure. Accordingly, if the wearer goes for a run the environment 10D may be monitored by the cameras 72 for unauthorized occupants. When the wearable 2542 indicates that the wearer has returned to the environment 10D, the cameras 72 may be deactivated.

Baby Monitor

Figure 55:
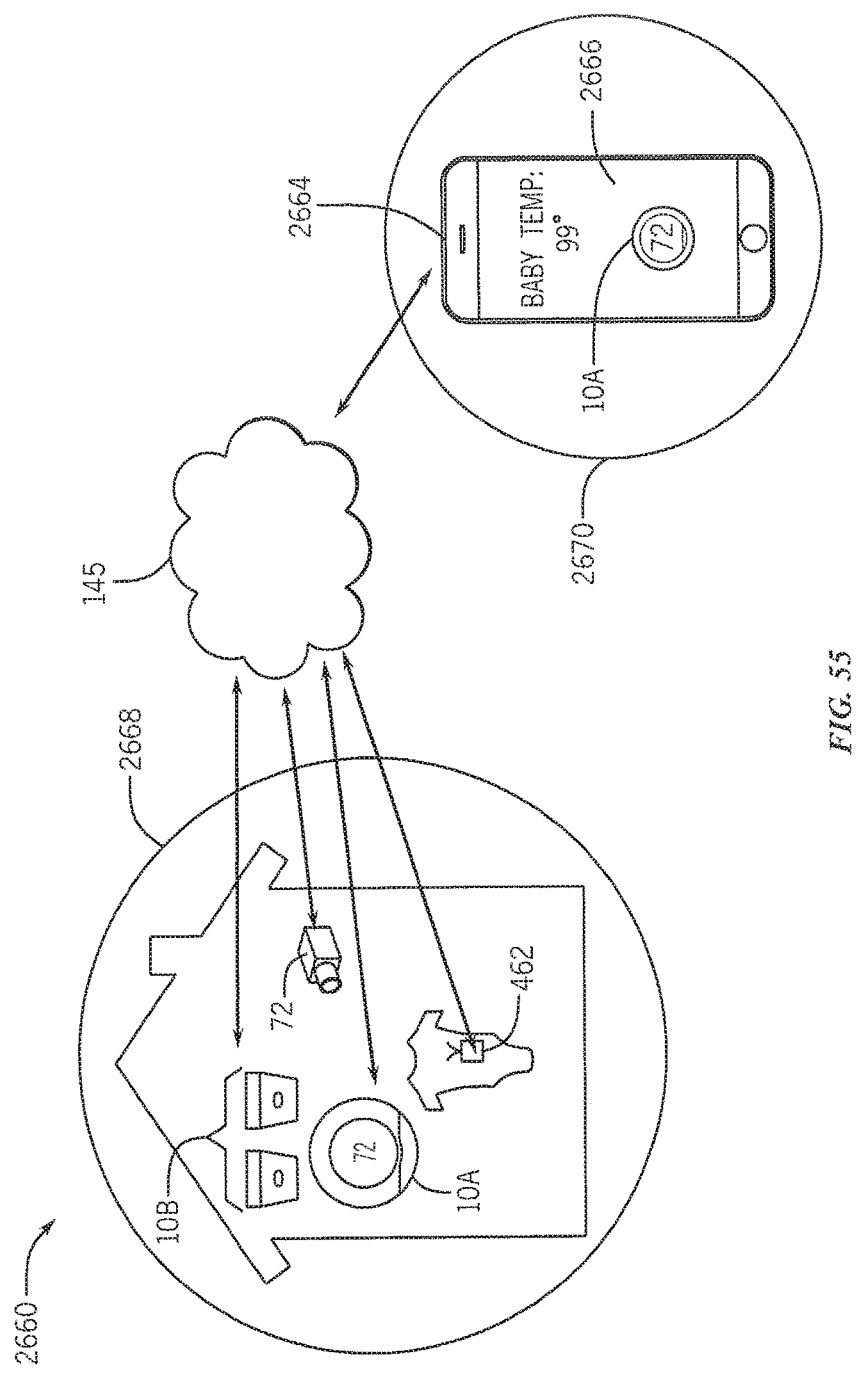
FIG. 55 is a block diagram illustrating a system that integrates a wearable smart baby monitor with smart devices, in accordance with an embodiment.

In another embodiment, a smart baby monitor data may be used as a condition for a thermostat 10A, smoke detector 10B, and/or camera 72 outputs and/or a thermostat 10A, smoke detector 10B, or camera 72 data (e.g., conditions) may be used for a smart baby monitor output. FIG. 55 provides a system 2660 that integrates a smart baby monitor 2662 with smart devices 10A and/or 10B.

The smart baby monitor 2662 may be built into baby clothing (e.g., onesie, shirt, sleep sack) and worn by a baby to monitor certain vitals (respiration, heart rate, temperature) as well as provide various stimuli to the baby (e.g., vibrate, play music). In alternative embodiments, the smart baby monitor 2662 may be a surface the baby is in contact with, such as a sleeping pad, crib sheet, etc. In some embodiments, the temperature of the baby may be sent from the smart baby monitor 2662 via the cloud services 145 or API(s) interfacing with the smart devices 10A and/or 10B to the smart devices 10A and/or 10B and/or the mobile devices 2664. The mobile devices 2664 may include a graphical user interface (GUI) 2666 that displays the baby temperature via an application tailored to receive input from the smart baby monitor 2662. Further, the mobile devices 2664 may include one or more applications tailored to control the smart devices 10A and 10B via a communication network. As such, a user may receive the baby's temperature and adjust the thermostat 10A in the application on the GUI 2666 based on the baby's temperature.

One or more sensors on the smart baby monitor 2662 may detect movement of the baby. The movement signals may be sent to the smart devices 10A and/or 10B, which may change the mode from "AWAY" or "AUTO-AWAY" to "HOME". Thus, the data from the smart baby monitor 2662 may be used to detect occupancy of the structure since the presence of a baby in a structure may be highly indicative of caregivers present in the structure.

In some embodiments, a pre-alarm and alarm system status may be changed based on the status of the baby provided by the smart baby monitor 2662. For example, the alarms emitted by the smart device 10B (e.g., smoke and CO detector) may escalate (e.g., increase sound, flash different colored lights, etc.) based on escalating problems with the baby detected by the smart baby monitor 2662 (e.g., increased temperature, coughing due to smoke, changed respiratory rate).

Additionally, in some embodiments, pre-alarm and alarm system status of the smart device 10B may be used as a condition to control the output of the smart baby monitor 2662. For example, when the smart device 10B enters an alarm state, the smart baby monitor 2662 may vibrate to aid in waking up the child.

Alarm conditions may be more sensitive for baby-based vitals. For example, small body temperature drift in babies may have a greater impact than in adults. Accordingly, alarms may be triggered for smaller body temperature drifts than temperature drifts observed in adult occupants.

Further, in some embodiments, cameras 72 proximate to the baby may be activated and/or deactivated based upon the movement and/or sound detected by the smart baby monitor 2662. For example, when baby movement is detected, the cameras 72 proximate to the baby may be activated. When the movement stops, the cameras 72 may be deactivated.

Further, using boundaries (e.g., geo-fencing radius), such as a home boundary 2668, or a mobile device boundary 2664, the smart baby monitor 2662 and the smart devices 10B may coordinate to prevent certain undesirable events (e.g., kidnapping). For example, when the smart baby monitor 2662 leaves the home boundary 2668 and/or phone boundary 2664, then the smart device 10B may sound an alarm and/or a notification may be sent to an application on the connected mobile device 2664. This may inhibit a child from being kidnapped when the user has his phone in a different room than the child and the child exits the phone boundary 2670 or when the child has been taken outside of the home boundary 2668. Additionally, using the boundaries (2668 and 2670) and the smart baby monitor 2662 may inhibit children from running away or simply leaving the house unattended by sounding the alarm of the smart device 10B and/or sending an alert to the mobile device 2664 as they exit the home boundary 2668 and/or phone boundary 2670.

In some embodiments, the smart baby monitor 2662 may provide information related to the location of the baby wearing the smart baby monitor 2662 to the smart devices 10A and/or 10B. As a result, the smart devices 10A and/or 10B may adjust their sensitivity (e.g., become more sensitive) to the location of the baby. For example, the thermostat 10A may become more sensitive to providing a comfortable temperature and inhibit temperature drift in a room where the baby is located.

The smart baby monitor 2662 may also be used as a condition to the output of a smart video camera 72. For example, when the smart baby monitor 2662 detects that the baby is moving, the baby's temperature exceeds a threshold amount, the baby's breathing becomes irregular, etc. the smart video camera 512 may be activated to enable a user to view the child. Further, in some embodiments, cases may be designed with sockets that fit the smart video cameras 72 and the cases may be attachable to certain objects, such as baby cribs.

In certain embodiments, correlation between the smart baby monitor 2662, a thermostat 10A, a camera 72, and or other devices 10C may be useful. For example, in one embodiment, information regarding activation of an HVAC system may be ascertained from the thermostat 10A. Audio and/or video from the camera 72 may be used to detect baby motion correlated with the activation of the HVAC system, sound events (e.g., excessive sounds, alarms, etc.) that occur proximate to the activation of the HVAC system, etc. Further, the smart baby monitor 2662 can be used to monitor baby movement, vitals, etc. of the baby upon activation of the HVAC system and/or upon the occurrence of sound events.

Correlation of this information may help to ascertain whether activation of the HVAC system is affecting the sleep patterns of the baby. For example, this correlated information may be used to discern that a baby's sleep is being interrupted by HVAC noise pollution, over and/or under conditioning an environment via the HVAC system, or both.

Additionally, the cameras 72 may record the baby during movement detected by the smart baby monitor 2662. In some instances, a notification may be sent via the cloud services 145 when a baby is restless and/or woken, as detected and indicated to the cloud services 145 by the smart baby monitor 2662.

Sleep-Aide Interaction

New sleep-aide devices are becoming available in the marketplace. Interactions between these aides and the smart devices and/or smart environment 10 may be possible using the cloud services 145. For example, in some embodiments, a smart bed cover may be used as a condition for a thermostat 10A and/or smoke detector 10B output and/or a thermostat 10A and/or smoke detector 10B condition may be used for a smart bed cover output. FIG. 43 provides a system 2700 that integrates a smart bed cover 2702 and a smart bedside sleep detector 2704 with smart devices 10A and/or 10B.

In some embodiments, the smart bed cover 2702 may provide data to the thermostat 10A and/or 10B to save energy. For example, the smart bed cover 2702 may detect, via one or more sensors, that the user has entered the bed at a certain time and transmit that information via the cloud services 145 and/or API(s) interfacing with the smart devices 10A and 10B. In response, the thermostat 10A may use the data as a condition to focus the temperature regulation of the structure to the bedroom where the user is sleeping. That is, the thermostat 10A may focus the comfort regulation efforts on the bedroom while allowing the other rooms of the structure to change to a more efficient temperature at that particular time of night. As a result, the HVAC system may employ less electricity and the user may save money on the utility bill.

In another embodiment, the smart bed cover 2702 may provide data to the thermostat 10A and/or 10B to set and maintain an ideal sleep temperature. For example, the smart bed cover 2702 may detect, via one or more sensors, that the user has entered the bed at a certain time and transmit that information via the cloud services 145 and/or API(s) interfacing with the smart devices 10A and 10B. In response, the thermostat 10A may use the data as a condition to set the temperature in the bedroom to the user's ideal sleep setting, which may be determined based on the user's response to various temperatures as detected and transmitted via the smart bed cover 2702. For example, the smart bed cover 2702 may detect that the user sweats at a particular temperature using a galvanic skin response (GSR), or the like. Thus, the thermostat 10A may determine not to set that particular temperature that causes the user to sleep. It should be understood, that the user's internal body temperature may change during different stages of sleep (e.g., rapid eye movement vs. non-rapid eye movement) and the thermostat 10A may maintain the ideal temperature based on data received from the smart bed cover 2702, among other sources. This may provide the benefit of the user sleeping better without having interruptions from being too hot or too cold.

In another embodiment, the smart bed cover 2702 may provide data to the thermostat 10A and/or 10B to set the wake up temperature. For example, the smart bed cover 2702 may detect, via one or more sensors, that the user wakes up at a certain time and send that information via the cloud services 145 and/or API(s) interfacing with the smart devices 10A and 10B. In response, the thermostat 10A may use the data as a condition to begin warming up the bedroom a configurable amount of time before the user wakes up (e.g., 30 minutes prior) based on a known amount of time to heat the room to a desired temperature. In other embodiments, if the user has set an alarm to a particular time (e.g., 6 AM), then the thermostat 10A may begin warming the room a configurable amount of time prior to the alarm time so that the user may step out of bed comfortably when the alarm sounds.

In another embodiment, the smart bed cover 2702 may provide data to the thermostat 10A and/or 10B to determine occupancy of a structure. For example, the smart bed cover 2702 may detect, via one or more sensors, that the user is present in the bed (e.g., under or on top of the smart bed cover 2702) and send that information via the cloud services 145 and/or API(s) interfacing with the smart devices 10A and 10B. The smart devices 10A and 10B may determine occupancy based on the motion data and can use that data to set "HOME" mode, "AWAY" mode, or "AUTO-AWAY" mode. That is, if there is movement detected via the smart bed cover 2702, then occupancy in the house may be determined and the bed may not be heated unless the house is occupied.

In some cases, the motion data may be collected and profiled for the people that use the smart bed cover 2702 and for one or more animals that interact with the cover 2702. In this way, an animal (e.g., a dog) that jumps on the bed may be detected as a false positive and not cause occupancy to be detected, thereby inhibiting changing from "AWAY" mode to "HOME" mode by mistake. Further, the smart bed cover 2702 may upload the energy used to be reported. Also, the smart bed cover 2702 may upload the sleep status via the cloud services 145 and/or API(s) to be used in occupancy determinations.

The smart bedside sleep detector 2704 may track the user's sleep, such as the different cycles of sleep the user is in throughout the night. The sleeping information may be sent via the cloud services 145 and/or API(s) to the smart devices 10A/10B and/or any other smart device in the smart environment 30 and used to gently wake the user at the most optimal time in the user's sleep cycle by slowly brightening the lights, cooling the temperature to a desired temperature in the bedroom, playing desired music at a low decibel level, and so forth. For example, in some embodiments, the thermostat 10A may set the temperature to a preferred temperature when the user goes to sleep and/or wakes up based on the data output from the smart bedside sleep detector 2704.

In some embodiments, the smart bedside sleep detector 2704 may include a light that may display any suitable color. When the detectors 10B enter an alarm state, the light of the smart bedside sleep detector 2704 may turn red to indicate there is an emergency.

It should be understood that, in some embodiments, third parties may desire access to the information obtained in the derived home data 88 and/or home data 82 from the smart bed cover 2702 and, based on permissions granted by a user and/or business arrangements, the information may be provided.

When the sleep aides (or other smart devices) indicate that the occupants are asleep, additional security measures may be desired. In some embodiments, when the system discerns that the occupants are asleep, the cameras 72 may be activated to monitor the environment 10D. Thus, an added level of security may be provided during the occupants' sleep cycles.

Service Interaction

In some embodiments, services may interact with the smart devices and/or smart environment 10 via the cloud services 145. For example, in some embodiments, an Internet-based service provider may control and/or receive data from the smart devices and/or smart environment 10. The following discussion relates to a variety of service interaction embodiments made possible via the cloud services 145 (e.g., the API 90).

Condition Based Access and/or Control Services

In some embodiments, the API(s) 90 and/or the cloud services 145 may be used to enable condition based access and/or control. For example, conditional rules may be generated based upon information received and/or sent to and/or received from the API(s) 90. In one example, conditional rule generation may occur from a website, such as a site that enables plugging in of conditions and outputs from a variety of different sources. In some examples, dedicated machine-readable code having conditional rule generation instructions may be stored on a tangible, non-transitory, machine-readable medium and executed by a machine.

In some embodiments, conditional rules may be created where the smart devices 10A and/or 10B are affected as an output of the rule. FIG. 57 illustrates an example of a conditional rule 3000 where the output 3002 is access and/or control of one or more features of the smart devices 10A and/or 10B. For example, an output 3002 for a thermostat 10A may be changing a mode (e.g., "HOME" or "AWAY") for the thermostat, changing a desired temperature level of the thermostat, setting a fan to on or off, changing a fan speed, changing a temperature adjustment system (e.g., setting heat to cool or vice versa), etc. Example outputs 3002 relating to a smoke detector and/or carbon monoxide detector (e.g., device 10B) may be activating/deactivating alarms, activating/deactivating audio, activating/deactivating lighting, activating/deactivating motion sensors, etc.

The conditions 3004 used to control the outputs 3002 need not be sourced from the smart devices accessed and/or controlled by the outputs 3002. In some embodiments, the conditional rules 3000 may be based upon conditions sourced from an external data source 3006 (e.g., external to the smart devices 10A and/or 10B). For example, FIG. 13 illustrates a conditional rule 3000 where the condition(s) 3004 is sourced from an external source 3006. For example, the external data source 3006 may include a weather service, social media site (e.g., check-in announcement), electronic-calendar (e.g., Google calendar), geo-fencing application, utility company rate schedule, an electronic device (e.g., an alarm clock), etc.

In some embodiments, conditional rules may be based upon information sourced from the smart devices 10A (e.g., thermostat) and/or 10B (e.g., smoke and/or carbon monoxide detector). Further, though the source for the condition 3004 may be the smart devices 10A and/or 10B, the outputs 3002 may be external to the smart devices 10A and/or 10B. For example, FIG. 14 illustrates a conditional rule 3010 where the output 3002 is an external output 3012 and the inputs 3001 are sourced from data provided by the thermostat 10A and/or smoke and/or carbon monoxide detector 10B. In some embodiments, both the inputs 3001 and the outputs 3002 relate to the smart devices 10A and/or 10B.

Example conditions 3004 that may be sourced from the thermostat 10A may include: any device operation status 156 of the thermostat, a mode (e.g., "HOME" and/or "AWAY") of the thermostat, an ambient temperature of the thermostat, an amount of periodic temperature change, etc. Example conditions 3004 that may be sourced from the smoke and/or carbon monoxide detector 10B may include: an operating status 156 of the device, an active smoke alarm, and active carbon monoxide alarm, low device battery level, etc.

Having now discussed basic conditional rules (e.g., 3000 and 3010) using the thermostat 10A and/or smoke/carbon monoxide detector 10B, the following are examples of conditional rules that may be useful for implementation within a smart environment. In one embodiment, data from an activity monitor, such as an electronic wristband that tracks vital statistics may be used to provide a condition for a conditional rule. For example, when the activity monitor detects that an activity level suggests that the user is sleeping, a conditional output may set the desired temperature to a desired sleep temperature. When the activity level suggests that the user is awake, the output may set the desired thermostat temperature to an awake temperature.

In certain embodiments, a conditional output may correspond to smart lighting. For example, the lighting may be turned off when the thermostat 10A enters an "AWAY" mode. This helps to ensure that energy is not wasted while no one is in the home. Further, when the thermostat 10A enters "HOME" mode, the lighting may be re-activated (perhaps in the same configuration as when it was turned off, or a new configuration, such as lighting only the front foyer where access to the home typically occurs). Additionally, lighting colors may change based upon conditions from the devices 10A and/or 10B. For example, it has been shown that the color red may provide visibility benefits when smoke and/or gaseous conditions. Accordingly, color-changing lights may be transitioned to red when an alarm from the smoke/carbon monoxide detector 10B is active. In some embodiments, the outputs of the smart lights may be configured by the user for different conditions sourced by the smart devices 10A and/or 10B.

In some embodiments, additional notifications may be provided via conditional rules. For example, a rule may trigger a text message, email, voice call, etc. to family, friends, neighbors, home-owners, etc. when a smoke alarm and/or a carbon monoxide alarm is triggered. Further, when a television, receiver, etc. is operating at a high decibel level, it may be beneficial to mute or lower the decibel volume to ensure that active alarms are heard. Accordingly, a conditional rule may mute or lower decibel levels of one or more devices if an alarm of the detector 10B is active. In some instances, this may be done in conjunction with a programmable remote control. In some embodiments, a notification may be sent to the user's handheld device when the smart devices 10A and/or 10B battery is low.

Further, when an emergency and/or other hazard is detected by the detector 10B, a television may display visual notifications overlaid on the image currently being displayed on the screen. The notification may be prominently displayed to grab the viewer's attention. Additionally, audio may be used in conjunction with the visual notifications. For example, a beep or loud noise may be provided via a speaker of the television. In addition, another rule may trigger upon an event occurring in an activity zone that is monitored by the video camera 72. When such an event occurs, the television may display a visual notification (e.g., via a picture-in-picture live feed) from the video camera 72 of the activity zone.

As mentioned above, a weather service may provide conditions 3004 for a conditional rule. For example, when the weather service reports an extremely hot and/or humid day, the desired temperature of the thermostat 10A may be adjusted as a conditional rule output. Thus, the thermostat 10A may become highly customizable for a user's desired preferences.

In some embodiments, the inputs that may trigger conditional rules may be sourced from the smart devices 10A, 10B, and/or 10C or from services and/or devices external to the home environment 30. Additionally, the inputs that trigger the conditional rules may be zone or area (e.g., city, county, street, etc.) specific instead of individual structure specific. Likewise, the outputs of the conditional rule may be similar in that they may be applicable to zone or areas as opposed to individual structures. These types of conditional rules may provide situational awareness that enable automatic performance of an action or prompting a user to perform an action. For example, a third-party service or device may determine that a certain event has occurred or is occurring in a zone or area in which the home of the user of smart devices 10A, 10B, and/or 10C is located. As a result, an action may be performed automatically on the smart devices 10A, 10B, and/or 10C and/or a prompt for action on the smart devices 10A, 10B, and/or 10C may be provided to the user. That is, in some embodiments, events or data from outside of the environment 30 may be used to proactively take action.

To illustrate, the weather service may receive data that a hurricane, tornado, or fire is near an area (e.g., street or neighborhood block) in of the environment 30. As a result, the weather service may query certain statuses from the smart devices 10A, 10B, and/or 10C, such as the battery life of the smart devices 10A, 10B, and/or 10C, and notify the respective users of the battery life of the detectors 10B in their homes. Additionally, the service may check any video cameras 72 to determine whether they are operational, may send snapshots using the cameras 72 over a desired interval (e.g., every 10 minutes, 15 minutes), enable the user to subscribe to additional motion notifications, and the like.

In another example, if an unauthorized intrusion has occurred in a house in the area of the environment 30, a push notification may be sent to the smart devices 10A, 10B, and/or 10C, which may be configured to enter a security lock down state. In such a state, the smart locks may ensure that locks are actuated, the video cameras 72 may be turned on as a monitoring precaution, and occupancy simulation may be implemented (e.g., speakers may emit music, lights may be turned on, etc.). In some embodiments, a third-party service may check the status of the smart devices 10A, 10B, and/or 10C and prompt the user to approve certain actions.

For example, the service may detect that three of the users video cameras 72 are turned off and ask the user if he or she wants the cameras to be turned on. If the user confirms, then the service may activate the respective cameras 72.

In another example, a third-party service may detect a gas leak in the area and may check the status of the detectors 10B in the home environments in that area. The service may notify the user if the battery levels are low or if any of the detectors 10B are not operational. Additionally, when a certain number of detectors 10B in an area detect carbon monoxide (or other hazard), an alert may be sent to the other users of detectors 10B in the area to evacuate their premises and/or may check the status of the detectors 10B. In some embodiments, a notification of the detected carbon monoxide (or other hazard) may be provided to local remediation authorities, as a proactive measure.

In another example, a user may set energy preferences, indicating a desire to save money by saving power when demand is high (e.g., when the cost of energy is high). Third-party services may provide recommendations and/or prompts to help the user save money. For example, the third-party service may have access to energy time-of-day costs and may analyze the setpoint schedule of the user's thermostat 10A. The service may determine that the user may save money by changing the setpoint at certain times and may provide the notification to the user. The user may accept the recommendation and the service may modify the setpoint schedule of the thermostat 10A.

Accordingly, as may be appreciated there may be many area specific inputs, that when provided to the cloud services 175, trigger execution of automatic actions (e.g., security related actions) on particular smart devices (e.g., 10A, 10B, and/or 10C). Further, many area specific inputs may trigger prompting for the execution of actions on the smart devices 10A, 10B, and/or 10C. The user may receive a notification of the input that triggered the output. For example, in the security lock down state example discussed above, the user may be provided a notification that a reported unauthorized intrusion caused the lock down state.

Outputs 3002 related to mode changes in the thermostat 10A may be implemented by conditions sourced from social media data. For example, a "check-in" on Google Hangouts may suggest that a homeowner is not home and that an "AWAY" mode should be set. Accordingly, a rule may be generated to set the mode of the thermostat 10A to "AWAY" if there is a check-in outside of the home.

The geo-fencing applications (discussed in FIGS. 8 and 9 may also be used as conditions for the conditional rules. For example, an output altering the mode of the thermostat 10A to "AWAY" may be triggered when exiting the boundary 200A. The thermostat 10A mode may be altered to "HOME" when entering the boundary 200A.

In some examples, other smart devices within the home may trigger outputs of the smart devices 10A and/or 10B. For example, when motion sensing smart light bulbs and/or other motion sensing devices detect movement within the home, the thermostat 10A mode may be set to "HOME."

In one embodiment, particular keywords or contextual identifiers may be used as conditions 3004 that trigger an output 3002. For example, when a Google calendar appointment suggests that a climate-controlled environment will be unoccupied, the thermostat may be controlled to go into "AWAY" mode. For example, when a calendar entry includes the keywords "Out of Office," "OOO," "Vacation," etc., the "AWAY" mode output may be triggered at the thermostat 10A.

Further, particular keywords may be provided by a user speaking the keywords into an app on a user's mobile device. The particular keywords may be used as conditions 3004 that trigger an output 3002, such as setting the temperature up or down. For example, when the user says "set [the thermostat|the temperature] to nn degrees", the thermostat 10A may change the setpoint accordingly. The keywords "turn on the heat" may cause the thermostat to raise the setpoint 1° C. above the current ambient temperature.

If the thermostat 10A is in the range mode, then the thermostat 10A may change both the low and the high setpoints 1° C. higher than the current low and high setpoints.

Another voice command may include the keywords, "turn on the [air conditioning|cooling|AC]". Saying these keywords to the app may cause the thermostat 10A to set the setpoint temperature 1° C. below the current ambient temperature and, if in range mode, the thermostat 10A may change both the low and the high setpoint to 1° C. below the current ambient temperature.

The user may also say keywords to set the smart devices 10A/10B to "HOME" and "AWAY" mode. For example, when the user is outside of the home and wants to set the smart devices 10A/10B to "AWAY" mode, the user may say "set nest to away", and the app may call the cloud services 145 and/or API(s) 90 to set the smart devices 10A/10B to the "AWAY" mode. Additionally, when the user is coming home and wants to set the smart devices 10A/10B to the "HOME" mode, the user may say "set nest to home" and the app may call the cloud services 145 and/or API(s) 90 and set the smart devices 10A to the "HOME" mode.

In some embodiments, when the thermostat 10A transitions to "HOME," audio playback may be triggered. Further, when the thermostat 10A transitions to "AWAY," music playback may be halted. Additionally, activating music playback on a device within the home may automatically trigger a command to enable "HOME" mode on the thermostat 10A.

When multiple thermostats 10A and/or detectors 10B exist within a home, each of the thermostats 10A and/or detectors 10B may accessed by a unique identifier. Accordingly, a condition 3004 and/or output 3002 may be specifically tied to a particular one or many of the thermostats 10A and/or detectors 10B.

Booking Service

Figure 59:
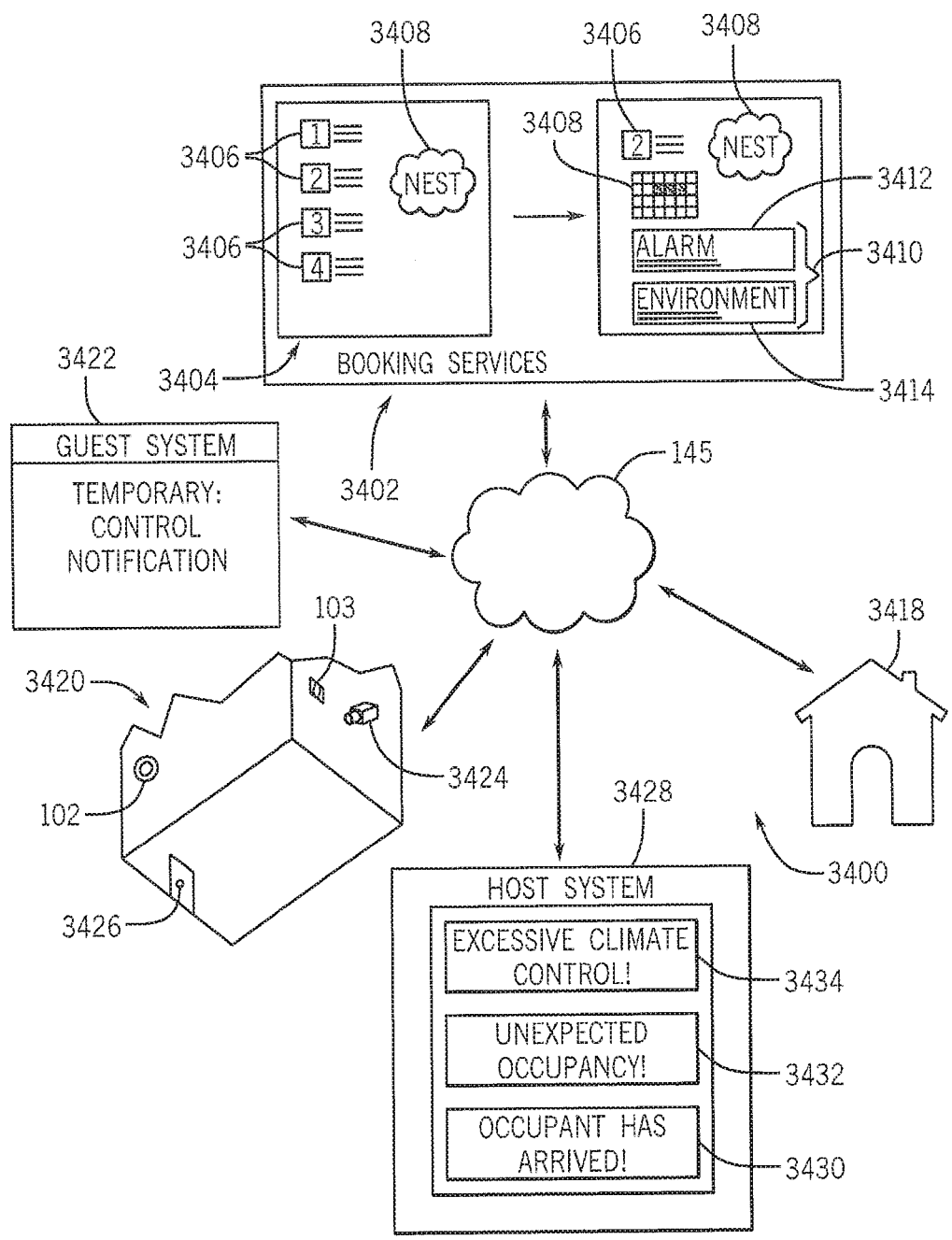
FIG. 59 is a block diagram of a system that integrates a booking service with a thermostat, smoke/carbon monoxide detector, an alarm system, or combination thereof, in accordance with an embodiment.

In some embodiments, booking service data (e.g., conditions) may be used to control smart devices and/or smart environments 10 (e.g., thermostat 10A and/or detectors 10B). FIG. 59 illustrates such a system 3400. A booking service 3402, such as a hotel or Bed and Breakfast website may enable reservations for one or more particular rooms. For example, the booking service 3402 includes a listing 3404 of available Bed and Breakfast locations for a particular location. Further, the listing 3404 may include an indicator 408 for smart locations that may be personalized for a user's particular desires or otherwise includes smart device capabilities.

When a location 3406 is selected, additional details about the location 3406 are provided. In the current embodiment, an availability calendar 3408 is provided. Further, because the selected location is a personalized location, additional prompts 3410 may be provided. For example, an alarm prompt 3412 may enable a user to input an alarm code that is easy for the user to remember. An environment prompt 3414 may enable the user to input particular environmental settings such as a desired arrival temperature, etc. In some embodiments, the alarm and/or environmental settings (or any other customizable settings) may be pre-populated or obtained from the user's home 3418 (or other location) settings. For example, if the user maintains a 78 degree temperature when awake and occupying the house and a 73 degree temperature when sleeping and occupying the house, these temperature settings may automatically be sent and implemented at the user's booked room 3420.

In some embodiments, based upon the dates selected in the booking service 3402, the cloud services 145 may provide the settings input at the prompts 3410 and/or the settings obtained from the house 3418. Thus, if the user booked a rental from December 1 through December 10, the user's settings may be automatically implemented via the cloud service 145 during those time periods. This may enable a user to provide an preferred temperature that may override a default temperature of the thermostat 102 (e.g., provided by the lessor).

Additionally, smart device notifications, such as active alarms of the detector 10B and/or smart device control, such as temperature control, door lock control, etc., may be temporarily provided to the user (e.g., via a guest system 3422, such as the user's smart phone, etc.) during the booked time period.

The temporary notification and control may be provided based upon a temporary account that is setup with the control and/or notification services provider (e.g., the provider of the API 90). For example, in some embodiments, the booking service 3402 may provide the temporary booking information to the cloud 145, which may automatically generate a temporary account that is valid for accessing and/or controlling smart devices and/or smart device data during the booked time period provided by the temporary booking information. Using this temporary account, the user (e.g., guest) may be able to receive temporary smoke and/or CO notifications from the detector 103 and/or may be able to control and/or receive notifications from the thermostat 102.

Control and/or notifications may be provided based upon a location of the guest and/or the guest system 3422. In some embodiments, certain control functions may be disabled, when the guest is not at and/or near the room 3420. For example, geo-fencing, an estimated time of arrival, etc. may be used to ascertain the guest's location in relation to the room 3420. The guest may be blocked from setting the thermostat 102 to "home" mode, when not near the room 3420.

In some embodiments, temporary access to camera 72 feeds of the room 3420 may be provided to the guest during their booking. When the camera 72 is active and/or activates, a notification may be provided in the room 3420. For example, a voice announcement of the speaker of the camera 72 or detector 103 may announce that the camera 72 is recording.

Additionally, in some embodiments, ease of room 3420 access may be provided by generation of a temporary key (e.g. personal identification number (PIN)) or other temporary access device (near field communications, Bluetooth communications, etc.) for a smart lock 3426 of the room 3420. For example, during the booking time period a temporary key may be provided to the guest (e.g., via email and/or MMS messaging to the guest system 3422). Additionally, a temporary key may be provided to service employees during their expected occupancy.

In some embodiments, when a guest (or other expected occupant) loses their temporary key, an additional key may be requested (e.g., via the guest system 3422). Upon receiving the request, the system 3400 may generate a new temporary key and revoke the old temporary key.

Further, the user's home may be controlled during the booked time period (e.g., by placing the user's home in "AWAY" mode during the booked time period) and the user may be notified of unexpected events (e.g., when their home devices detect occupancy while they are expected to be away (e.g., notify the user that their home thermostat transitioned to "HOME" while they are away)).

This functionality may also benefit the lessor by providing booking-based control and/or notification, which may result in increased security and/or energy efficiency. For example, in some booking-based-control embodiments, the booking service 3402 is aware of times when there is no occupancy in the room 3420. Accordingly, the availability calendar 3408 may be used to control smart devices within the room 3420. For example, in some embodiments, based upon the booking information (e.g., provided by the availability calendar 3408), control to set the thermostats 10A to "AWAY" during periods where there is no occupancy may be performed. Further, in systems where a camera 72 is present, the system 3400 may take a snapshot of the room 3420 prior to the expected arrival and/or after the expected departure (e.g., for damage analysis).

In some embodiments, the camera 72 may activate when no occupants are expected and/or no occupants are detected in the room 3420. The camera may turn off when the guest arrives at the room 3420 (e.g., as determined based upon the booking data, occupancy sensors, etc.). Further, the cameras 72 may activate when an alarm (e.g., a smoke and/or CO alarm activates or pre-alarms, such that the cause of the alarm and/or pre-alarm may be more-easily discernable. In some embodiments, only the cameras 72 in proximity to the activated alarm and/or pre-alarm will be activated. The cameras 72 may take video and/or still image shots upon activation. In some embodiments, the camera 72 may take a picture of the room 3420 before the guests arrive and after the guests depart to analyze whether any damage was done to the room, determine whether any items were stolen, and the like.

Further, the system 3400 may provide notifications based upon the booking parameters. For example, in some embodiments, the booking service 3402 may be aware (e.g., based upon the booking information) of when the guests, service employees (e.g., housekeeping), etc. will be expected to occupy the room 3420. Additionally, facial recognition may be implemented using data from the camera 72 to discern expected occupants of the room 3420. Based upon these expected occupancies, the system 3400 may provide notifications (e.g., to a system 3428 of the lessor (e.g., the room host)). For example, the system 3400 may send a notification 3430 when the guest first arrives in the room 3420. Additionally, the system 3400 may detect an unexpected number of occupants in the room 3420 (e.g., based upon occupancy sensors and/or data provided by the thermostat 102, the detector 103, and/or the camera 72) and may provide a notification 3432 of the unexpected number of occupants. Further, the system 3400 may provide a notification 3434 when climate control falls outside expected bounds (e.g., +/−20 degrees of the default temperature).

Building Maintenance Services

Figure 64:
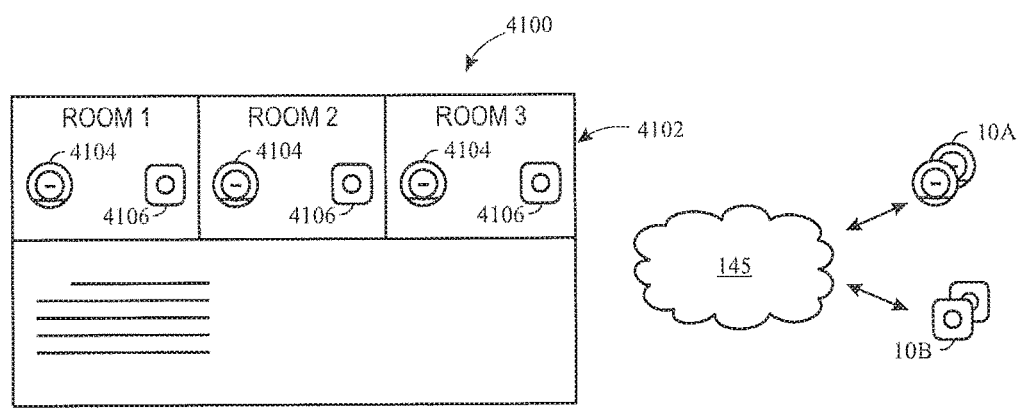
FIG. 64 is an illustration of building management services interacting with the smart devices and/or a smart environment, in accordance with an embodiment.

FIG. 64 illustrates Building Maintenance Services 4100 that may provide a dashboard 4102 or other view that accesses data via the cloud services 145. For example, a hotel may obtain and display the thermostat 10A state 4104, detectors 10B status 4106, and/or other information at a glance for multiple rooms of the hotel. Further, control data may be provided from the Building Maintenance Services to the thermostat 10A, the detector 10B, and/or other smart devices 10C, via the cloud services 145. Accordingly, the Building Maintenance Services 4100 may actively control and/or monitor thermostat 10A, detectors 10B, and or other smart devices 10C, at a single computer.

Voice Over IP (VOIP) Service Interaction

Figure 60:
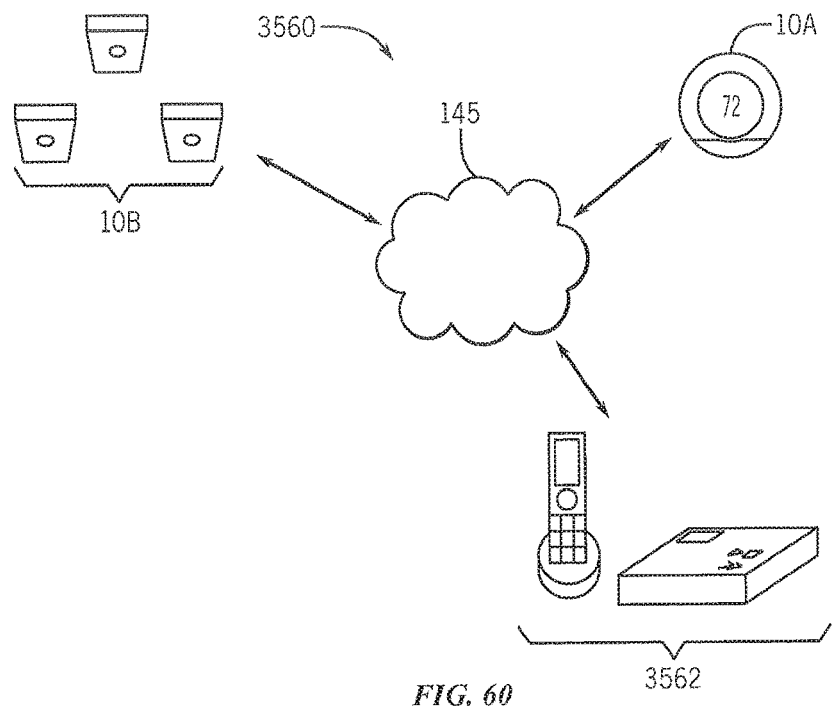
FIG. 60 is a block diagram illustrating a system that integrates a VoIP phone system with smart devices, in accordance with an embodiment.

In some embodiments, VoIP phone system output may be used as a condition for a thermostat 10A and/or smoke detector 10B output and/or a thermostat 10A and/or smoke detector 10B condition may be used for VoIP phone system output. FIG. 60 provides a system 3560 that integrates a VoIP phone system 3562 with smart devices 10A and/or 10B. It should be noted that although a VoIP phone system is used in the current discussion, any phone system for a business or home that is enabled to connect to the Internet or a local area network may be used.

In some embodiments, the VoIP phone system 3562 may access certain data related to the smart devices 10A and 10B via the cloud services 145 and/or API(s) interfacing with the smart devices 10A and 10B. For example, the VoIP phone system 562 may access data related to whether the smart devices 10A and 10B are in the "HOME" mode, "AWAY" mode, or "AUTO-AWAY" mode. When the smart devices 10A and/or 10B change from "HOME" mode to "AWAY" mode or "AUTO-AWAY" mode, the VoIP phone system 3562 may automatically forward incoming calls to a pre-configured phone number (e.g., the user's cell phone). When the smart devices 10A and 10B change modes from "AWAY" mode or "AUTO-AWAY" mode to "HOME" mode, the VoIP phone system 3562 may turn off the call forwarding feature and incoming calls may be received via the user's home telephone number.

Further, in some embodiments, voice notifications may be provided using the VoIP phone system 3562 based on data (e.g., conditions) of the smart devices 10A and/or 10B. For example, when any detector 10B in the system 3560 change an alarm system state to "emergency" and stays in that state for a configurable amount of time (e.g., 30, 60, 90, 120, 150 seconds, the VoIP phone system 3562 may call the user on a pre-configured phone number (e.g., the user's cell phone). Once answered, the VoIP phone system 3562 may play a pre-recorded voice message letting the user know what alarm states have been trigged (smoke, CO, or both) and may also present a pre-recorded voice message where the user will have the option to enter "911" to initiate a 911 call from their VoIP phone system 3562 and have the call patched through on the existing call. Since the 911 call originates from the VoIP phone system 3562, the call may automatically be routed to the user's local public safety answering point (PSAP) where the authorities have address and location information of the user's home. This may allow emergency response personnel to response much more quickly than if the 911 call had been placed from the user's cell phone. The user may also have the option to pause the VoIP phone system 3562 prompt to check other sensors/services to verify the alarm condition. This feature may operate regardless of the smart devices' home/away status.

Additionally, in some embodiments, check-in monitoring may be enabled using the VoIP phone system 3562 and data obtained from the smart devices 10A and 10B. For example, the user may configure a schedule during which a structure's away state should be set to "HOME" at some point during the configured time window. That is, the user may expect their kids to come home between 3-4 PM on weekdays, or their elderly parents to be home between 8-10 PM every day. If the structure's away state is set to "AWAY" or "AUTO-AWAY" for the entire duration of the configured time window and never enters the "HOME" state, the check-in policy fails and the VoIP phone system 3562 may call the user on a pre-configured phone number. Once answered, the VoIP phone system 3562 may play a pre-recorded voice message alerting the user of the situation.

In addition, in some embodiments, the user may be presented an option by the VoIP phone system 3562 to press a button to connect directly to the person who is being monitored and the VoIP phone system 3562 may patch in the person being monitored by calling their pre-recorded phone number. Additionally or alternatively, a push notification and/or email notification may be sent to the user through an application tailored for the VoIP phone system 3562 installed on the user's mobile device (e.g., smart phone, tablet, laptop, etc.) to alert the user of the situation.

Insurance Service Interaction

Figure 63:
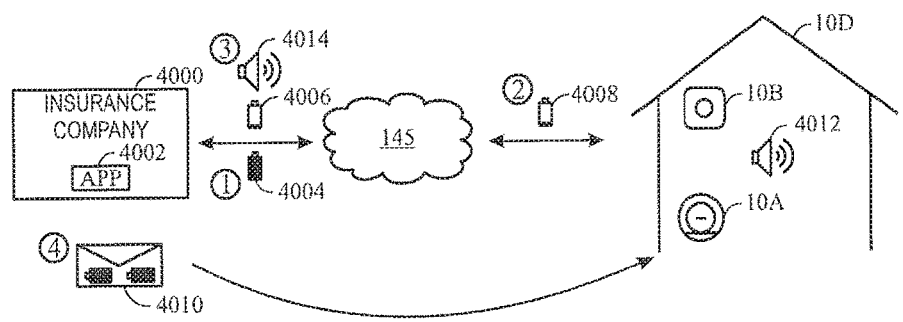
FIG. 63 is an illustration of insurance service providers interacting with the smart devices and/or a smart environment, in accordance with an embodiment.

In some embodiments, as depicted in FIG. 63, Insurance Service Providers 4000 may wish to interact with the smart devices (e.g., 10A and/10B) and/or smart environment 10D. In some embodiments, an insurance service provider application 4002 may interact with the cloud services 145 to communicate with the smart devices 10 and/or smart environment 10D. For example, the insurance provider application 4002 may request 4004 and obtain 4006 status indicators from hazard detectors 10B, such as smoke detector and/or a carbon dioxide detector. In one embodiment, the insurance service provider application 4002 may obtain a battery level 4008 of the hazard detectors 10B in the smart environment 10D. When the battery level indicates that low battery level, the insurance company may mail 4010 new batteries to their customers associated with the smart environment 10D.

Further, in some embodiments, when an alarm 4012 is activated by a smart device (e.g., hazard detector 10B), the insurance provider application 4002 may become aware of a triggered alarm status 4014. After a certain threshold amount of time (e.g., 24 hours), the Insurance Service Provider 4000 may contact the customer associated with the smart environment 10D to determine if a claim should be filed, ascertain damages, etc.

Internet Service Providers

Internet Service Providers (ISPs) may provide a dashboard or other view that accesses data via the cloud services 145. For example, the ISPs may obtain and provide the thermostat 10A state, detectors 10B status, and/or other information at a glance.

Certain partners may be offered click through incentives to drive their customers to the thermostat 10A and/or detector 10B manufacturer's products. For example, the partners may provide a thermostat icon and/or a home icon that links to the manufacture's products in the partner's user interface. If the partner's customers clicks through to the manufacturer's product and/or purchases the manufacturer's product, the partner may receive an incentive, such as a monetary reward.

Use Case Development Kits

In certain embodiments, developer kits may be provided, which may enable vendors of smart devices to implement the use cases discussed herein with their products. A code wrapper for various types of smart-devices may be created, which may simplify implementation of the use cases, by providing out of the box configuration with the cloud services 145, such that the use cases may be implemented. For example, code may be provided in the developer kit that is specifically designed for a smart light bulb. The code may provide out of the box instructions for an application, such that the application may configure the smart light bulb for implementation of one or more of the use cases described herein. Thus, application developers may make use of these developer kits, to implement use cases for their smart devices with relative ease. The smart light bulb example is just one non-limiting example. Developer kits may be designed for any of the smart devices and/or use cases discussed herein.

Video Camera Interaction

Figure 61:
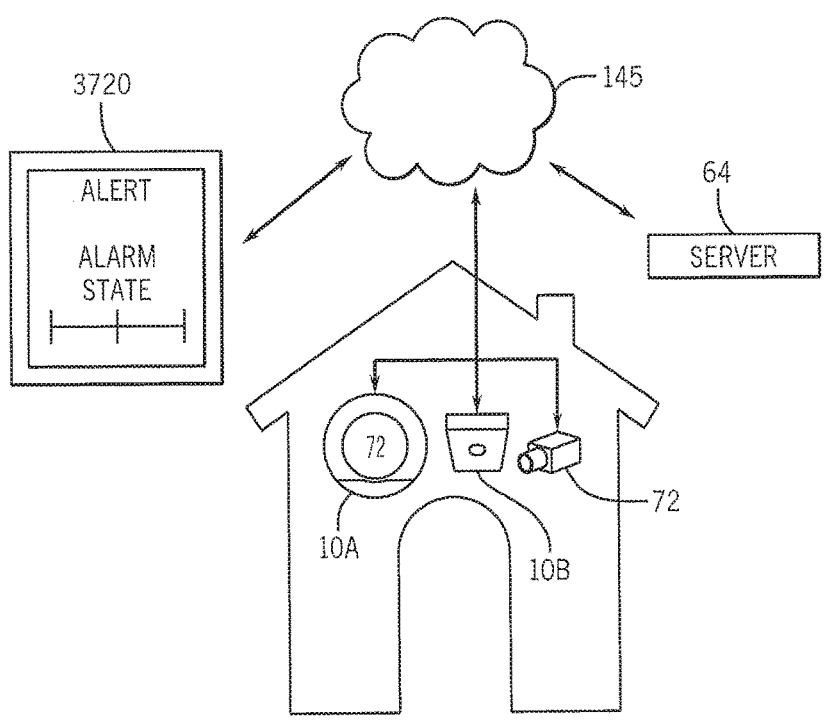
FIG. 61 is a block diagram illustrating control/reporting relating to smart video cameras in the smart environment, in accordance with an embodiment.

As previously mentioned, the smart environment 30 may include one or more smart video cameras 72. In some embodiments, smart video camera data (e.g., conditions) may be used to affect changes in a smart device and/or smart environment 10, such as thermostat 10A, detectors 10B, and/or other smart devices 10C. Additionally or alternatively, smart device and/or smart environment 10 data (e.g., conditions) may be used to affect changes in the smart video cameras 72. FIG. 61 provides an illustration of relational control between smart video camera 72 and the thermostat 10A and/or detectors 10B in the smart environment 30. The smart video camera 72 may exchange information with smart devices 10A, 10B, and/or central server or cloud-computing system 64 via cloud services 145.

In some embodiments, when the user manually sets the home/away status of the smart devices 10A/10B, certain alerts provided by the smart video camera 72 to the user's mobile device 3720 may be enabled or disabled. For example, if the smart devices 10A/10B enter the "AWAY" mode, then the smart video camera 72 may provide alerts to the user if a person is detected in the house. For example, the camera 72 may take a snapshot of whether movement is detected and send the image to the user. Further, a manual home/away status change by the user may cause the smart video camera 72 to activate or deactivate. For example, the smart video camera 72 may activate when the user sets the smart devices 10A/10B to "AWAY" mode, and the smart video camera 72 may deactivate when the user sets the smart devices 10A/10B to "HOME".

Additionally, in some embodiments, the smart video camera 72 may activate when the detectors 10A enter an alarm state (e.g., by detecting CO and/or smoke). Further, the smart video camera 72 may auto-generate a video clip of the home while the detectors 10A are in the alarm state and send the video clip to the user. In addition, push notifications may be sent to the smart video camera 72 and/or mobile device 3720 when the detectors 10B are in the alarm state. Further, the alarm state detected by the detectors 10B may be shown in a timeline activity feed displayed on an app tailored for the smart video camera 72, where the app may be installed on the mobile device 3720.

Further, in some embodiments, the mobile device 3720 may act as a remote control that triggers a picture capture (or video capture) by the camera 72. For example, a control signal may be sent by the mobile device 3720, via the cloud services 145, to the camera 72. Once the control signal is received, the camera 72 may enter a picture and/or video capture mode.

In some embodiments, certain motion and/or sound events occur, video, snapshots and/or audio captured by the cameras 72 may be pushed to an occupant. For example, when a door is opened and/or closed, a doorbell is activated, a door knock is detected (e.g., by a microphone, motion sensor, vibration detection device, etc. at the door), a door lock is locked and/or unlocked, etc., a camera 72 in view of the doorway may be activated. For example, the camera 72 may be a camera 72 integrated into the doorbell, the door, or may be a standalone camera 72 near the door. The camera 72 may take a snapshot and/or video feed and send the snapshot and/or video feed to smart environment 10D occupants (e.g., via a smart application on the occupant's smart phone, via a television, via handheld electronic devices, etc.).

Thus, it should be noted that there may be certain activity zones that are used in triggers. The activity zones may be used to program a rule that obtains a snapshot, or some other action from the camera 72, when a defined activity occurs in a certain zone. For example, when motion is sensed, when a door opens and/or closes, when the lock is unlocked and/or locked, when garage door opens and/or closes, when animal door moves, when a window is opened, closed, and/or is broken, when lights are turned on and/or off, and the like in a certain zone, a rule may dictate that a snapshot be taken by the camera 72 and sent to the user. For example, in some embodiments, the event may include a pet walking in a feeding area (activity zone). This may trigger the action of taking a snapshot and sending the snapshot to the user. Further, a more granular event may include establishing an activity zone around the feeding bowl and taking a snapshot when the pet is detected in the activity zone. This may enable a user to determine when their pet is feeding. Further a feeding history report may be generated for the pet based on the events detected in the activity zones.

Additionally, a last available snapshot taken from the camera 72 may be sent to the user when the activity occurs in the activity zone. In some embodiments, the rule may indicate that the camera 72 should zoom in on the activity that triggers the event. In some embodiments, the door, lock, or other devices in the smart environment 30 may request the snapshot image from the camera 72 when the event occurs in the activity zone and the image may be forwarded to the user. In some embodiments, the camera 72 may be configured to push the snapshot image to the user when the event occurs in the activity zone.

The examples provided herein are not meant to be limiting examples. There may be many other actions that may be triggered as a result of an event occurring in an activity zone. For example, lights may be turned on or off when movement is detected by the video camera 72. Additionally and/or alternatively, a door lock may be locked or unlocked, the shades be opened or closed, the music may be turned on or off, and so forth.

Additionally, if the door is locked and/or unlocked, a change in status of a smart lock system may be made available via the cloud services 145. In response to these status changes, proximate cameras 72 may be activated upon such status changes, to capture video and/or audio of door usage.

Further, in some embodiments, the cameras 72 may be used as motion detectors. In such embodiments, motion detection status may be made available via the cloud services 145. Lighting systems that are in proximity to the detected motion and are attached to the cloud services 145 may be activated, either as a security measure and/or to facilitate mobility of occupants.

Further, in certain embodiments, when unexpected motion is detected and/or no internal motion is detected for an extended period of time, simulated occupancy may be generated. For example, upon detection of unexpected motion, lighting systems, speaker systems, audio/visual systems, etc. may be activated to simulate occupancy. Such simulated occupancy may deter unauthorized occupancy of the smart environment 10D.

In some embodiments, the cameras 72 may identify particular occupants of the smart environment 10D. For example, facial and/or body recognition may be used by the cameras 72 to determine occupants and their locations within the smart environment 10D. Accordingly, based upon this information, particular preferences of an occupant may be tailored to the location of the occupant. For example, if occupant A is upstairs and occupant B is downstairs, the upstairs thermostat 10A may be tailored to occupant A's preference. The downstairs thermostat 10A may be tailored to occupant B's preferences. Further, certain functionality may enable color mapping of a person's skin-tone and makeup to provide a modified image with an altered skin shade. The modified image may enable enhanced identification of the user in the image.

In some embodiments, it may be useful to alter ambient lighting based upon certain factors that may be observed by the camera 72. For example, in some embodiments, the camera 72 may not sense motion and/or sound for a certain period of time. Upon such an observation, lights in the environment 30 may be dimmed or turned off. This may be especially useful when an occupant (e.g., a child) has likely fallen asleep, as lighting may disturb sleep patterns. The modified lighting may be facilitated by the cloud services 145, by providing an indication of the lack of movement in the environment 30 to the cloud services 145. After receiving the indication from the camera 72, the cloud services 145 may send a control signal to smart lights, indicating that the lights should be dimmed or turned off.

Further, in some embodiments, indoor lighting may be tuned to match ambient lighting of the environment 30. For example, the camera 72 may provide an indication of the environment 30's ambient light levels to the cloud services 145. The cloud services 145 may then provide a control signal to one or more smart lights, providing an instruction to adjust to a level corresponding to the ambient light provided by the camera 72.

Additionally and/or alternatively, third party vendors may use the cloud services 145 to obtain access points to the cameras 72 and provide links to the cameras 72 within their applications. For example, a third party garage door manufacturer may obtain access to an environment 10D's garage cameras 72 and provide a link (e.g., a URL) to a feed of the garage cameras 72 via the garage door manufacturer's own application.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The invention claimed is:

1. A system, comprising:
an application programming interface (API) client device, comprising a camera, the camera comprising a processor configured to:
provide submission data to an application programming interface (API), the submission data including information about the camera to be processed by a cloud service that includes a data model associated with the API, the data model comprising information related to one or more smart-devices, one or more smart-device environment structures comprising the smart-devices, or both; and
receive reception data from the API, the reception data including information about the one or more smart-devices, the one or more smart-device environment structures comprising the smart-devices, or both, a camera status of the camera being modified based upon the reception data, and a smart-device status being modified based upon the submission data, or both.

2. The system of claim 1, wherein:
the data model comprises a single JavaScript Object Notation (JSON) document describing the one or more smart-device environment structures, the one or more smart-devices, or both, and the one or more smart-devices comprise: a thermostat, a hazard detector, a lighting controller, security system, a doorbell, or any combination thereof;
the processor is configured to provide the submission data, receive the reception data, or both by providing a request to a representational state transfer (REST) host, a subscription-based application programming interface (API) host, or both; and
the REST host receives REST-based messages and the subscription-based API host receives messages in accordance with a standard of the subscription-based API host.

3. The system of claim 1, the system comprising one or more smart-lights within one of the one or more smart-device environment structures;
the processor configured to:
include an indication of motion detection in the submission data that is effective to operate the one or more smart-lights.

4. The system of claim 3, wherein the indication of the motion detection is a detection of motion by the camera inside or outside of the one of the one or more smart-device environment structures, and wherein the operation of the one or more smart-lights activates the smart-lights for a period of time.

5. The system of claim 4, wherein the one or more smart-lights are activated immediately after the detection of the motion, activated after a fixed time delay after the detection of the motion, or activated after a bounded, random time delay after the detection of the motion.

6. The system of claim 3, wherein the indication of the motion detection is that no motion has been detected by the camera for a period of time, and wherein the operation of the one or more smart-lights is to dim or turn off the smart-lights.

7. The system of claim 3, wherein the camera monitors an activity zone, and wherein the motion is detected in the activity zone.

8. The system of claim 1, wherein the received reception data includes a trigger from one of the one or more smart-devices, and wherein the trigger is effective to cause the camera to capture a picture or a video.

9. The system of claim 8, wherein the trigger is: sensing motion in a certain activity zone, a door opening or closing, a lock being locked or unlocked, a window being opened or closed, a garage door opening or closing, an animal door moving, a window being broken, lights being turned on or off, a request from a user device to capture the picture or the video, or any combination thereof.

10. A method for controlling a camera, the method comprising:
providing submission data to an application programming interface (API), by the camera, which is an API client device, the submission data including information about the camera to be processed by a cloud service that includes a data model associated with the API, the data model comprising information related to one or more smart-devices, one or more smart-device environment structures comprising the smart-devices, or both; and;

receiving reception data from the API, the reception data including information about the one or more smart-devices, the one or more smart-device environment structures comprising the smart-devices, or both, a camera status of the camera being modified based upon the reception data, and a smart-device status being modified based upon the submission data, or both.

11. The method of claim 10, comprising:

detecting motion, by the camera, in an activity zone inside or outside of one of the one or more smart-device environment structures; and including an indication of the detected motion in the submission to the API that is effective to operate one or more smart-lights within the one of the one or more smart-device environment structures.

12. The method of claim 11, wherein the one or more smart-lights are activated immediately after the detection of the motion, activated after a fixed time delay after the detection of the motion, or activated after a bounded, random time delay after the detection of the motion.

13. The method of claim 10, the method comprising:

measuring, by the camera, an ambient light level; and including an indication of the ambient light level in the submission data that is effective to adjust one or more smart-lights to a level corresponding to the ambient light level.

14. The method of claim 10, wherein the received reception data includes a trigger from one of the one or more smart-devices, the method comprising:

capturing a picture or a video in response to the trigger.

15. The method of claim 14, wherein the trigger is: sensing motion in a certain activity zone, a door opening or closing, a lock being locked or unlocked, a window being opened or closed, a garage door opening or closing, an animal door moving, a window being broken, lights being turned on or off, a request from a user device to capture the picture or the video, or any combination thereof.

16. An application programming interface (API) client device, comprising a camera, the camera comprising a processor configured to:

provide submission data to an application programming interface (API), the submission data including information about the camera to be processed by a cloud service that includes a data model associated with the API, the data model comprising information related to one or more smart-devices, one or more smart-device environment structures comprising the smart-devices, or both; and receive reception data from the API, the reception data including information about the one or more smart-devices, the one or more smart-device environment structures comprising the smart-devices, or both, a camera status of the camera being modified based upon the reception data, and a smart-device status being modified based upon the submission data, or both.

17. The API client device of claim 16, the processor configured to:

detect motion in an activity zone inside or outside of one of the one or more smart-device environment structures; and include an indication of the detected motion in the submission data to the API, the indication being effective to operate one or more smart-lights within the one of the one or more smart-device environment structures.

18. The API client device of claim 17, wherein the one or more smart-lights are activated immediately after the detection of the motion, activated after a fixed time delay after the detection of the motion, or activated after a bounded, random time delay after the detection of the motion.

19. The API client device of claim 17, wherein the indication of the motion detection is that no motion has been detected by the camera for a period of time, and wherein the operation of the one or more smart-lights is to dim or turn off the smart-lights.

20. The API client device of claim 16, wherein the received reception data includes a trigger from one of the one or more smart-devices, wherein the trigger is effective to cause the camera to capture a picture or a video, and wherein the trigger is: sensing motion in a certain activity zone, a door opening or closing, a lock being locked or unlocked, a window being opened or closed, a garage door opening or closing, an animal door moving, a window being broken, lights being turned on or off, a request from a user device to capture the picture or the video, or any combination thereof.

* * * * *